United States Patent
Sathyanarayan et al.

(10) Patent No.: US 11,848,810 B2
(45) Date of Patent: Dec. 19, 2023

(54) IMPLEMENTATION OF ORTHOGONAL TIME FREQUENCY SPACE MODULATION FOR WIRELESS COMMUNICATIONS

(71) Applicant: Cohere Technologies, Inc., Santa Clara, CA (US)

(72) Inventors: Seshadri Sathyanarayan, Santa Clara, CA (US); Shlomo Selim Rakib, Santa Clara, CA (US)

(73) Assignee: Cohere Technologies, Inc., San Jose, CA (US)

( * ) Notice: Subject to any disclaimer, the term of this patent is extended or adjusted under 35 U.S.C. 154(b) by 0 days.

(21) Appl. No.: 17/456,024

(22) Filed: Nov. 22, 2021

(65) Prior Publication Data
US 2022/0085928 A1   Mar. 17, 2022

Related U.S. Application Data

(63) Continuation of application No. 15/733,176, filed as application No. PCT/US2018/063818 on Dec. 4, 2018, now Pat. No. 11,184,122.
(Continued)

(51) Int. Cl.
*H04L 5/00* (2006.01)
*H04L 27/00* (2006.01)
(Continued)

(52) U.S. Cl.
CPC ....... *H04L 27/26532* (2021.01); *H04B 1/385* (2013.01); *H04L 5/0007* (2013.01);
(Continued)

(58) Field of Classification Search
CPC . H04L 5/0007; H04L 5/0053; H04L 27/0008; H04L 27/206; H04L 27/2602; H04L 27/2647; H04B 1/385
(Continued)

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 204044598 | * 5/2014 |
| WO | 2011150315 | 12/2011 |

(Continued)

OTHER PUBLICATIONS

CN204044598 English Translation, LED Illumination Device and an Intelligent Home Control System, May 13, 2014.*
(Continued)

*Primary Examiner* — Ted M Wang
(74) *Attorney, Agent, or Firm* — Paradice & Li LLP

(57) ABSTRACT

Device, methods and systems for implementing aspects of orthogonal time frequency space (OTFS) modulation in wireless systems are described. In an aspect, the device may include a surface of an object for receiving an electromagnetic signal. The surface may be structured to perform a non-electrical function for the object. The surface may generate an electrical signal from an electromagnetic signal. The electromagnetic signal may be received from a transmitter. The transmitter may map digital data to a digital amplitude modulation constellation in a time-frequency space. The digital amplitude modulation constellation may be mapped to a delay-Doppler domain and the transmitter may transmit to the surface according to an orthogonal time frequency space modulation signal scheme. The apparatus may further include a demodulator to demodulate the electrical signal to determine digital data.

20 Claims, 123 Drawing Sheets

Related U.S. Application Data

(60) Provisional application No. 62/622,046, filed on Jan. 25, 2018, provisional application No. 62/620,989, filed on Jan. 23, 2018, provisional application No. 62/621,002, filed on Jan. 23, 2018, provisional application No. 62/594,490, filed on Dec. 4, 2017, provisional application No. 62/594,497, filed on Dec. 4, 2017.

(51) Int. Cl.
*H04L 27/26* (2006.01)
*H04B 1/3827* (2015.01)
*H04L 27/20* (2006.01)

(52) U.S. Cl.
CPC ........ *H04L 5/0053* (2013.01); *H04L 27/0008* (2013.01); *H04L 27/206* (2013.01); *H04L 27/2602* (2013.01); *H04L 27/2636* (2013.01); *H04L 27/2647* (2013.01); *H04L 5/0044* (2013.01); *H04L 27/26526* (2021.01)

(58) Field of Classification Search
USPC ........................................................ 375/260
See application file for complete search history.

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,651,912 B2 | 5/2020 | Wang et al. |
| 10,667,148 B1 | 5/2020 | Hadani et al. |
| 10,681,568 B1 | 6/2020 | Hadani et al. |
| 10,693,581 B2 | 6/2020 | Rakib et al. |
| 10,693,692 B2 | 6/2020 | Hadani et al. |
| 10,716,095 B2 | 7/2020 | Rakib et al. |
| 10,749,651 B2 | 8/2020 | Hebron et al. |
| 10,826,728 B2 | 11/2020 | Tsatsanis et al. |
| 10,855,425 B2 | 12/2020 | Kons et al. |
| 10,873,418 B2 | 12/2020 | Kons et al. |
| 10,886,991 B2 | 1/2021 | Akoum et al. |
| 11,050,530 B2 | 6/2021 | Wang et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2007/0263752 A1 | 11/2007 | Guey et al. |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |

(56) References Cited

U.S. PATENT DOCUMENTS

| | | |
|---|---|---|
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Mm et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288913 A1 | 10/2017 | Rakib et al. |
| 2017/0289961 A1 | 10/2017 | Rakib et al. |
| 2018/0025497 A1* | 1/2018 | Lai .................... G06T 7/246 382/107 |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1* | 3/2019 | Hadani .............. H04L 27/2647 |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |
| 2021/0194732 A1 | 6/2021 | Kons et al. |

FOREIGN PATENT DOCUMENTS

| | | |
|---|---|---|
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017044501 | 3/2017 |
| WO | 2017087706 | 5/2017 |
| WO | 2017100666 | 6/2017 |
| WO | 2017147439 | 8/2017 |
| WO | 2017165697 | 9/2017 |
| WO | 2017173160 | 10/2017 |
| WO | 2017173389 | 10/2017 |
| WO | 2017201467 | 11/2017 |
| WO | 2018031938 | 2/2018 |
| WO | 2018031952 | 2/2018 |
| WO | 2018032016 | 2/2018 |
| WO | 2018064587 | 4/2018 |
| WO | 2018064605 | 4/2018 |
| WO | 2018106731 | 6/2018 |
| WO | 2018129554 | 7/2018 |
| WO | 2018140837 | 8/2018 |
| WO | 2018191309 | 10/2018 |
| WO | 2018195548 | 10/2018 |
| WO | 2018200567 | 11/2018 |
| WO | 2018200577 | 11/2018 |
| WO | 2019014332 | 1/2019 |
| WO | 2019032142 | 2/2019 |

(56) References Cited

FOREIGN PATENT DOCUMENTS

| | | |
|---|---|---|
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019060596 | 5/2019 |
| WO | 2019089986 | 5/2019 |
| WO | 2019113046 | 6/2019 |
| WO | 2019157230 | 8/2019 |
| WO | 2019173775 | 9/2019 |
| WO | 2019241436 | 12/2019 |
| WO | 2019241589 | 12/2019 |
| WO | 2020142520 | 7/2020 |
| WO | 2020206304 | 10/2020 |
| WO | 2020227619 | 11/2020 |
| WO | 2020247768 | 12/2020 |
| WO | 2021026212 | 2/2021 |
| WO | 2021062354 | 4/2021 |

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.

CATT, "UL ACK/NACK transmission methods for LTE-A," 3GPP TSG RAN WG1 Meeting #60bis, R1-102453, Beijing, China, Apr. 12-16, 2010, 8 pages.

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).

Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.

* cited by examiner

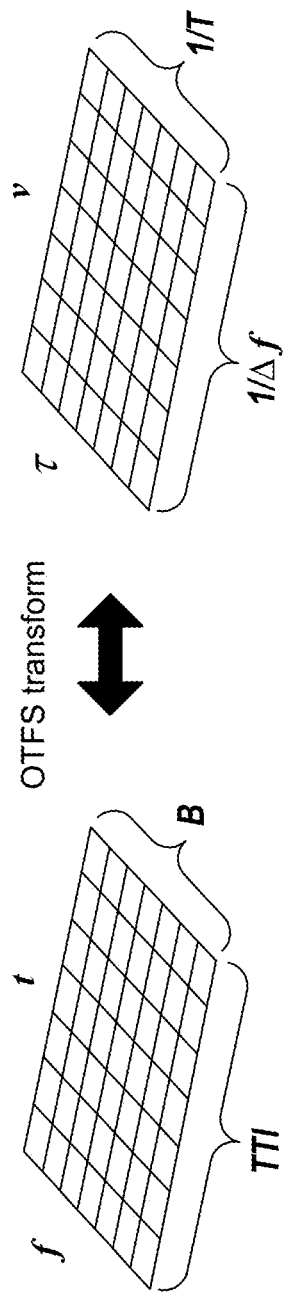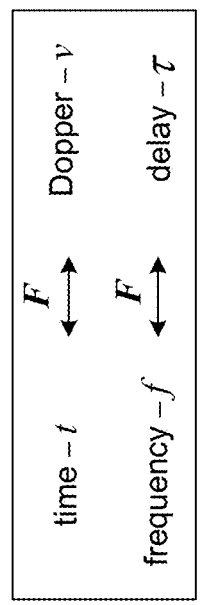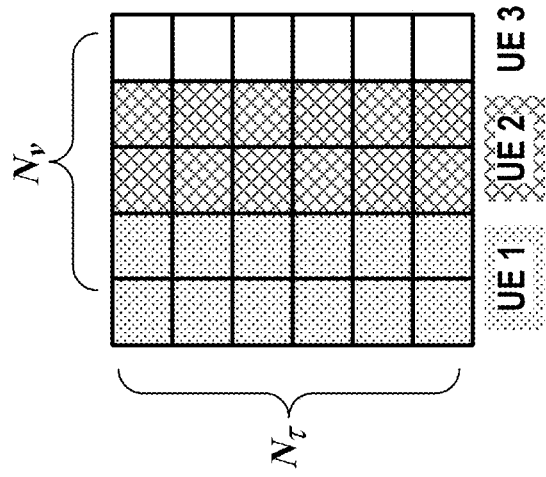
FIG. 1
FIG. 2

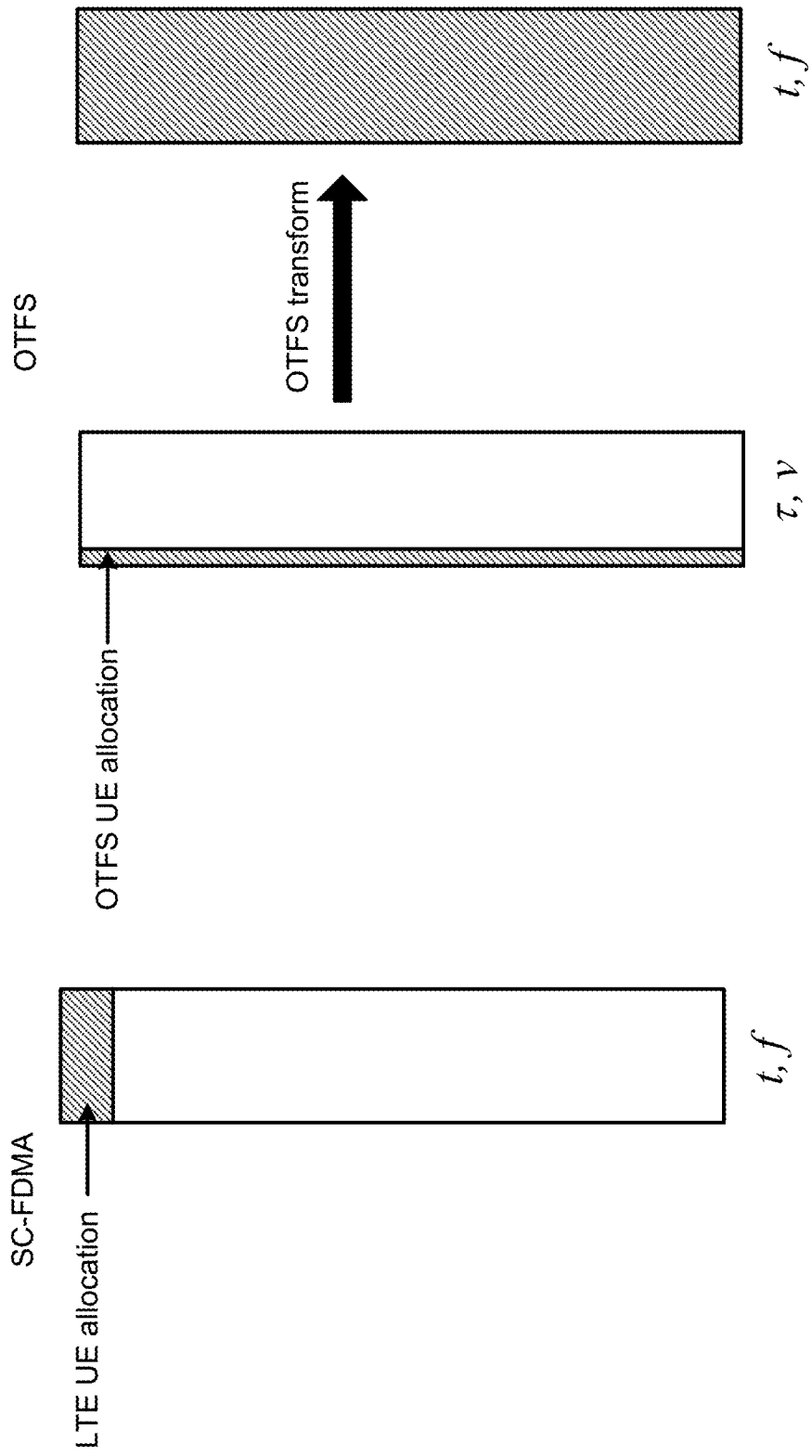

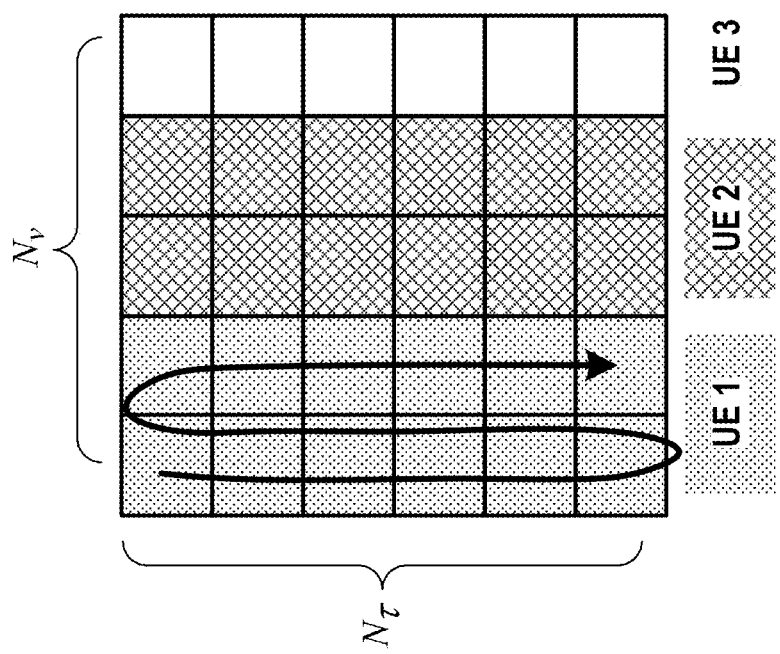

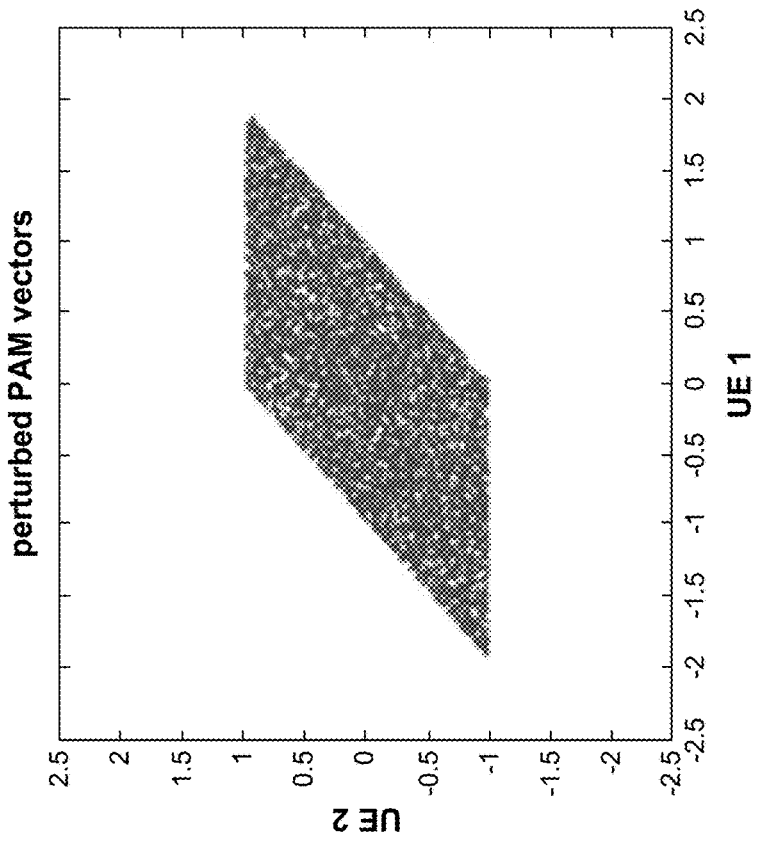
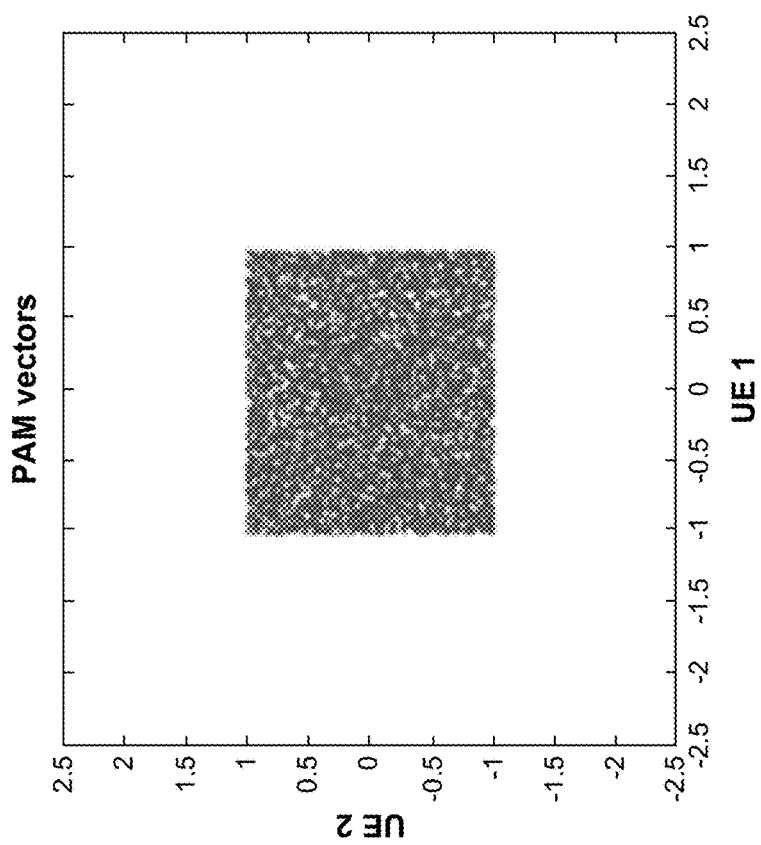
FIG. 57

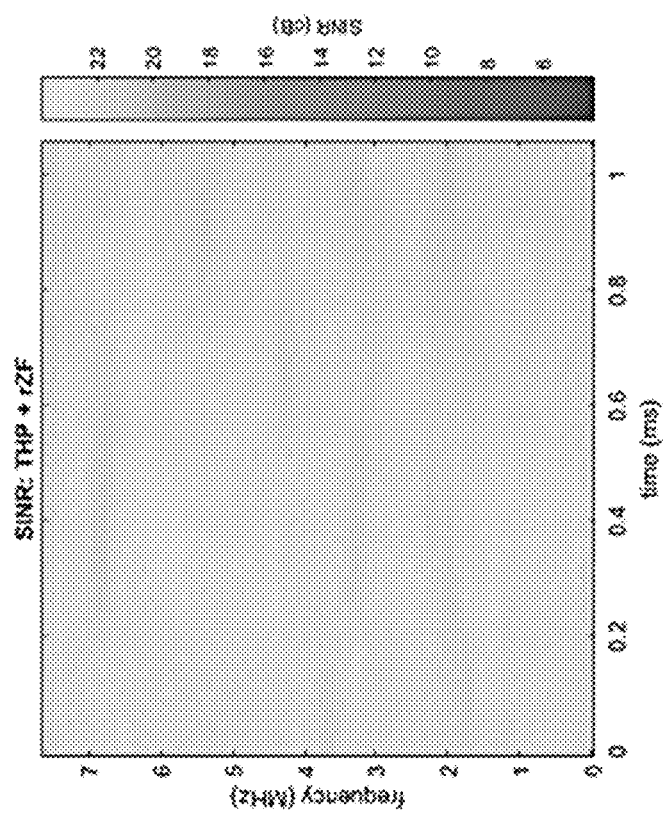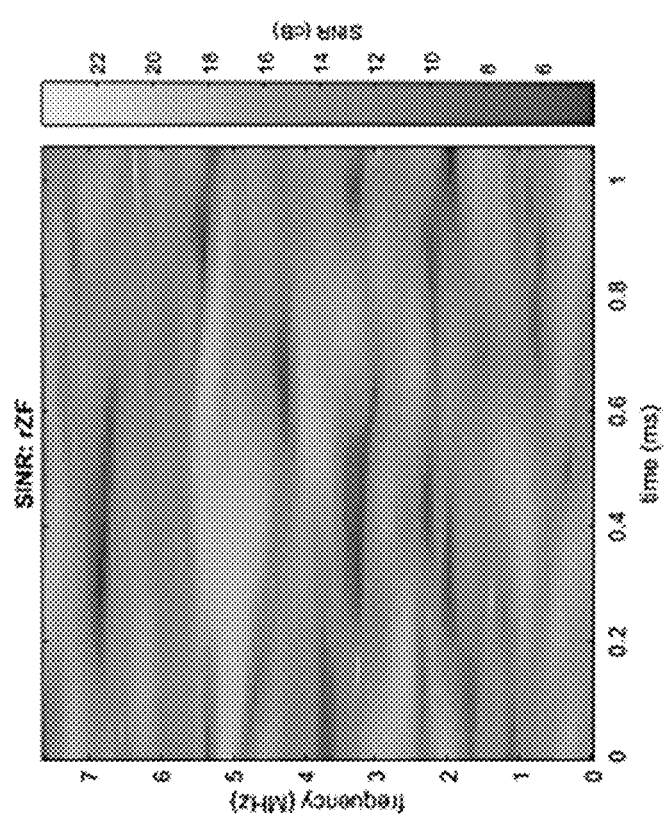
FIG. 76

$$\varepsilon_r = 2 - (r/a)^2$$

where r is the distance from the center of the lens to an interior point, a is the outer radius of the lens and $\varepsilon_r$ is the relative dielectric constant at r.

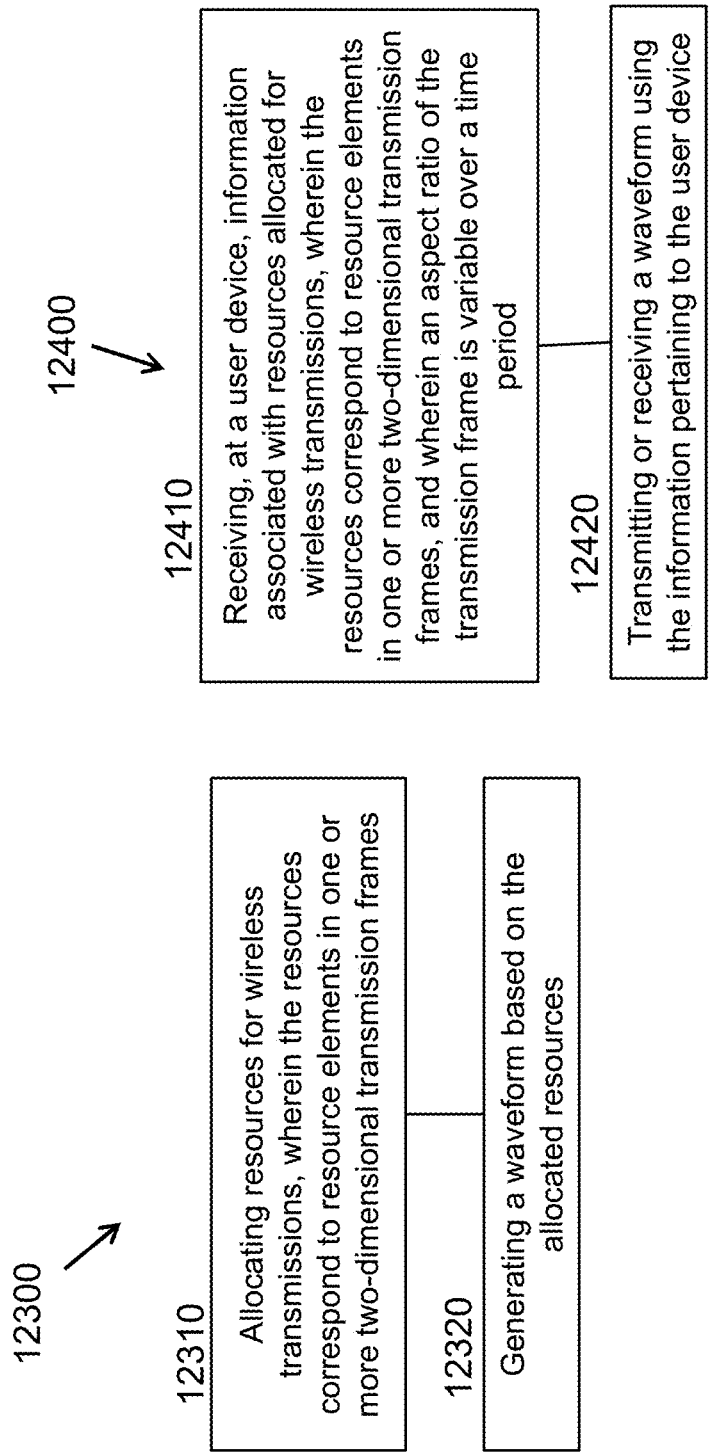

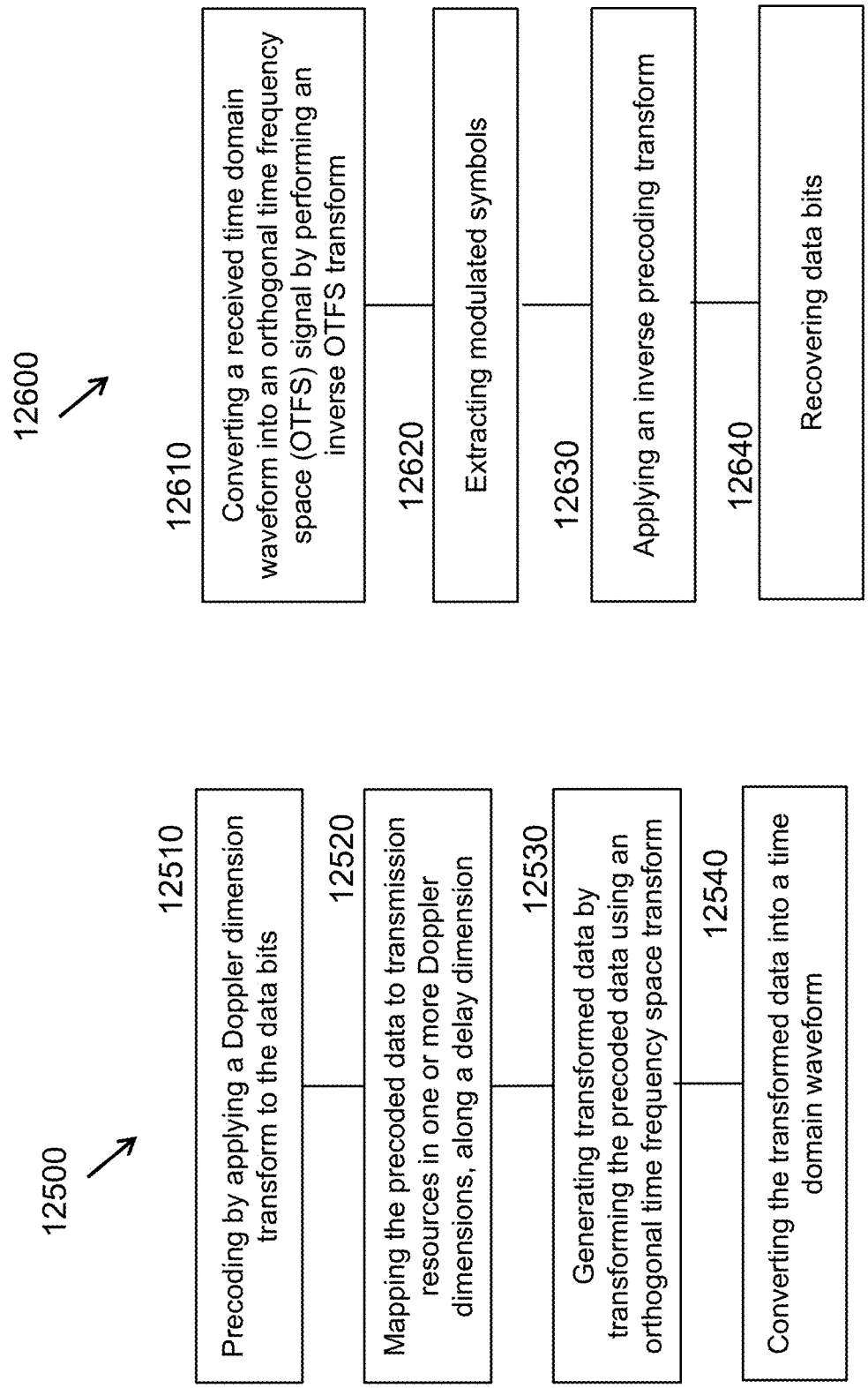

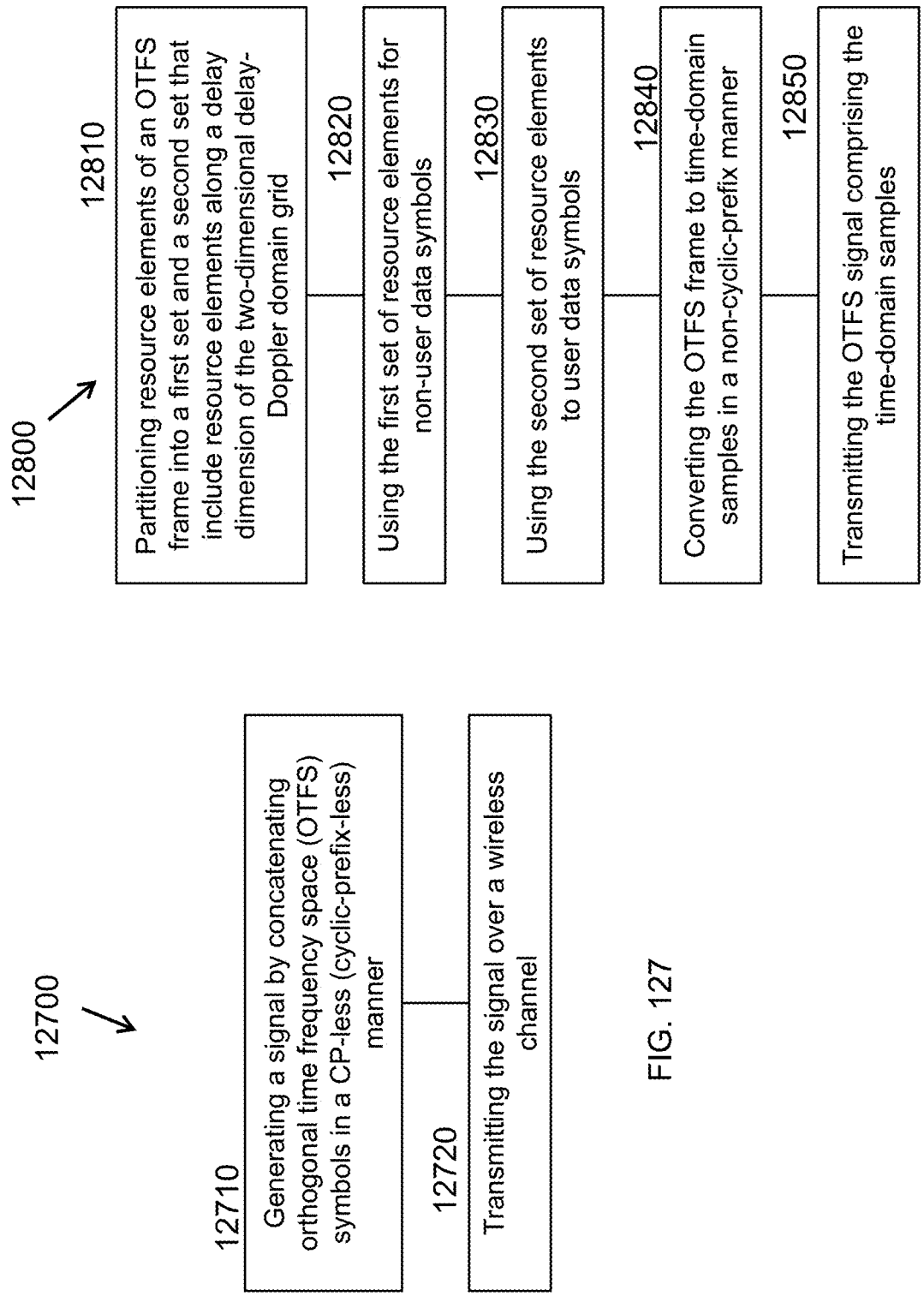

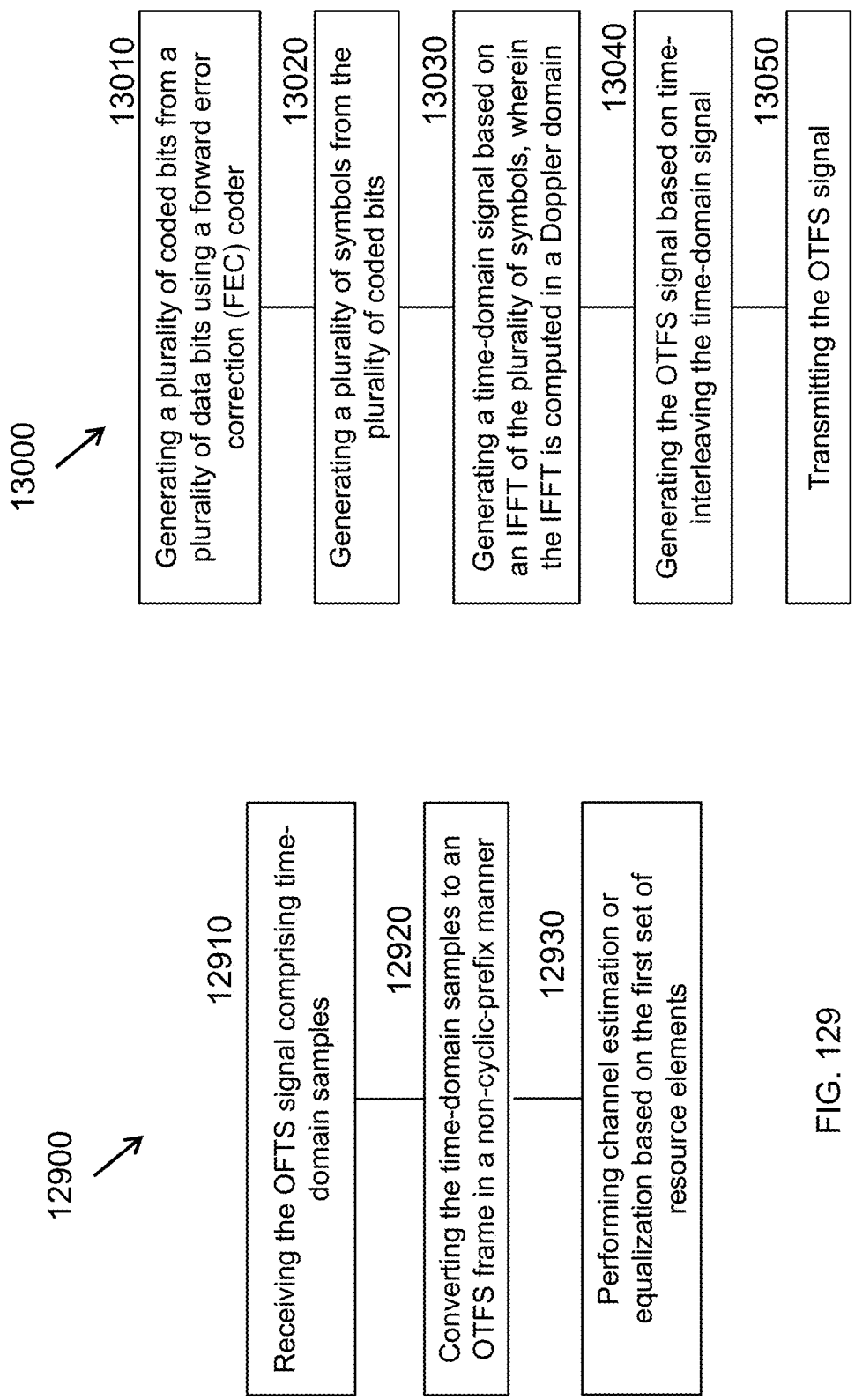

IMPLEMENTATION OF ORTHOGONAL TIME FREQUENCY SPACE MODULATION FOR WIRELESS COMMUNICATIONS

CROSS-REFERENCES TO RELATED APPLICATIONS

This patent appliction is a continuation appliction claiming priority to U.S. application Ser. No. 15/733,176, filed 4 Jun. 2020, now U.S. Pat. No. 11,184,122, which is a 371 National Phase Application of PCT Application No. PCT/US2018/063818 entitled "IMPLEMENTATION OF ORTHOGONAL TIME FREQUENCY SPACE MODULATION FOR WIRELESS COMMUNICATIONS" filed 4 Dec. 2018 which, claims priority to and benefits of U.S. Provisional Application No. 62/594,497 entitled "ORTHOGONAL TIME FREQUENCY SPACE MULTIPLEXING FOR WIRELESS NETWORKING" filed on 4 Dec. 2017, U.S. Provisional Application No. 62/594,490 entitled "LIGHT BULB WITH INTEGRATED ANTENNA" filed on 4 Dec. 2017, U.S. Provisional Application No. 62/620,989 entitled "VARIABLE FRAME ASPECT RATIO AND DISCRETE FOURIER TRANSFORM PRECODING IN ORTHOGONAL TIME FREQUENCY SPACE MODULATION" filed on 23 Jan. 2018, U.S. Provisional Application No. 62/621,002 entitled "COMMUNICATION OF ORTHOGONAL TIME FREQUENCY SPACE (OTFS) SYMBOLS WITHOUT CYCLIC PREFIXES" filed on 23 Jan. 2018 and U.S. Provisional Application No. 62/622,046 entitled "TRANSMITTER AND RECEIVER IMPLEMENTATION FOR ORTHOGONAL TIME FREQUENCY SPACE MODULATED COMMUNICATIONS" filed on 25 Jan. 2018. The entire contents of the aforementioned patent applications are incorporated by reference herein.

TECHNICAL FIELD

The present document relates to wireless communication, and more particularly, to implementation aspects of orthogonal time frequency space (OTFS) modulation for wireless communications.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques that can be used to implement orthogonal time frequency space (OTFS) modulation for wireless communications.

In one example aspect, a wireless networking receiver apparatus is disclosed. The apparatus may include a surface of an object for receiving an electromagnetic signal. The surface may be structured to perform a non-electrical function for the object. The surface may generate an electrical signal from an electromagnetic signal. The electromagnetic signal may be received from a transmitter. The transmitter may map digital data to a digital amplitude modulation constellation in a time-frequency space. The digital amplitude modulation constellation may be mapped to a delay-Doppler domain and the transmitter may transmit to the surface according to an orthogonal time frequency space modulation signal scheme. The apparatus may further include a demodulator to demodulate the electrical signal to determine digital data.

In another example aspect, a light bulb apparatus is disclosed. The light bulb may include one or more light sources. The light bulb may further include a steerable directional antenna coupled to the one or more light sources. The steerable directional antenna may be further coupled to a transmitter. The transmitter may map digital data to a digital amplitude modulation constellation in a time-frequency space. The digital amplitude modulation constellation may be mapped to a delay-Doppler domain and transmitted to the steerable directional antenna according to an OTFS modulation signal scheme.

In yet another example aspect, a method for wireless communication with a variable frame aspect ratio in an OTFS system includes allocating resources for wireless transmissions, wherein the resources correspond to resource elements in one or more two-dimensional transmission frames, wherein each transmission frame comprises a first number of units along a delay dimension and a second number of units along a Doppler dimension, and wherein an aspect ratio of the transmission frame is variable over a time period, and generating a waveform based on the allocated resources.

In yet another example aspect, a method for wireless communication with a variable frame aspect ratio in an OTFS system includes receiving, at a user device, information associated with resources allocated for wireless transmissions, wherein the resources correspond to resource elements in one or more two-dimensional transmission frames, wherein each transmission frame comprises a first number of units along a delay dimension and a second number of units along a Doppler dimension, and wherein an aspect ratio of the transmission frame is variable over a time period, and transmitting or receiving a waveform using the information pertaining to the user device.

In yet another example aspect, a method for wireless communication with a variable frame aspect ratio in an OTFS system includes generating, from data bits, a signal for transmission wherein the signal corresponds to an output of operations of precoding by applying a Doppler dimension transform to the data bits, thereby producing precoded data, mapping the precoded data to transmission resources in one or more Doppler dimensions, along a delay dimension, generating transformed data by transforming the precoded data using an orthogonal time frequency space transform, and converting the transformed data into a time domain waveform corresponding to the signal.

In yet another example aspect, a method for wireless communication with a variable frame aspect ratio in an OTFS system includes converting a received time domain waveform into an orthogonal time frequency space (OTFS) signal by performing an inverse OTFS transform, extracting, from the OTFS signal, modulated symbols along one or more Doppler dimensions, applying an inverse precoding transform to the extracted modulated symbols, and recovering data bits from an output of the inverse precoding transform.

In yet another example aspect, a method for wireless communication using an OTFS signal comprising one or more OTFS frames in a two-dimensional delay-Doppler domain grid includes generating a signal by concatenating OTFS symbols in a CP-less (cyclic-prefix-less) manner, wherein in each OTFS frame in a two-dimensional delay-Doppler domain grid, for at least some Doppler domain values, a split allocation scheme is used for assigning transmission resources along delay dimension, wherein the split allocation scheme includes allocating a first portion to user data symbols and a second portion to non-user data symbols, and transmitting the signal over a wireless channel.

In yet another example aspect, a method for wireless communication using an OTFS signal comprising one or more OTFS frames in a two-dimensional delay-Doppler domain grid includes partitioning resource elements of an OTFS frame into a first set and a second set that include resource elements along a delay dimension of the two-dimensional delay-Doppler domain grid, using the first set of resource elements for non-user data symbols, using the second set of resource elements to user data symbols, wherein the second set of resource elements comprises lower-numbered delay domain values, converting the OTFS frame to time-domain samples in a non-cyclic-prefix manner, and generating a transmission waveform of the OTFS signal comprising the time-domain samples.

In yet another example aspect, a method for wireless communication using an OTFS signal comprising one or more OTFS frames in a two-dimensional delay-Doppler domain grid includes receiving the OTFS signal comprising time-domain samples, converting the time-domain samples to an OTFS frame in a non-cyclic-prefix manner, wherein resource elements of the OTFS frame are partitioned into a first set and a second set that include resource elements along a delay dimension of the two-dimensional delay-Doppler domain grid, wherein the first set of resource elements are used for non-user data symbols, wherein the second set of resource elements are used for user data symbols, wherein the second set of resource elements comprises lower-numbered delay domain values, and performing channel estimation or equalization based on the first set of resource elements.

In yet another example aspect, a wireless communication apparatus that implements the above-described methods is disclosed.

In yet another example aspect, the method may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 1 shows an example of an OTFS transform.

FIG. 2 shows an example of an OTFS allocation in the delay-spread and Doppler domain.

FIG. 4 shows an example of an OTFS allocation scheme in an uplink.

FIG. 6 shows an example of allocating UE resources along delay dimensions, using one or more than one Doppler dimension.

FIG. 57 is a plot illustrating an example result of a spatial THP.

FIG. 76 shows plots comparing the SINR experienced by 1 UE for two precoding schemes in the MIMO OTFS case.

FIG. 114 depicts an example of an OTFS network and a wired network, in accordance with some example embodiments.

FIG. 115 depicts examples of cases and enclosures that are OTFS surfaces, in accordance with some example embodiments.

FIG. 116 depicts an example of a wireless system including light bulbs with integrated antennas, in accordance with some example embodiments.

FIG. 117 depicts an example of a light pole and an exploded view of the top of the light pole including the light bulb, in accordance with some example embodiments.

FIG. 118 depicts another example of a light pole with a light bulb that includes an antenna for wireless communication, in accordance with some example embodiments.

FIG. 119 depicts an example of a light pole with a light bulb including an antenna and signal processing electronics, in accordance with some example embodiments.

FIG. 120 depicts an example of a mast mounted antenna and an example of a pole mounted antenna, in accordance with some example embodiments.

FIG. 121 depicts an example of a tower mounted antenna and another example of a pole mounted antenna, in accordance with some example embodiments.

FIG. 122 depicts an example of a light pole, in accordance with some example embodiments.

FIG. 123 is a flowchart of a wireless communication method.

FIG. 124 is a flowchart of another wireless communication method.

FIG. 125 is a flowchart of yet another wireless communication method.

FIG. 126 is a flowchart of yet another wireless communication method.

FIG. 127 is a flowchart of yet another wireless communication method.

FIG. 128 is a flowchart of yet another wireless communication method.

FIG. 129 is a flowchart of yet another wireless communication method.

FIG. 130 is a flowchart of yet another wireless communication method.

Figure 131:
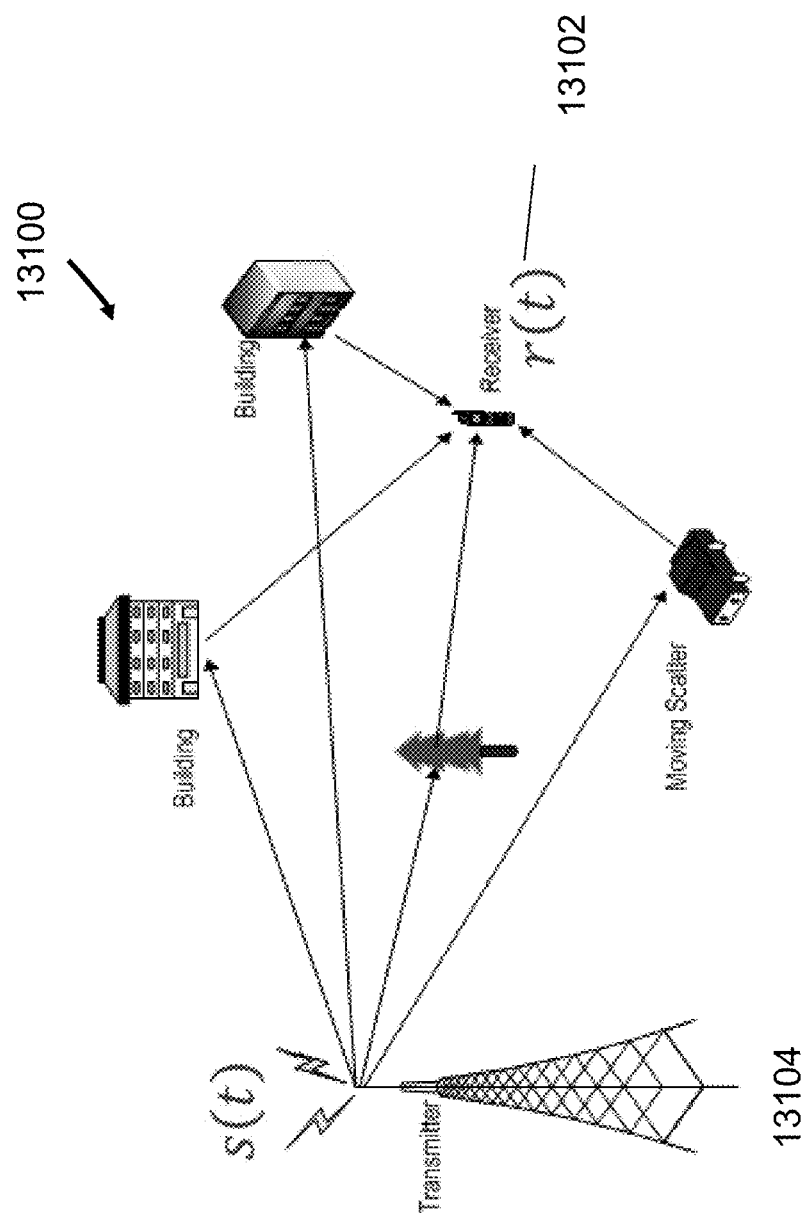

FIG. 131 is an example of a wireless communication system.

Figure 132:
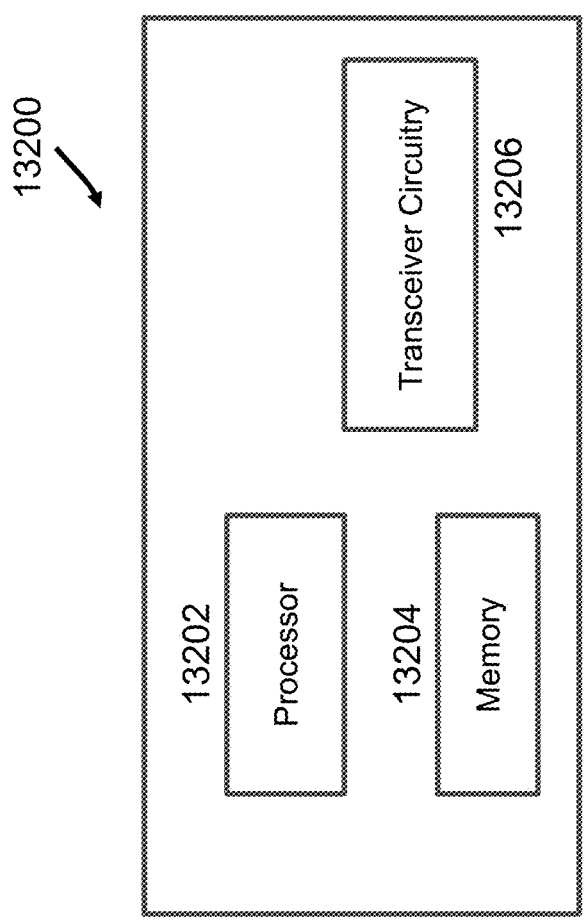

FIG. 132 is a block diagram of a wireless communication apparatus.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. The terms "hub" and user equipment/device are used to refer to the transmitting side apparatus and the receiving side apparatus of a transmission, and each may take the form of a base station, a relay node, an access point, a small-cell access point, user equipment, and so on.

The present document describes various implementation aspects of OTFS modulation for wireless communications, and is organized as follows: Section 1 provides an overview of OTFS modulation, and Sections 2 and 3 discuss OTFS communication without cyclic prefixes and using variable frame aspect ratios, respectively. Section 4 covers OTFS multiple access and precoding, and Section 5 covers transmitter and receiver implementations, which may be used to implement OTFS modulated wireless communications that are characterized by the features discussed in Sections 2-5. Section 6 covers hardware and antenna implementations that may be used in conjunction with the described transmitter and receiver implementations, and include an antenna system comprising a hemispherical dome (Section 6.1), a variable beamwidth multiband antenna (Section 6.2), SWAP (size, weight and power) optimized devices (Section 6.3), and light bulbs with integrated antennas (Section 6.4).

Methods related to embodiments of the presently disclosed technology are described in Section 7.

Section 1: Overview of OTFS
1.1 OTFS Waveform Description

Traditional OFDM modulation operates in the frequency-time domains. An OFDM resource elements (RE) occupies one subcarrier on one particular OFDM symbol. In contrast, OTFS modulation operates in the Delay spread-Doppler plane domains, which are related to frequency and time by the symplectic Fourier transform, a two-dimensional discrete Fourier transform. Similarly to single-carrier frequency domain multiple access (SC-FDMA), OTFS can be implemented as a preprocessing step on top of an underlying OFDM signal. FIG. 1 illustrates the relationships between different domains.

In OTFS, resource elements are defined in the delay-Doppler domains, which provide a two-dimensional grid similar to OFDM. The size of the delay-Doppler resource grid is related to the size of the frequency-time plane by the signal properties, i.e. bandwidth, frame duration, sub-carrier spacing, and symbol length. These relationships are expressed by the following equalities:

$$N_\tau = B/\Delta f$$

$$N_v = TTI/T$$

where $N_\tau$ denotes the number of bins in the Delay Spread domain and $N_v$ the number of bins in the Doppler domain in the OTFS grid. B stands for the allocated bandwidth, $\Delta f$ is the subcarrier spacing, TTI is the frame duration (transmit time interval), and T is the symbol duration. In this example there is an exact matching between the delay spread and frequency domains, and, similarly, between the Doppler and time domains. Therefore, the number of delay dimensions equals the number of active subcarriers in the OFDM signal, while the number of Doppler dimensions equals the number of OFDM symbols in the frame.

An OTFS Physical Resource Block (PRB) can be defined as the number of symbols, also known as resource elements (RE) corresponding to a minimum resource allocation unit, defined in the Delay Spread-Doppler domain. For example, an OTFS PRB may be defined as a region occupying $N_{RB,\tau} \times N_{RB,v}$ RE, where, the total number of RE is $N_{RB} = N_{RB,\tau} N_{RB,v}$. Different OTFS PRB configurations might be considered. e.g. in one particular case a PRB may be defined to span $N_{RB,\tau} \times 1$ RE, i.e. this specific OTFS PRB occupies a single Doppler dimension.

Conversion to Time-Domain Samples

Denote the discrete OTFS signal in the delay-Doppler plane by x(k,l), which corresponds to the $k^{th}$ delay bin and $l^{th}$ Doppler bin. After the symplectic transform, the following signal is obtained in the frequency-time plane:

$$X[m,n] = \frac{1}{N_\tau N_v} \sum_{k=0}^{N_\tau-1} \sum_{l=0}^{N_v-1} x[k,l] e^{j2\pi\left(\frac{mk}{N_\tau} - \frac{nl}{N_v}\right)}$$

Conversion to time domain samples can be executed in a number of ways.

In one embodiment, a conventional OFDM modulator is used to convert each symbol $X[m,0], \ldots, X[m,N_v-1]$ to time domain samples. As part of the OFDM modulation process, a cyclic prefix may be added before the samples of each OFDM symbol.

In another embodiment, the OTFS signal is converted directly (i.e. without intermediate conversion to time-frequency plane) to time domain samples, by a single inverse Fourier Transform in the Doppler domain. Time domain samples are obtained by direct conversion as $$s[k+nN_\tau] = \frac{1}{N_v} \sum_{l=0}^{N_v-1} x[k,l] e^{j2\pi\left(\frac{nl}{N_v}\right)} \quad k = 0 \ldots N_\tau - 1, n = 0 \ldots N_v - 1$$

In this case, it is also possible to insert a cyclic prefix between blocks of $N_\tau$ samples, consisting of the last samples of the block. Alternatively, it is also possible to not insert a cyclic prefix and use a Guard Grid instead.

OTFS Uplink Resource Allocation Scheme

Figure 3:
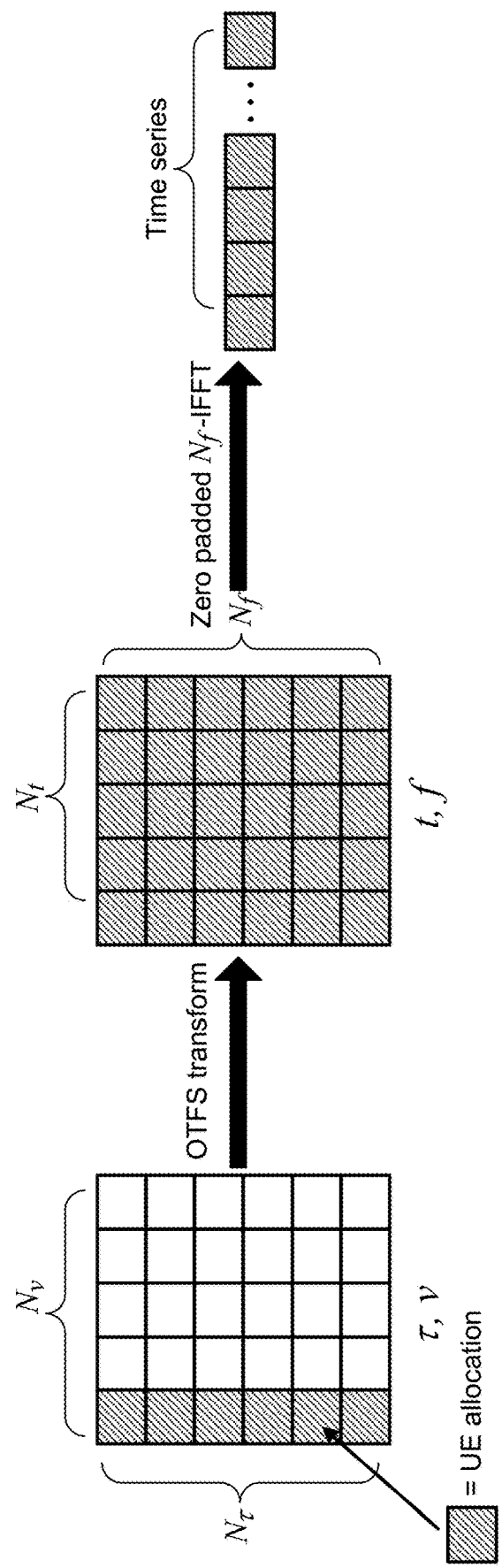
FIG. 3 shows another example of an OTFS allocation in the delay-spread and Doppler domain, and mapping to the time-frequency domain via the OTFS transform.

UEs may be allocated to disjoint Doppler slices of the delay-Doppler plane. An example is provided in FIG. 2. To modulate data, UEs first place a sequence of QAM symbols on their assigned resource elements, in the region of the delay-Doppler plane corresponding to their PRB allocation. Next, the UEs perform an OTFS transform to convert their data from delay-Doppler domains to time-frequency domains. Finally, the standard OFDM zero-padded IFFT generates a time series. This process which takes place in the transmitter can be seen in FIG. 3.

The proposed uplink scheme has, amongst other, at least two key benefits:

For small packets the PAPR of the time series is low (equivalent to SC-FDMA).

Packets can be spread across all of time and frequency thus achieving the full diversity of the channel yielding in higher reliability and enhanced link margins.

Low PAPR OTFS Waveform

In a multiuser system, RE are generally assigned to different users. When a user transmits, it fills the allocated RE with QAM symbols and the rest of RE with zeros. It is easily shown that OTFS may achieve very low PAPR if certain conditions are satisfied with the allocation of RE. In particular, when a user is allocated RE along a single Doppler dimension and on all delay dimensions, the PAPR can be reduced by several dB in some embodiment. DFT-spread OFDM signals are characterized by much lower PAPR when compared to OFDM signals. More details and derivations can be found in Appendix A1 of this document. Furthermore, when in a DFT-spread OFDM signal, the size of the DFT precoding transform equals the size of the subsequent inverse DFT in the OFDM modulator, the PAPR of a pure single carrier modulation is achieved.

In some embodiments, OTFS has low PAPR for small packets sizes. Assuming that a UE is allocated the first Doppler bin, then the transmitted OTFS satisfies $$x[k,l] = 0, \forall k \neq 0$$

As a result, the signal after the symplectic transform simplifies to $$X[n,m] = \frac{1}{N_{S,\tau} N_{S,v}} \sum_{l=0}^{N_{S,\tau}-1} x[0,l] e^{-j2\pi\left(\frac{ml}{N_{S,\tau}}\right)}$$

Therefore, for any OFDM symbol n within the TTI, the signal in the frequency domain is the result of applying a DFT to the delay domain symbols, which is equivalent to the operation done by SC-FDMA. As a result, for symbol n, the OTFS waveform is equivalent to a DFT-spread waveform (i.e. SC-FDMA), multiplied by a constant phase, which for this example is 0. Therefore, in terms of PAPR, OTFS also enjoys the benefits observed in SC-FDMA.

Overhead in OTFS

A significant source of overhead in OTFS stems from the insertion of a cyclic prefix between the underlying OFDM symbols, or blocks of $N_\tau$ samples. As an example, in LTE the overhead may be as high as 7%, or more if an extended cyclic prefix is used. This document discloses an overhead reduction technique, which reduces the overhead compared to a system using a cyclic prefix.

Frequency Diversity

The OTFS modulation can spread each QAM symbol into different bandwidths (even over the full bandwidth) and TTI durations. Typically this spreading in frequency and time is larger than the one of OFDM and so often achieves the full diversity of the channel. In contrast, for small packets, SC-FDMA only transmits over a narrow bandwidth. The concept is illustrated in FIG. 4.

SC-FDMA cannot spread their allocation across frequency without always paying a penalty in pilot overhead (for the case of evenly spreading data across frequency) or increasing PAPR (for the case of unevenly spreading across frequency), whilst these effects can eventually be avoided by OTFS.

While both OTFS and SC-FDMA keep the PAPR at low levels, OTFS inherent frequency and time diversity extraction and the lack of such in SC-FDMA translates to performance superiority expressed as enhanced link budget and higher reliability of payload delivery.

Simulation Results

The evaluation of the packet error rate (PER) of OTFS and SC-FDMA under the simulation assumptions are reported in Table 1.

TABLE 1

Evaluation Assumptions

| Parameter | Value |
| --- | --- |
| Carrier frequency | 4 GHz |
| System BW | 10 MHz |
| TTI length | 1 msec |
| Subcarrier spacing | 15 kHz |
| Transport Block Size | 3 PRB |
| Coding | LTE Turbo code |
| MCS | 16-QAM, R = ½; 64-QAM, R = ½ |
| Antenna Configuration | SISO |
| Receiver | Turbo equalizer (both OTFS and SC-FDMA) |
| Channel profile | Rural Macro (RMa), Urban Micro (UMi) |
| UE Speed | 30 kph |
| Channel estimation | Ideal |

Figure 5B:
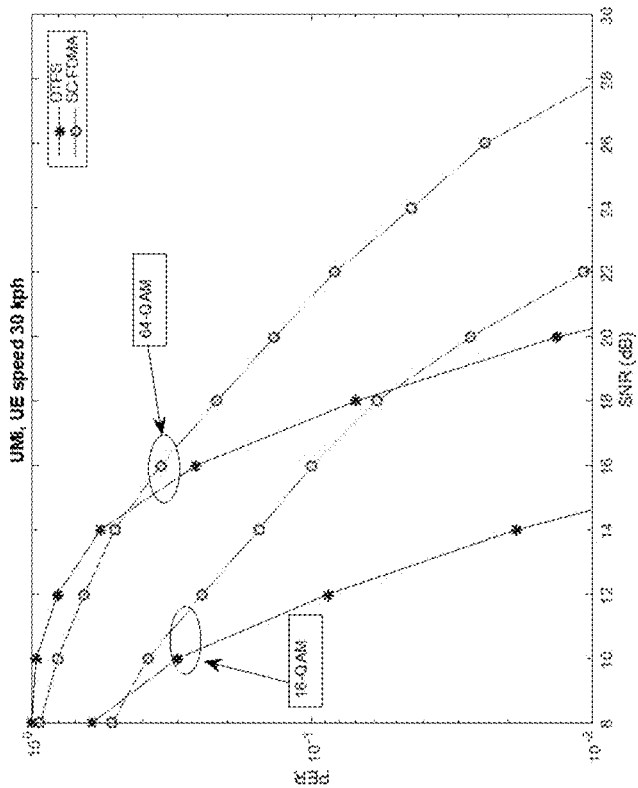
FIGS. 5A and 5B show the packet error rate (PER) of OTFS and SC-FDMA at equal PAPR in the rural macro channel and the urban micro channel, respectively.
Figure 5A:
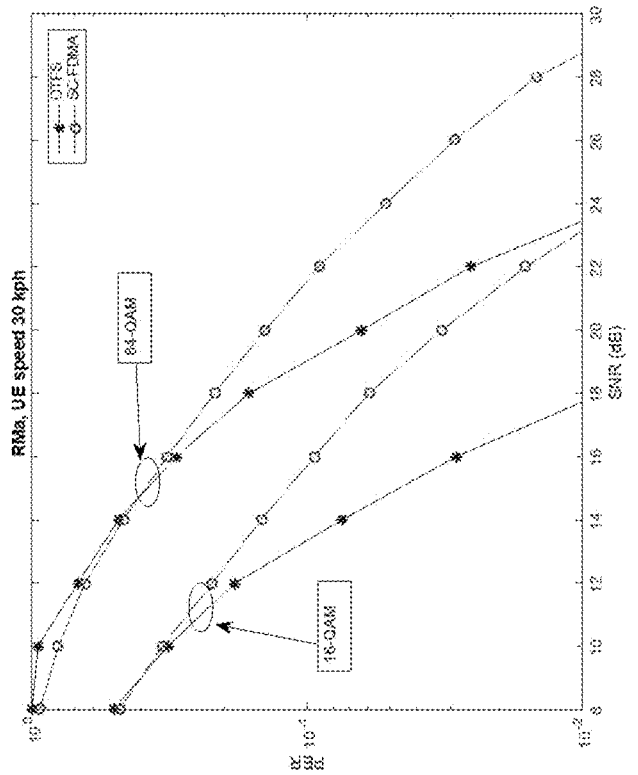

A potential cell edge situation, with a small Transport Block size of 3 PRB, was considered. Both UMi and RMa channel models were simulated, with a UE speed of 30 kph (since the resilience of OTFS to higher Doppler was previously reported, in these simulations higher UE speeds are omitted). For a fair comparison, both OTFS and SC-FDMA were evaluated using an advanced turbo equalizer receiver. The effect of channel estimation was not accounted for, being the simulation carried out with perfect channel knowledge at the receiver. Results, shown in FIG. 5A and FIG. 5B, confirm that the higher degree of diversity attained by OTFS results in remarkable performance advantages. Gains for a 10% target PER are summarized in Table 2.

TABLE 2

Performance Gain of OTFS Over SC-FDMA

| | RMa | UMi |
| --- | --- | --- |
| 16-QAM | 2.3 dB | 4.2 dB |
| 64-QAM | 2.5 dB | 3.7 dB |

1.2 Low OTFS PAPR Based on Adjustable Frame Aspect Ratio

Definitions

An OTFS frame may be defined as a set of RE arranged along delay and Doppler dimensions. In a rectangular arrangement, the OTFS frame is characterized by $N_\tau$ delay dimensions and by $N_v$ Doppler dimensions, resulting in a total of $N_{SF}=N_\tau \times N_v$ RE. The relation between $N_\tau$ and $N_v$, while keeping the product fixed, is defined as the frame aspect ratio. The total of RE within a frame is divided into one or more sets, and allocated to one or more users.

In one embodiment of the disclosed technology, each UE is allocated resources along delay dimensions first (as shown in FIG. 6). When all delay dimensions of a given Doppler dimension are used, additional delay dimensions in the next Doppler dimension are used, until all resources are allocated. This type of resource allocation is described as Delay first symbol mapping.

Figure 7:
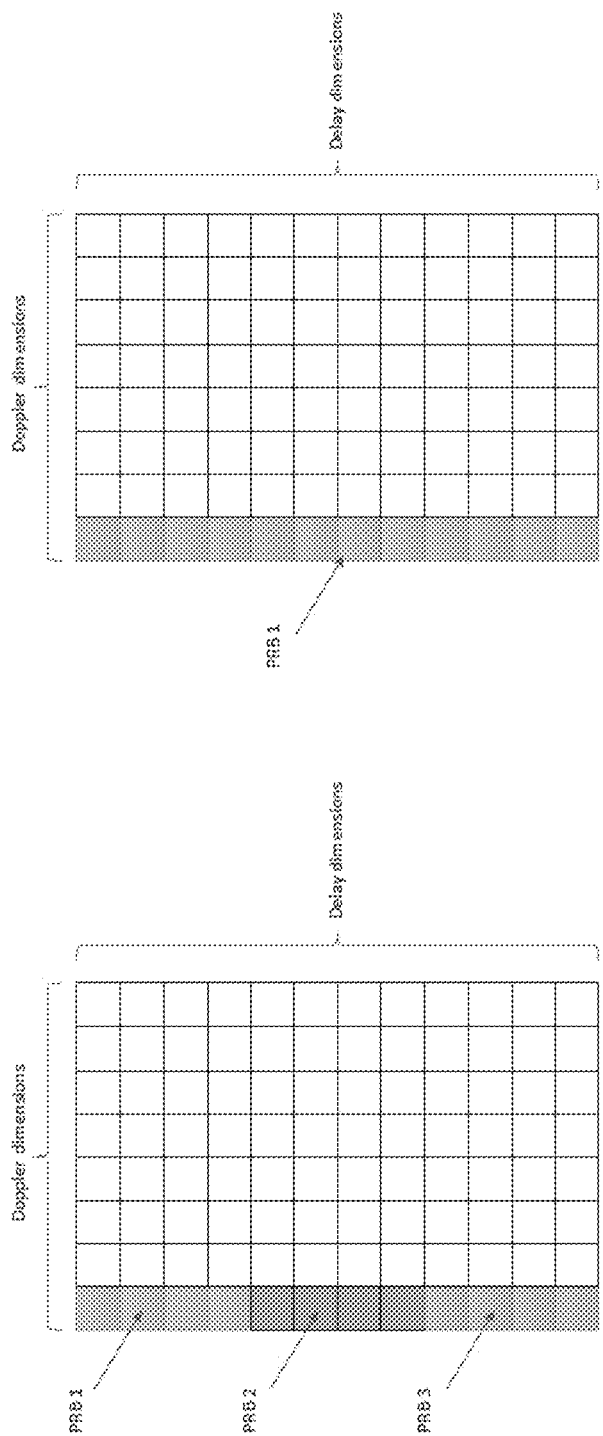
FIG. 7 shows an example of assigning one or more physical resource blocks (PRBs) along the Doppler dimension.

In one embodiment, resources are organized in physical resource blocks (PRB), containing a fixed number of symbols. PRB are defined along one Doppler dimension. Each Doppler dimension may contain one or more PRB. An illustration is provided in FIG. 7.

The number of symbols in one PRB may vary due to the insertion of reference symbols, control signaling, blank symbols, or other aspects necessary for the transmission.

In another embodiment, no PRB are defined, and allocations are performed with Delay first mapping for an arbitrary number of symbols.

Adjustable Frame Aspect Ratio

In this section, techniques to achieve low PAPR OTFS signals in a system with varying number of users and packet sizes are described. In particular, techniques based on changing the aspect ratio of the OTFS frame are disclosed.

Figure 8:
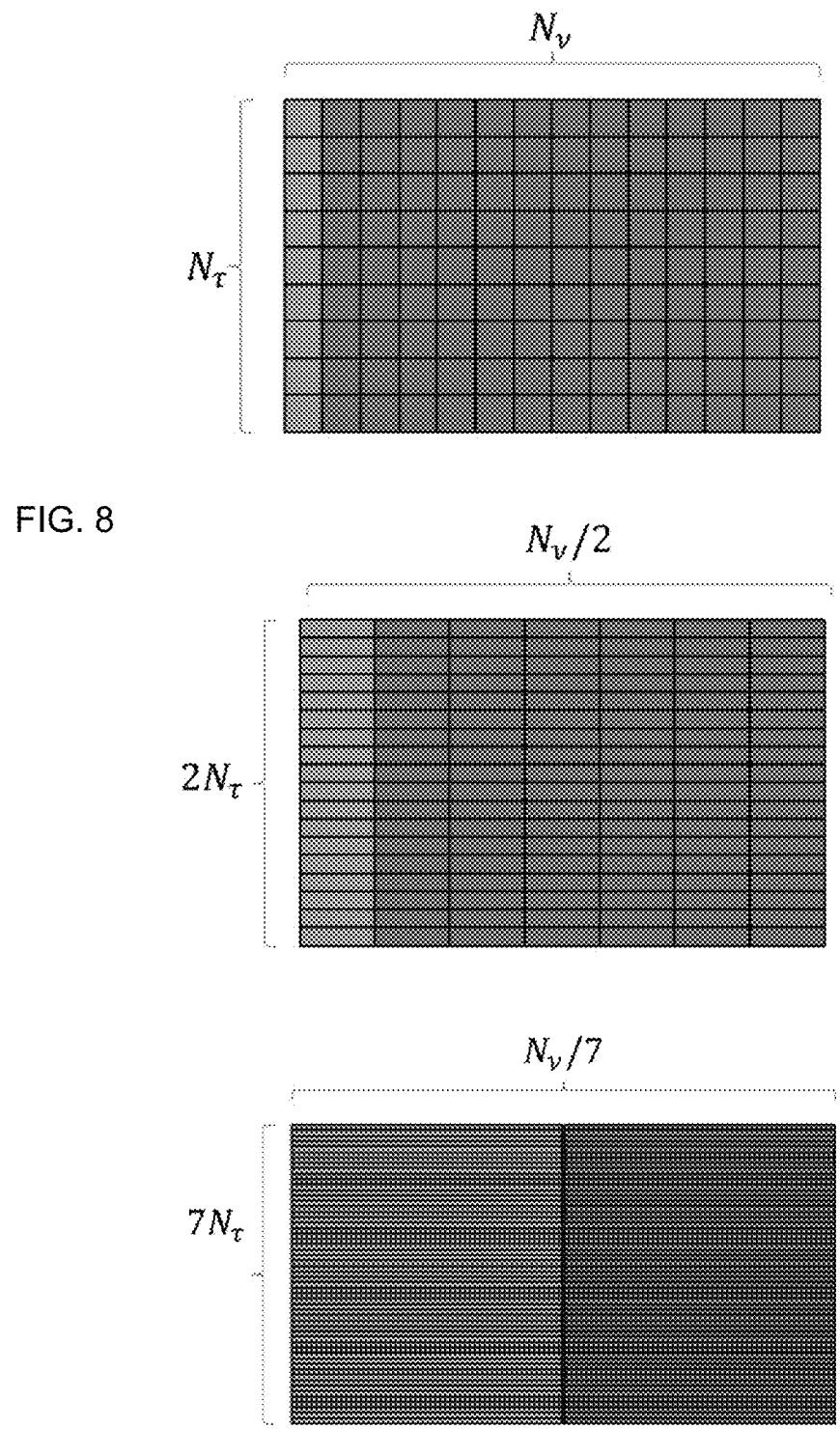
FIG. 8 shows examples of different variable aspect frame ratios to accommodate low PAPR transmission of packets of difference sizes along a single Doppler dimension.

In one embodiment, for a given PRB size $N_{PRB}$ defined along one Doppler dimension, the frame aspect ratio is adjusted so that $N_\tau$ equals (or is a multiple of) $N_{PRB}$, and $N_\tau$ is adjusted dynamically. Correspondingly, $N_v$ is also adjusted to maintain $N_{SF}$ constant. Using this approach, users with a packet size equal to one PRB may be transmitted with minimum PAPR using a frame aspect ratio such that $N_\tau = N_{PRB}$. Moreover, users with a packet size equal to k PRB may be transmitted with minimum PAPR using a frame aspect ratio such that $N_\tau = kN_{PRB}$. An illustration of this embodiment is provided in FIG. 8. The embodiment also includes other values for $N_\tau$, $N_v$ and $N_{PRB}$ as well as other aspect ratio variations than those portrayed in the figure.

After the OTFS frame has been conformed, conversion to time domain samples is carried out. In one embodiment, conversion to time domain consists of two steps: a first step is a 2-dimensional Fourier transform to convert the signal to the time-frequency domains, and a second step consists of an OFDM modulator, which converts the signal to the time domain by means of an additional Fourier transform, and prepends a cyclic prefix to every OFDM symbol. In this method, OFDM dimensions (number of sub-carriers and number of symbols per frame) are adjusted to match the OTFS grid size, based on the previously described equalities. In another embodiment, conversion to time domain consists of a single step consisting of a Fourier transform to convert from Doppler to time domains, as detailed previously.

Frame Aspect Ratio Configuration

The frame aspect ratio is configured by the Base Station and indicated to the UE prior to transmission.

One or more of the following procedures are used when variable frame aspect ratio is used in the uplink:

(1) Communication by means of the downlink control channel: in an earlier OTFS downlink frame the downlink control channel contains information regarding the aspect ratio of an upcoming uplink frame. This information is contained in a downlink control information message part of the common control channel, to be received by all UEs. Alternatively, this information is contained in the UE-specific downlink control channel. Aspect ratio indication may be for a single OTFS frame, or for multiple OTFS frames. The aspect ratio of the downlink control region (common or UE-specific) is known to the UE. For example, it is determined by upper layer signaling or system configuration.

(2) Communication by means of UE configuration or upper layer signaling: the UE is configured for a given frame aspect ratio. Configuration occurs by means of upper layer configuration messages, either when activating the UE or when initiating a transmission. Configuration may change semi-statically, that is, in a time frame significantly larger than an OTFS frame period.

(3) Implicit indication: a UE is required to infer the frame aspect ratio from other information appearing in the control channel, as well as the system state. For example, it is required to infer the aspect ratio from the uplink scheduling assignment and its configuration. In one embodiment, a UE configured as low PAPR assumes that the frame aspect ratio is such that its assigned resources fit in exactly one Doppler dimension when using all delay dimensions.

(4) UE detection: a UE may be required to detect the downlink frame aspect ratio based on the physical characteristics of the transmitted signal, and derive the corresponding uplink frame aspect ratio using a predetermined algorithm. For example, it may be assumed that the same aspect ratio is used for uplink and downlink. It may also be assumed that the uplink aspect ratio has a fixed relation to the downlink aspect ratio. This fixed relation may be given by the desired uplink/downlink traffic ratio in the system.

For the downlink, one or more of the following procedures are used:

(1) Communication by means of the downlink control channel: in an earlier OTFS downlink frame the downlink control channel contains information regarding the aspect ratio of an upcoming uplink frame. This information is contained in a downlink control information message part of the common control channel, to be received by all UEs. Alternatively, this information is contained in the UE-specific downlink control channel. Aspect ratio indication may be for a single OTFS frame, or for multiple OTFS frames. The aspect ratio of the downlink control region (common or UE-specific) is known to the UE. For example, it is determined by upper layer signaling or system configuration.

(2) Communication by means of UE configuration or upper layer signaling: the UE is configured for a given frame aspect ratio. Configuration occurs by means of upper layer configuration messages, either when activating the UE or when initiating a transmission. Configuration may change semi-statically, that is, in a time frame significantly larger than an OTFS frame period.

(3) Implicit detection: a UE may be required to infer the frame aspect ratio from other information appearing in the control channel, as well as the system state. For example, it be required to infer the aspect ratio from the downlink scheduling assignment and its configuration.

(4) UE detection: a UE may be required to detect the frame aspect ratio based on the physical characteristics of the transmitted signal.

For OTFS over OFDM, changing the aspect ratio of the OTFS frame implies a change in the aspect ratio of the OFDM frame, since there is a 1-to-1 correspondence between the number of Delay dimensions in OTFS and number of subcarriers in OFDM, and also between the number of Doppler dimensions in OTFS and the number of symbols in the corresponding OFDM frame. For the corresponding OFDM frame, the following parameters are adapted to the OTFS frame aspect ratio:

An OFDM frame numerology is defined for every aspect ratio of the OTFS frame, where numerology comprises subcarrier spacing, number of sub-carriers, number of symbols, symbol duration and cyclic prefix duration.

Reference signals are defined specifically for every supported aspect ratio. The criterion used to adapt reference signals is to maintain overhead ratio constant, as well as to maintain a constant separation in both time and frequency domains between reference signals, if possible.

Resource mapping, as described by control messages, is adapted to the aspect ratio.

1.3 Low PAPR OTFS Based on DFT Precoded OTFS

In this section, techniques to achieve low PAPR OTFS signals in a system with varying number of users and packet sizes are described. In particular, techniques based on applying DFT precoding prior to the OTFS transform are disclosed.

Figure 9A:
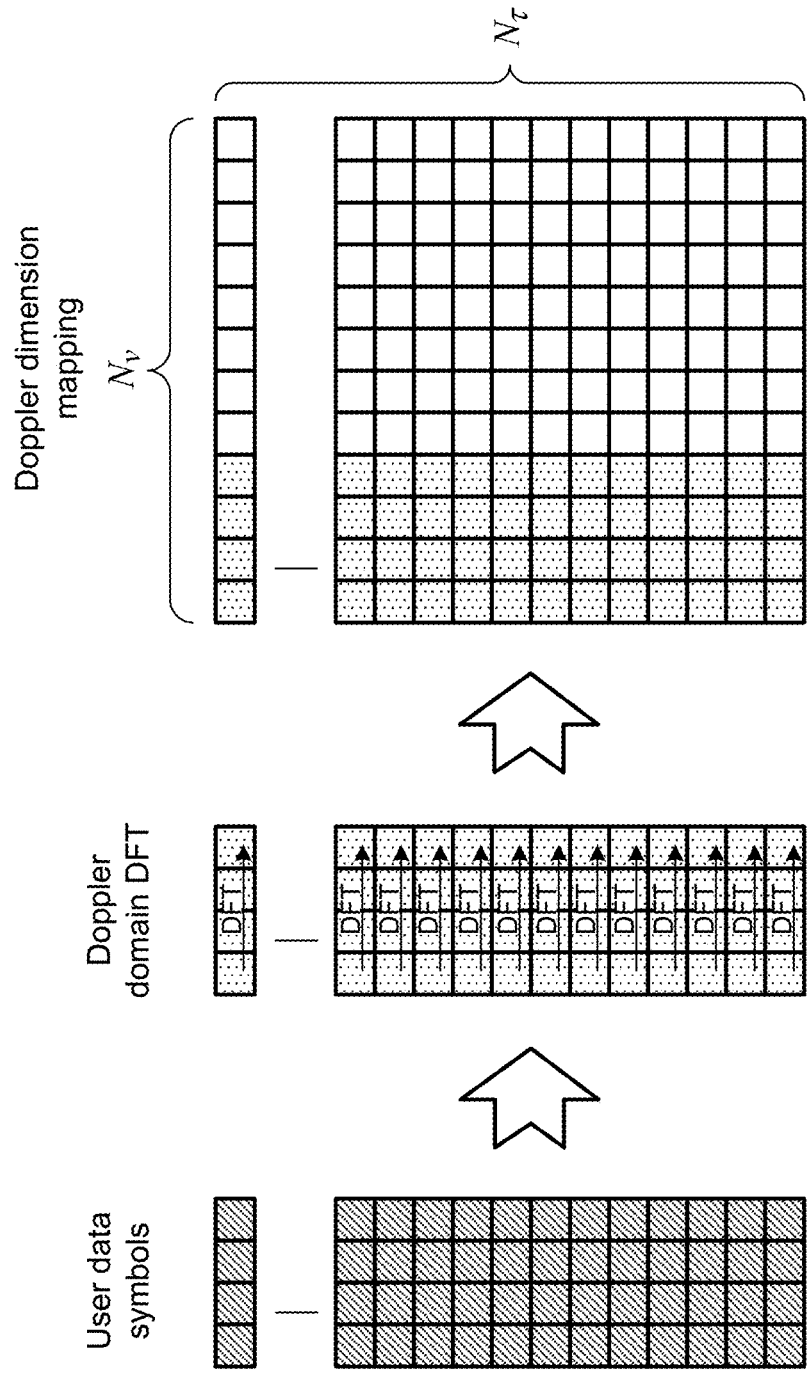
FIGS. 9A and 9B show examples of DFT precoded OTFS for low PAPR.
Figure 9B:
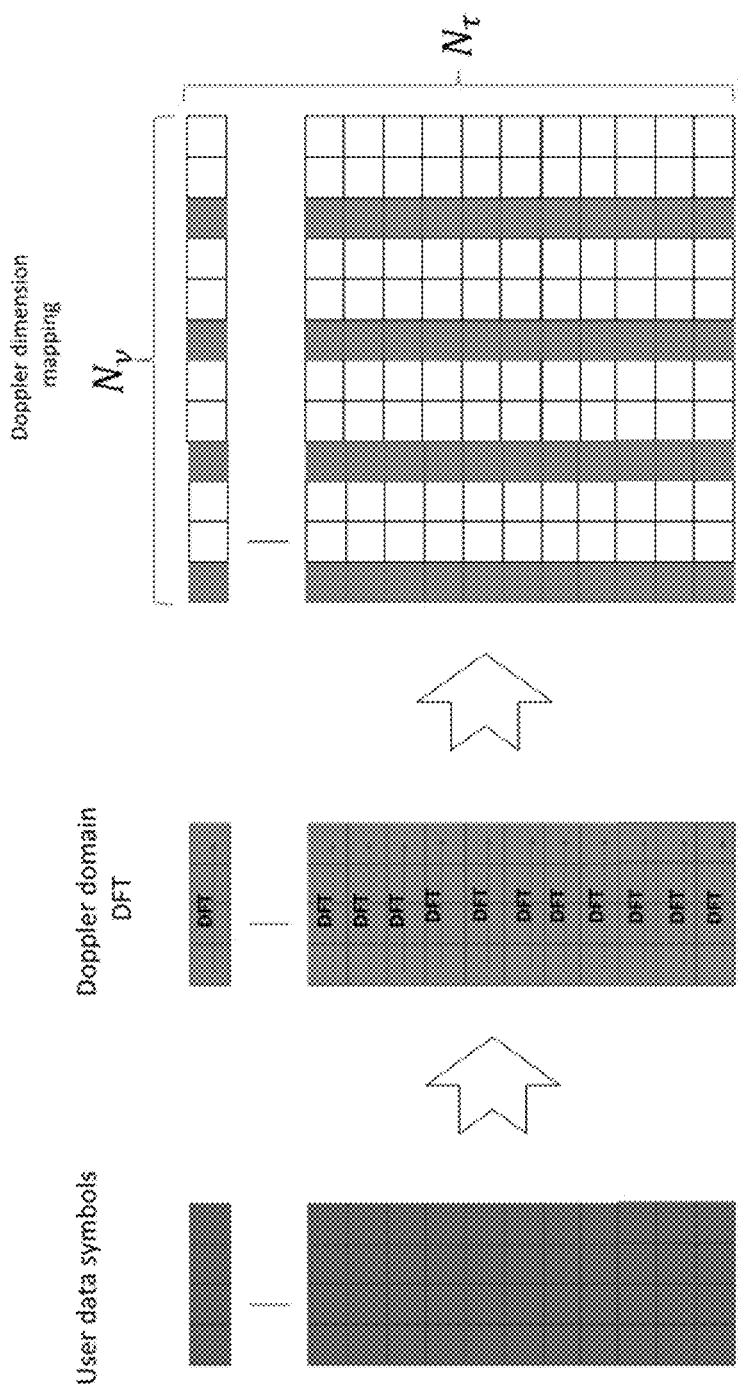

In one embodiment, a Doppler domain discrete Fourier transform (DFT) precoding is applied prior to the OTFS transform. The size of the Doppler domain DFT precoding transform ranges between 1 and $N_v$. The output is then mapped onto the corresponding number of Doppler dimensions. As a result, low PAPR transmission is achieved for any size of the DFT precoding transform. An illustration of this technique is provided in FIGS. 9A and 9B.

A user with packet size equal to one PRB transmits using a DFT precoding transform of size 1, and the output is mapped to $N_\tau$ delay dimensions and one Doppler dimension. A user with packet size equal to L PRB transmits using a DFT precoding transform of size L, and the output is mapped to $N_\tau$ delay dimensions and L Doppler dimensions. Mathematically, the DFT precoding step can be expressed as follows. Let x(k,l) denote QAM symbols corresponding to the data to be transmitted (which may be encoded using a channel code), arranged in a matrix with $N_\tau$ rows and L columns. A DFT is performed along rows, resulting in $$\hat{x}(k, l') = \frac{1}{\sqrt{L}} \sum_{l=0}^{L-1} x(k, l) e^{-\frac{j2\pi ll'}{L}}, l' = 0 \ldots L-1$$

$\hat{x}(k,l')$ is Then mapped onto L columns (Doppler dimensions) in the OTFS grid of size $N^\tau \times N_v$. Different users are mapped onto disjoint sets of Doppler dimensions. The following options are possible for mapping to Doppler dimensions:
1. Map to an adjacent set of L Doppler dimensions.
2. Map in an interleaved fashion, where the total of $N_v$ Doppler dimensions is divided into an integer number of blocks of size M, and the $i^{th}$ Doppler dimension in each block is selected.
3. Other mappings After mapping to the OTFS frame, conversion to time domain samples is carried out. In one embodiment, conversion to time domain consists of two steps: a first step is a 2-dimensional Fourier transform to convert the signal to the time-frequency domains, and a second step consists of an OFDM modulator, which converts the signal to the time domain by means of an additional Fourier transform, and prepends a cyclic prefix to every OFDM symbol.

Figure 10:
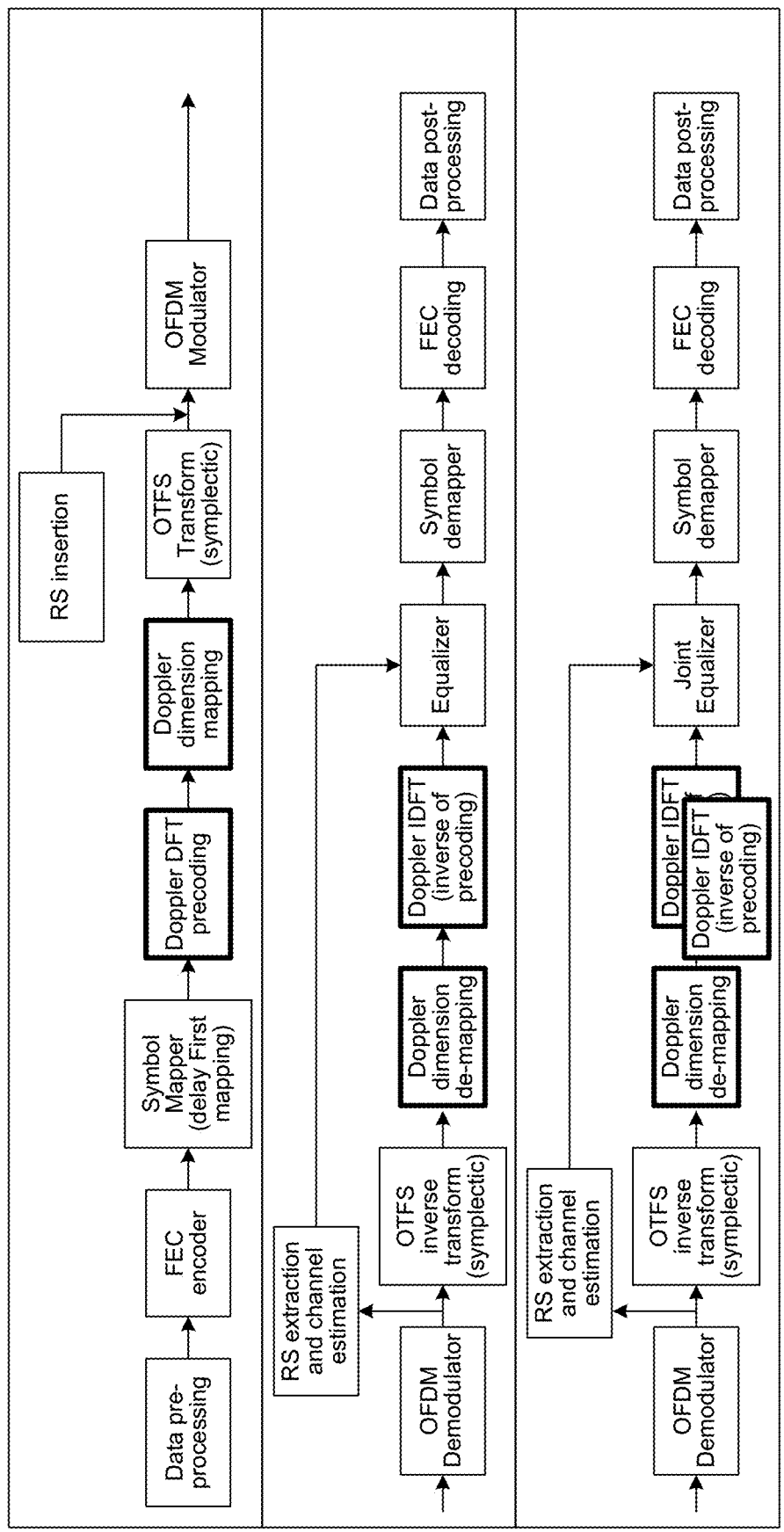
FIG. 10 shows an example of a transmitter and receiver block diagram for an embodiment of the disclosed technology.
Figure 11:
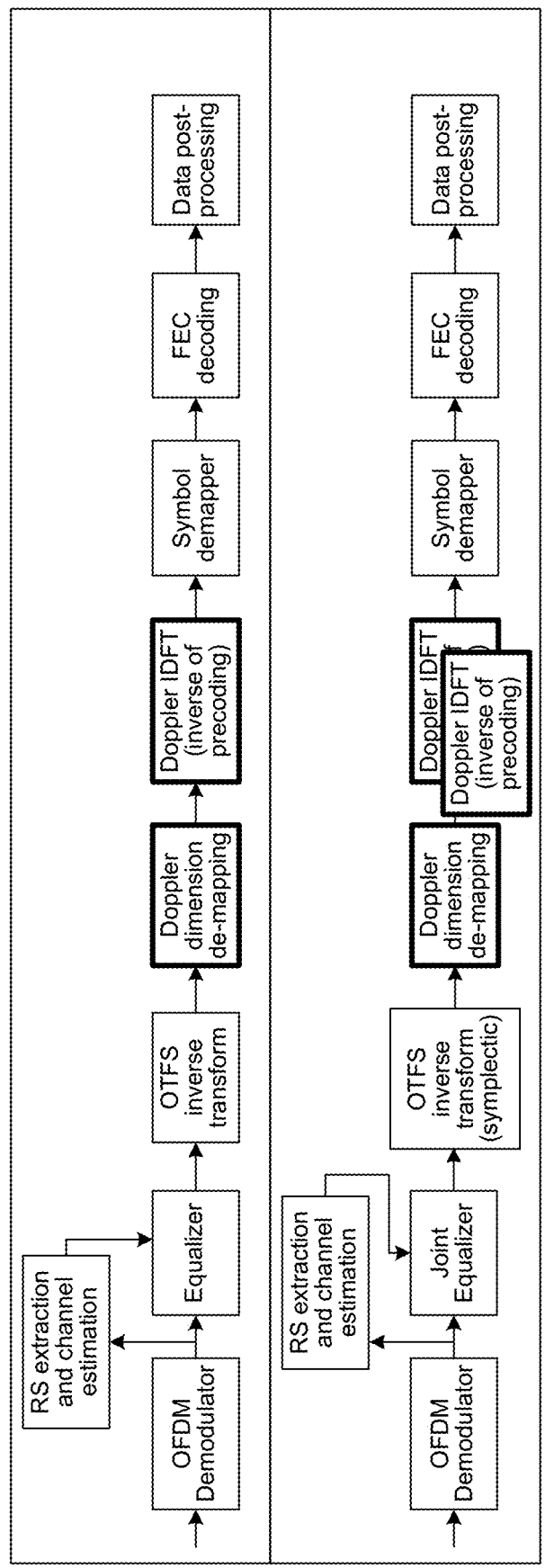
FIG. 11 shows an example of a transmitter and receiver block diagram for another embodiment of the disclosed technology.

Block diagrams for the transmitter and receiver structures are shown in FIG. 10. Note that in a similar embodiment reference signal (RS) insertion may also occur before the OTFS transform. For the receiver, two different embodiments are considered (shown in the block diagrams below). One corresponds to a single user receiver, where only symbols for one user are recovered. A second one corresponds to a multi-user receiver, where symbols from all users are recovered. In the multi-user receiver, the Doppler IDFT block is executed for every user in the OTFS frame. In a different embodiment, equalization is performed in the frequency domain, as illustrated in FIG. 11.

Figure 12:
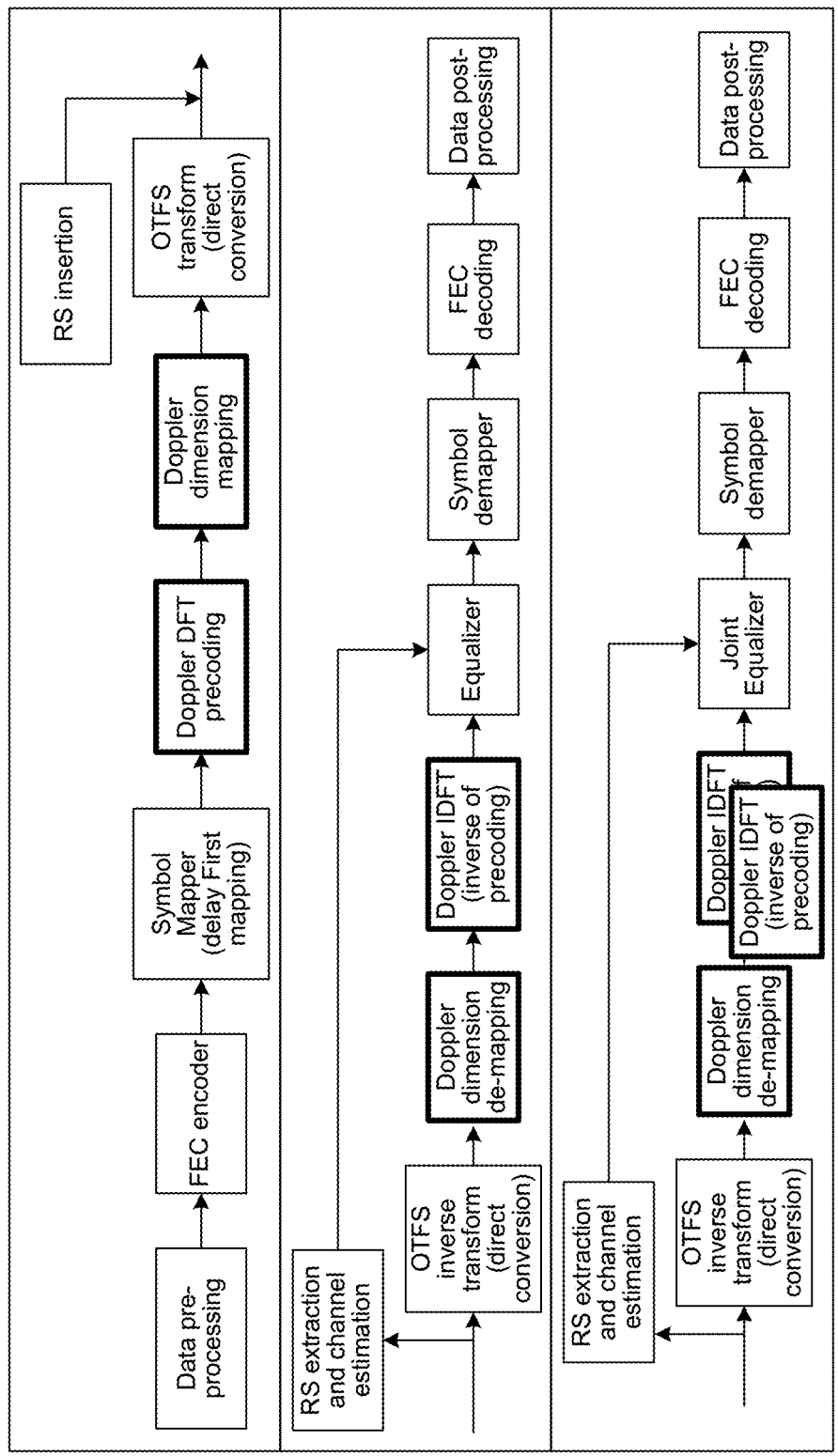
FIG. 12 shows an example of a transmitter and receiver block diagram for yet another embodiment of the disclosed technology.

In another embodiment, conversion to time domain consists of a single step consisting of a Fourier transform to convert from Doppler to time domains. A block diagram description is provided in FIG. 12.

The proposed embodiment may lead to a reduction of the peak to average power ratio (PAPR) of the transmitted signal of several dB. In embodiment 1). For example, when a localized mapping of the Doppler dimensions is used, the original data symbols may be interpreted as residing in the time-delay domains. The combination of size L DFT and size $N_v$ IDFT, combined with mapping on adjacent subcarriers, may be interpreted as a time domain interpolator (the operation consisting of conversion by means of DFT, zero padding, and conversion back by means of IDFT is an interpolator). Therefore, the resulting samples of DFT-precoded OTFS are in fact samples of a single carrier signal interpolated by a factor $N_v/L$.

In embodiment 2), i.e. when interleaved mapping of the Doppler dimensions is used, the original data symbols may be interpreted as residing in the time-delay domains. The combination of L DFT and size $N_v$ IDFT, combined with mapping every M-th subcarrier, leads to the repetition, by a factor of M, of the original samples, where each repetition is multiplied by a linear phase. Therefore, the resulting samples of DFT-precoded OTFS are in fact samples of a single carrier signal repeated by a factor $M=N_v/L$.

1.4 OTFS Modulation with Guard Grid

In this section, aspects related to Guard Grid Based OTFS (GG-OTFS), which is a form of OTFS that does not require the use of a cyclic prefix between symbols, are described.

In this embodiment, OTFS blocks of $N_T$ samples are concatenated without insertion of any cyclic prefix. In the OTFS Delay-Doppler grid, special symbols, which may be known to the OTFS receiver, are allocated to the last $N_G$ Delay dimensions on every Doppler dimension. This region is denoted as the $N_G \times N_v$ Guard Grid. Such a system may be referred to as Guard Grid based OTFS or GG-OTFS.

Figure 13:
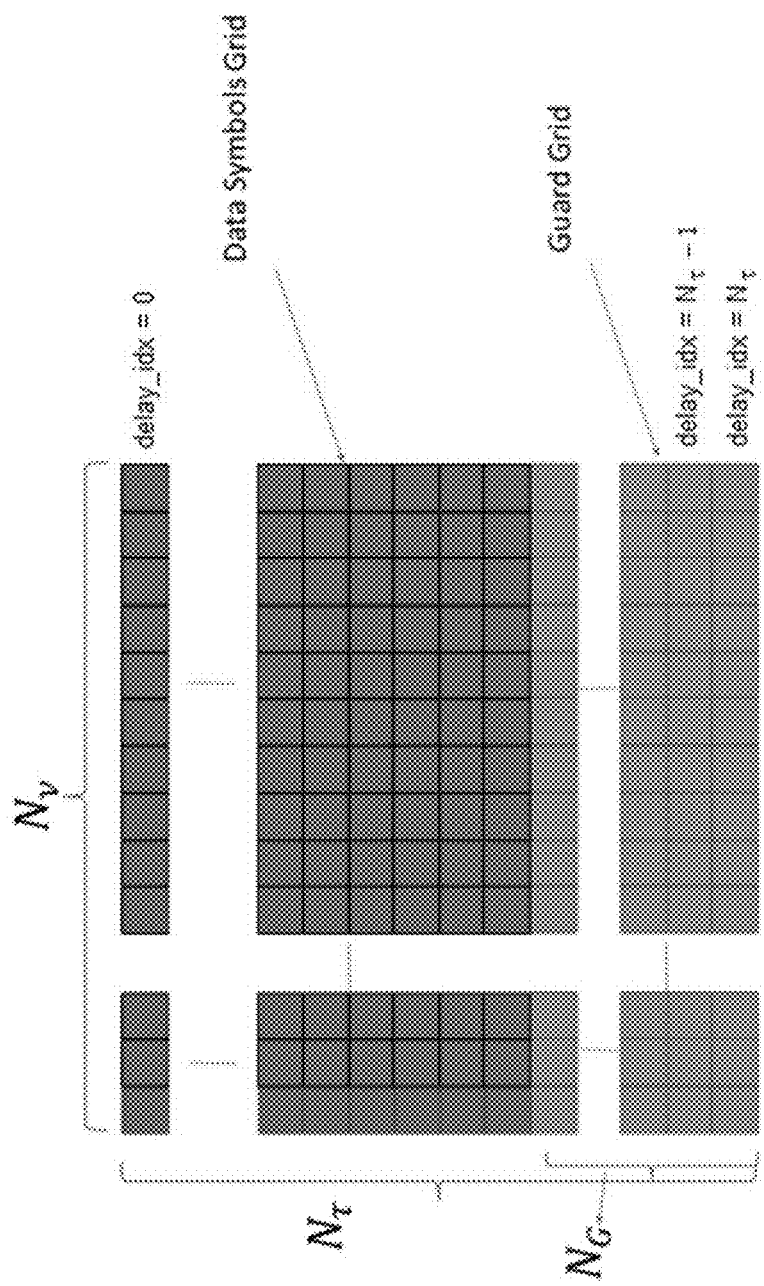
FIG. 13 shows an example of an OTFS delay-Doppler grid with a guard grid region and a data symbol region.

FIG. 13 illustrates this embodiment in the Delay-Doppler domain plane.

Regarding the Guard Grid, the following embodiments are possible:

(1) Zero values (blank symbols) are allocated to all symbols in the Guard Grid. By using this procedure, a circulant channel may be observed by symbols in the rest of the Delay-Doppler grid. This facilitates equalization, permitting the use of techniques similar to those used in cyclic prefix based OTFS.

(2) Non-zero values are allocated to symbols in the first Doppler dimension of the Guard Grid, while zero values (blank symbols) are allocated in other dimensions. By using this procedure, a circulant channel may be observed by symbols in the rest of the Delay-Doppler grid. This facilitates equalization, permitting the use of techniques similar to those used in cyclic prefix based OTFS.

(3) The first data samples of the data grid are copied as the samples of the Guard Grid. By using this procedure, a circulant channel may be observed by symbols in the rest of the Delay-Doppler grid. This facilitates equalization, permitting the use of techniques similar to those used in cyclic prefix based OTFS.

(4) Non-zero values are allocated on all symbols in the Guard Grid.

(5) In embodiments 2 and 4, special symbols used for channel estimation by the receiver are allocated to one or more Delay-Doppler dimensions of the Guard Grid. These symbols may be specific to every transmitter, either user or base station. These symbols may be inferred by the receiver based on an identifier associated with the transmitter, such as cell ID or beam ID.

Figure 14A:
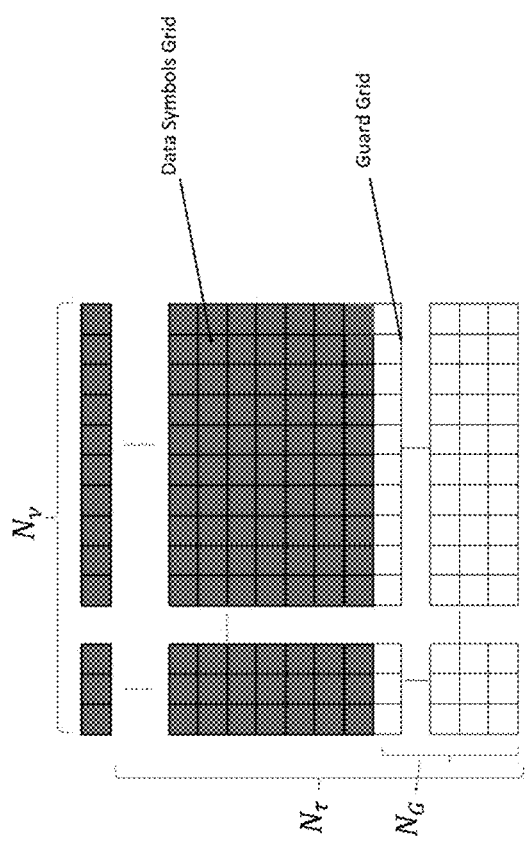
FIGS. 14A, 14B and 14C shows examples of different guard grid symbols.
Figure 14B:
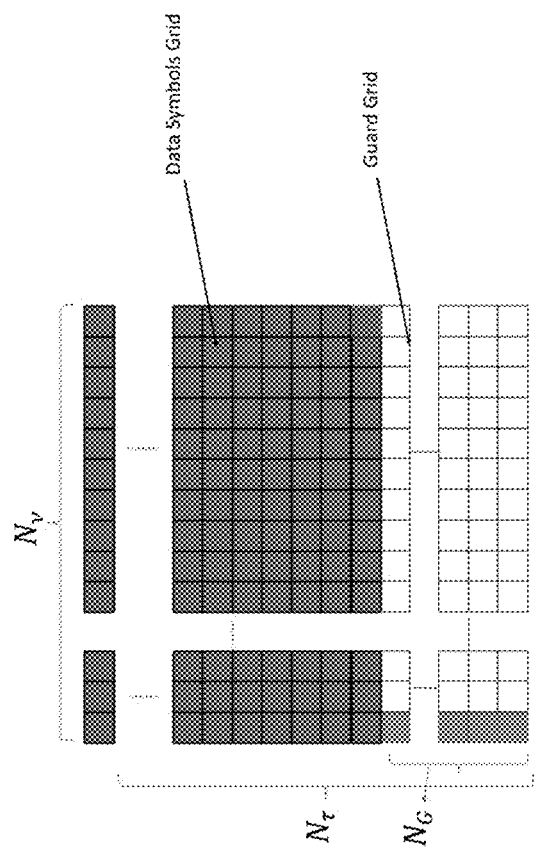
Figure 14C:
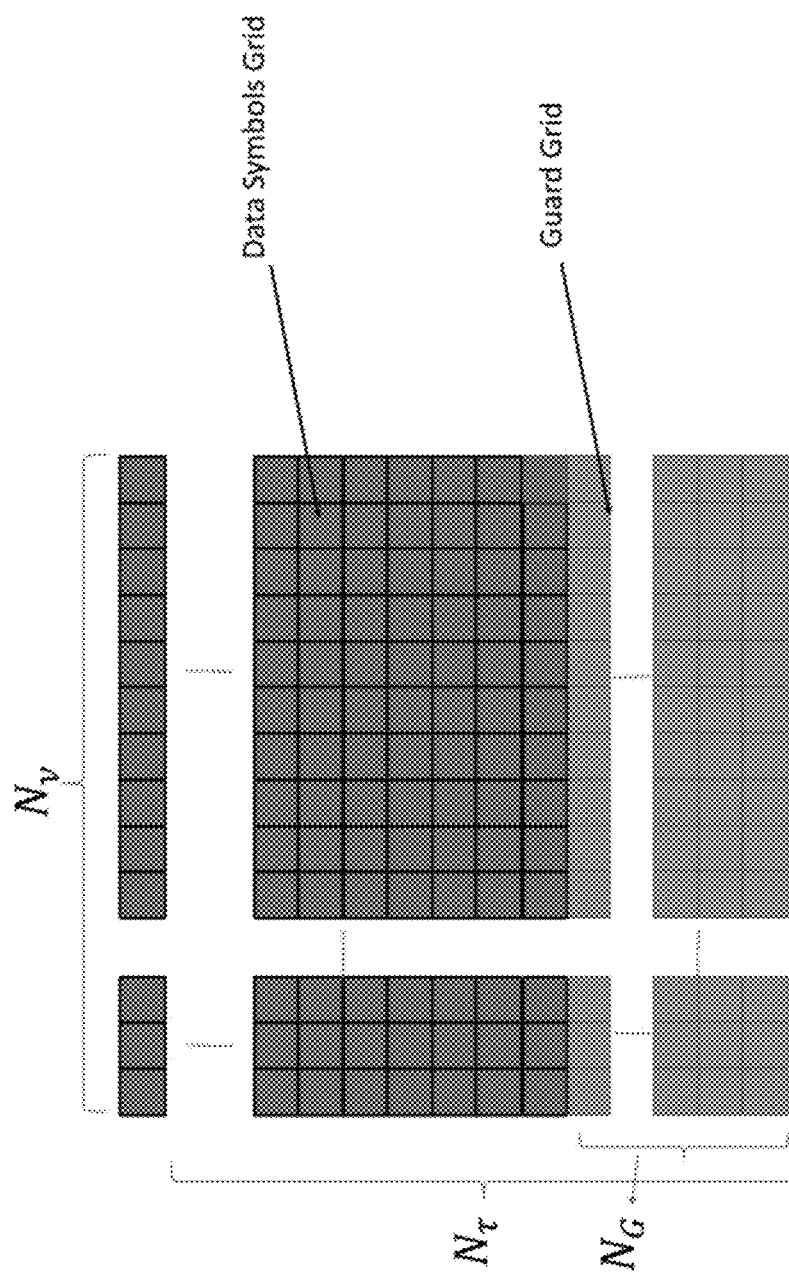

FIGS. 14A, 14B and 14C illustrate embodiments 1-5 for Guard Grid design.

On any of these embodiments, the size of the Guard Grid may be fixed system-wide, or variable. By variable, the following options are described:

Guard Grid Size may be determined upon system deployment, and fixed for every transmitter in the system. An equal value for all, or different values per transmitter may be determined.

Guard Grid Size may be determined upon the establishment of a connection, and fixed throughout the connection at a value specific for that connection.

Guard Grid Size may vary dynamically, depending on propagation conditions or other system aspects.

A combination of the above options may be used.

Figure 15:
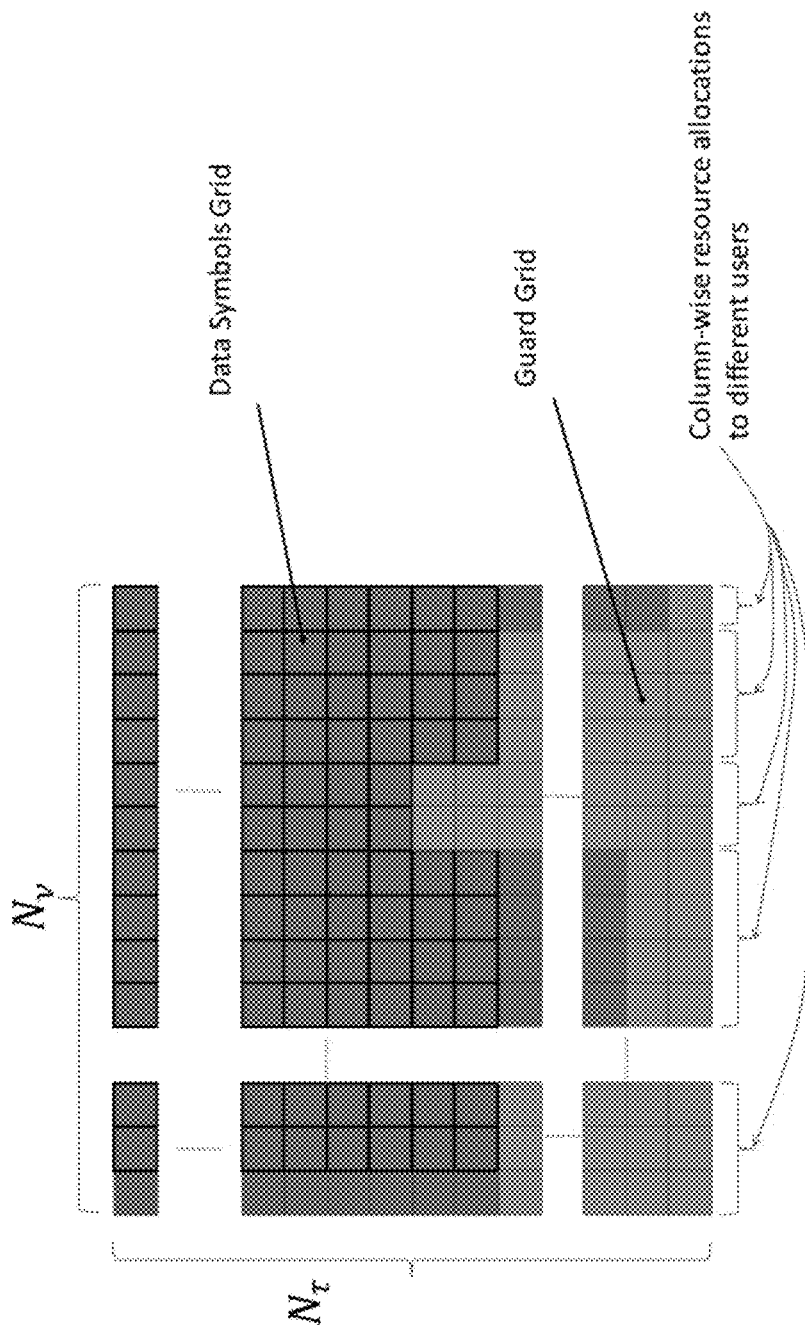
FIG. 15 shows an example of an OTFS with different guard grid sizes allocated to different transmissions.

FIG. 15 provides an illustration of an OTFS frame with different Guard Grid size for different transmissions corresponding to different users.

Figure 16:
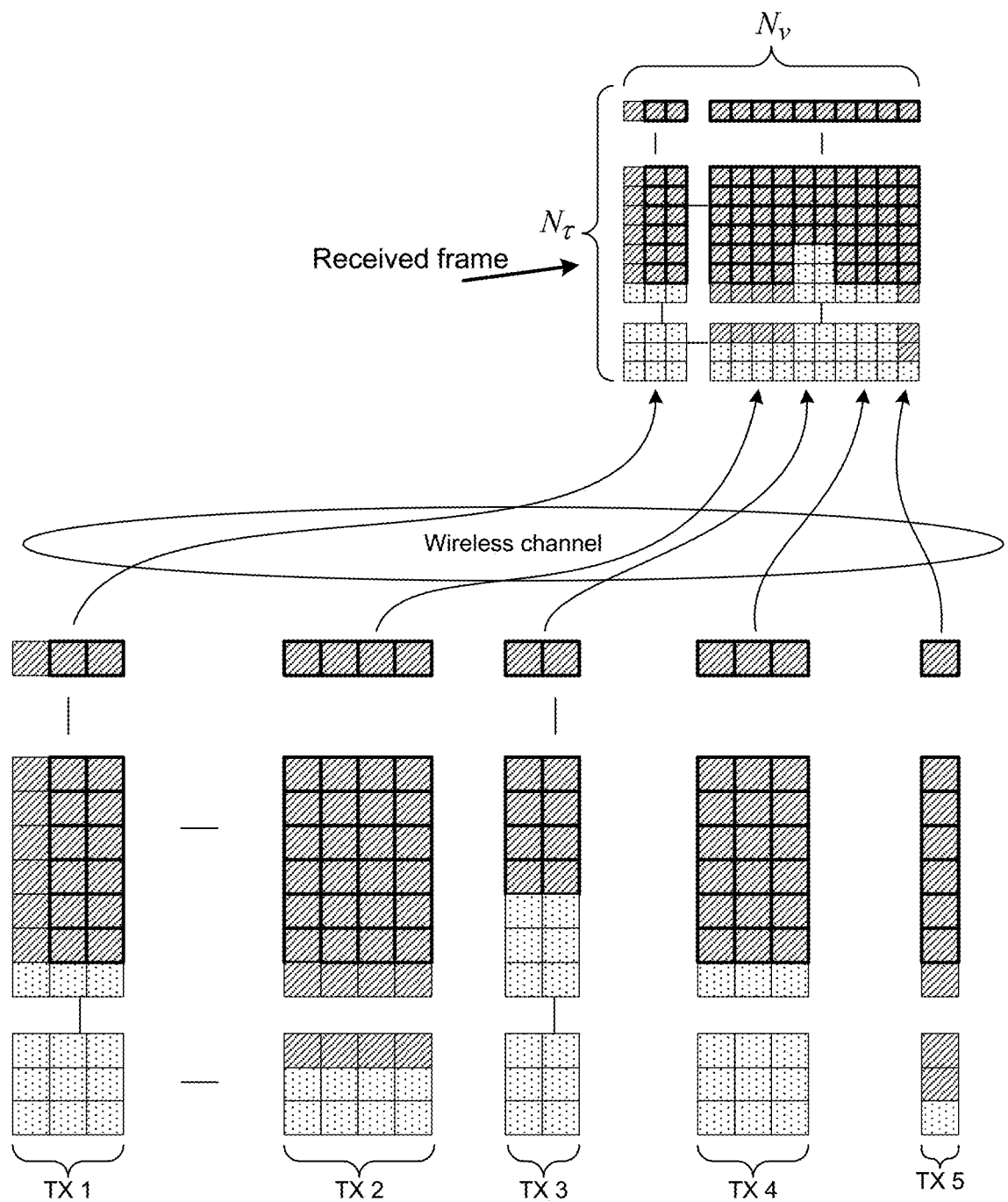
FIG. 16 shows an example of an uplink OTFS frame with different guard grid sizes allocated to different transmissions.

In the specific case of uplink transmission, the uplink frame at the receiver originates from different transmitters, as illustrated in FIG. 16.

By varying the size of the Guard Grid, it may be possible to reduce the amount of overhead with respect to a fixed Guard Grid design, which must support worst-case scenarios and possibly be unnecessarily large for most typical cases. For the same reason, it may also be possible to reduce the overhead of cyclic prefix based OTFS.

Figure 17:
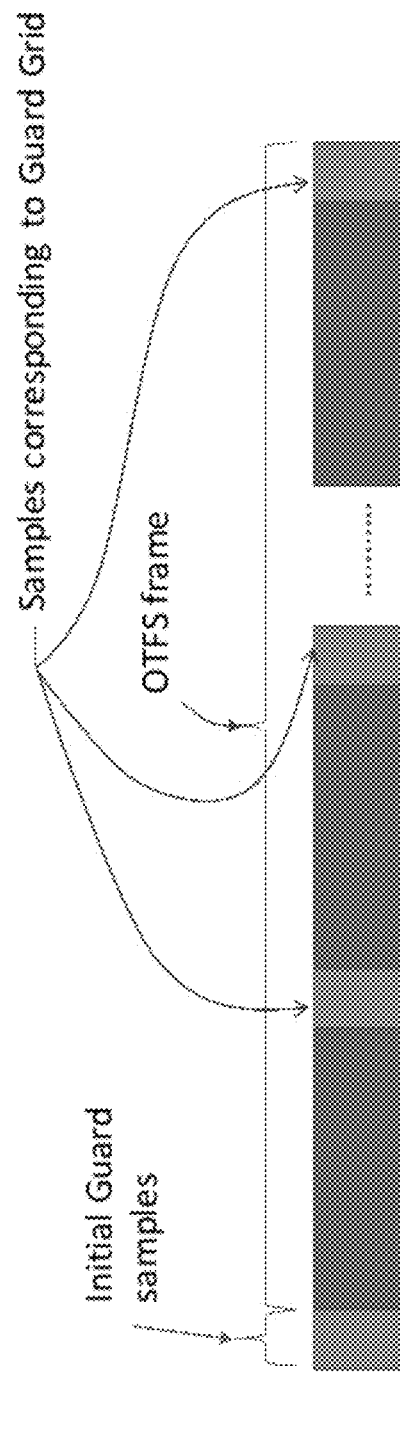
FIG. 17 shows an example of a guard grid based OTFS frame.

FIG. 17 illustrates Guard Grid Based OTFS embodiment in the time domain, after the OTFS transform. Time domain samples corresponding to the Guard Grid (in green) are obtained through processing of the Guard Grid symbols in the Delay-Doppler grid by means of the OTFS transform. In addition, initial Guard samples are added, preceding the OTFS frame samples, in order to avoid interference between OTFS frames. In one embodiment, Initial Guard samples are identical to the time domain samples resulting from the OTFS transform of the Guard Grid samples.

The transmitter for GG-OTFS consists of at least the following blocks:
  Data pre-processing (including segmentation)
  Forward error correction (FEC) encoding
  Symbol mapper
  Reference signal insertion
  Guard Grid insertion
  OTFS transform
  Initial Guard Samples insertion The receiver for GG-OTFS consists of at least the following blocks:
  Initial Guard Samples removal
  OTFS inverse transform
  RS extraction and channel estimation
  Guard Grid removal
  Equalizer
  Symbol demapper
  FEC decoding
  Data post-processing (including aggregation)

It is also possible to use iterative (or Turbo) receivers for GG-OTFS. In that case, a symbol mapper and an OTFS transform blocks would also be part of the receiver.

Figure 18:
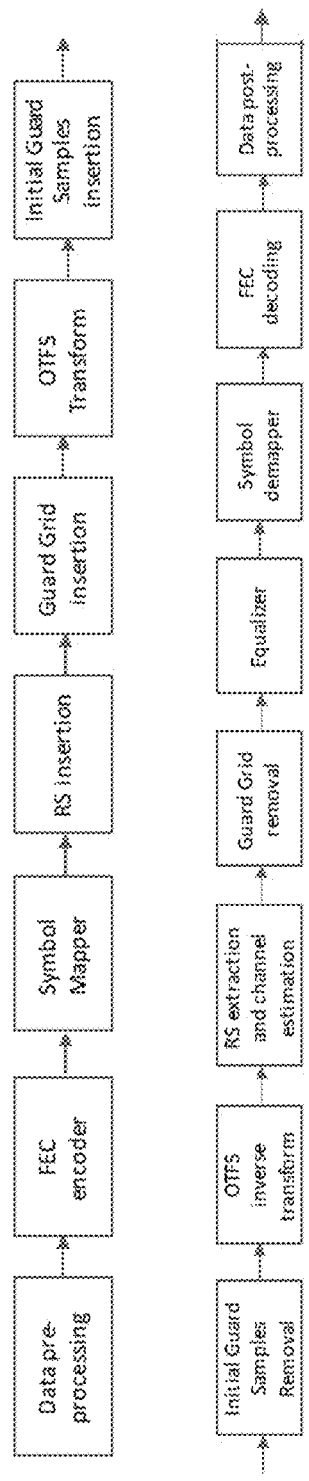
FIG. 18 shows an example of a transmitter and receiver block diagram for yet another embodiment of the disclosed technology.

Transmitter and receiver block diagrams are depicted in FIG. 18.

Signaling and System Aspects

In this section, system procedures related to using the Guard Grid in lieu of cyclic prefixes, and which may be implemented by the disclosed technology, are described.

Guard Grid Configuration

The Guard Grid is configured by the Base Station and indicated to the UE prior to transmission. The following aspects may be configured regarding the Guard Grid:
  Size, in number of Delay dimensions used
  Contents of the Guard Grid symbols When the Guard Grid is configured dynamically, one or more of the following procedures are used:
  (1) Communication by means of the downlink control channel: in an earlier or the current downlink frame, the downlink control channel contains Guard Grid configuration information. This information is contained in a downlink control information message part of the common control channel, to be received by all UEs. Alternatively, this information is contained in the UE-specific downlink control channel. The Guard Grid configuration may be for a single frame, or for multiple frames. The Guard Grid configuration of the control region (common or UE-specific) is known to the UE as determined by upper layer signaling.
  (2) Communication by means of UE configuration or upper layer signaling. Configuration occurs by means of upper layer configuration messages, either when activating the UE or when initiating a transmission. Configuration may change semi-statically, that is, in a time frame significantly larger than an OTFS frame period.
  (3) Implicit detection: a UE may be required to infer the Guard Grid configuration from other information appearing in the control channel, as well as the system state.
  (4) UE detection: a UE may be required to detect the Guard Grid configuration based on the physical characteristics of the transmitted signal.

The Guard Grid configuration for downlink and uplink transmissions of a given UE may be predetermined in advance. For example, indication of a given Guard Grid configuration for the downlink may imply a given Guard Grid configuration for the uplink. Uplink and downlink configurations may be identical or related by a mathematical or pre-established relation.

Section 2: OTFS Communication without Cyclic Prefixes

In orthogonal frequency division multiplexing (OFDM) and similar systems, cyclic prefix (CP) are used for improving performance of digital communication. A significant source of overhead stems from the insertion of a CP between the underlying OFDM symbols. As an example, in LTE the overhead can be as high as 7%, or more if an extended cyclic prefix is used. The techniques disclosed in the present document can be used to achieve overhead reduction, which reduces the overhead compared to a system using a cyclic prefix. As such, the disclosed techniques perform transmission resource allocation such that OTFS transmissions can be made without using CP, for example by concatenating symbols without any intervening CPs.

Some additional embodiments for OTFS communication without cyclic prefixes are described in Section 1.4, and others are described in Section 7.

Section 3: Variable Frame Aspect Ratios in OTFS

In some embodiments, the aspect ratio of the transmission frame (e.g., the ratio of number of delay units and number of dimension units) may be changed over a period of time. This change may be performed to accommodate user data packet size changes. In an example, the aspect ratio may be changed such that one user device packet maps to one PRB in the delay-Doppler grid. Various methods may be used for signaling the change from a transmitting device (or a device that controls resource scheduling) to a receiving device. The signaling may be performed sufficiently in advance (e.g., 1 millisecond, or one transmit time interval TTI) so that the receiving device may adapt its PHY and MAC for the change in the aspect ratio.

In some embodiments, the signaling may be performed using one or more of the following techniques: a) downlink control channel signaling, (b) upper layer signaling, (c) implicit indication, or (d) signal detection. Furthermore, the signaling may include signaling of various transmission parameters such as one or more of subcarrier spacing, a number of sub-carriers in the transmission frames, a number of symbols in the transmission frames, symbol duration and cyclic prefix duration. Similar signaling techniques may be used for future transmissions in both downlink and uplink directions.

In some embodiments, the aspect ratio selection may be performed such that the frame area (delay domain×Doppler domain units) may be kept constant. Alternatively, the frame area (total number of resource elements in the frame) may be changed to adapt the communication system to different channels.

Some additional embodiments for OTFS communication using variables frame aspect ratios are described in Section 1.2, and others are described in Section 7.

Section 4: Multiple Access and Precoding in OTFS

Figure 19:
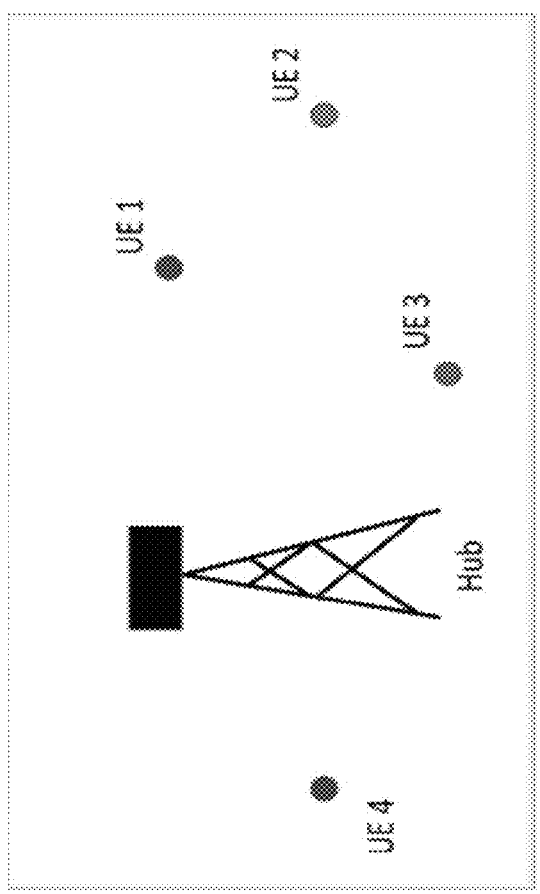
FIG. 19 depicts an example network configuration in which a hub services for user equipment (UE).
Figure 20:
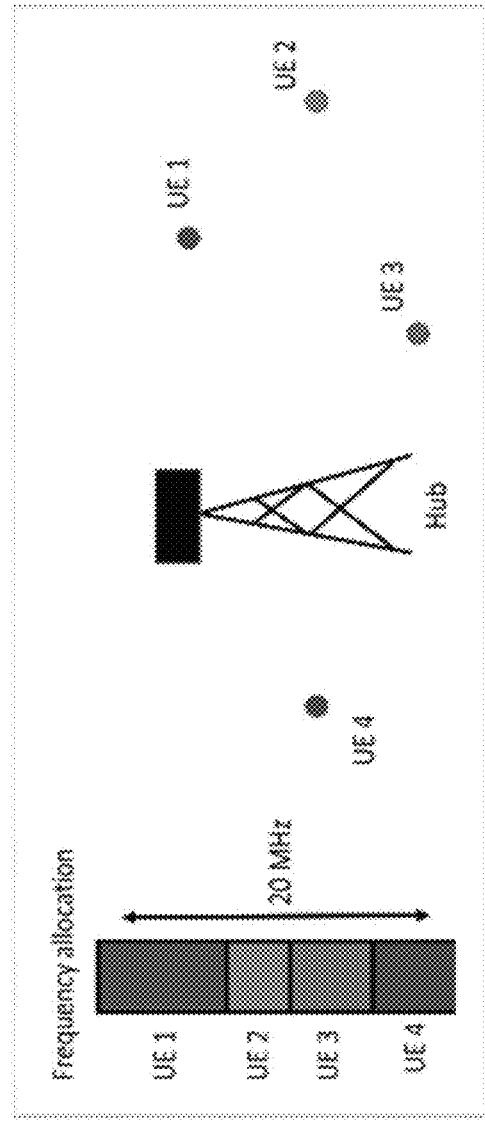
FIG. 20 depicts an example embodiment in which an orthogonal frequency division multiplexing access (OFDMA) scheme is used for communication.

FIG. 19 depicts a typical example scenario in wireless communication is a hub transmitting data over a fixed time and bandwidth to several user devices (UEs). For example: a tower transmitting data to several cell phones, or a Wi-Fi router transmitting data to several devices. Such scenarios are called multiple access scenarios.

Orthogonal Multiple Access

Currently the common technique used for multiple access is orthogonal multiple access. This means that the hub breaks it's time and frequency resources into disjoint pieces and assigns them to the UEs. An example is shown in FIG.

20, where four UEs (UE1, UE2, UE3 and UE4) get four different frequency allocations and therefore signals are orthogonal to each other.

The advantage of orthogonal multiple access is that each UE experience its own private channel with no interference. The disadvantage is that each UE is only assigned a fraction of the available resource and so typically has a low data rate compared to non-orthogonal cases.

Precoding Multiple Access

Figure 21:
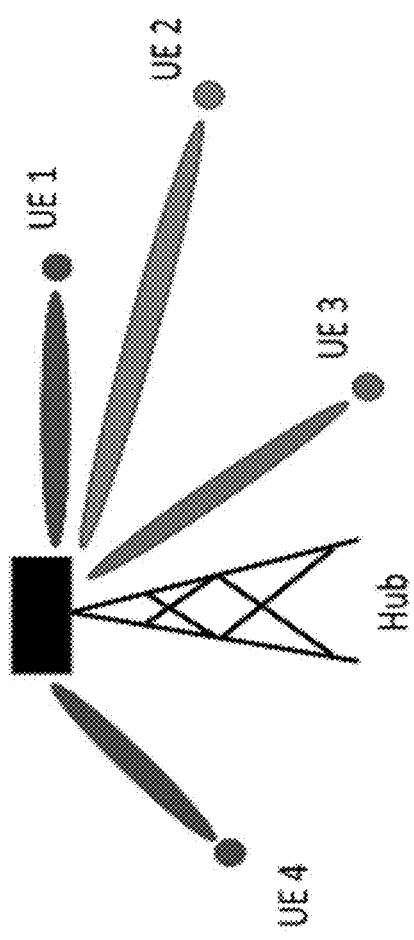
FIG. 21 illustrates the concept of precoding in an example network configuration.

Recently, a more advanced technique, precoding, has been proposed for multiple access. In precoding, the hub is equipped with multiple antennas. The hub uses the multiple antennas to create separate beams which it then uses to transmit data over the entire bandwidth to the UEs. An example is depicted in FIG. 21, which shows that the hub is able to form individual beams of directed RF energy to UEs based on their positions.

The advantage of precoding it that each UE receives data over the entire bandwidth, thus giving high data rates. The disadvantage of precoding is the complexity of implementation. Also, due to power constraints and noisy channel estimates the hub cannot create perfectly disjoint beams, so the UEs will experience some level of residual interference.

Introduction to Precoding

Precoding may be implemented in four steps: channel acquisition, channel extrapolation, filter construction, filter application.

Channel acquisition: To perform precoding, the hub determines how wireless signals are distorted as they travel from the hub to the UEs. The distortion can be represented mathematically as a matrix: taking as input the signal transmitted from the hubs antennas and giving as output the signal received by the UEs, this matrix is called the wireless channel.

Channel prediction: In practice, the hub first acquires the channel at fixed times denoted by $s_1, s_2, \ldots, s_n$. Based on these values, the hub then predicts what the channel will be at some future times when the pre-coded data will be transmitted, we denote these times denoted by $t_1, t_2, \ldots, t_m$.

Filter construction: The hub uses the channel predicted at $t_1, t_2, \ldots t_m$ to construct precoding filters which minimize the energy of interference and noise the UEs receive.

Filter application: The hub applies the precoding filters to the data it wants the UEs to receive.

Channel Acquisition

This section gives a brief overview of the precise mathematical model and notation used to describe the channel.

Time and frequency bins: the hub transmits data to the UEs on a fixed allocation of time and frequency. This document denotes the number of frequency bins in the allocation by $N_f$ and the number of time bins in the allocation by $N_t$.

Number of antennas: the number of antennas at the hub is denoted by $L_h$, the total number of UE antennas is denoted by $L_u$.

Transmit signal: for each time and frequency bin the hub transmits a signal which we denote by $\varphi(f,t) \in \mathbb{C}^{L_h}$ for $f=1, \ldots, N_f$ and $t=1, \ldots, N_t$.

Receive signal: for each time and frequency bin the UEs receive a signal which we denote by $y(f,t) \in \mathbb{C}^{L_u}$ for $f=1, \ldots, N_f$ and $t=1, \ldots, N_t$.

White noise: for each time and frequency bin white noise is modeled as a vector of iid Gaussian random variables with mean zero and variance $N_0$. This document denotes the noise by $w(f,t) \in \mathbb{C}^{L_u}$ for $f=1, \ldots, N_f$ and $t=1, \ldots, N_t$.

Channel matrix: for each time and frequency bin the wireless channel is represented as a matrix and is denoted by $H(f,t) \in \mathbb{C}^{L_u \times L_h}$ for $f=1, \ldots, N_f$ and $t=1, \ldots, N_t$.

Figure 22:
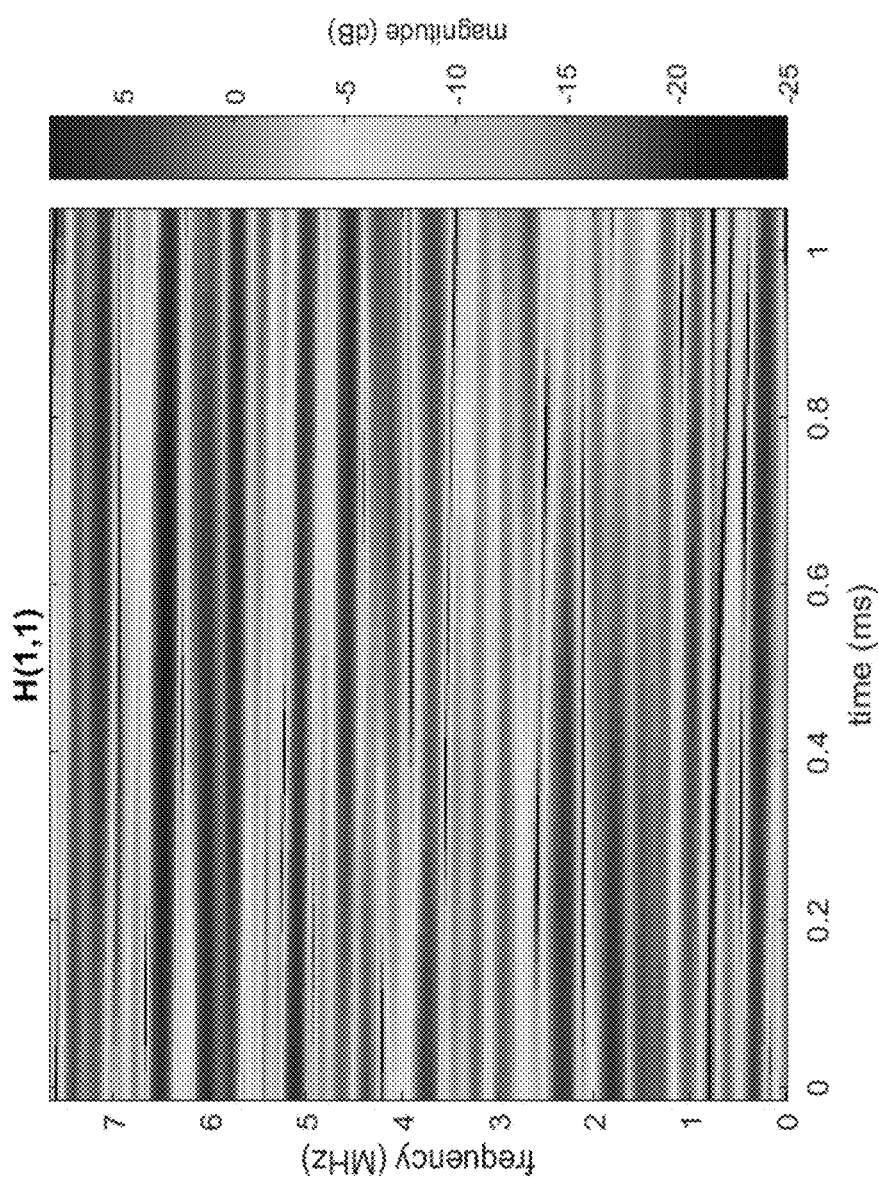
FIG. 22 is a spectral chart of an example of a wireless communication channel.

The wireless channel can be represented as a matrix which relates the transmit and receive signals through a simple linear equation:

$$y(f,t) = H(f,t)\varphi(f,t) + w(f,t) \quad (1)$$

for $f=1, \ldots, N_f$ and $t=1, \ldots, N_t$. FIG. 22 shows an example spectrogram of a wireless channel between a single hub antenna and a single UE antenna. The graph is plotted with time as the horizontal axis and frequency along the vertical axis. The regions are shaded to indicate where the channel is strong or weak, as denoted by the dB magnitude scale shown in FIG. 22.

Two common ways are typically used to acquire knowledge of the channel at the hub: explicit feedback and implicit feedback.

Explicit Feedback

In explicit feedback, the UEs measure the channel and then transmit the measured channel back to the hub in a packet of data. The explicit feedback may be done in three steps.

Pilot transmission: for each time and frequency bin the hub transmits a pilot signal denoted by $p(f,t) \in \mathbb{C}^{L_h}$ for $f=1, \ldots, N_f$ and $t=1, \ldots, N_t$. Unlike data, the pilot signal is known at both the hub and the UEs.

Channel acquisition: for each time and frequency bin the UEs receive the pilot signal distorted by the channel and white noise:

$$H(f,t)p(f,t) + w(f,t), \quad (2)$$

for $f=1, \ldots, N_f$ and $t=1, \ldots, N_t$. Because the pilot signal is known by the UEs, they can use signal processing to compute an estimate of the channel, denoted by $\hat{H}(f,t)$.

Feedback: the UEs quantize the channel estimates $\hat{H}(f,t)$ into a packet of data. The packet is then transmitted to the hub.

The advantage of explicit feedback is that it is relatively easy to implement. The disadvantage is the large overhead of transmitting the channel estimates from the UEs to the hub.

Implicit Feedback

Figure 23:
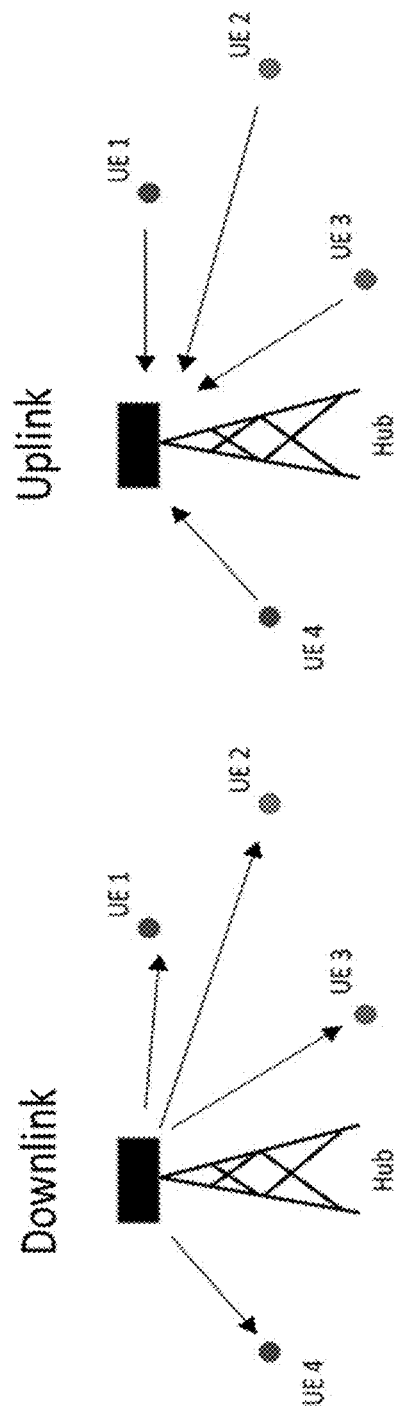
FIG. 23 illustrates examples of downlink and uplink transmission directions.

Implicit feedback is based on the principle of reciprocity which relates the uplink channel (UEs transmitting to the hub) to the downlink channel (hub transmitting to the UEs). FIG. 23 shows an example configuration of uplink and downlink channels between a hub and multiple UEs.

Specifically, denote the uplink and downlink channels by $H_{up}$ and $H$ respectively, then:

$$H(f,t) = A H_{up}^T(f,t) B, \quad (3)$$

for $f=1, \ldots, N_f$ and $t=1, \ldots, N_t$. Where $H_{up}^T(f,t)$ denotes the matrix transpose of the uplink channel. The matrices $A \in \mathbb{C}^{L_u \times L_u}$ and $B \in \mathbb{C}^{L_h \times L_h}$ represent hardware non-idealities. By performing a procedure called reciprocity calibration, the effect of the hardware non-idealities can be removed, thus giving a simple relationship between the uplink and downlink channels:

$$H(f,t) = H_{up}^T(f,t) \quad (4)$$

The principle of reciprocity can be used to acquire channel knowledge at the hub. The procedure is called implicit feedback and consists of three steps.

Reciprocity calibration: the hub and UEs calibrate their hardware so that equation (4) holds.

Pilot transmission: for each time and frequency bin the UEs transmits a pilot signal denoted by $p(f,t) \in \mathbb{C}^{L_u}$ for $f=1, \ldots, N_f$ and $t=1, \ldots, N_t$. Unlike data, the pilot signal is known at both the hub and the UEs.

Channel acquisition: for each time and frequency bin the hub receives the pilot signal distorted by the uplink channel and white noise:

$$H_{up}(f,t)p(f,t)+w(f,t) \quad (5)$$

for $f=1, \ldots, N_f$ and $t=1, \ldots, N_t$. Because the pilot signal is known by the hub, it can use signal processing to compute an estimate of the uplink channel, denoted by $\hat{H}_{up}(f,t)$. Because reciprocity calibration has been performed the hub can take the transpose to get an estimate of the downlink channel, denoted by $\hat{H}(f,t)$.

The advantage of implicit feedback is that it allows the hub to acquire channel knowledge with very little overhead; the disadvantage is that reciprocity calibration is difficult to implement.

Channel Prediction

Figure 24:
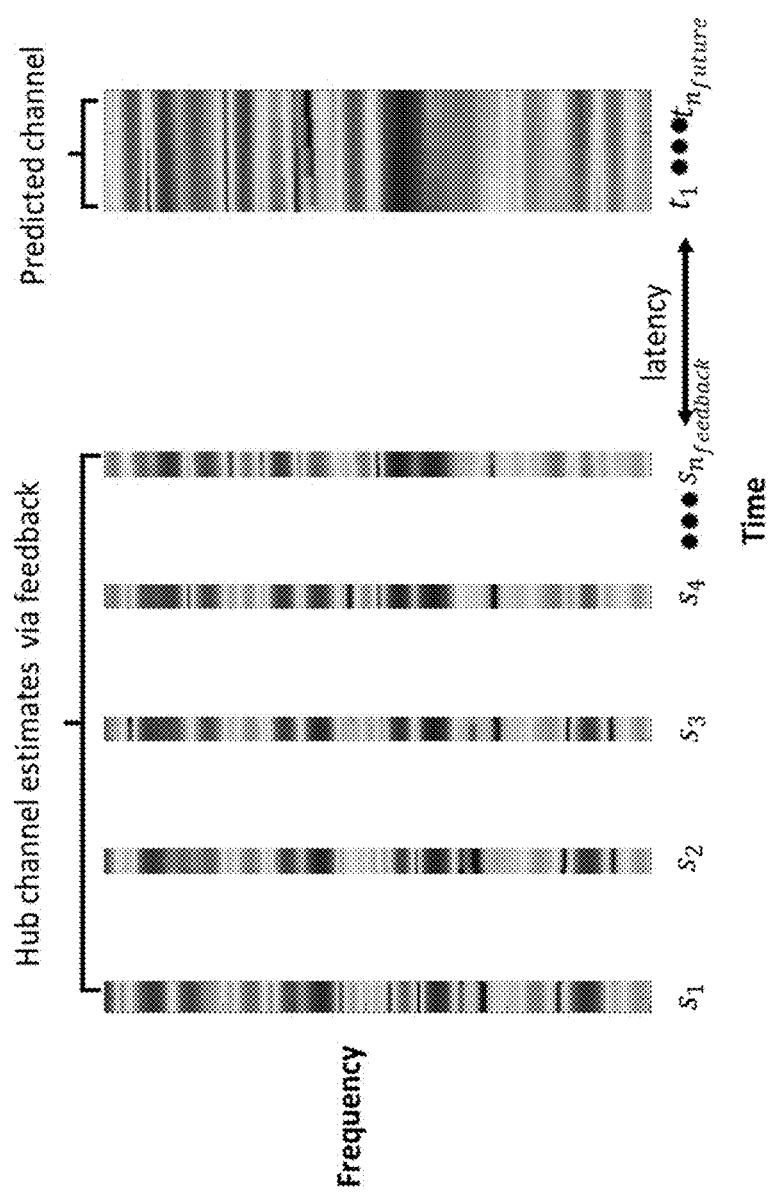
FIG. 24 illustrates spectral effects of an example of a channel prediction operation.

Using either explicit or implicit feedback, the hub acquires estimates of the downlink wireless channel at certain times denoted by $s_1, s_2, \ldots, s_n$ using these estimates it must then predict what the channel will be at future times when the precoding will be performed, denoted by $t_1, t_2, \ldots, t_m$. FIG. 24 shows this setup in which "snapshots" of channel are estimated, and based on the estimated snapshots, a prediction is made regarding the channel at a time in the future. As depicted in FIG. 24, channel estimates may be available across the frequency band at a fixed time slots, and based on these estimates, a predicated channel is calculated.

There are tradeoffs when choosing the feedback times $s_1, s_2, \ldots, s_n$.

Latency of extrapolation: Refers to the temporal distance between the last feedback time, $s_n$, and the first prediction time, $t_1$, determines how far into the future the hub needs to predict the channel. If the latency of extrapolation is large, then the hub has a good lead time to compute the pre-coding filters before it needs to apply them. On the other hand, larger latencies give a more difficult prediction problem.

Density: how frequent the hub receives channel measurements via feedback determines the feedback density. Greater density leads to more accurate prediction at the cost of greater overhead.

There are many channel prediction algorithms in the literature. They differ by what assumptions they make on the mathematical structure of the channel. The stronger the assumption, the greater the ability to extrapolate into the future if the assumption is true. However, if the assumption is false then the extrapolation will fail. For example:

Polynomial extrapolation: assumes the channel is smooth function. If true, can extrapolate the channel a very short time into the future ≈0.5 ms.

Bandlimited extrapolation: assumes the channel is a bandlimited function. If true, can extrapolated a short time into the future ≈1 ms.

MUSIC extrapolation: assumes the channel is a finite sum of waves. If true, can extrapolate a long time into the future ≈10 ms.

Precoding Filter Computation and Application

Using extrapolation, the hub computes an estimate of the downlink channel matrix for the times the pre-coded data will be transmitted. The estimates are then used to construct precoding filters. Precoding is performed by applying the filters on the data the hub wants the UEs to receive. Before going over details we introduce notation.

Channel estimate: for each time and frequency bin the hub has an estimate of the downlink channel which we denote by $\hat{H}(f,t) \in \mathbb{C}^{L_u \times L_h}$ for $f=1, \ldots, N_f$ and $t=1, \ldots, N_t$.

Precoding filter: for each time and frequency bin the hub uses the channel estimate to construct a precoding filter which we denote by $W(f,t) \in \mathbb{C}^{L_h \times L_u}$ for $f=1, \ldots, N_f$ and $t=1, \ldots, N_t$.

Data: for each time and frequency bin the UE wants to transmit a vector of data to the UEs which we denote by $x(f,t) \in \mathbb{C}^{L_u}$ for $f=1, \ldots, N_f$ and $t=1, \ldots, N_t$.

Hub Energy Constraint

When the precoder filter is applied to data, the hub power constraint is an important consideration. We assume that the total hub transmit energy cannot exceed $N_f N_t L_h$. Consider the pre-coded data:

$$W(f,t)x(f,t), \quad (6)$$

for $f=1, \ldots, N_f$ and $t=1, \ldots, N_t$. To ensure that the pre-coded data meets the hub energy constraints the hub applies normalization, transmitting:

$$\lambda W(f,t)x(f,t), \quad (7)$$

for $f=1, \ldots, N_f$ and $t=1, \ldots, N_t$. Where the normalization constant is given by:

$$\lambda = \sqrt{\frac{N_f N_t L_h}{\Sigma_{f,t} \|W(f,t)x(f,t)\|^2}} \quad (8)$$

Receiver SNR

The pre-coded data then passes through the downlink channel, the UEs receive the following signal:

$$\lambda H(f,t)W(f,t)x(f,t)+w(f,t), \quad (9)$$

for $f=1, \ldots, N_f$ and $t=1, \ldots, N_t$. The UE then removes the normalization constant, giving a soft estimate of the data:

$$x_{soft}(f,t) = H(f,t)W(f,t) + \frac{1}{\lambda}w(f,t), \quad (10)$$

for $f=1, \ldots, N_f$ and $t=1, \ldots, N_t$. The error of the estimate is given by:

$$x_{soft}(f,t) - x(f,t) = H(f,t)W(f,t)x(f,t) - x(f,t) + \frac{1}{\lambda}w(f,t), \quad (11)$$

The error of the estimate can be split into two terms. The term $H(f,t)W(f,t)-x(f,t)$ is the interference experienced by the UEs while the term $$\frac{1}{\lambda}w(f,t)$$

gives the noise experienced by the UEs.

When choosing a pre-coding filter there is a tradeoff between interference and noise. We now review the two most popular pre-coder filters: zero-forcing and regularized zero-forcing.

Zero Forcing Precoder

Figure 25:
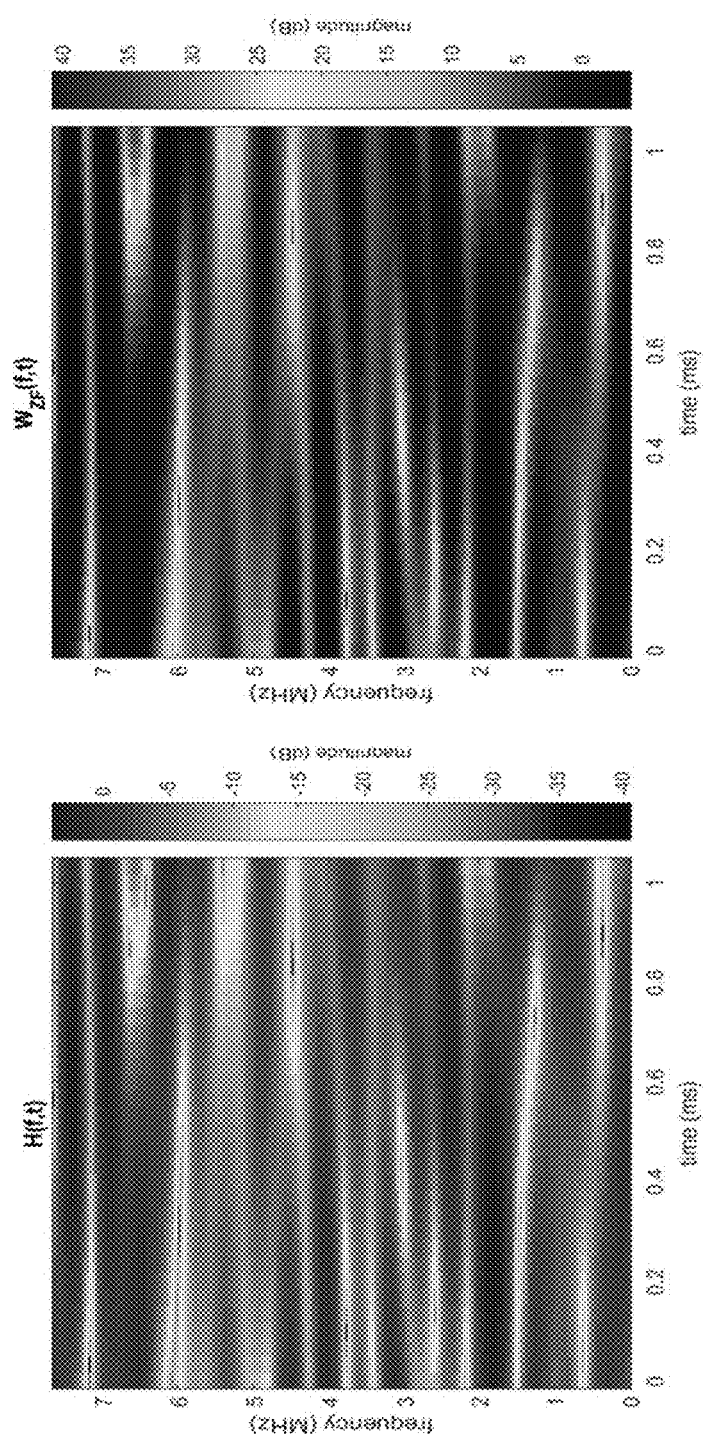
FIG. 25 graphically illustrates operation of an example implementation of a zero-forcing precoder (ZFP).

The hub constructs the zero forcing pre-coder (ZFP) by inverting its channel estimate:

$$W_{ZF}(f,t)=(\hat{H}^*(f,t)\hat{H}(f,t))^{-1}\hat{H}^*(f,t), \quad (12)$$

for f=1, ..., $N_f$ and t=1, ..., $N_t$. The advantage of ZPP is that the UEs experience little interference (if the channel estimate is perfect then the UEs experience no interference). The disadvantage of ZFP is that the UEs can experience a large amount of noise. This is because at time and frequency bins where the channel estimate $\hat{H}(f,t)$ is very small the filter $W_{ZF}(f,t)$ will be very large, thus causing the normalization constant $\lambda$ to be very small giving large noise energy. FIG. 25 demonstrates this phenomenon for a SISO channel.

Regularized Zero-Forcing Pre-Coder (rZFP)

Figure 26:
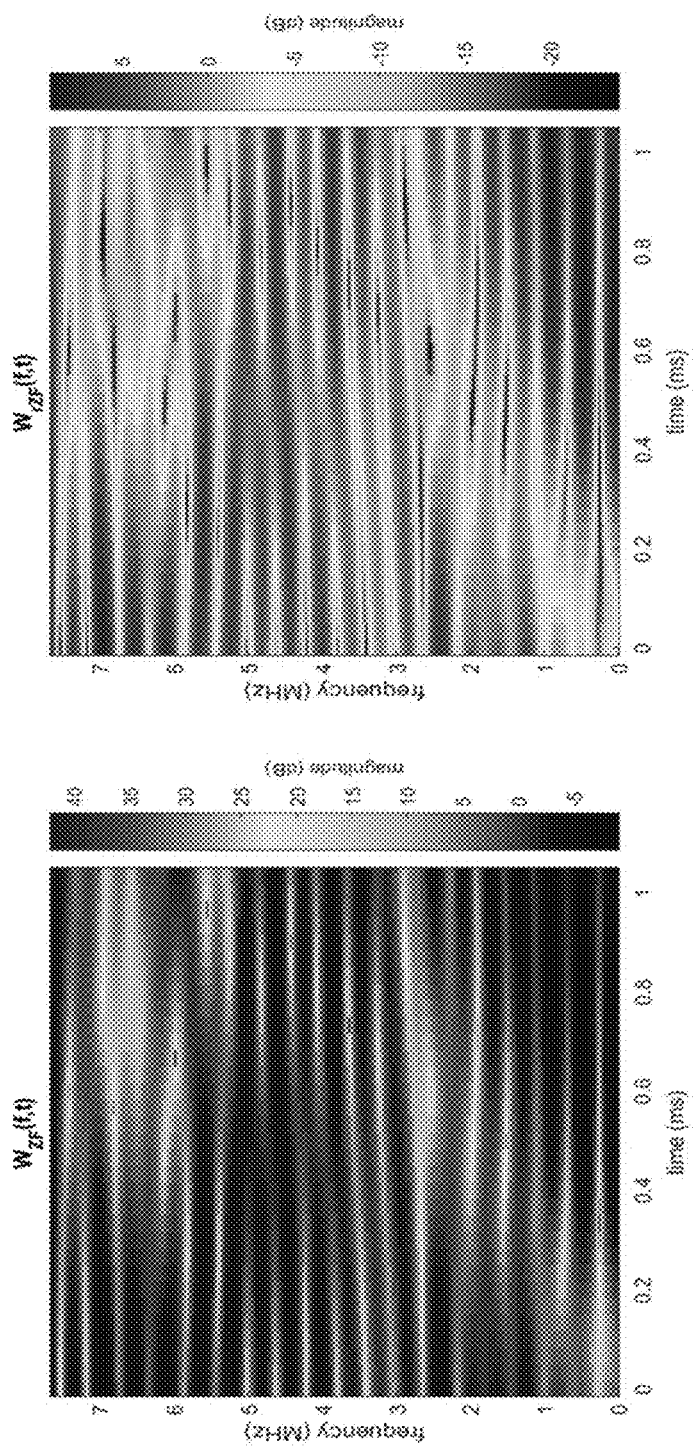
FIG. 26 graphically compares two implementations—a ZFP implementation and regularized ZFP implementation (rZFP).

To mitigates the effect of channel nulls (locations where the channel has very small energy) the regularized zero forcing precoder (rZFP) is constructed be taking a regularized inverse of its channel estimate:

$$W_{rZF}(f,t) = (\hat{H}^*(f,t)\hat{H}(f,t) + \alpha I)^{-1}\hat{H}^*(f,t), \quad (13)$$

for f=1, ..., $N_f$ and t=1, ..., $N_t$. Where $\alpha > 0$ is the normalization constant. The advantage of rZFP is that the noise energy is smaller compared to ZPF. This is because rZFP deploys less energy in channel nulls, thus the normalization constant $\lambda$ is larger giving smaller noise energy. The disadvantage of rZFP is larger interference compared to ZFP. This is because the channel is not perfectly inverted (due to the normalization constant), so the UEs will experience residual interference. FIG. 26 demonstrates this phenomenon for a SISO channel.

Figure 27:
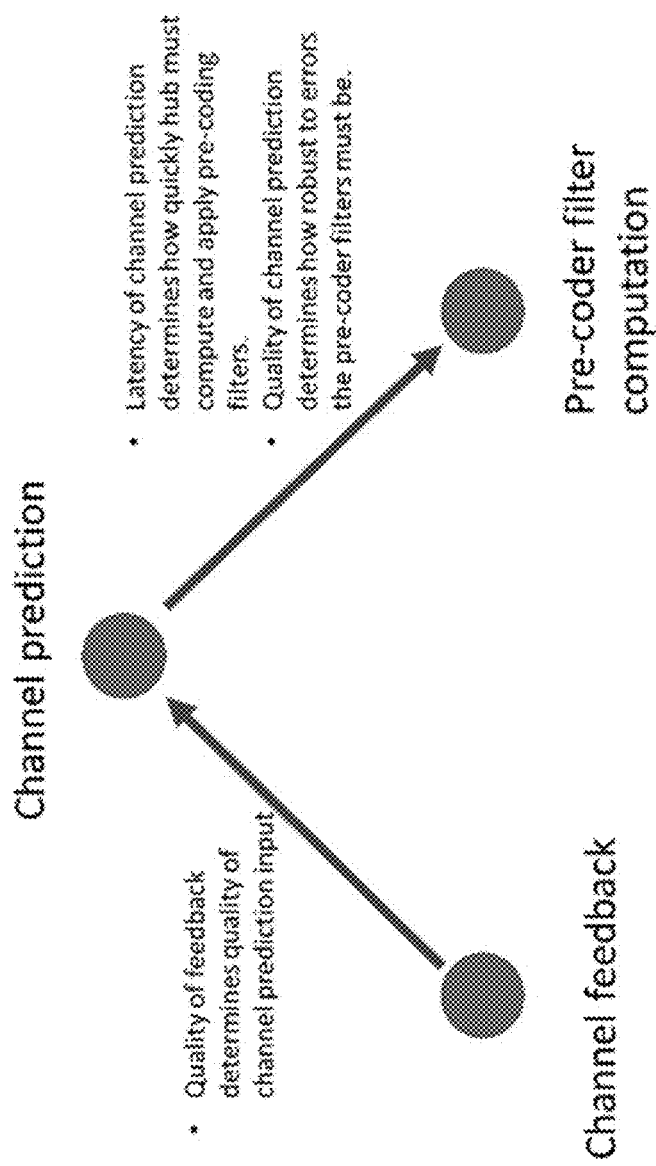
FIG. 27 shows components of an example embodiment of a precoding system.

As described above, there are three components to a precoding system: a channel feedback component, a channel prediction component, and a pre-coding filter component. The relationship between the three components is displayed in FIG. 27.

OTFS Precoding System

Various techniques for implementing OTFS precoding system are discussed. Some disclosed techniques can be used to provide unique ability to shape the energy distribution of the transmission signal. For example, energy distribution may be such that the energy of the signal will be high in regions of time frequency and space where the channel information and the channel strength are strong. Conversely, the energy of the signal will be low in regions of time frequency and space where the channel information or the channel strength are weak.

Figure 28:
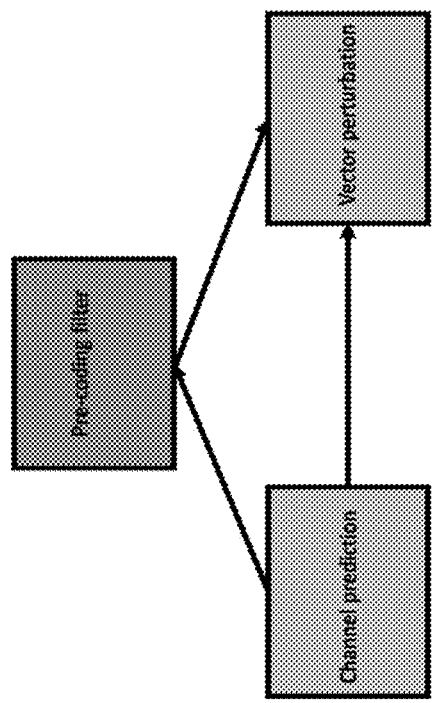
FIG. 28 is a block diagram depiction of an example of a precoding system.

Some embodiments may be described with reference to three main blocks, as depicted in FIG. 28.

Channel prediction: During channel prediction, second order statistics are used to build a prediction filter along with the covariance of the prediction error.

Optimal precoding filter: using knowledge of the predicted channel and the covariance of the prediction error: the hub computes the optimal precoding filter. The filter shapes the spatial energy distribution of the transmission signal.

Vector perturbation: using knowledge of the predicted channel, precoding filter, and prediction error, the hub perturbs the transmission signal. By doing this the hub shapes the time, frequency, and spatial energy distribution of the transmission signal.

Review of OTFS Modulation

A modulation is a method to transmit a collection of finite symbols (which encode data) over a fixed allocation of time and frequency. A popular method used today is Orthogonal Frequency Division Multiplexing (OFDM) which transmits each finite symbol over a narrow region of time and frequency (e.g., using subcarriers and timeslots). In contrast, Orthogonal Time Frequency Space (OTFS) transmits each finite symbol over the entire allocation of time and frequency. Before going into details, we introduce terminology and notation.

We call the allocation of time and frequency a frame. We denote the number of subcarriers in the frame by $N_f$. We denote the subcarrier spacing by df. We denote the number of OFDM symbols in the frame by $N_t$. We denote the OFDM symbol duration by dt. We call a collection of possible finite symbols an alphabet, denoted by A.

A signal transmitted over the frame, denoted by $\varphi$, can be specified by the values it takes for each time and frequency bin:

$$\varphi(f,t) \in \mathbb{C}, \quad (14)$$

for f=1, ..., $N_f$ and t=1, ..., $N_t$.

Figure 29:
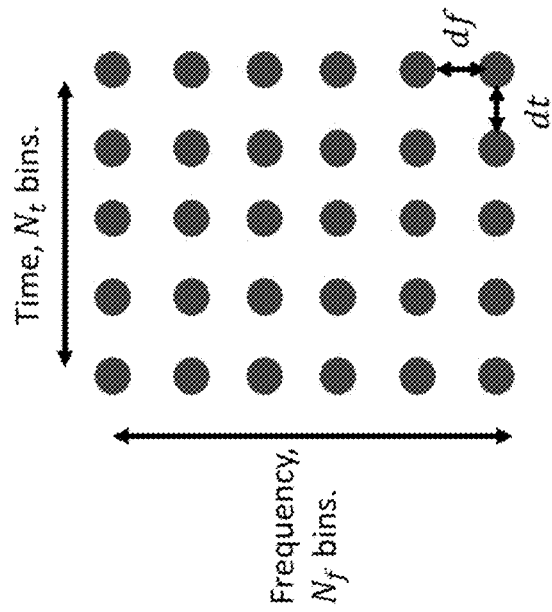
FIG. 29 shows an example of a quadrature amplitude modulation (QAM) constellation.
Figure 30:
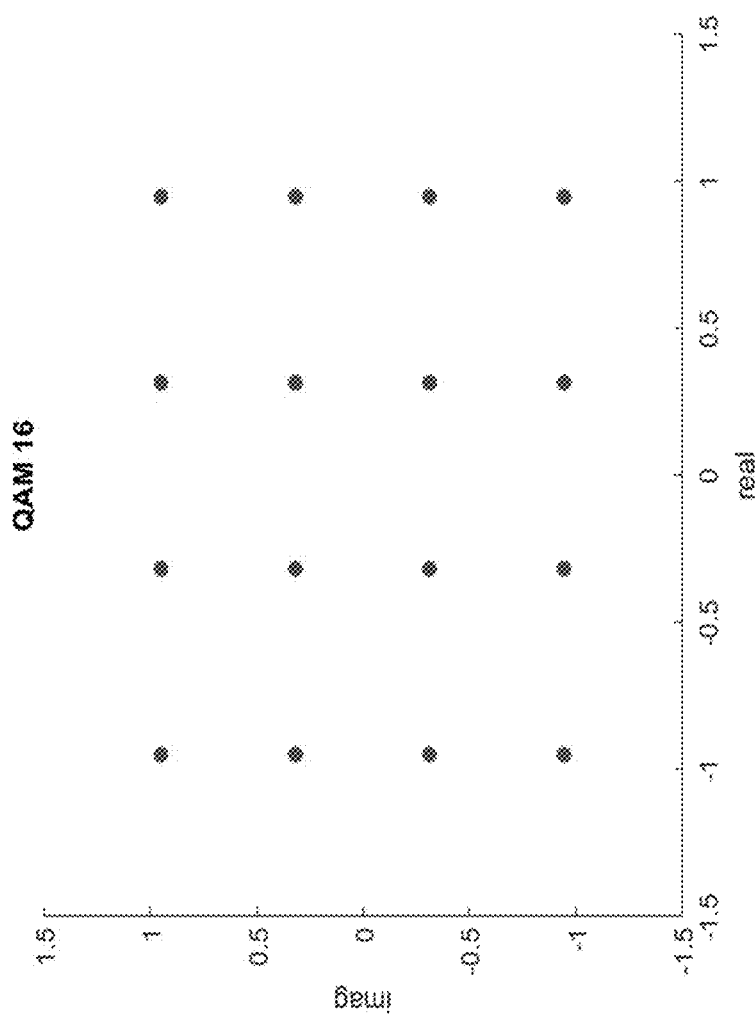
FIG. 30 shows another example of QAM constellation.

FIG. 29 shows an example of a frame along time (horizontal) axis and frequency (vertical) axis. FIG. 30 shows an example of the most commonly used alphabet: Quadrature Amplitude Modulation (QAM).

OTFS Modulation

Suppose a transmitter has a collection of $N_f N_t$ QAM symbols that the transmitter wants to transmit over a frame, denoted by:

$$x(f,t) \in A, \quad (15)$$

for f=1, ..., $N_f$ and t=1, ..., $N_t$. OFDM works by transmitting each QAM symbol over a single time frequency bin:

$$\varphi(f,t) = x(f,t), \quad (16A)$$

for f=1, ..., $N_f$ and t=1, ..., $N_t$. The advantage of OFDM is its inherent parallelism, this makes many computational aspects of communication very easy to implement. The disadvantage of OFDM is fading, that is, the wireless channel can be very poor for certain time frequency bins. Performing pre-coding for these bins is very difficult.

The OTFS modulation is defined using the delay Doppler domain, which is relating to the standard time frequency domain by the two-dimensional Fourier transform.

The delay dimension is dual to the frequency dimension. There are $N_\tau$ delay bins with $N_\tau = N_f$. The Doppler dimension is dual to the time dimension. There are $N_\nu$ Doppler bins with $N_\nu = N_t$.

A signal in the delay Doppler domain, denoted by $\phi$, is defined by the values it takes for each delay and Doppler bin:

$$\phi(\tau,\nu) \in \mathbb{C}, \quad (16B)$$

for $\tau$=1, ..., $N_\tau$ and $\nu$=1, ..., $N_\nu$.

Given a signal $\phi$ in the delay Doppler domain, some transmitter embodiments may apply the two-dimensional Fourier transform to define a signal $\varphi$ in the time frequency domain:

$$\varphi(f,t) = (F\phi)(f,t), \quad (17)$$

for f=1, ..., $N_f$ and t=1, ..., $N_t$. Where F denotes the two-dimensional Fourier transform.

Conversely, given a signal $\varphi$ in the time frequency domain, transmitter embodiments could apply the inverse two-dimensional Fourier transform to define a signal $\phi$ in the delay Doppler domain:

$$\phi(\tau,\nu) = (F^{-1}\varphi)(\tau,\nu), \quad (18)$$

for $\tau$=1, ..., $N_\tau$ and $\nu$=1, ..., $N_\nu$.

Figure 31:
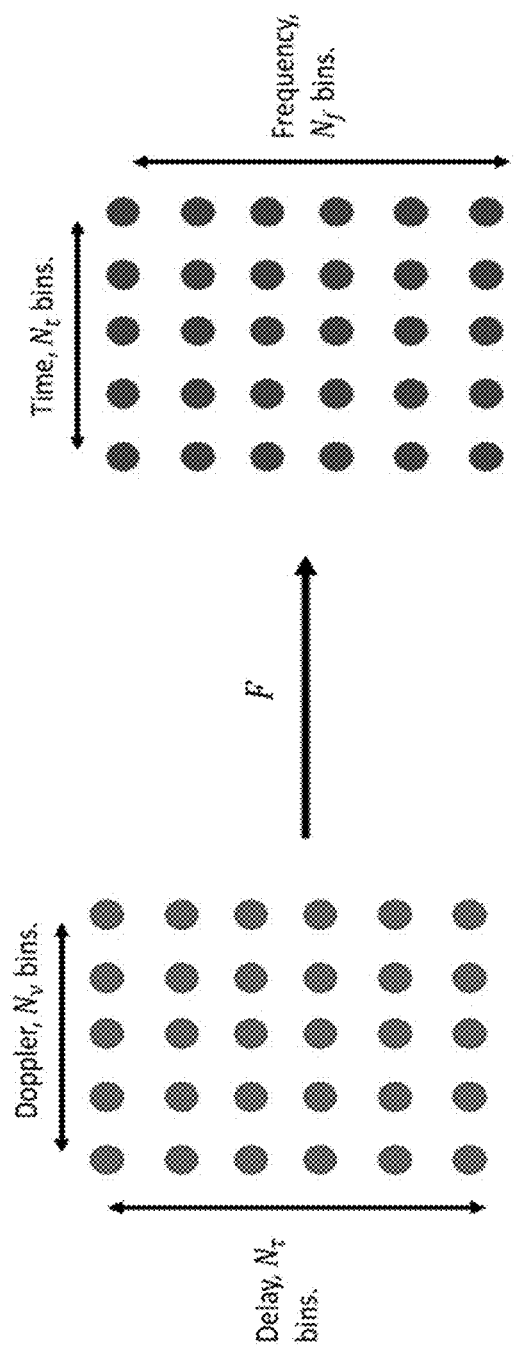
FIG. 31 pictorially depicts an example of relationship between delay-Doppler domain and time-frequency domain.

FIG. 31 depicts an example of the relationship between the delay Doppler and time frequency domains.

The advantage of OTFS is that each QAM symbol is spread evenly over the entire time frequency domain (by the two-two-dimensional Fourier transform), therefore each QAM symbol experience all the good and bad regions of the channel thus eliminating fading. The disadvantage of OTFS is that the QAM spreading adds computational complexity.

MMSE Channel Prediction

Figure 32:
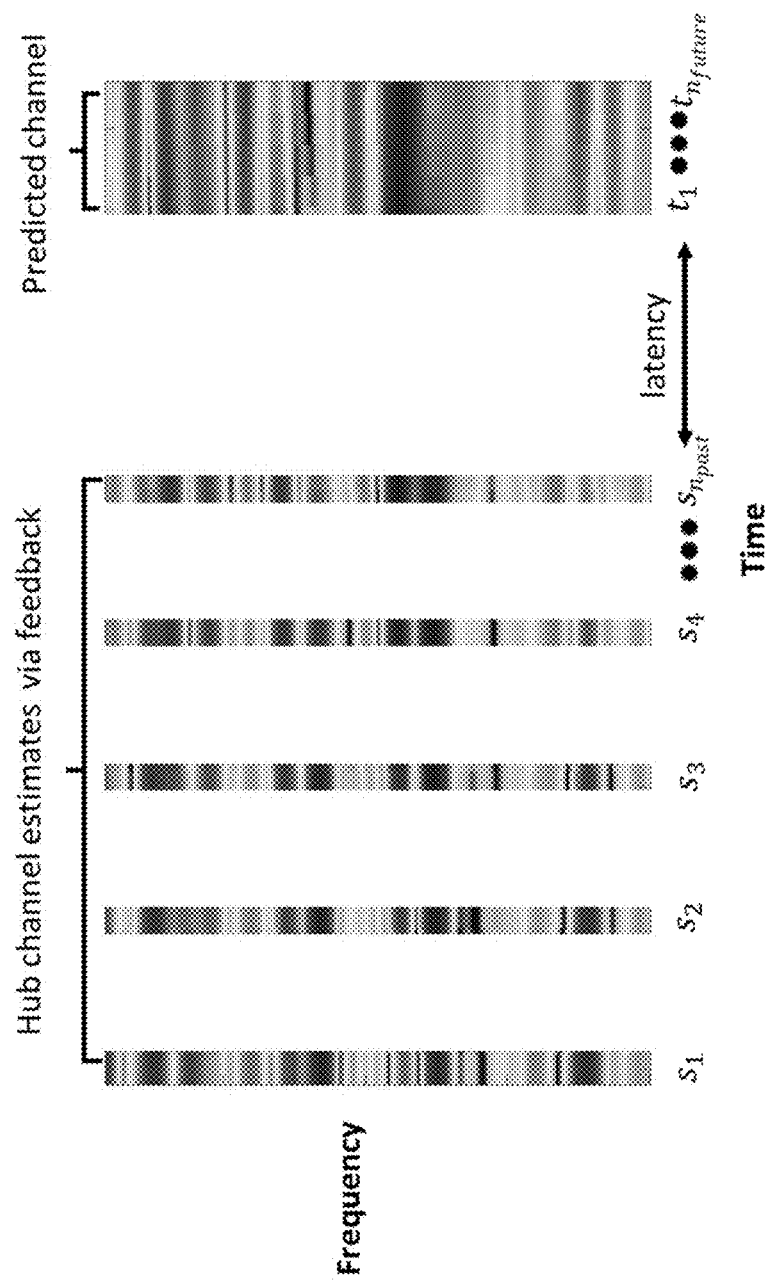
FIG. 32 is a spectral graph of an example of an extrapolation process.

Channel prediction is performed at the hub by applying an optimization criterion, e.g., the Minimal Mean Square Error (MMSE) prediction filter to the hub's channel estimates (acquired by either implicit or explicit feedback). The MMSE filter is computed in two steps. First, the hub computes empirical estimates of the channel's second order statistics. Second, using standard estimation theory, the hub uses the second order statistics to compute the MMSE prediction filter. Before going into details, we introduce notation:

We denote the number of antennas at the hub by $L_h$. We denote the number of UE antennas by $L_u$. We index the UE antennas by $u=1, \ldots, L_u$. We denote the number frequency bins by $N_f$. We denote the number of feedback times by $n_{past}$. We denote the number of prediction times by $n_{future}$. FIG. 32 shows an example of an extrapolation process setup.

For each UE antenna, the channel estimates for all the frequencies, hub antennas, and feedback times can be combined to form a single $N_f L_h n_{past}$ dimensional vector. We denote this by:

$$\hat{H}_{past}(u) \in \mathbb{C}^{N_f L_h n_{past}}, \quad (19)$$

Likewise, the channel values for all the frequencies, hub antennas, and prediction times can be combined to form a single $N_f L_h n_{future}$ dimensional vector. We denote this by:

$$H_{future}(u) \in \mathbb{C}^{N_f L_h n_{future}}, \quad (20)$$

In typical implementations, these are extremely high dimensional vectors and that in practice some form of compression should be used. For example, principal component compression may be one compression technique used.

Empirical Second Order Statistics

Empirical second order statistics are computed separately for each UE antenna in the following way:

At fixed times, the hub receives through feedback N samples of $\hat{H}_{past}(u)$ and estimates of $H_{future}(u)$. We denote them by: $\hat{H}_{past}(u)_i$ and $\hat{H}_{future}(u)_i$ for $i=1, \ldots, N$.

The hub computes an estimate of the covariance of $\hat{H}_{past}(u)$, which we denote by $\hat{R}_{past}(u)$:

$$\hat{R}_{past}(u) = \frac{1}{N} \sum_{i=1}^{N} \hat{H}_{past}(u)_i \hat{H}_{past}(u)_i^* \quad (21)$$

The hub computes an estimate of the covariance of $H_{future}(u)$, which we denote by $\hat{R}_{future}(u)$:

$$\hat{R}_{future}(u) = \frac{1}{N} \sum_{i=1}^{N} \hat{H}_{future}(u)_i \hat{H}_{future}(u)_i^* \quad (22)$$

The hub computes an estimate of the correlation between $H_{future}(u)$ and $\hat{H}_{past}(u)$, which we denote by $\hat{R}_{past,future}(u)$:

$$\hat{R}_{future,past}(u) = \frac{1}{N} \sum_{i=1}^{N} \hat{H}_{future}(u)_i \hat{H}_{past}(u)_i^* \quad (23)$$

In typical wireless scenarios (pedestrian to highway speeds) the second order statistics of the channel change slowly (on the order of 1-10 seconds). Therefore, they should be recomputed relatively infrequently. Also, in some instances it may be more efficient for the UEs to compute estimates of the second order statistics and feed these back to the hub.

MMSE Prediction Filter

Using standard estimation theory, the second order statistics can be used to compute the MMSE prediction filter for each UE antenna:

$$C(u) = \hat{R}_{future,past}(u) \hat{R}_{past}^{-1}(u), \quad (24)$$

Where C(u) denotes the MMSE prediction filter. The hub can now predict the channel by applying feedback channel estimates into the MMSE filter:

$$\hat{H}_{future}(u) = C(u) \hat{H}_{past}(u). \quad (25)$$

Prediction Error Variance

We denote the MMSE prediction error by $\Delta H_{future}(u)$, then:

$$H_{future}(u) = \hat{H}_{future}(u) + \Delta H_{future}(u). \quad (26)$$

We denote the covariance of the MMSE prediction error by $R_{error}(u)$, with:

$$R_{error}(u) = \mathbb{E}[\Delta H_{future}(u) \Delta H_{future}(u)^*] \quad (27)$$

Using standard estimation theory, the empirical second order statistics can be used to compute an estimate of $R_{error}(u)$:

$$\hat{R}_{error}(u) = C(u)\hat{R}_{past}(u)C(u)^* - C(u)\hat{R}_{future,past}(u)^* - \hat{R}_{future,past}(u)C(u)^* + \hat{R}_{future}(u) \quad (28)$$

Simulation Results

Figure 33:
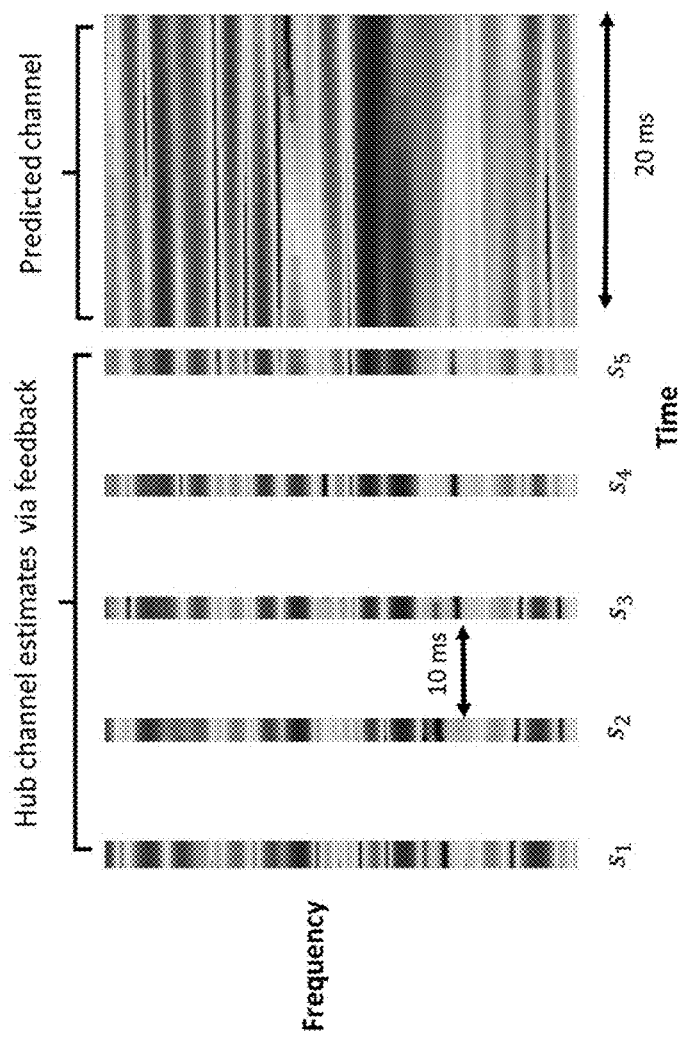
FIG. 33 is a spectral graph of another example of an extrapolation process.

We now present simulation results illustrating the use of the MMSE filter for channel prediction. Table 3 gives the simulation parameters and FIG. 33 shows the extrapolation setup for this example.

TABLE 3

| | |
|---|---|
| Subcarrier spacing | 15 kHz |
| Number of subcarriers | 512 |
| Delay spread | 3 μs |
| Doppler spread | 600 Hz |
| Number of channel feedback estimates | 5 |
| Spacing of channel feedback estimates | 10 ms |
| Prediction range | 0-20 ms into the future |

Figure 34:
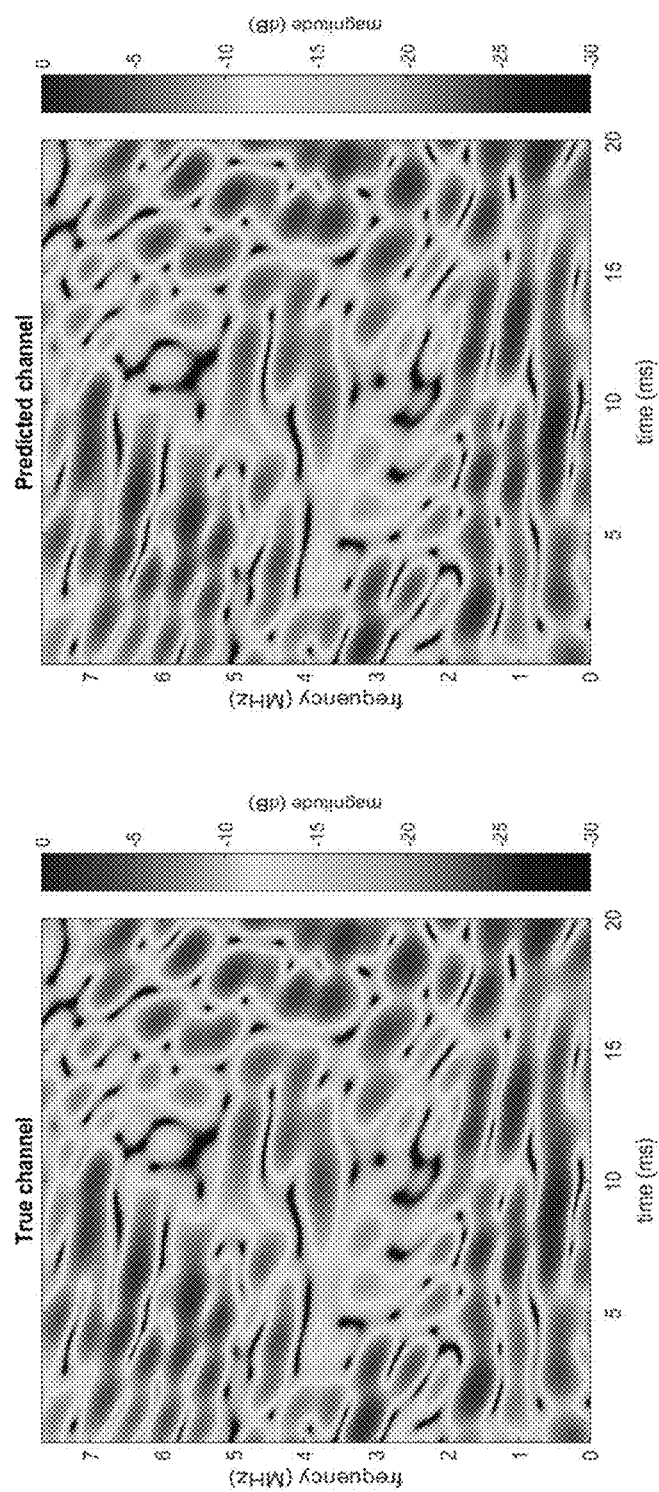
FIG. 34 compares spectra of a true and a predicted channel in some precoding implementation embodiments.

Fifty samples of $\hat{H}_{past}$ and $\hat{H}_{future}$ were used to compute empirical estimates of the second order statistics. The second order statistics were used to compute the MMSE prediction filter. FIG. 34 shows the results of applying the filter. The results have shown that the prediction is excellent at predicting the channel, even 20 ms into the future.

Block Diagrams

Figure 35:
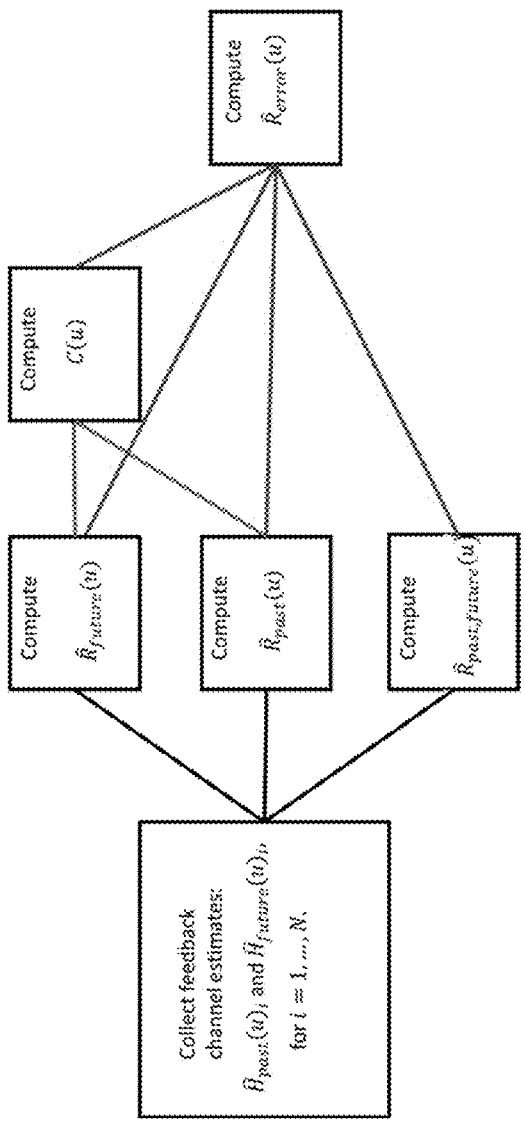
FIG. 35 is a block diagram depiction of a process for computing prediction filter and error covariance.
Figure 36:
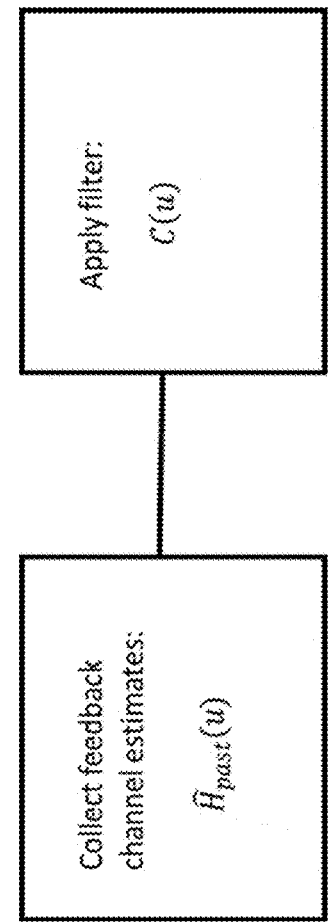
FIG. 36 is a block diagram illustrating an example of a channel prediction process.

In some embodiments, the prediction is performed independently for each UE antenna. The prediction can be separated into two steps:

1) Computation of the MMSE prediction filter and prediction error covariance: the computation can be performed infrequently (on the order of seconds). The computation is summarized in FIG. 35. Starting from left in FIG. 35, first, feedback channel estimates are collected. Next, the past, future and future/past correlation matrices are computed. Next the filter estimate C(u) and the error estimate are computed.
2) Channel prediction: is performed every time precoding is performed. The procedure is summarized in FIG. 36.

Optimal Precoding Filter

Using MMSE prediction, the hub computes an estimate of the downlink channel matrix for the allocation of time and frequency the pre-coded data will be transmitted. The estimates are then used to construct precoding filters. Precoding is performed by applying the filters on the data the hub wants the UEs to receive. Embodiments may derive the "optimal" precoding filters as follows. Before going over details we introduce notation.

Frame (as defined previously): precoding is performed on a fixed allocation of time and frequency, with $N_f$ frequency bins and $N_t$ time bins. We index the frequency bins by: f=1, ..., $N_f$. We index the time bins by t=1, ..., $N_t$.

Channel estimate: for each time and frequency bin the hub has an estimate of the downlink channel which we denote by $\hat{H}(f,t) \in \mathbb{C}^{L_u \times L_h}$ Error correlation: we denote the error of the channel estimates by $\Delta H(f,t)$, then:

$$H(f,t) = \hat{H}(f,t) + \Delta H(f,t), \quad (29)$$

We denote the expected matrix correlation of the estimation error by $R_{\Delta H}(f,t) \in \mathbb{C}^{L_h \times L_h}$, with:

$$R_{\Delta H}(f,t) = \mathbb{E}[\Delta H(f,t)^* \Delta H(f,t)]. \quad (30)$$

The hub can be easily compute these using the prediction error covariance matrices computed previously: $\hat{R}_{error}(u)$ for u=1, ..., $L_u$.

Signal: for each time and frequency bin the UE wants to transmit a signal to the UEs which we denote by $s(f,t) \in \mathbb{C}^{L_u}$.

Precoding filter: for each time and frequency bin the hub uses the channel estimate to construct a precoding filter which we denote by $W(f,t) \in \mathbb{C}^{L_h \times L_u}$.

White noise: for each time and frequency bin the UEs experience white noise which we denote by $n(f,t) \in \mathbb{C}^{L_u}$. We assume the white noise is iid Gaussian with mean zero and variance $N_0$.

Hub Energy Constraint

When the precoder filter is applied to data, the hub power constraint may be considered. We assume that the total hub transmit energy cannot exceed $N_f N_t L_h$. Consider the pre-coded data:

$$W(f,t) s(f,t), \quad (31)$$

To ensure that the pre-coded data meets the hub energy constraints the hub applies normalization, transmitting:

$$\lambda W(f,t) s(f,t), \quad (32)$$

Where the normalization constant $\lambda$ is given by:

$$\lambda = \sqrt{\frac{N_f N_t L_h}{\sum_{f,t} \|W(f,t) s(f,t)\|^2}} \quad (33)$$

Receiver SINR

The pre-coded data then passes through the downlink channel, the UEs receive the following signal:

$$\lambda H(f,t) W(f,t) s(f,t) + n(f,t), \quad (34)$$

The UEs then removes the normalization constant, giving a soft estimate of the signal:

$$s_{soft}(f,t) = H(f,t) W(f,t) s(f,t) + \frac{1}{\lambda} n(f,t). \quad (35)$$

The error of the estimate is given by:

$$s_{soft}(f,t) - s(f,t) = H(f,t) W(f,t) s(f,t) - s(f,t) + \frac{1}{\lambda} n(f,t). \quad (36)$$

The error can be decomposed into two independent terms: interference and noise. Embodiments can compute the total expected error energy:

$$\text{expected error energy} = \sum_{f=1}^{N_f} \sum_{t=1}^{N_t} \mathbb{E}\|s_{soft}(f,t) - s(f,t)\|^2 = \quad (37)$$

$$\sum_{f=1}^{N_f} \sum_{t=1}^{N_t} \mathbb{E}\|H(f,t) W(f,t) s(f,t) - s(f,t)\|^2 + \frac{1}{\lambda^2} \mathbb{E}\|n(f,t)\|^2 =$$

$$\sum_{f=1}^{N_f} \sum_{t=1}^{N_t} \left(\hat{H}(f,t) W(f,t) s(f,t) - s(f,t)\right)^*$$

$$\left(\hat{H}(f,t) W(f,t) s(f,t) - s(f,t)\right) +$$

$$(W(f,t) s(f,t))^* \left(R_{\Delta H}(f,t) + \frac{N_0 L_u}{L_h} I\right) (W(f,t) s(f,t))$$

Optimal Precoding Filter

We note that the expected error energy is convex and quadratic with respect to the coefficients of the precoding filter. Therefore, calculus can be used to derive the optimal precoding filter:

$$W_{opt}(f,t) = \left(\hat{H}(f,t)^* \hat{H}(f,t) + R_{\Delta H}(f,t) + \frac{N_0 L_u}{L_h} I\right)^{-1} \hat{H}(f,t)^* \quad (38)$$

Accordingly, some embodiments of an OTFS precoding system use this filter (or an estimate thereof) for precoding.

Simulation Results

Figure 37:
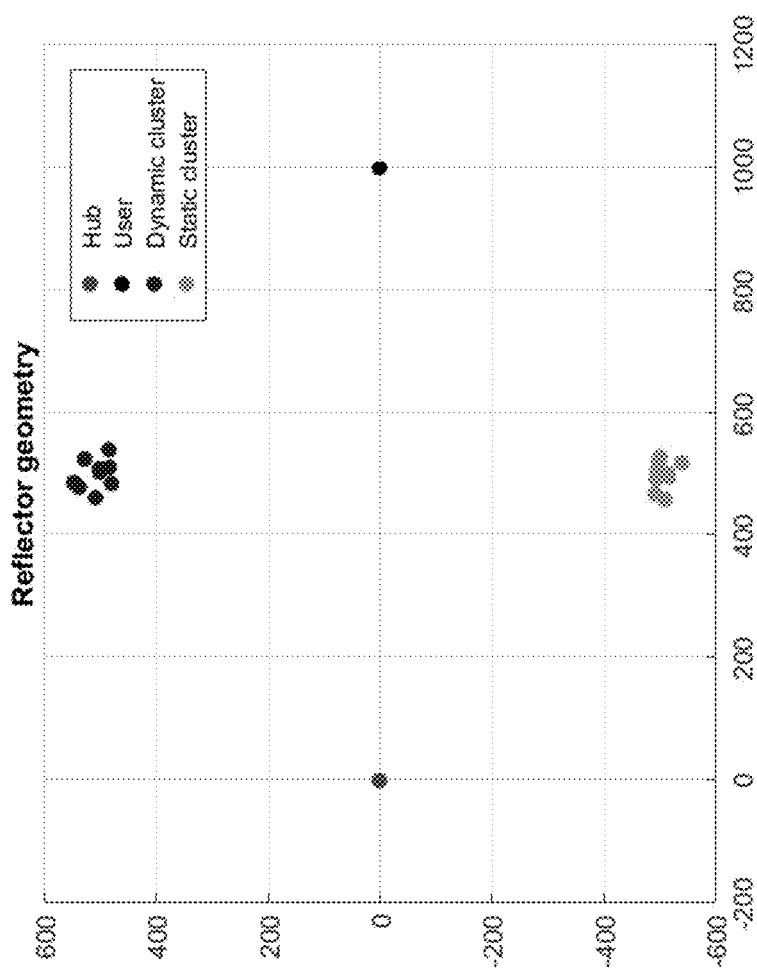
FIG. 37 is a graphical depiction of channel geometry of an example wireless channel.
Figure 38A:
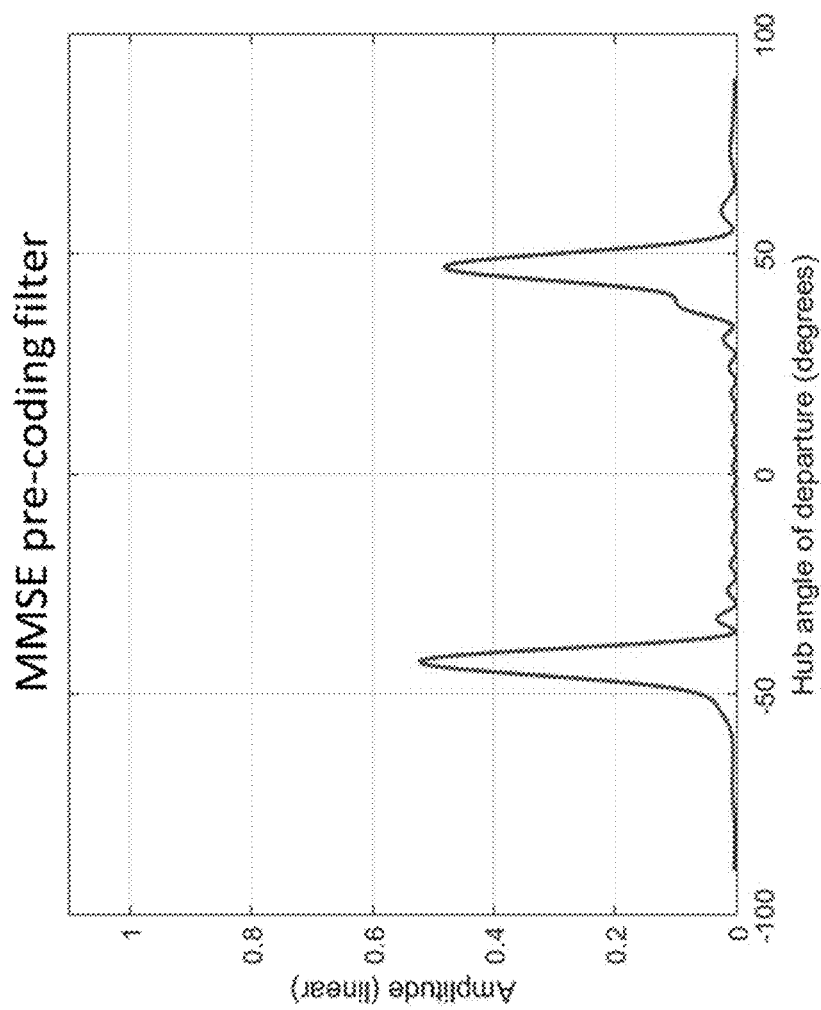
FIG. 38A is a graph showing an example of a precoding filter antenna pattern.

We now present a simulation result illustrating the use of the optimal precoding filter. The simulation scenario was a hub transmitting data to a single UE. The channel was non line of sight, with two reflector clusters: one cluster consisted of static reflectors, the other cluster consisted of moving reflectors. FIG. 37 illustrates the channel geometry, with horizontal and vertical axis in units of distance. It is assumed that the hub has good Channel Side Information (CSI) regarding the static cluster and poor CSI regarding the dynamic cluster. The optimal precoding filter was compared to the MMSE precoding filter. FIG. 38A displays the antenna pattern given by the MMSE precoding filter. It can be seen that the energy is concentrated at ±45°, that is, towards the two clusters. The UE SINR is 15.9 dB, the SINR is relatively low due to the hub's poor CSI for the dynamic cluster.

Figure 38B:
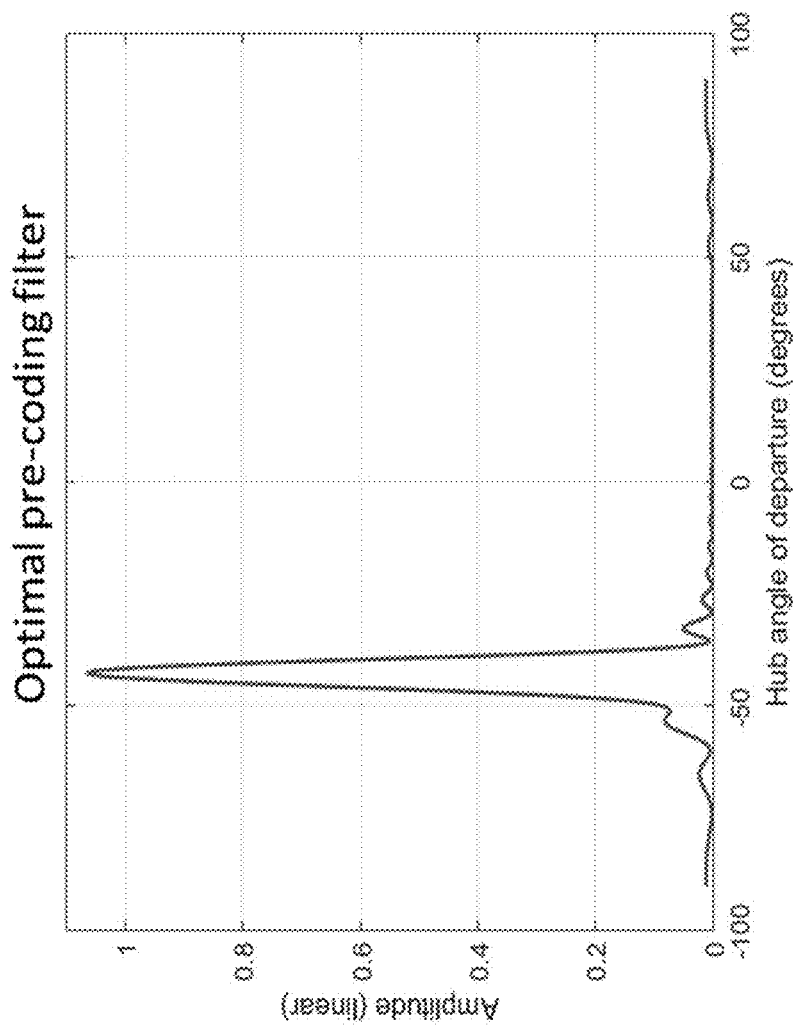
FIG. 38B is a graph showing an example of an optical pre-coding filter.

FIG. 38B displays the antenna pattern given by the optimal precoding filter as described above, e.g., using equation (38). In this example, the energy is concentrated at −45°, that is, toward the static cluster. The UE SINR is 45.3 dB, the SINR is high (compared to the MMSE case) due to the hub having good CSI for the static reflector.

The simulation results depicted in FIGS. 38A and 38B illustrate the advantage of the optimal pre-coding filter. The filter it is able to avoid sending energy towards spatial regions of poor channel CSI, e.g., moving regions.

Example Block Diagrams

Figure 39:
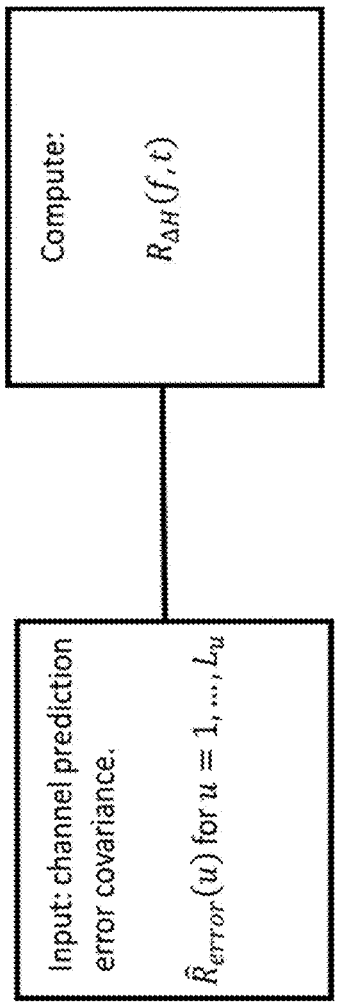
FIG. 39 is a block diagram showing an example process of error correlation computation.

Precoding is performed independently for each time frequency bin. The precoding can be separated into three steps:
[1] Computation of error correlation: the computation be performed infrequently (on the order of seconds). The computation is summarized in FIG. 39.

Figure 40:
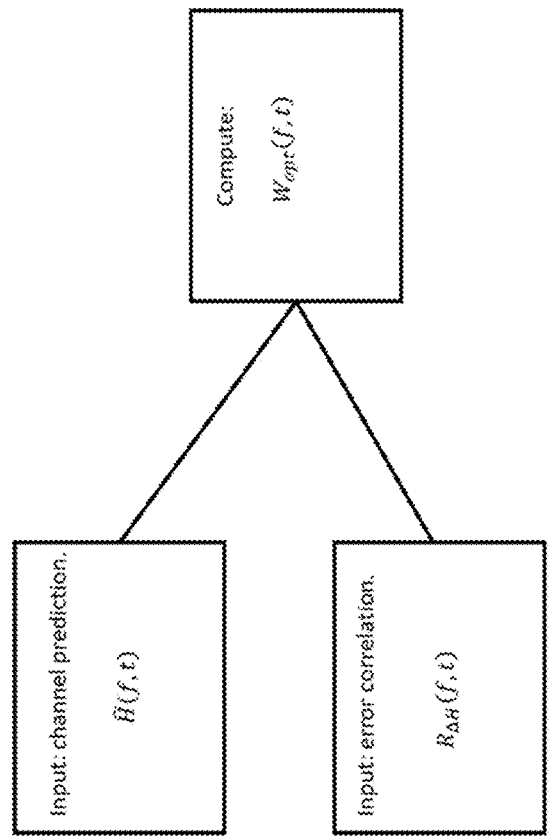
FIG. 40 is a block diagram showing an example process of precoding filter estimation.

[2] Computation of optimal precoding filter: may be performed every time pre-coding is performed. The computation is summarized in FIG. 40.

Figure 41:
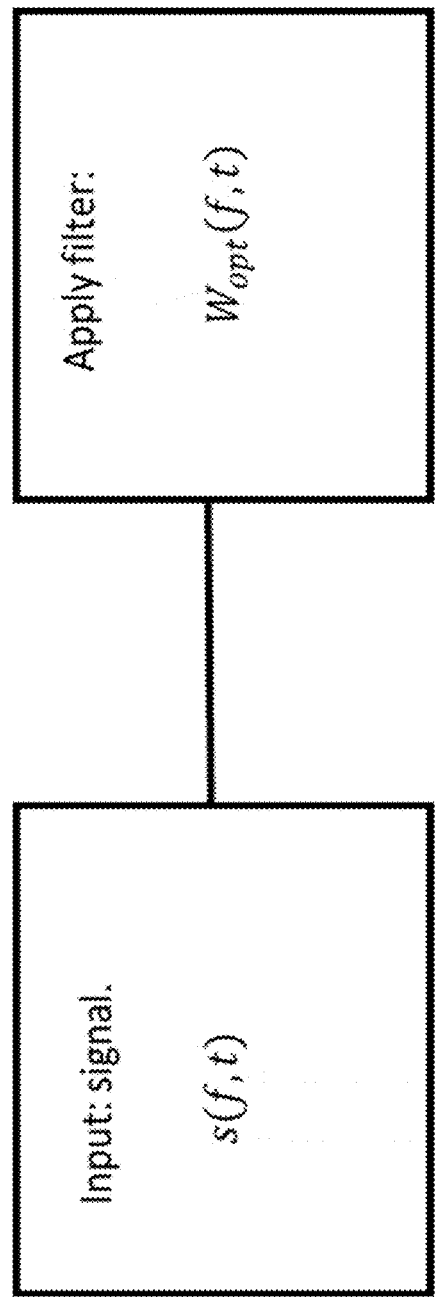
FIG. 41 is a block diagram showing an example process of applying an optimal precoding filter.

[3] Application of the optimal precoding filter: may be performed every time pre-coding is performed. The procedure is summarized in FIG. 41.

OTFS Vector Perturbation

Before introducing the concept of vector perturbation, we outline the application of the optimal pre-coding filter to OTFS.

OTFS Optimal Precoding

In OTFS, the data to be transmitted to the UEs are encoded using QAMs in the delay-Doppler domain. We denote this QAM signal by x, then:

$$x(\tau,\nu) \in A^{L_u}, \qquad (39)$$

for $\tau=1, \ldots, N_\tau$ and $\nu=1, \ldots, N_\nu$. A denotes the QAM constellation. Using the two-dimensional Fourier transform the signal can be represented in the time frequency domain. We denote this representation by X:

$$X(f,t) = (Fx)(f,t), \qquad (40)$$

for $f=1, \ldots, N_f$ and $t=1, \ldots, N_t$. F denotes the two-dimensional Fourier transform. The hub applies the optimal pre-coding filter to X and transmit the filter output over the air:

$$\lambda W_{opt}(f,t) X(f,t), \qquad (41)$$

for $f=1, \ldots, N_f$ and $t=1, \ldots, N_t$. $\lambda$ denotes the normalization constant. The UEs remove the normalization constant giving a soft estimate of X:

$$X_{soft}(f,t) = H(f,t)W_{opt}(f,t)X(f,t) + \frac{1}{\lambda}w(f,t), \qquad (42)$$

for $f=1, \ldots, N_f$ and $t=1, \ldots, N_t$. The term w(f,t) denotes white noise. We denote the error of the soft estimate by E:

$$E(f,t) = X_{soft}(f,t) - X(f,t), \qquad (43)$$

for $f=1, \ldots, N_f$ and $t=1, \ldots, N_t$. The expected error energy was derived earlier in this document:

$$\text{expected error energy} = \sum_{f=1}^{N_f} \sum_{t=1}^{N_t} \mathbb{E}\|X_{soft}(f,t) - X(f,t)\|^2 = \qquad (44)$$

$$\sum_{f=1}^{N_f} \sum_{t=1}^{N_t} X(f,t)^* M_{error}(f,t) X(f,t)$$

Where:

$$M_{error}(f,t) = \left(\hat{H}(f,t)W_{opt}(f,t) - I\right)^*\left(\hat{H}(f,t)W_{opt}(f,t) - I\right) + \qquad (45)$$

$$\ldots W_{opt}(f,t)^*\left(R_{\Delta H}(f,t) + \frac{N_0 L_u}{L_h}\right)W_{opt}(f,t)$$

We call the positive definite matrix $M_{error}(f,t)$ the error metric.

Vector Perturbation

In vector perturbation, the hub transmits a perturbed version of the QAM signal:

$$x(\tau,\nu) + p(\tau,\nu), \qquad (46)$$

for $\tau=1, \ldots, N_\tau$ and $\nu=1, \ldots, N_\nu$. Here, $p(\tau,\nu)$ denotes the perturbation signal. The perturbed QAMs can be represented in the time frequency domain:

$$X(f,t) + P(f,t) = (Fx)(f,t) + (Fp)(f,t), \qquad (47)$$

for $f=1, \ldots, N_f$ and $t=1, \ldots, N_t$. The hub applies the optimal pre-coding filter to the perturbed signal and transmits the result over the air. The UEs remove the normalization constant giving a soft estimate of the perturbed signal:

$$X(f,t) + P(f,t) + E(f,t), \qquad (48)$$

for $f=1, \ldots, N_f$ and $t=1, \ldots, N_t$. Where E denotes the error of the soft estimate. The expected energy of the error is given by:

$$\text{expected error energy} = \sum_{f=1}^{N_f} \sum_{t=1}^{N_t} (X(f,t) + P(f,t))^* M_{error}(f,t)(X(f,t) + P(f,t)) \qquad (49)$$

The UEs then apply an inverse two dimensional Fourier transform to convert the soft estimate to the delay Doppler domain:

$$x(\tau,\nu) + p(\tau,\nu) + e(\tau,\nu), \qquad (50)$$

for $\tau = \ldots, N_\tau$ and $\nu=1, \ldots, N_\nu$. The UEs then remove the perturbation $p(\tau,\nu)$ for each delay Doppler bin to recover the QAM signal x.

Collection of Vector Perturbation Signals

One question is: what collection of perturbation signals should be allowed? When making this decision, there are two conflicting criteria:

1) The collection of perturbation signals should be large so that the expected error energy can be greatly reduced.
2) The collection of perturbation signals should be small so the UE can easily remove them (reduced computational complexity):

$$x(\tau,\nu) + p(\tau,\nu) \to x(\tau,\nu) \qquad (51)$$

Coarse Lattice Perturbation

An effective family of perturbation signals in the delay-Doppler domain, which take values in a coarse lattice:

$$p(\tau,\nu) \in B^{L_u}, \qquad (52)$$

for $\tau=1, \ldots, N_\tau$ and $\nu=1, \ldots, N_\nu$. Here, B denotes the coarse lattice. Specifically, if the QAM symbols lie in the box: $[-r,r] \times [-r,r]$ we take as our perturbation lattice $B=2r\mathbb{Z}+2rj\mathbb{Z}$. We now illustrate coarse lattice perturbation with an example.

EXAMPLES

Figure 42:
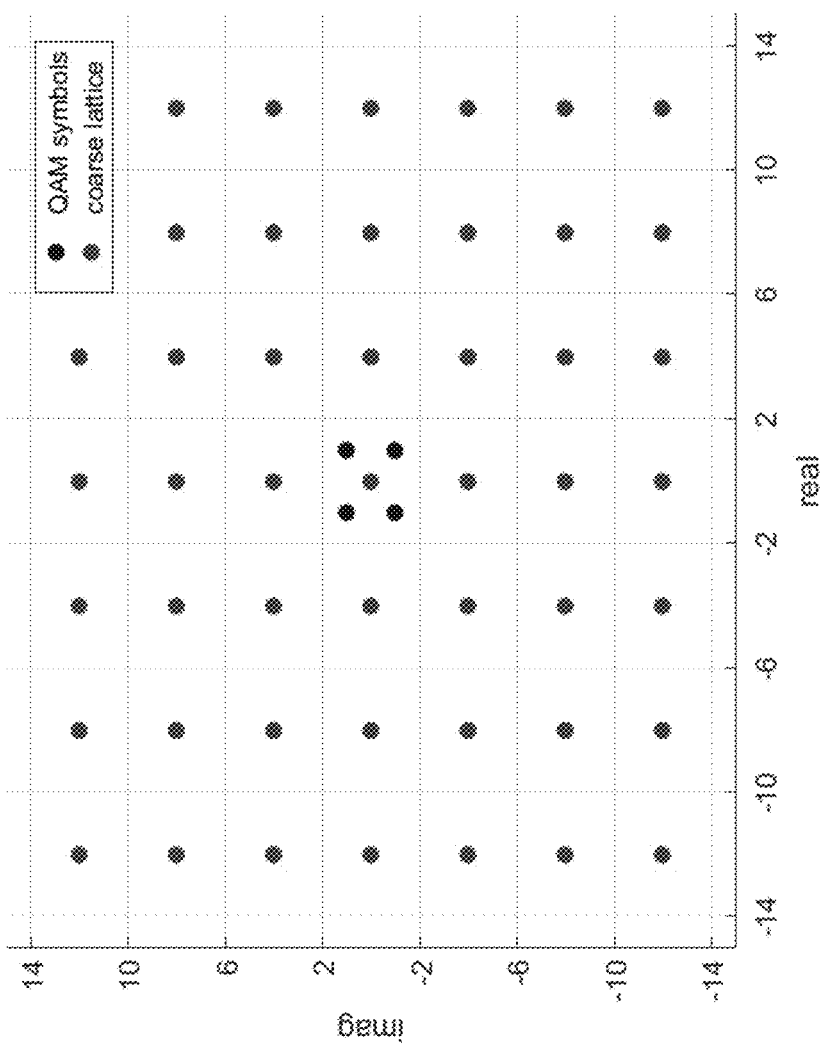
FIG. 42 is a graph showing an example of a lattice and QAM symbols.
Figure 43:
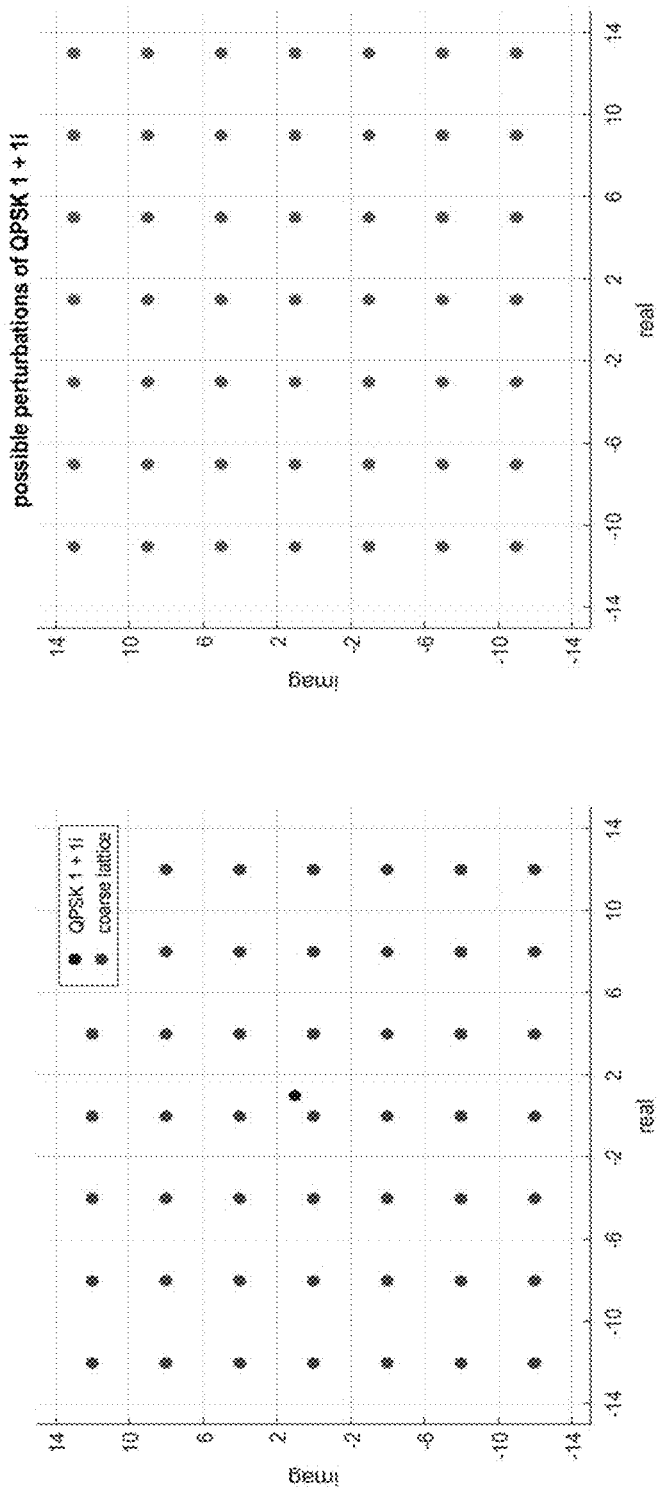
FIG. 43 graphically illustrates effects of perturbation examples.
Figure 44:
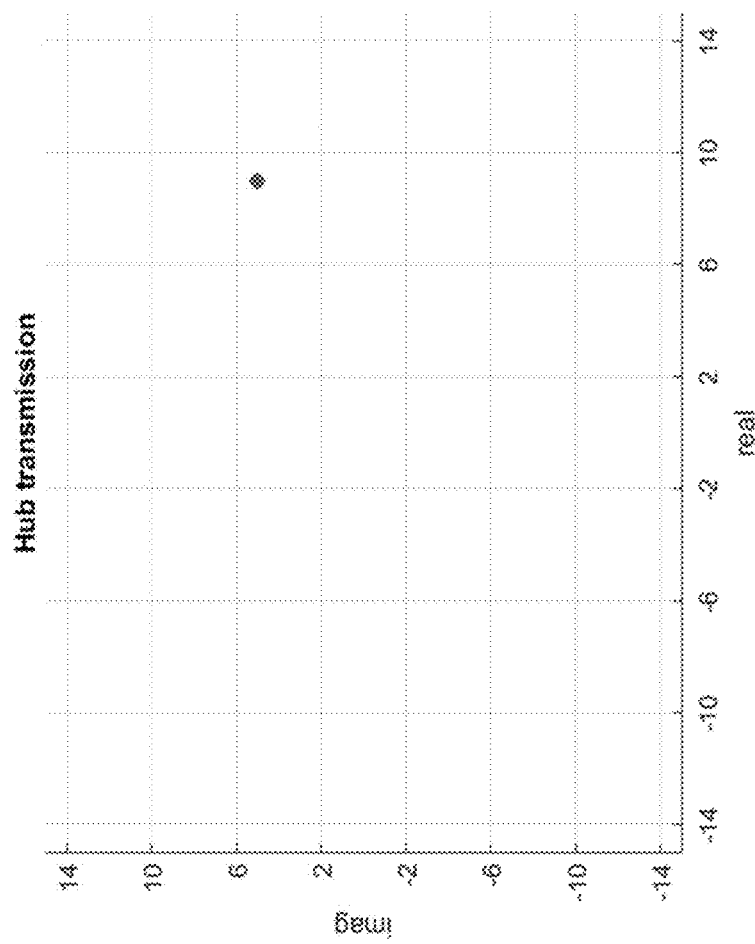
FIG. 44 is a graph illustrating an example of hub transmission.

Consider QPSK (or 4-QAM) symbols in the box $[-2,2] \times j[-2,2]$. The perturbation lattice is then $B=4\mathbb{Z}+4j\mathbb{Z}$. FIG. 42 illustrates the symbols and the lattice. Suppose the hub wants to transmit the QPSK symbol 1+1j to a UE. Then there is an infinite number of coarse perturbations of 1+1j that the hub can transmit. FIG. 43 illustrates an example. The hub selects one of the possible perturbations and transmits it over the air. FIG. 44 illustrates the chosen perturbed symbol, depicted with a single solid circle.

Figure 45:
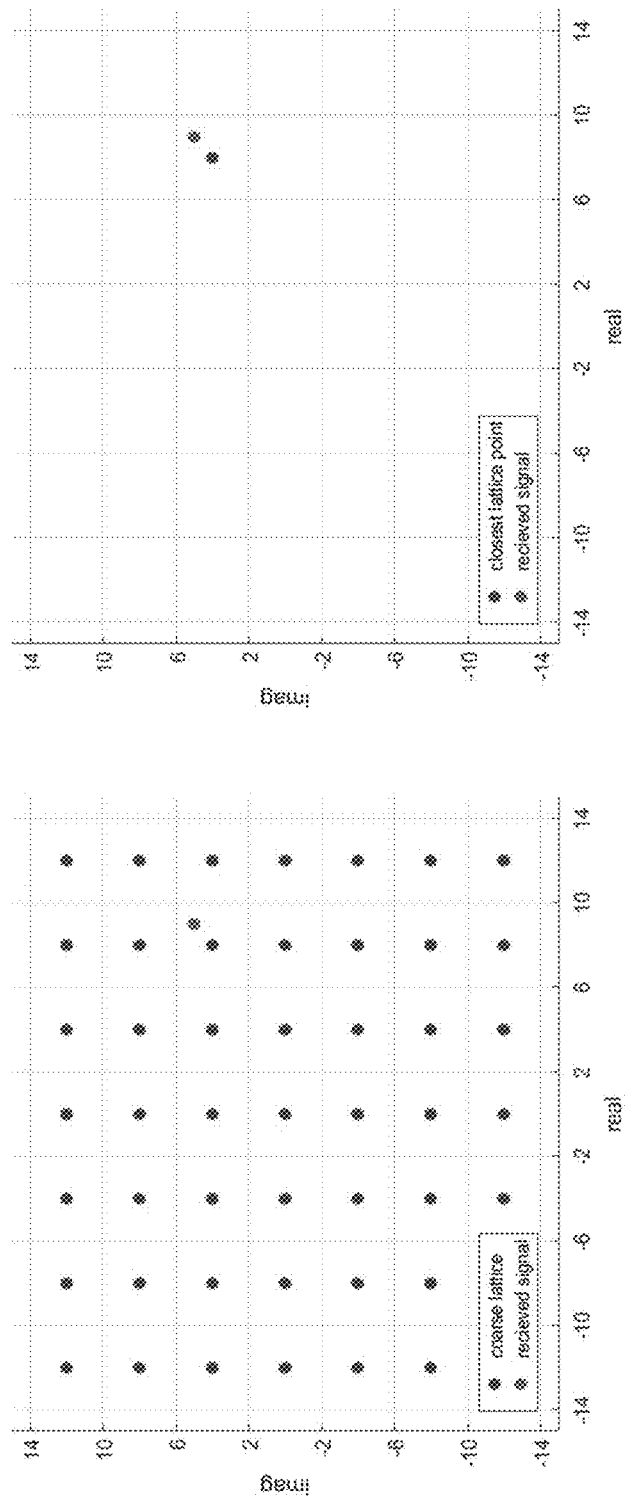
FIG. 45 is a graph showing an example of the process of a UE finding a closest coarse lattice point.

The UE receives the perturbed QPSK symbol. The UE then removes the perturbation to recover the QPSK symbol. To do this, the UE first searches for the coarse lattice point closest to the received signal. FIG. 45 illustrates this.

Figure 46:
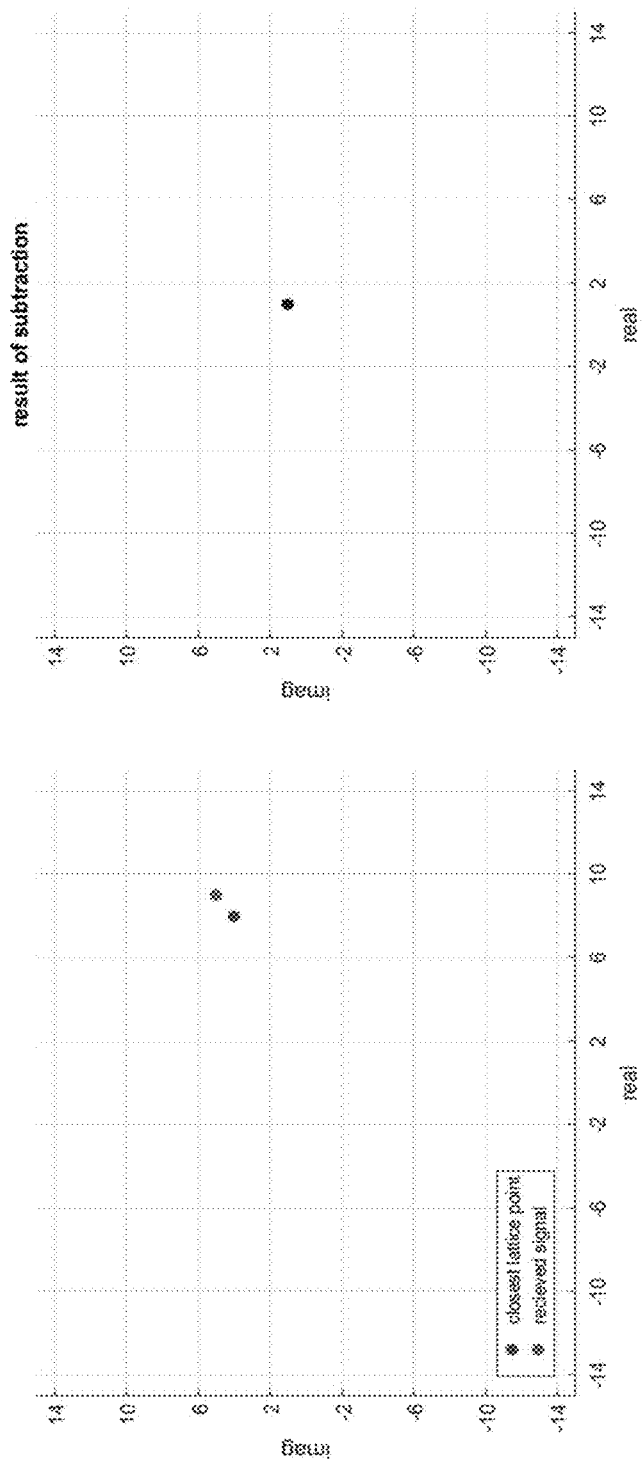
FIG. 46 is a graph showing an example process of UE recovering a QPSK symbol by subtraction.

The UE subtracts the closest lattice point from the received signal, thus recovering the QPSK symbol 1+1j. FIG. 46 illustrates this process.

Finding Optimal Coarse Lattice Perturbation Signal

The optimal coarse lattice perturbation signal, $p_{opt}$, is the one which minimizes the expected error energy:

$$p_{opt} = \operatorname{argmin}_p \sum_{f=1}^{N_f} \sum_{t=1}^{N_t} (X(f,t) + P(f,t))^* M_{error}(f,t)(X(f,t) + P(f,t)) \qquad (53)$$

The optimal coarse lattice perturbation signal can be computed using different methods. A computationally efficient method is a form of Thomlinson-Harashima precoding which involves applying a DFE filter at the hub.

Coarse Lattice Perturbation Example

We now present a simulation result illustrating the use of coarse lattice perturbation. The simulation scenerio was a hub antenna transmitting to a single UE antenna. Table 4 displays the modulation parameters. Table 5 display the channel parameters for this example.

TABLE 4

| Subcarrier spacing | 30 kHz |
|---|---|
| Number of subcarriers | 256 |
| OFDM symbols per frame | 32 |
| QAM order | Infinity (uniform in the unit box) |

TABLE 5

| Number of reflectors | 20 |
|---|---|
| Delay spread | 2 μs |
| Doppler spread | 1 KHz |
| Noise variance | −35 dB |

Figure 47:
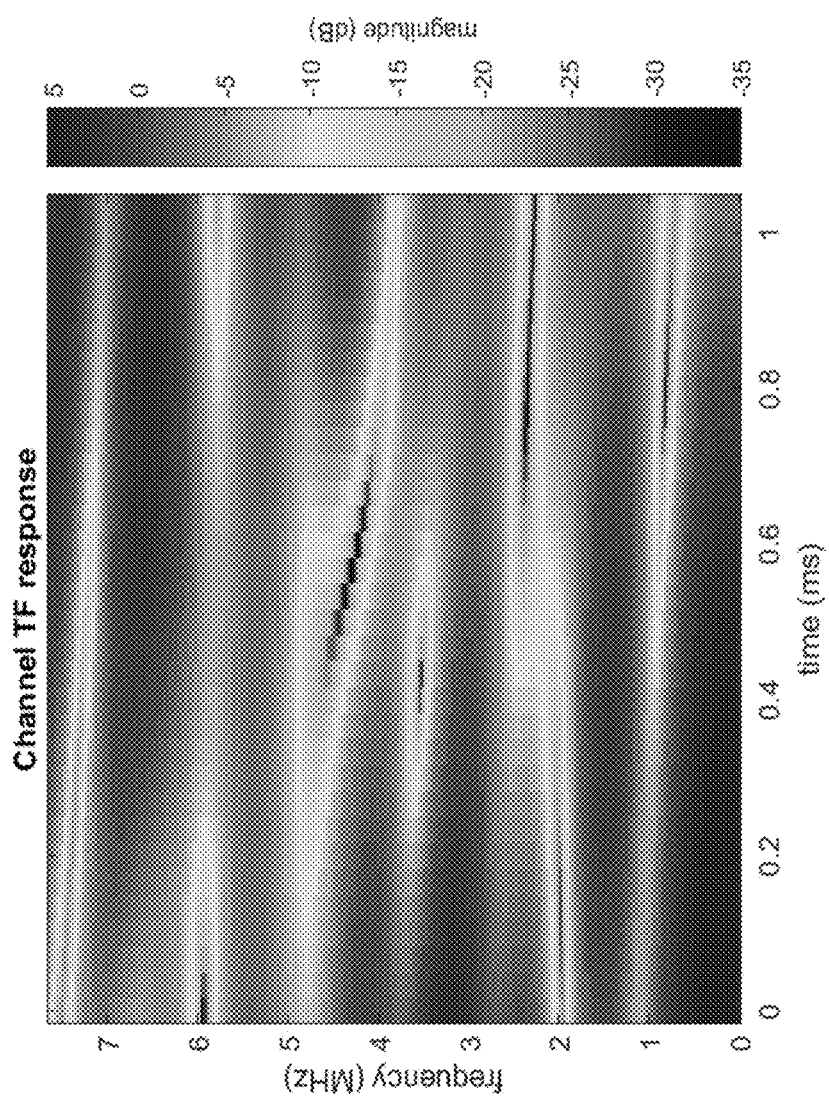
FIG. 47 depicts an example of a channel response.

FIG. 47 displays the channel energy in the time (horizontal axis) and frequency (vertical axis) domain.

Because this is a SISO (single input single output) channel, the error metric $M_{error}(f,t)$ is a positive scaler for each time frequency bin. The expected error energy is given by integrating the product of the error metric with the perturbed signal energy:

$$\text{expected error energy} = \sum_{f=1}^{N_f} \sum_{t=1}^{N_t} M_{error}(f,t) |X(f,t) + P(f,t)|^2 \quad (54)$$

Figure 48:
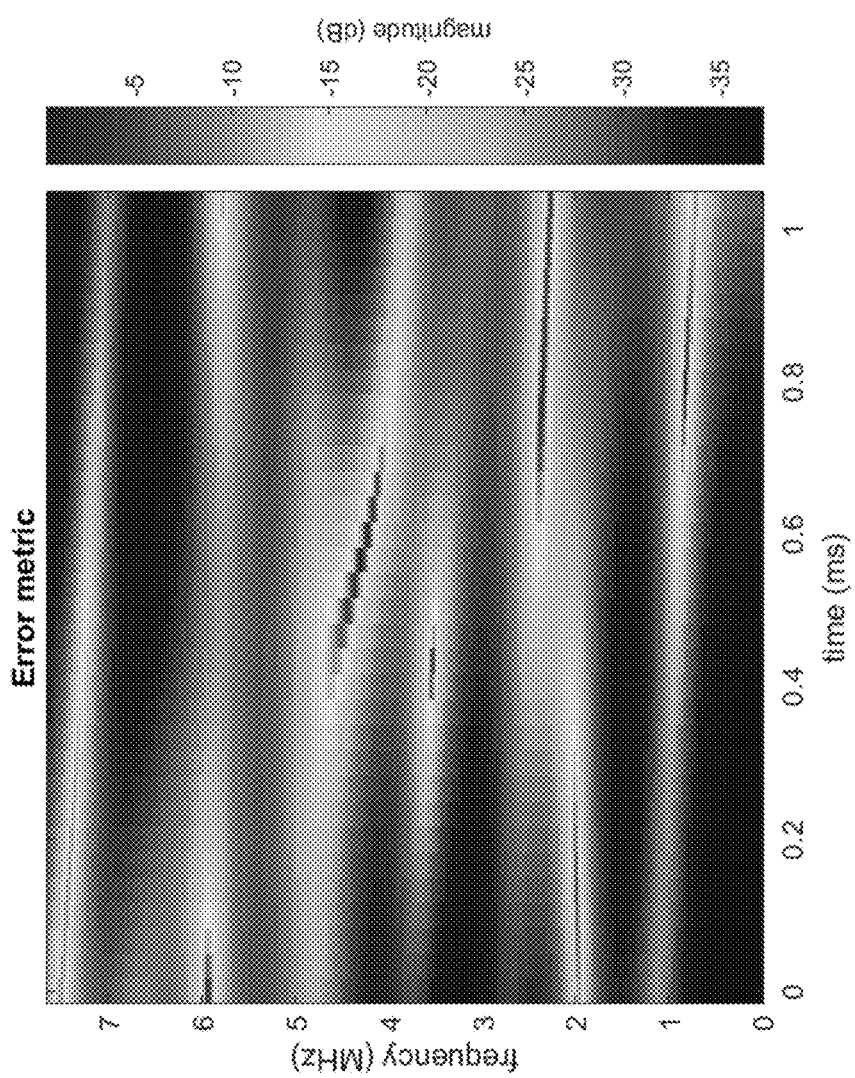
FIG. 48 depicts an example of an error of channel estimation.
Figure 49:
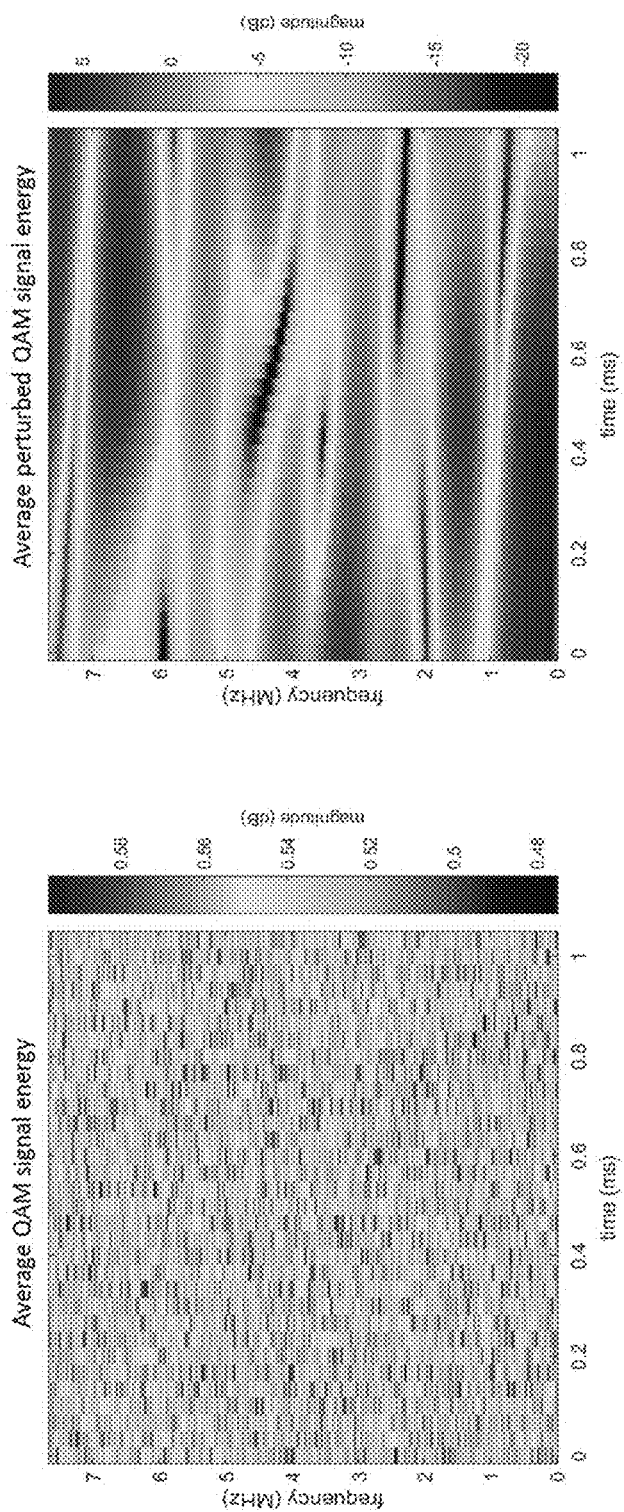
FIG. 49 shows a comparison of energy distribution of an example of QAM signals and an example of perturbed QAM signals.

FIG. 48 displays an example of the error metric. One hundred thousand random QAM signals were generated. For each QAM signal, the corresponding optimal perturbation signal was computed using Thomlinson-Harashima precoding. FIG. 49 compares the average energy of the QAM signals with the average energy of the perturbed QAM signals. The energy of QAM signals is white (evenly distributed) while the energy of the perturbed QAM signals is colored (strong in some time frequency regions and weak in others). The average error energy of the unperturbed QAM signal was −24.8 dB. The average error energy of the perturbed QAM signal was −30.3 dB. The improvement in error energy can be explained by comparing the energy distribution of the perturbed QAM signal with the error metric.

Figure 50:
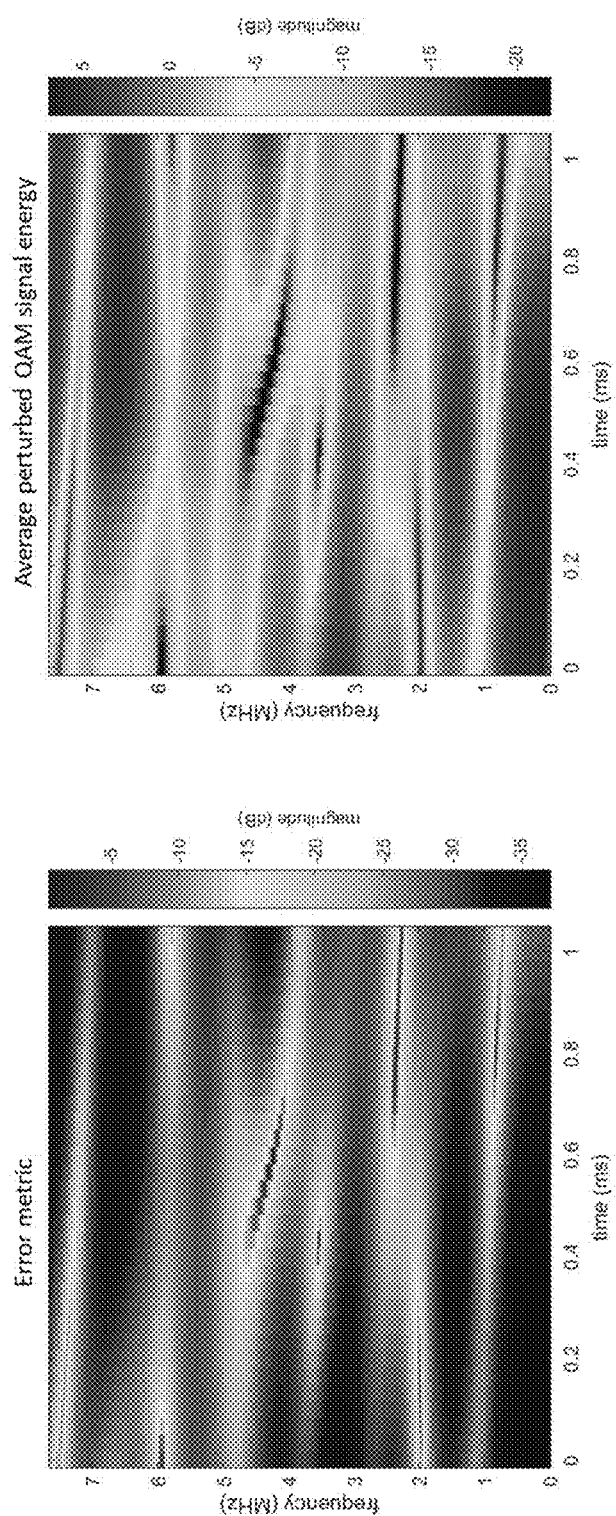
FIG. 50 is a graphical depiction of a comparison of an example error metric with an average perturbed QAM energy.

FIG. 50 shows a comparison of an example error metric with an average perturbed QAM energy. The perturbed QAM signal has high energy where the error metric is low, conversely it has low energy where the error metric is high.

The simulation illustrates the gain from using vector perturbation: shaping the energy of the signal to avoid time frequency regions where the error metric is high.

Block Diagrams

Vector perturbations may be performed in three steps. First, the hub perturbs the QAM signal. Next, the perturbed signal is transmitted over the air using the pre-coding filters. Finally, the UEs remove the perturbation to recover the data.

Figure 51:
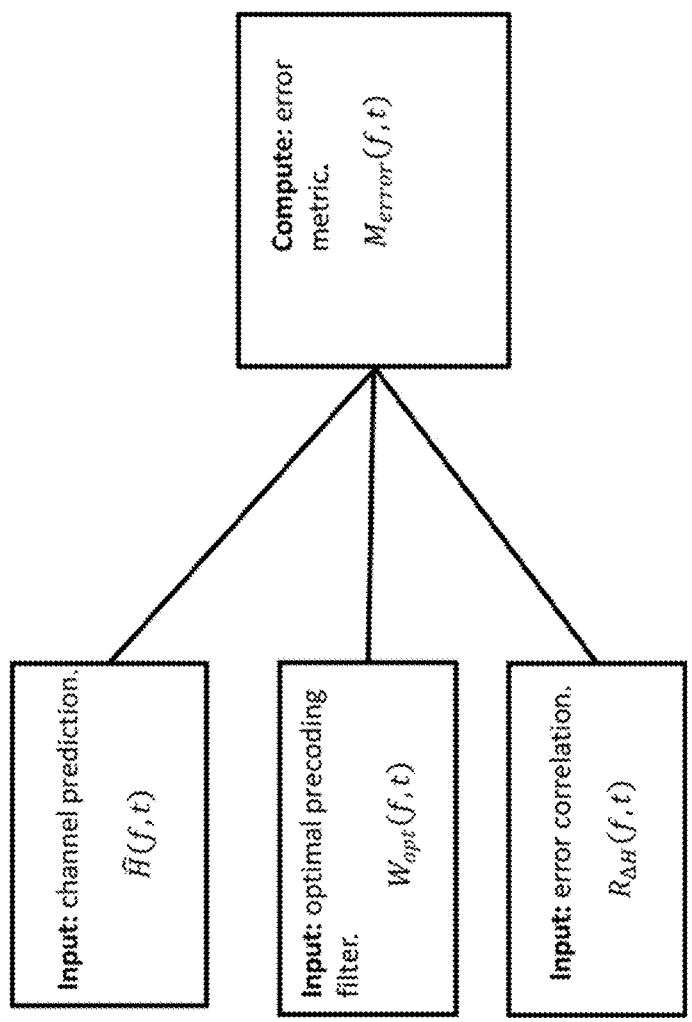
FIG. 51 is a block diagram illustrating an example process of computing an error metric.

Computation of error metric: the computation can be performed independently for each time frequency bin. The computation is summarized in FIG. 51. See also Eq. (45). As shown, the error metric is calculated using channel prediction estimate, the optimal coding filter and error correlation estimate.

Figure 52:
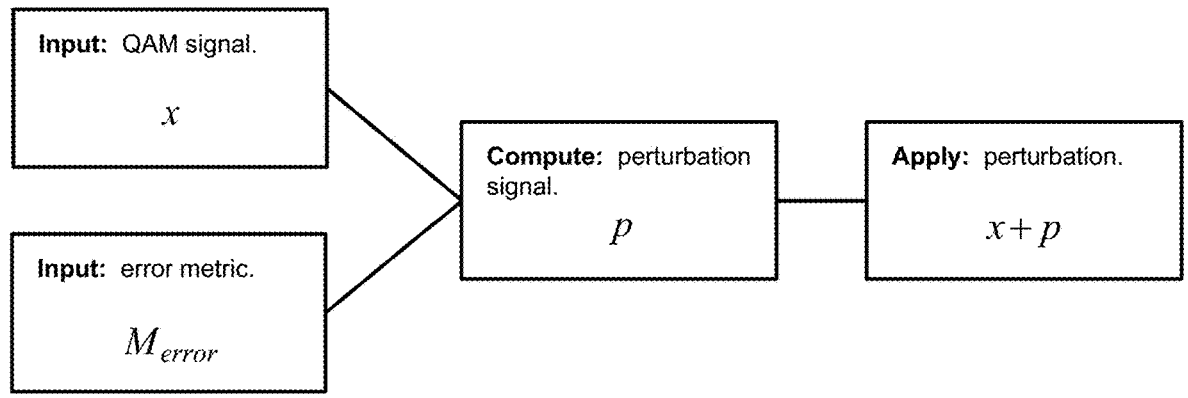
FIG. 52 is a block diagram illustrating an example process of computing perturbation.

Computation of perturbation: the perturbation is performed on the entire delay Doppler signal. The computation is summarized in FIG. 52. As shown, the QAM signal and the error metric are used to compute the perturbation signal. The calculated perturbation signal is additively applied to the QAM input signal.

Figure 53:
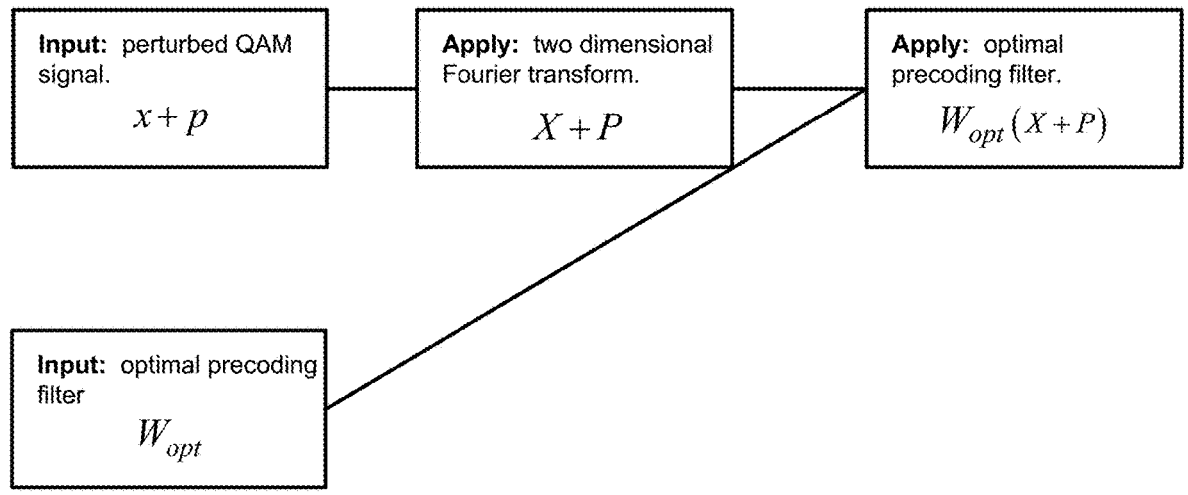
FIG. 53 is a block diagram illustrating an example of application of a precoding filter.

Application of the optimal precoding filter: the computation can be performed independently for each time frequency bin. The computation is summarized in FIG. 53. The perturbed QAM signal is processed through a two dimensional Fourier transform to generate a 2D transformed perturbed signal. The optimal precoding filter is applied to the 2D transformed perturbed signal.

Figure 54:
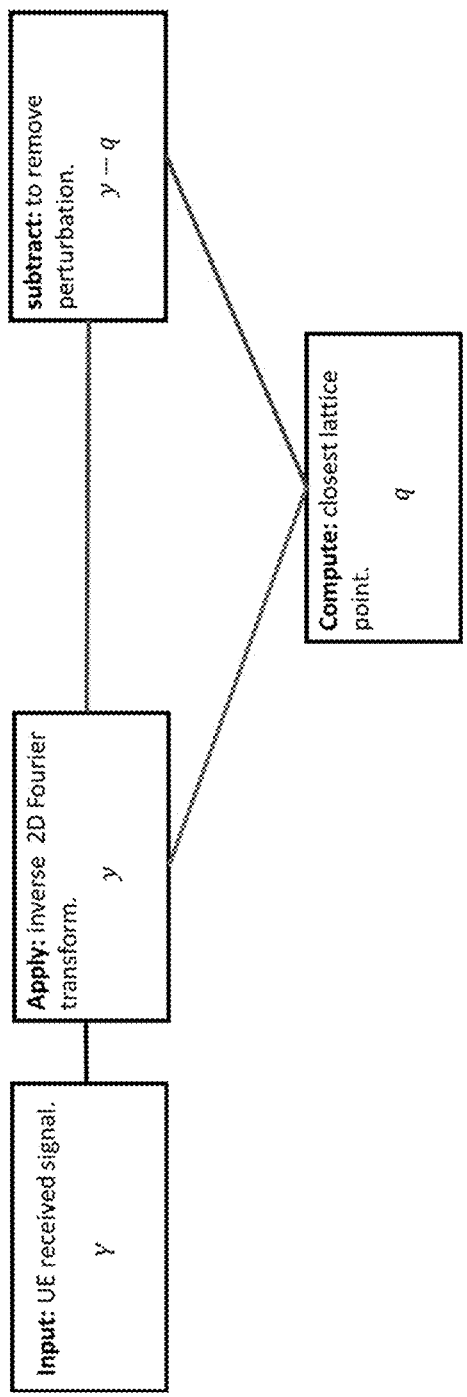
FIG. 54 is a block diagram illustrating an example process of UE removing the perturbation.

UEs removes perturbation: the computation can be FIG. 54. At UE, the input signal received is transformed through an inverse 2D Fourier transform. The closest lattice point for the resulting transformed signal is determined and then removed from the 2D transformed perturbed signal.

Spatial Tomlinson Harashima Precoding

This section provides additional details of achieving spatial precoding and the beneficial aspects of using Tomlinson Harashima precoding algorithm in implementing spatial precoding in the delay Doppler domain. The embodiments consider a flat channel (with no frequency or time selectivity).

Review of Linear Precoding

In precoding, the hub wants to transmit a vector of QAMs to the UEs. We denote this vector by $x \in \mathbb{C}^{L_u}$. The hub has access to the following information:

An estimate of the downlink channel, denoted by: $\hat{H} \in \mathbb{C}^{L_u \times L_h}$.

The matrix covariance of the channel estimation error, denoted by: $R_{\Delta H} \in \mathbb{C}^{L_h \times L_h}$.

From this information, the hub computes the "optimal" precoding filter, which minimizes the expected error energy experienced by the UEs:

$$W_{opt} = \left(\hat{H}^* \hat{H} + R_{\Delta H} + \frac{N_0 L_u}{L_h} I\right)^{-1} \hat{H}^*$$

By applying the precoding filter to the QAM vector the hub constructs a signal to transmit over the air: $\lambda W_{opt} x \in \mathbb{C}^{L_h}$, where $\lambda$ is a constant used to enforce the transmit energy constraints. The signal passes through the downlink channel and is received by the UEs:

$$\lambda H W_{opt} x + w,$$

Where $w \in \mathbb{C}^{L_u}$ denotes AWGN noise. The UEs remove the normalization constant giving a soft estimate of the QAM signal:

$$x + e,$$

where $e \in \mathbb{C}^{L_u}$ denotes the estimate error. The expected error energy can be computed using the error metric:

$$\text{expected error energy} = x^* M_{error} x$$

where $M_{error}$ is a positive definite matrix computed by:

$$M_{error} = \left(\hat{H} W_{opt} - I\right)^* \left(\hat{H} W_{opt} - I\right) + W_{opt}^* \left(R_{\Delta H} + \frac{N_0 L_u}{L_h}\right) W_{opt}$$

Review of Vector Perturbation

The expected error energy can be greatly reduced by perturbing the QAM signal by a vector $v \in \mathbb{C}^{L_u}$. The hub now transmits $\lambda W_{opt}(x+v) \in \mathbb{C}^{L_h}$. After removing the normalization constant, the UEs have a soft estimate of the perturbed QAM signal:

$$x+v+e$$

Again, the expected error energy can be computed using the error metric:

$$\text{expected error energy} = (x+v)^* M_{error}(x+v)$$

The optimal perturbation vector minimizes the expected error energy:

$$v_{opt} = \text{argmin}_v (x+V)^* M_{error}(x+v).$$

Computing the optimal perturbation vector is in general NP-hard, therefore, in practice an approximation of the optimal perturbation is computed instead. For the remainder of the document we assume the following signal and perturbation structure:

The QAMs lie in the box $[-1,1] \times j[-1,1]$.
The perturbation vectors lie on the coarse lattice: $(2\mathbb{Z}+2j\mathbb{Z})^{L_u}$.

Spatial Tomlinson Harashima Precoding

In spatial THP a filter is used to compute a "good" perturbation vector. To this end, we make use of the Cholesky decomposition of the positive definite matrix $M_{error}$:

$$M_{error} = U^* D U,$$

where D is a diagonal matrix with positive entries and U is unit upper triangular. Using this decomposition, the expected error energy can be expressed as:

$$\text{expected error energy} = (U(x+v))^* D(U(x+v)) = z^* Dz = \sum_{n=1}^{L_u} D(n,n)|z(n)|^2,$$

where $z = U(x+v)$. We note that minimizing the expected error energy is equivalent to minimizing the energy of the z entries, where:

$$z(L_u) = x(L_u) + v(L_u),$$

$$z(n) = x(n) + v(n) + \sum_{m=n+1}^{L_u} U(n,m)(x(m) + v(m)),$$

for $n = 1, 2, \ldots, L_u - 1$. Spatial THP iteratively choses a perturbation vector in the following way.

$$v(L_u) = 0$$

Figure 55:
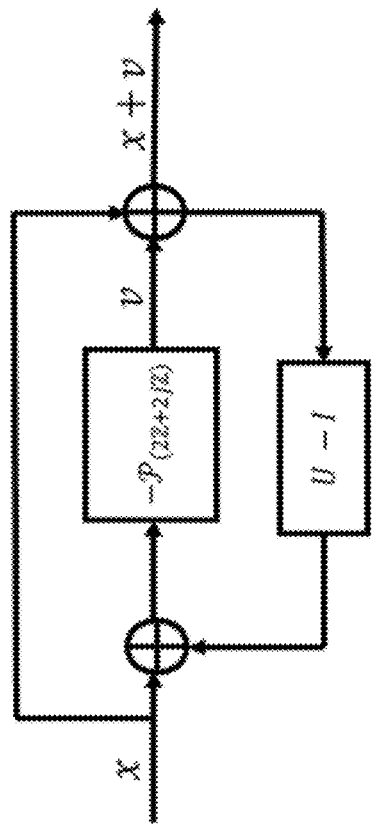
FIG. 55 is a block diagram illustrating an example spatial Tomlinson Harashima precoder (THP).

Suppose $v(n+1), v(n+2), \ldots, v(L_u)$ have been chosen, then:

$$v(n) = -\mathcal{P}_{(2\mathbb{Z}+2j\mathbb{Z})}\left(x(n) + \sum_{m=n+1}^{L_u} U(n,m)(x(m) + v(m))\right)$$

where $\mathcal{P}(2\mathbb{Z}+2j\mathbb{Z})$ denotes projection onto the coarse lattice. We note that by construction the coarse perturbation vector bounds the energy of the entries of z by two. FIG. 55 displays a block diagram of spatial THP.

Simulation Results

We now present the results of a simple simulation to illustrate the use of spatial THP. Table 6 summarizes the simulation setup.

TABLE 6

| Simulation setup | |
| --- | --- |
| Number of hub antennas | 2 |
| Number of UEs | 2 (one antenna each) |
| Channel condition number | 10 dB |
| Modulation | PAM infinity (data uniformly disturbed on the interval [−1, 1]) |
| Data noise variance | −35 dB |
| Channel noise variance | −35 dB |

Figure 56:
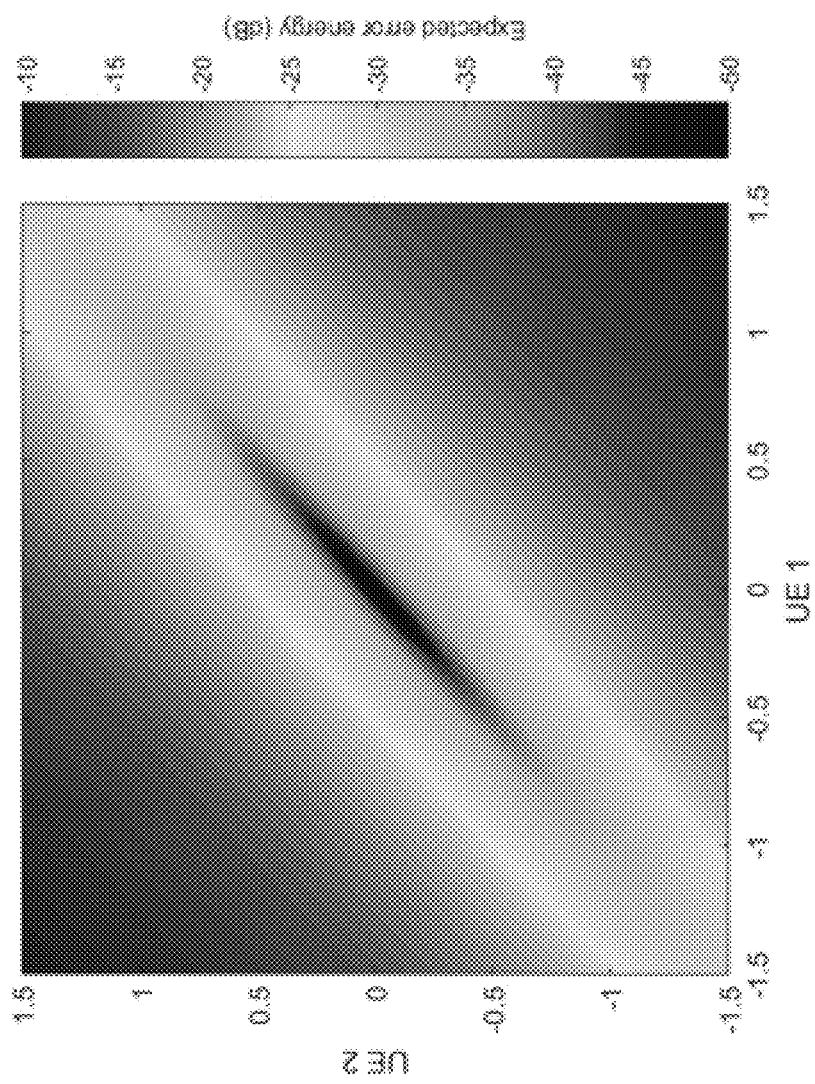
FIG. 56 is a spectral chart of expected energy error for different PAM vectors.

FIG. 56 displays the expected error energy for different PAM vectors. We note two aspects of the figure.

The error energy is low when the signal transmitted to UE1 and UE2 are similar. Conversely, the error energy is high when the signals transmitted to the UEs are dissimilar. We can expect this pattern to appear when two UEs are spatially close together; in these situations, it is advantageous to transmit the same message to both UEs.

The error energy has the shape of an ellipses. The axes of the ellipse are defined by the eigenvectors of $M_{error}$.

A large number data of PAM vectors was generated and spatial THP was applied. FIG. 57 shows the result. Note that the perturbed PAM vectors are clustered along the axis with low expected error energy.

THP Enhancements

The problem of finding the optimal perturbation vector at the transmitter is analogous to the MIMO QAM detection problem at the receiver. Furthermore, transmitter THP is analogous to receiver successive interference cancellation (SIC). The same improvements used for SIC can be used for THP, for example:

V-Blast, can be used to first choose a better ordering of streams before applying THP.

K-best and sphere detection can be used to search more perturbation vectors.

Lattice reduction can be used as a pre-processing step to THP, improving the condition number of the Cholesky factors.

All these techniques are well known to wireless engineers. We will only go into more depth with lattice reduction as it gives the best performance for polynomial complexity.

Lattice Reduction Enhancement

The performance of THP depends strongly on the size of the diagonal Cholesky factor of $M_{error}$:

$$\text{expected error energy} = \sum_{n=1}^{L_u} D(n,n)|z(n)|^2 \leq 2 \sum_{n=1}^{L_u} D(n,n)$$

Lattice reduction is a pre-processing step to THP which improves performance by relating the old Cholesky factorization $U^* DU$ to a new Cholesky factorization $U^*_{LR} D_{LR} U_{LR}$, with:

$$\sum_{n=1}^{L_u} D_{LR}(n,n) \leq \sum_{n=1}^{L_u} D(n,n)$$

$$D^{\frac{1}{2}} U = A D_{LR}^{\frac{1}{2}} U_{LR} T$$

where $A \in \mathbb{C}^{L_u \times L_u}$ is a unitary matrix (i.e $AA^* = A^* A = I$), and $T \in (\mathbb{Z} + j\mathbb{Z})^{L_u \times L_u}$ is unimodular (i.e. complex integer entries with determinat 1 or −1). We note that if $M_{error}$ is ill-conditioned, then the diagonal of the lattice reduced Cholesky factor is typically much smaller then the original. To use the improved Cholesky factorization for THP we need to make use of two important properties of unimodular matrices:

If T is unimodular, then $T^{-1}$ is also unimodular.
If $v \in (\mathbb{Z}+j\mathbb{Z})^{L_u}$, then $Tv \in (\mathbb{Z}+j\mathbb{Z})^{L_u}$.

We now return to the perturbation problem, where we are trying to find a coarse perturbation vector $v - (2\mathbb{Z}+2j\mathbb{Z})^{L_u}$ which minimizes the expected error energy:

$$\min_v (x+v)*U*DU(x+v) = \min_v (x+v)*\left(D^{\frac{1}{2}}U\right)*\left(D^{\frac{1}{2}}U\right)(x+v)$$

$$= \min_v (x+v)*\left(AD_{LR}^{\frac{1}{2}}U_{LR}T\right)*AD_{LR}^{\frac{1}{2}}U_{LR}T(x+v)$$

$$= \min_v (Tx+Tv)*U_{LR}^*D_{LR}U_{LR}(Tx+Tv)$$

$$= \min_{\tilde{v}} (Tx+\tilde{v})*U_{LR}^*D_{LR}U_{LR}(Tx+\tilde{v})$$

where the last equality follows from the fact that applying unimodular matrices to coarse perturbation vectors returns coarse perturbation vectors. THP can now be used to find a coarse perturbation vector $\tilde{v}$ which makes $(Tx+\tilde{v})U^*_{LR}D_{LR}U_{LR}(Tx+\tilde{v})$ small. Applying $T^{-1}$ to $\tilde{v}$ returns a coarse perturbation vector $v$ which makes $(x+v)*U*DU(x+v)$ small. We now summarize the steps:

1. Compute a lattice reduced Cholesky factorization $U^*_{LR}D_{LR}U_{LR}$. (The most popular algorithm for this is Lenstra-Lenstra-Lovász basis reduction). The algorithm will return the reduced Cholesky factorization and the unimodular matrix T.
2. Use THP to find a coarse perturbation vector $\tilde{v}$ which makes the equation (1.) small:

$$(Tx+\tilde{v})*U^*_{LR}D_{LR}U_{LR}(Tx+\tilde{v}) \qquad (1.)$$

3. Return $T^{-1}\tilde{v}$.

OTFS Tomlinson Harashima Precoding Filters

This section details of techniques of efficiently computing coarse OTFS perturbation using a THP filter in the OTFS domain.

Review of OTFS Perturbation

The goal of OTFS perturbation is to find a coarse perturbation signal which makes the expected error energy small, where:

expected error energy =

$$\sum_{f=0}^{N_f-1} \sum_{t=0}^{N_t-1} (X(f,t) + P(f,t))^* M_{error}(f,t)(X(f,t) + P(f,t))$$

Figure 58:
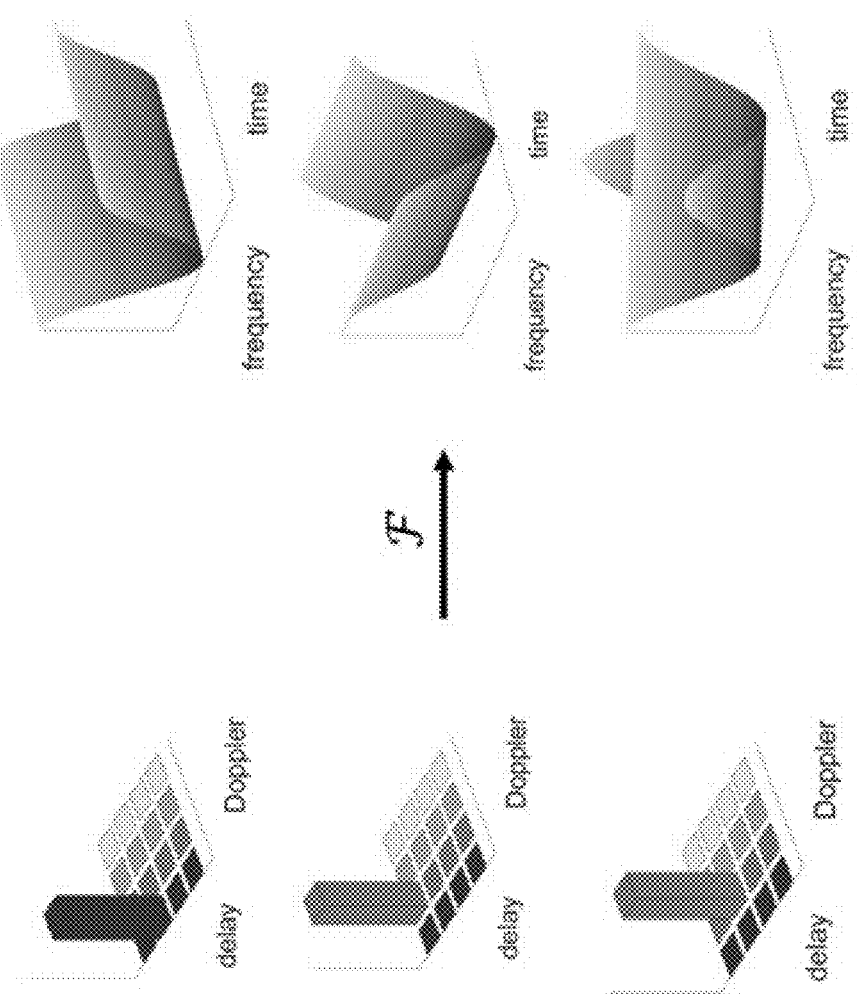
FIG. 58 shows examples of local signals in delay-Doppler domain being non-local in time-frequency domain

Recall that $X = \mathcal{F}_{TF}x$ and $P = \mathcal{F}_{FP}p$, where $\mathcal{F}_{TF}$ denotes the two-dimensional Fourier transform, x is the QAM signal, and p is the perturbation signal. The presence of the Fourier transform means that perturbing a single QAM in the delay-Doppler domain affects the signal over the entire time-frequency domain (illustrated in FIG. 58).

The time-frequency (TF) non-locality of OTFS perturbations carries advantages and disadvantages.

Advantage: OTFS perturbations can shape the TF spectrum of the signal to avoid TF channel fades.

Disadvantage: the OTFS perturbations are typically computed jointly, this contrasts with OFDM which can compute independent perturbations for each TF bin.

When OTFS perturbations are computed jointly, this means that brute force methods may not work efficiently. For example, consider the system parameters summarized in Table 7.

TABLE 7

| Typical system parameters | |
| --- | --- |
| $N_f$ | 600 |
| $N_t$ | 14 |
| $L_u$ | 4 |

For such a system the space of coarse perturbation signals, $(2\mathbb{Z}+2j\mathbb{Z})^{L_u N_f N_t}$, is 3.36e4 dimensional.

OTFS THP Filters

To manage the complexity of OTFS perturbations it may be recalled that the channel is localized in the delay-Doppler domain. Utilizing this fact, a near optimal coarse perturbation can be computed using a two-dimensional filter whose length is roughly equal to the delay and Doppler span of the channel. We call this class of filters OTFS THP filters. These filters can get quite sophisticated, so the document will develop them in stages: starting with simple cases and ending in full generality.

1) SISO single carrier (this is equivalent to OTFS with $N_t=1$)
2) SISO OTFS
3) MIMO single carrier
4) MIMO OTFS SISO Single Carrier In this section, we disclose a SISO single carrier THP filter. Towards this end we express the expected error energy in the delay domain (the domain where QAMs and perturbations are defined):

expected error energy =
$$\sum_{f=0}^{N_f-1}(X(f)+P(f))^*M_{error}(f)(X(f)+P(f)) =$$

$$\sum_{\tau=0}^{N_\tau-1}(x(\tau)+p(\tau))^*\sum_{\tau'=0}^{N_\tau-1}m_{error}(\tau-\tau')(x(\tau')+p(\tau'))$$

The QAM signal x and the perturbation signal p can be represented as vectors in $\mathbb{C}^{N_\tau}$ which we denote by x, p respectively. Likewise, convolution by $m_{error}$ can be represented as multiplication by a positive definite circulant matrix in $\mathbb{C}^{N_\tau \times N_\tau}$ which we denote by $m_{error}$. Using these representations, we can write the expected error energy as:

expected error energy=$(x+p)*m_{error}(x+p)$

Figure 59:
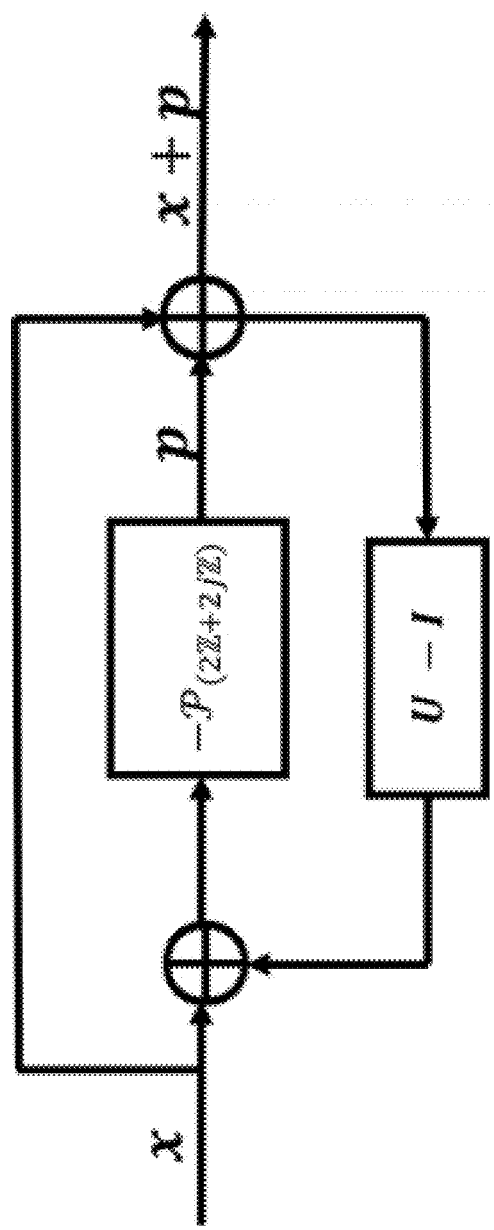
FIG. 59 is a block diagram illustrating an example of the computation of coarse perturbation using Cholesky factor.

Similar to the spatial case, a good coarse perturbation vector can be computed (FIG. 59) by utilizing the Cholesky factors of $m_{error}$:

$m_{error} = UDU*$

Although the method computes good perturbations, there are two main challenges: it requires a very large Cholesky factorization and the application of U–I can be very expensive. To resolve these issues, we will utilize $U^{-1}$ which has much better structure:

$U^{-1}$ is bandlimited, with bandwidth approximately equal to the channel delay span.
Apart from its edges, $U^{-1}$ is nearly Toeplitz.

These facts enable the computation of good perturbations using a short filter which we call the SISO single carrier THP filter and denote by $W_{THP}$. Before showing how to compute coarse perturbations with $U^{-1}$ and $W_{THP}$, we illustrate the structure of $U^{-1}$ with a small simulation (parameters in Table 8).

TABLE 8

| | |
|---|---|
| Sample rate | 10 MHz |
| Number of samples | 512 |
| Delay span | 3 us |
| Shaping filter | Root raised cosine, roll-off 12% |
| Data noise variance | −35 dB |
| Channel noise variance | −35 dB |

Figure 60:
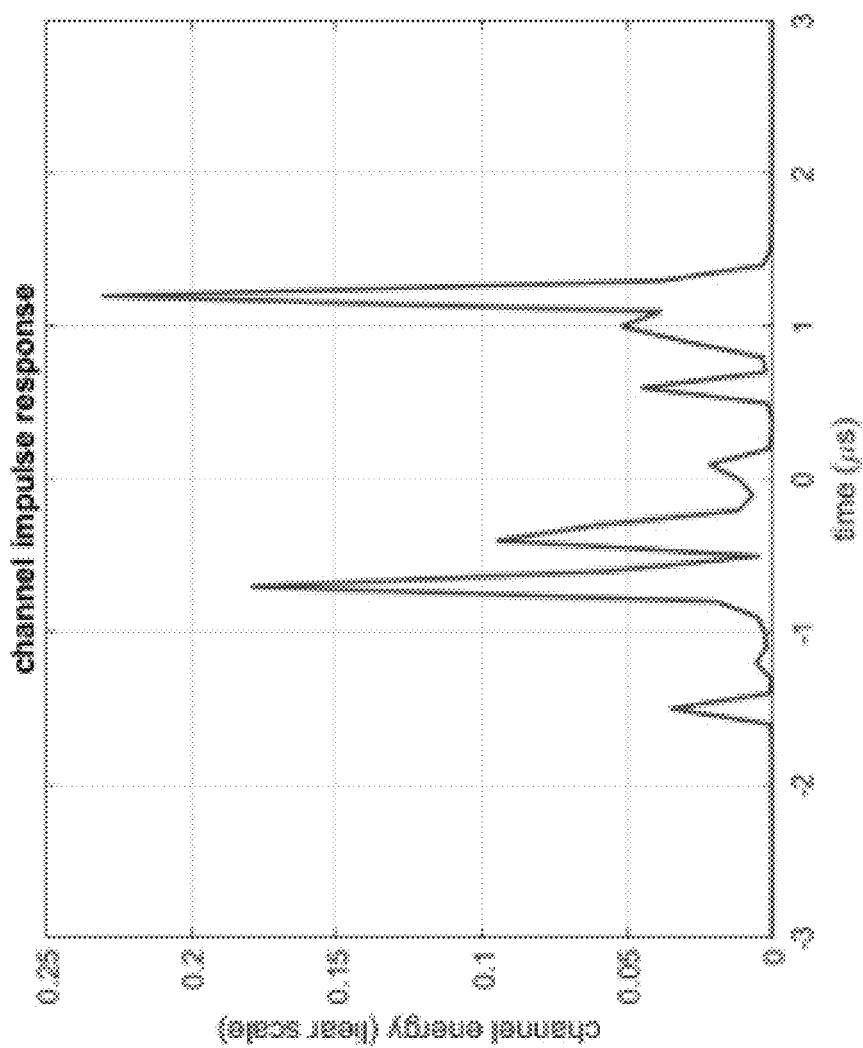
FIG. 60 shows an exemplary estimate of the channel impulse response for the SISO single carrier case.
Figure 61:
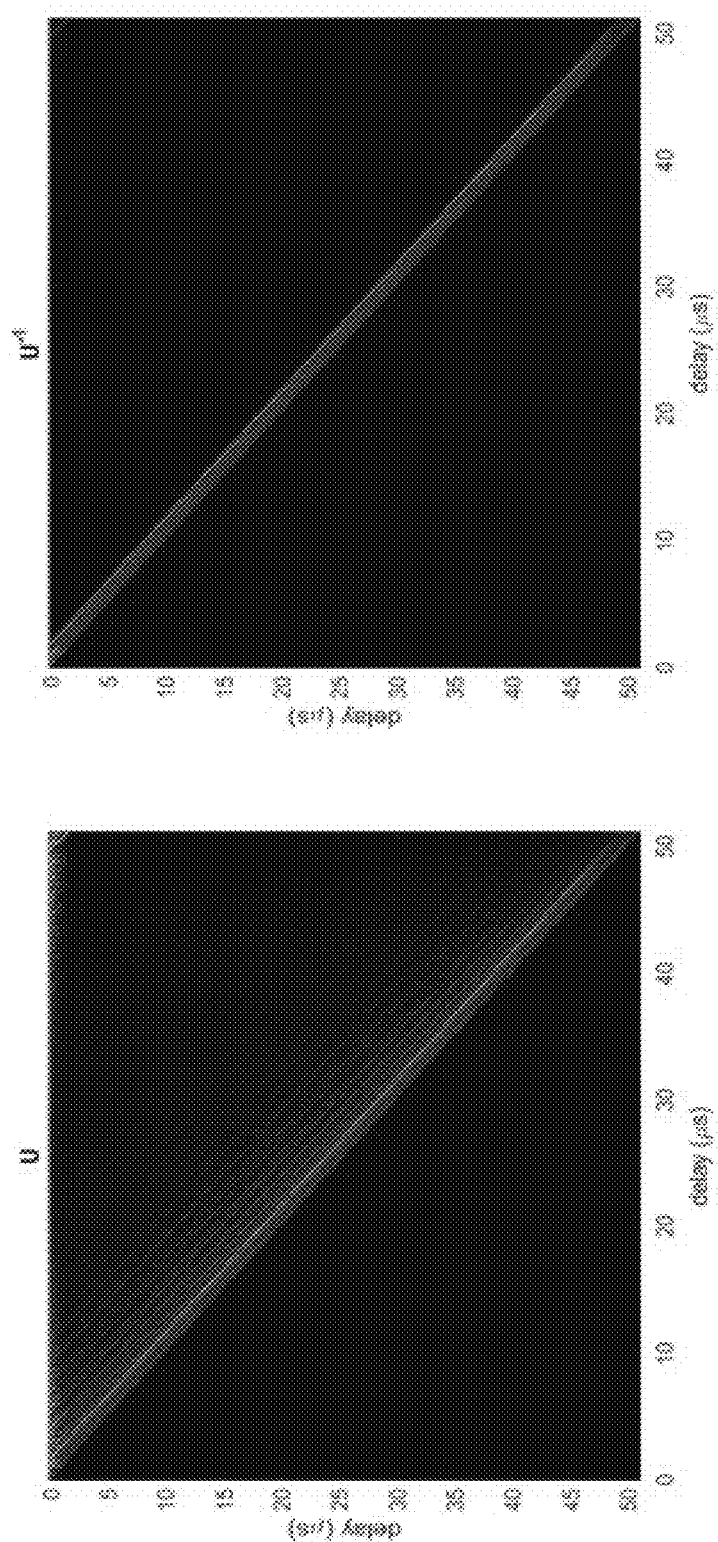
FIG. 61 shows spectral plots of an example of the comparison of Cholesky factor and its inverse.

FIG. 60 displays an estimate of the channel impulse response. Using this estimate, the error metric in the delay domain, $m_{error}$, was computed. FIG. 61 compares the structure of the resulting Cholesky factor and its inverse.

To visualize the near Toeplitz structure of $U^{-1}$ we overlay plots of columns slices (FIG. 45):

$s_n(m) = U^{-1}(n-m, n)$ for m=0, 1, . . . , 40 and n=40, . . . , ($N_\tau$−40). We note that if a matrix is Toeplitz then the slices will be identical.

Figure 62:
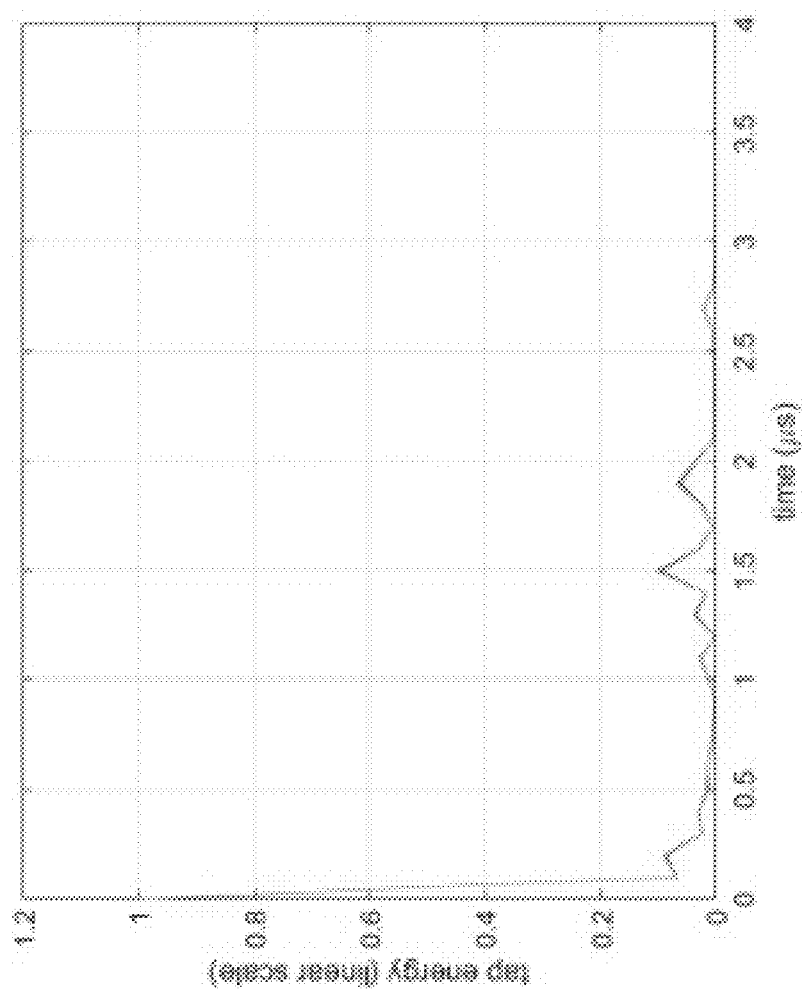
FIG. 62 shows an example of an overlay of $U^{-1}$ column slices.

FIG. 62 shows the bandwidth of $U^{-1}$ is approximately equal to the channel span, and that outside of edges the matrix is very near Toeplitz.

Computing Good Perturbations with $U^{-1}$

In this subsection, we disclose how to compute good perturbations using $U^{-1}$. Towards this end we express the expected error energy in terms of the Cholesky factors:

$$\text{expected error energy} = (x+p) * m_{error}(x+p)$$
$$= (U(x+p)) * D(U(x+p))$$
$$= z * Dz$$
$$= \sum_{\tau=0}^{N_\tau-1} D(\tau)|z(\tau)|^2$$

where $z = U(x+p)$ and $D(\tau) = D(\tau, \tau)$. Therefore, minimizing the expected error energy is equivalent to minimizing the energy of the entries of z, which can be expressed recursively:

$$z(\tau) = x(\tau) + p(\tau) - \sum_{\tau'=\tau+1}^{N_\tau-1} U^{-1}(\tau, \tau')z(\tau')$$

for τ=0, 1, . . . , $N_\tau$−1. Using this expression, a good perturbation vector can be computed iteratively in the following way:

1. Initialization set $p(N_\tau−1)=0$ and $z(N_\tau−1)=x(N_\tau−1)$.
2. Update suppose we have selected p(τ') and z(τ') for τ'=(τ+1), . . . , $N_\tau$−1, then:

$$r(\tau) = x(\tau) - \sum_{\tau'=\tau+1}^{N_\tau-1} U^{-1}(\tau, \tau')z(\tau')$$

$$p(\tau) = -\mathcal{P}_{(2\mathbb{Z}+2j\mathbb{Z})}(r(\tau))$$

$$z(\tau) = x(\tau) + r(\tau)$$

Figure 63:
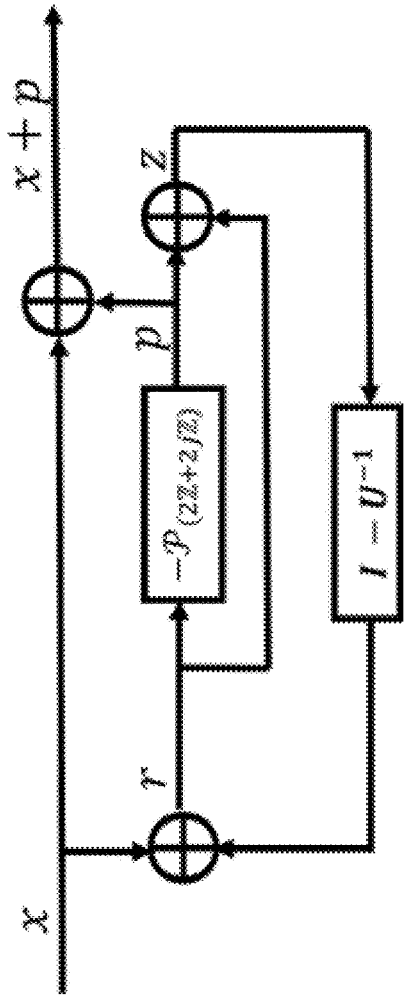
FIG. 63 is a block diagram illustrating an example of the computation of coarse perturbation using $U^{-1}$ for the SISO single carrier case.

Herein, $\mathcal{P}(2\mathbb{Z}+2j\mathbb{Z})$ denotes projection onto the coarse lattice. We note that the algorithm bounds the energy of the z entries by two. FIG. 63 displays a block diagram of the algorithm.

Computing Perturbations with $W_{THP}$

In this subsection, we disclose how to efficiently compute a good perturbation using a SISO single carrier THP filter. Towards this end we note that due to the banded near Toeplitz structure of $U^{-1}$, the application of $I-U^{-1}$ can be well approximated by the application of a filter (outside of edge effects):

$$\sum_{\tau'=\tau+1}^{N_\tau-1} U^{-1}(\tau, \tau')z(\tau') \approx \sum_{n=1}^{N_{chan}} W_{THP}(n)z(\tau+n),$$

for τ=0, 1, . . . , $N_T$−$N_{chan}$−1, where $N_{chan}$ denotes the channel width. We call $W_{THP}$ the SISO single carrier THP filter with:

$W_{THP}(n) = U^{-1}(N_{chan}-n, N_{chan})$, for n=1, . . . , $N_{chan}$. To use the approximation, we need to avoid the non-Toeplitz edge effects of $U^{-1}$, this is done by enforcing the QAM signal x to take the value zero for an initialization region. Putting everything together gives an efficient method for computing good perturbation signals:

Setup compute the filter coefficients: $W_{THP}(n)$ for n=1, . . . , $N_{chan}$.

Initialization set function values on the top delay bins equal to zero:

p(τ)=0, x(τ)=0, and z(τ)=0 for τ=$N_\tau$−$N_{chan}$, . . . , $N_\tau$−1

Update suppose we have selected p(τ') and z(τ') for τ'=(τ+1), . . . , $N_\tau$−1, then:

$$r(\tau) = x(\tau) - \sum_{n=1}^{N_{chan}} W_{THP}(n)z(\tau+n)$$

$$p(\tau) = -\mathcal{P}_{(2\mathbb{Z}+2j\mathbb{Z})}(r(\tau))$$

$$z(\tau) = x(\tau) + r(\tau)$$

Finalize suppose we have selected $p(\tau)$ and $z(\tau)$ for $\tau'=0, 1, \ldots, N_\tau-1$. Then we take:

$$x(\tau) = z(\tau) + \sum_{n=1}^{N_{chan}} W_{THP}(n)z(\tau+n)$$

for $\tau=N_\tau-k_{chan}, \ldots, N_\tau-1$.

Figure 64:
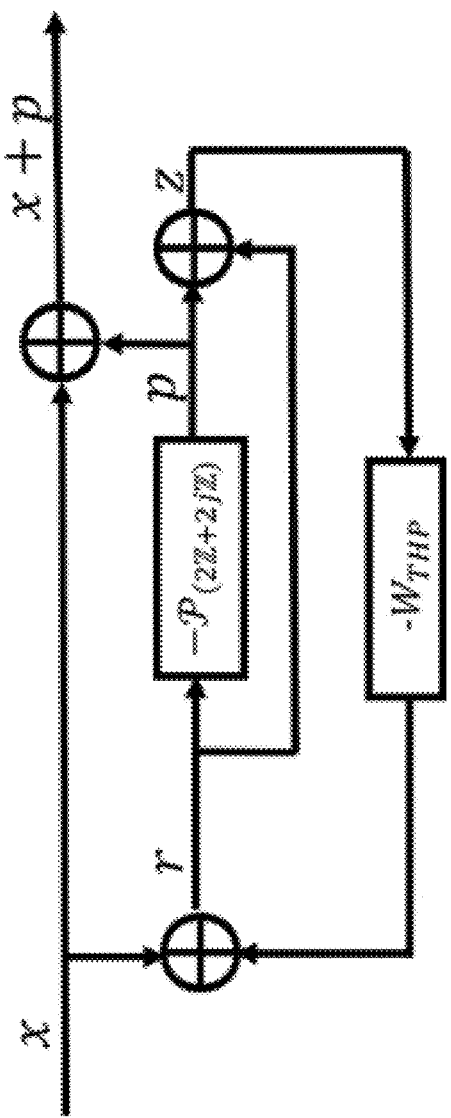
FIG. 64 is a block diagram illustrating an example of the computation of coarse perturbations using $W_{THP}$ for the SISO single carrier case.

The finalize step is done to ensure that x+p is equal to the correlation of $\overline{I+W_{THP}}$ and z. Because there is no QAM information transmitted in the initialization region, the finalize step does not overwrite user data. We note that by using unique word single carrier, the initialization region can also do the work of the cyclic prefix thus limiting overhead. A block diagram for the update step is shown in FIG. 64.

Simulation Results

Application of the SISO single carrier THP filter was simulated using the parameters given in Table 9.

TABLE 9

| | |
|---|---|
| Sample rate | 10 MHz |
| Number of samples | 512 |
| Delay span | 3 us |
| Shaping filter | Root raised cosine, roll-off 12% |
| Data noise variance | −35 dB |
| Channel noise variance | −35 dB |
| QAM order | Infinity (uniform in unit box) |

Figure 66:
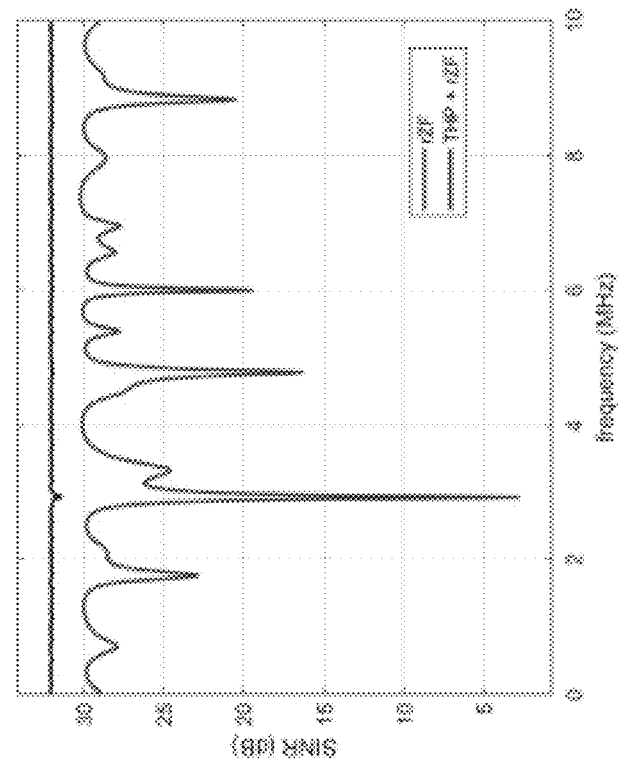
FIG. 66 shows an exemplary plot comparing linear and non-linear precoders for the SISO single carrier case.
Figure 65:
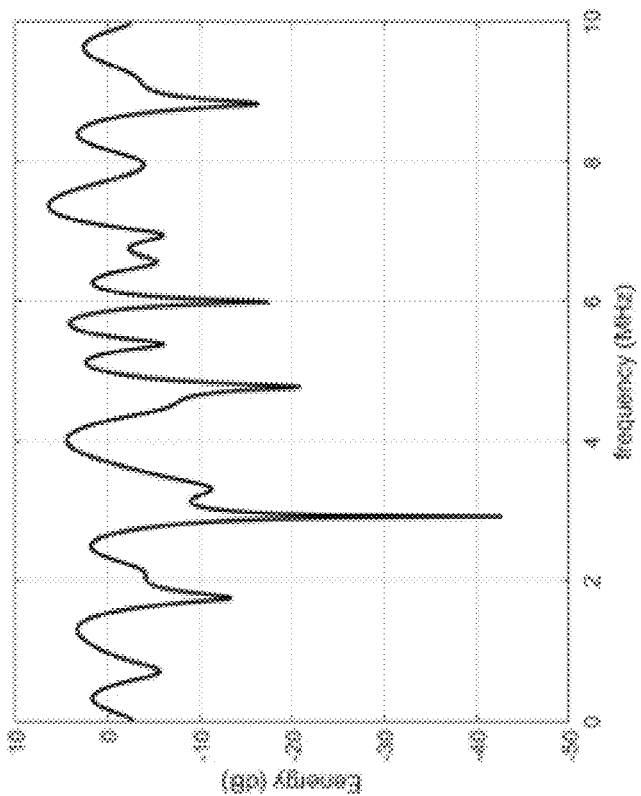
FIG. 65 shows an exemplary plot of a channel frequency response for the SISO single carrier case.

Ten thousand random QAM signals were generated and two different precoders schemes were applied to the QAM signal:

1) Regularized zero forcing (rZF)
2) THP perturbation of the QAM signal followed by rZF FIG. 65 displays the channel frequency response. FIG. 66 compares the SINR experienced by the UE for the two precoding schemes. We note that the THP perturbed signal has both a high average SINR and an extremely stable SINR. In contract, just using the linear precoder results in large SINR fluctuations (20+ dBs).

SISO OTFS

In this section, we disclose SISO OTFS THP filters. The filters will be intimately related to the previously disclosed SISO single carrier THP filters. To make the connection clear we represent the expected error energy in the hybrid delay-time domain.

$$\text{expected error energy} = \sum_{f=0}^{N_f-1}\sum_{t=0}^{N_t-1}(X(f,t)+P(f,t))*M_{error}(f,t)(X(f,t)+P(f,t))$$

$$= \sum_{t=0}^{N_t-1}\sum_{\tau=0}^{N_\tau-1}(\tilde{X}(\tau,t)+\tilde{P}(\tau,t))*\sum_{\tau'=0}^{N_\tau-1}\tilde{M}_{error}(\tau-\tau',t)(\tilde{X}(\tau',t)+\tilde{P}(\tau',t)),$$

Where the function $\tilde{X}(\tau,t)$ is defined as:

$$\tilde{X}(\tau,t) = (\mathcal{F}_F^{-1}\tilde{X})(\tau,t)\sum_{f=0}^{N_f-1}e^{\frac{2\pi j f \tau}{N_f}}X(f,t)$$

and $\mathcal{F}_F^{-1}$ denotes the Fourier transform converting frequency-time to delay-time. The functions $\tilde{P}(\tau,t)$ and $\tilde{M}_{error}$ $(\tau,t)$ are defined in the same way. Next, we vectorize the functions $\tilde{P}(\bullet,t)$ and $\tilde{X}(\bullet,t)$ to express the expected error energy using linear algebra:

$$\text{expected error energy} = \sum_{t=0}^{N_t-1}(\tilde{X}_t+\tilde{P}_t)*\tilde{M}_{error,t}(\tilde{X}_t+\tilde{P}_t)$$

where $\tilde{X}_t, \tilde{P}_t \in \mathbb{C}^{N_\tau}$ and the matrices $\tilde{M}_{error,t} \in \mathbb{C}^{N_\tau \times N_\tau}$ are circulant and positive definite.

Computing Perturbations with $U^{-1}$

In this subsection, we disclose how to compute good perturbations using the Cholesky decompositions:

$$\tilde{M}_{error,t} = \tilde{U}_t^* \tilde{D}_t \tilde{U}_t,$$

for $t=0, 1, \ldots, N_t-1$. Where the $\tilde{U}_t$ are unit upper triangular and the $\tilde{D}_t$ are positive diagonal. Expressing the expected error energy in terms of these decompositions gives:

$$\text{expected error energy} = \sum_{t=0}^{N_t-1}(\tilde{X}_t+\tilde{P}_t)*\tilde{U}_t^*\tilde{D}_t\tilde{U}_t(\tilde{X}_t+\tilde{P}_t)$$

$$= \sum_{t=0}^{N_t-1}\tilde{Z}_t^*\tilde{D}_t\tilde{Z}_t$$

$$= \sum_{\tau=0}^{N_\tau-1}\sum_{t=0}^{N_t-1}\tilde{Z}(\tau,t)*\tilde{D}(\tau,t)\tilde{Z}(\tau,t)$$

where $\tilde{Z}_t = \tilde{U}_t(\tilde{X}_t+\tilde{P}_t)$, $\tilde{Z}(\tau,t)=\tilde{Z}_t(\tau)$, and $\tilde{D}(\tau,t)=\tilde{D}_t(\tau,\tau)$. Next, we express the expected error energy in the delay-Doppler domain (the domain where the QAMs and perturbations are defined):

$$\text{expected error energy} = \sum_{\tau=0}^{N_\tau-1}\sum_{v=0}^{N_v-1}z(\tau,v)*\sum_{v'=0}^{N_v-1}d(\tau,v-v')z(\tau,v')$$

where the function $z(\tau,v)$ is defined as:

$$z(\tau,v) = (\mathcal{F}_T^{-1}\tilde{Z})(\tau,v) = \sum_{t=0}^{N_t-1}e^{\frac{2\pi j t v}{N_t}}\tilde{Z}(\tau,t)$$

and $\mathcal{F}_T^{-1}$ denotes the Fourier transform converting delay-time to delay-Doppler. The function $d(\tau,v)$ is defined the same way. For Doppler shifts encountered in typical wireless channels 500 Hz) the term $\tilde{D}(\tau,t)$ is nearly constant with respect to time. Therefore, the energy of its Fourier transform, $d(\tau,v)$, will be concentrated in the DC term, $d(\tau,0)$. Using this fact, the expected error energy can be well approximated as:

$$\text{expected error energy} \approx \sum_{\tau=0}^{N_\tau-1} \sum_{v=0}^{N_v-1} z(\tau, v)^* d(\tau, 0) z(\tau, v) = \sum_{\tau=0}^{N_\tau-1} \sum_{v=0}^{N_v-1} d(\tau, 0)|z(\tau, v)|^2$$

Because the terms $d(\tau,0)$ are positive, minimizing the expected error energy is equivalent to minimizing the energy of the entries of z, which can be expressed recursively:

$$\tilde{Z}(\tau, t) = \tilde{X}(\tau, t) + \tilde{P}(\tau, t) - \sum_{\tau'=\tau+1}^{N_\tau-1} \tilde{U}_t^{-1}(\tau, \tau')\tilde{Z}(\tau', t)$$

$$z(\tau, v) = x(\tau, v) + p(\tau, v) - \mathcal{F}_T^{-1}\left(\sum_{\tau'=\tau+1}^{N_\tau-1} \tilde{U}_t^{-1}(\tau, \tau')\tilde{Z}(\tau', t)\right)(\tau, v)$$

Figure 67:
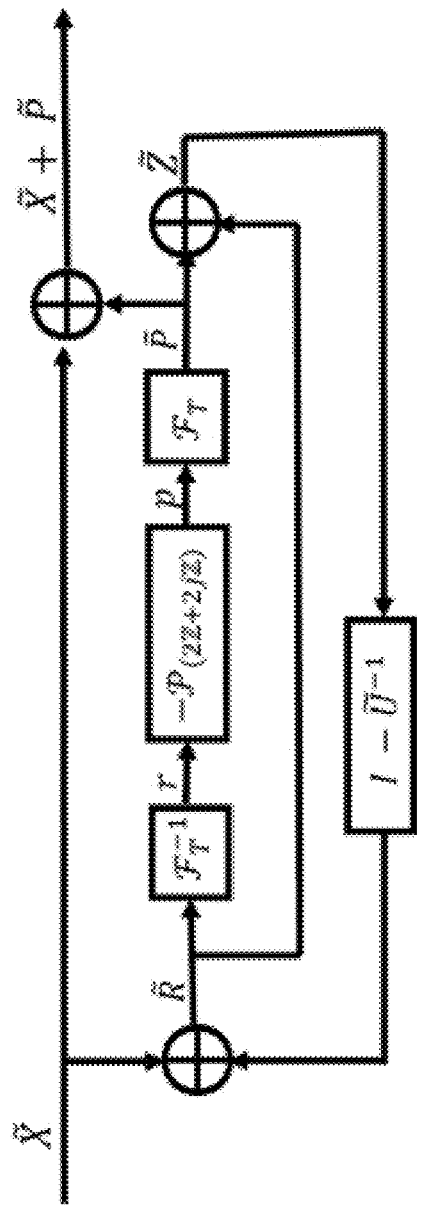
FIG. 67 is a block diagram illustrating an example of the algorithm for the computation of perturbation using $U^{-1}$ for the SISO OTFS case.

Using these expressions, a good perturbation signal can be computed iteratively:
Initialization set $\tilde{P}(N_\tau,t)=0$ and $\tilde{Z}(N_\tau,t)=\tilde{X}(N_\tau,t)$ for $t=0, 1, \ldots, N_t-1$
Update suppose we have selected $\tilde{P}(\tau',t)$ and $\tilde{Z}(\tau',t)$ for $\tau'=(\tau+1), \ldots, N_\tau-1$, then:

$$\tilde{R}(\tau, t) = \tilde{X}(\tau, t) - \sum_{\tau'=\tau+1}^{N_\tau-1} \tilde{U}_t^{-1}(\tau, \tau')\tilde{Z}(\tau', t)$$

$$p(\tau, v) = -\mathcal{P}_{(2\mathbb{Z}+2j\mathbb{Z})}\left((\mathcal{F}_T^{-1}\tilde{R})(\tau, v)\right)$$

$$\tilde{P}(\tau, t) = (\mathcal{F}_t p)(\tau, t)$$

$$\tilde{Z}(\tau, t) = \tilde{P}(\tau, t) + \tilde{R}(\tau, t)$$

for $t=0, 1, \ldots, N_t-1$, where $\mathcal{P}$ $(2\mathbb{Z}+2j\mathbb{Z})$ denotes projection onto the coarse lattice. We note that the algorithm bounds the energy of the entries of z by two. FIG. 67 displays a block diagram of the algorithm.

Computing Perturbations with $W_{THP}$

In this subsection we disclose how to compute good perturbations using SISO OTFS THP filters. Exactly like the single carrier case, the application of $I-\tilde{U}^{-1}$ can be well approximated by the application of a filter (outside of edge effects):

$$\sum_{\tau'=\tau+1}^{N_\tau-1} \tilde{U}_t^{-1}(\tau, \tau')z(\tau', t) \approx \sum_{n=1}^{N_{chan}} W_{THP}(n, t)z(\tau+n, t),$$

for $\tau=0, 1, \ldots, N_\tau-k_{chan}$ and $t=0, 1, \ldots, N_t-1$, where $N_{chan}$ denotes the channel delay width. We call the filters $W_{THP}$ (•,t) the SISO OTFS THP filters with:

$$W_{THP}(n,t)=\tilde{U}_t^{-1}(N_{chan}-n, N_{chan}),$$

for $t=0, 1, \ldots, N_t-1$ and $n=1, \ldots, N_{chan}$. Like the single carrier case, to avoid edge effects, we enforce the QAM signal x to take the value zero in an initialization region. Putting everything together gives an efficient method to compute good perturbations:

1. Setup compute the filter coefficients: $W_{THP}(n,t)$ for $t=0, 1, \ldots, N_t-1$ and $n=1, \ldots, N_{chan}$.
2. Initialization set function values on the top delay bins equal to zero:

$$\tilde{P}(\tau,t)=0, \tilde{X}(\tau,t)=0, \text{ and } \tilde{Z}(\tau,t)=0,$$

for $\tau=N_\tau-N_{chan}, \ldots, N_\tau-1$ and $t=0, 1, \ldots, N_t-1$.
3. Update Suppose we have selected $\tilde{P}(\tau', t)$ and $\tilde{Z}(\tau', t)$ for $\tau'=(\tau+1), \ldots, N_\tau-1$ and $t=0, 1, \ldots, N_t-1$, then:

$$\tilde{R}(\tau, t) = \tilde{X}(\tau, t) - \sum_{n=1}^{N_{chan}} W_{THP}(n, t)\tilde{Z}(\tau+n, t)$$

$$p(\tau, v) = -\mathcal{P}_{(2\mathbb{Z}+2j\mathbb{Z})}\left((\mathcal{F}_t^{-1}\tilde{R})(\tau, v)\right)$$

$$\tilde{P}(\tau, t) = (\mathcal{F}_t p)(\tau, t)$$

$$\tilde{Z}(\tau, t) = \tilde{P}(\tau, t) + \tilde{R}(\tau, t)$$

for $t=0, 1, \ldots, N_t-1$ and $v=0, 1, \ldots, N_v-1$.
4. Finalize suppose we have selected $\tilde{Z}(\tau', t)$ and $\tilde{P}(\tau', t)$ for $\tau'=0, 1, \ldots, N_\tau-1$ and $t=0, 1, \ldots, N_t-1$. Then we take:

$$\tilde{X}(\tau, t) = \tilde{Z}(\tau, t) + \sum_{n=1}^{N_{chan}} W_{THP,t}(n)\tilde{Z}(\tau, t)$$

for $\tau=N_\tau-N_{chan}, \ldots, N_\tau-1$ and $t=0, 1, \ldots, N_t-1$.

Figure 68:
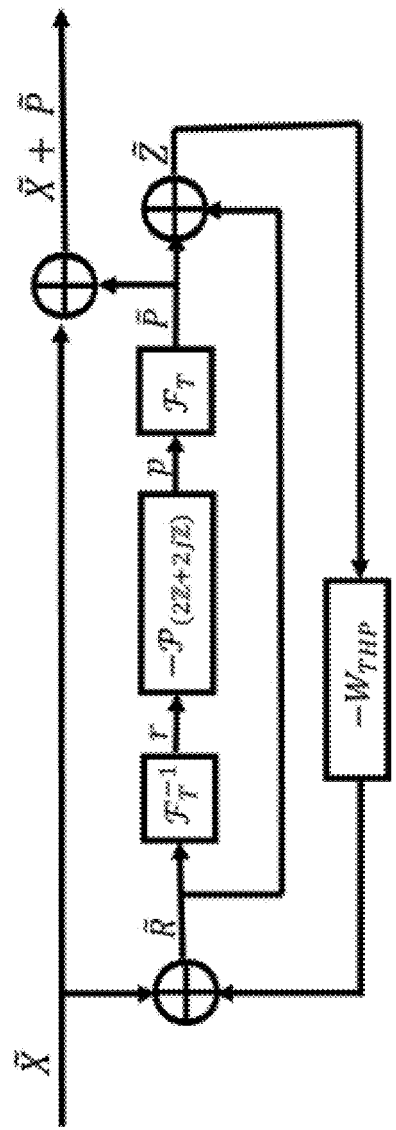
FIG. 68 is a block diagram illustrating an example of the update step of the algorithm for the computation of perturbation using $U^{-1}$ for the SISO OTFS case.

Because there is no QAM information transmitted in the initialization region the finalize step does not overwrite user data. We note that by using unique word OTFS, the initialization region can also do the work of the cyclic prefix thus limiting overhead. A block diagram for the update step is shown in FIG. 68.

Simulation Results

Application of the SISO OTFS THP filters was simulated using the parameters given in Table 10.

TABLE 10

| | |
|---|---|
| Sample rate | 10 MHz |
| $N_f$, $N_\tau$ | 128 |
| $N_t$, $N_v$ | 64 |
| Delay span | 1 us |
| Doppler span | 1 kHz |
| Shaping filter | Root raised cosine, roll-off 12% |
| Data noise variance | −35 dB |
| Channel noise variance | −35 dB |
| QAM order | Infinity (uniform in unit box) |

Figure 69:
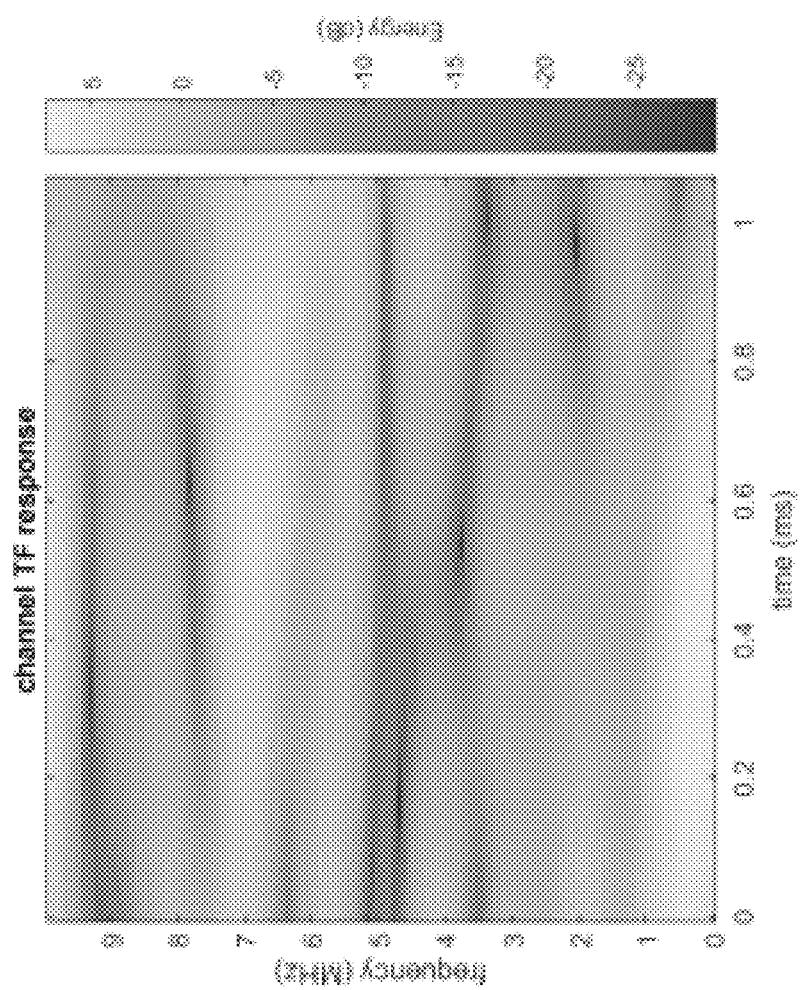
FIG. 69 shows an exemplary spectral plot of a channel frequency response for the SISO OTFS case.
Figure 70:
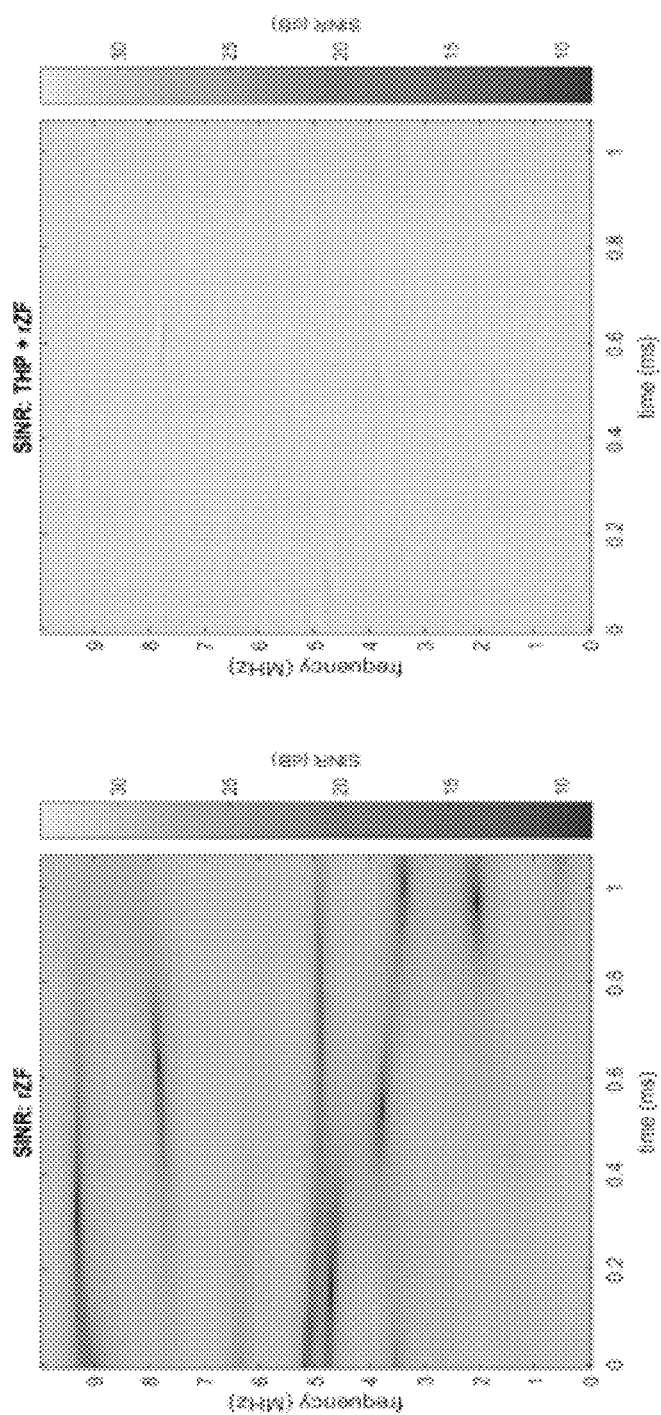
FIG. 70 shows exemplary spectral plots comparing the SINR experienced by the UE for two precoding schemes for the SISO OTFS case.

FIG. 69 displays the channel time frequency response. FIG. 70 compares the SINR experienced by the UE for the two precoding schemes. We note that the THP perturbed signal has both a high average SINR and an extremely stable SINR. In contract, just using the linear precoder results in large SINR fluctuations (20+ dBs).

MIMO Single Carrier

In this section, we disclose a MIMO single carrier THP filter. The filter will be like the SISO single carrier THP filter, however, with the filter taps now being matrix valued instead of scaler valued. Towards this end we express the expected error energy in the delay domain (the domain where QAMs and perturbations are defined):

$$\text{expected error energy} = \sum_{f=0}^{N_f-1} (X(f) + P(f))^* M_{error}(f)(X(f) + P(f)) =$$

$$\sum_{\tau=0}^{N_\tau-1} (x(\tau) + p(\tau))^* \sum_{\tau'=0}^{N_\tau-1} m_{error}(\tau - \tau')(x(\tau') + p(\tau'))$$

where $x(\tau), p(\tau) \in \mathbb{C}^{L_u}$ and $m_{error}(\tau) \in \mathbb{C}^{L_u \times L_u}$. The QAM signal x and the perturbation signal p can be represented as vectors in $\mathbb{C}^{L_u N_\tau}$, which we denote by x, p respectively. Likewise, convolution by $m_{error}$ can be represented as multiplication by a positive definite block circulant matrix in $\mathbb{C}^{L_u N_\tau \times L_u N_\tau}$ (blocks are of size $L_u \times L_u$) which we denote by $m_{error}$. Using these representations, we can write the expected error energy as:

$$\text{expected error energy} = (x+p)^* m_{error}(x+p)$$

Computing Perturbations with Block Cholesky Factors

In this subsection, we disclose how to compute good perturbations using the block Cholesky decomposition:

$$m_{error} = U^* D U,$$

where D is positive definite block diagonal and U is block unit upper triangular (i.e. upper triangular with block diagonal matrices equal to the identity matrix). Expressing the expected error energy in terms of the Cholesky factors gives:

$$\text{expected error energy} =$$

$$(U(x+p))^* D(U(x+p)) = z^* D z = \sum_{\tau=0}^{N_\tau-1} z(\tau)^* D(\tau) z(\tau)$$

with:
z=U(x+p)
$z(\tau) \in \mathbb{C}^{L_u}$ equal to the spatial values of z at delay bin $\tau$:

$z(\tau) = z(\tau L_u : (\tau+1) L_u - 1)$ $D(\tau) \in \mathbb{C}^{L_u \times L_u}$ equal to the $\tau$'th block diagonal entry of D:

$D(\tau) = D(\tau L_u : (\tau+1) L_u - 1, \tau L_u : (\tau+1) L_u - 1)$

Therefore, minimizing the expected error energy is equivalent to minimizing the quadratic forms $z(\tau)^* D(\tau) z(\tau)$, where the value of $z(\tau)$ can be expressed recursively:

$$z(\tau) = x(\tau) + p(\tau) - \sum_{\tau'=\tau+1}^{N_\tau-1} U^{-1}(\tau, \tau') z(\tau')$$

with:
$x(\tau) \in \mathbb{C}^{L_u}$ equal to the spatial values of x at delay bin $\tau$:

$x(\tau) = x(\tau L_u : (\tau+1) L_u - 1)$ $p(\tau) \in \mathbb{C}^{L_u}$ equal to the spatial values of p at delay bin $\tau$:

$p(\tau) = p(\tau L_u : (\tau+1) L_u - 1)$ $U^{-1}(\tau, \tau') \in \mathbb{C}^{L_u \times L_u}$ equal to the $(\tau, \tau')$ block entry of $U^{-1}$:

$U^{-1}(\tau, \tau') = U^{-1}(\tau L_u : (\tau+1) L_u - 1, \tau' L_u : (\tau'+1) L_u - 1)$ Suppose the value of $z(\tau')$ has been selected for $\tau' = (\tau+1), \ldots, N_\tau - 1$, then the problem of minimizing the quadratic form $z(\tau)^* D(\tau) z(\tau)$ can be cast as a closest lattice point problem (CLP) by noting that:

$$z(\tau)^* D(\tau) z(\tau) = (r(\tau) + p(\tau))^* D(\tau)(r(\tau) + p(\tau))$$

$$r(\tau) = x(\tau) - \sum_{\tau'=\tau+1}^{N_\tau-1} U^{-1}(\tau, \tau') z(\tau')$$

Therefore, minimizing the quadratic form is equivalent to solving the CLP:

$$\underset{p \in (2\mathbb{Z}+2j\mathbb{Z})^{L_u}}{\arg\min} (r(\tau) + p)^* D(\tau)(r(\tau) + p) \quad (1)$$

Figure 71:
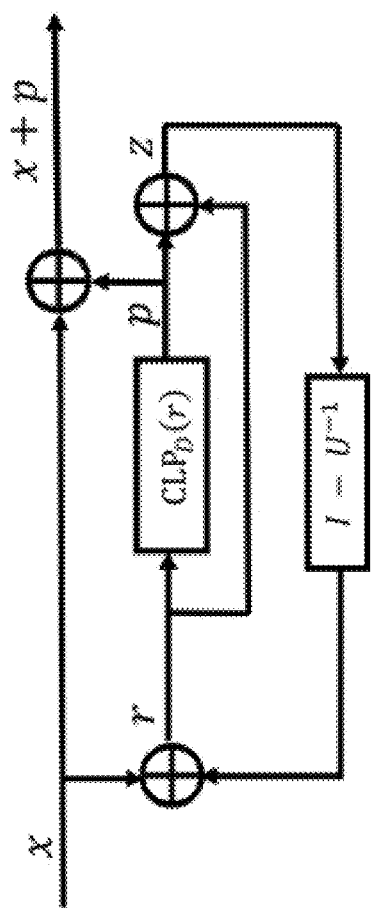
FIG. 71 is a block diagram illustrating an example of the update step of the algorithm for the computation of perturbation using $U^{-1}$ for the MIMO single carrier case.

In general, the CLP problem is NP hard. A quick but suboptimal solution can be computed by projecting each coordinate of $-r(\tau)$ onto the lattice $2\mathbb{Z} + 2j\mathbb{Z}$:

$$p(i) = -\mathcal{P}(2\mathbb{Z}+2j\mathbb{Z})(r(\tau))(i)$$

for $i = 0, \ldots, L_u - 1$. To compute a better solution a form of spatial THP should be used; this includes the methods of V-Blast, sphere-encoding, k-best, lattice reduction, and their variants. Putting everything together gives a method to iteratively compute good perturbation signals:

1. Initialization set $p(N_\tau) = 0$ and $z(N_\tau) = x(N_\tau)$.
2. Update Suppose we have selected $p(\tau')$ and $z(\tau')$ for $\tau' = (\tau+1), \ldots, N_\tau - 1$, then:

$$r(\tau) = x(\tau) - \sum_{\tau'=\tau+1}^{N_\tau-1} U^{-1}(\tau, \tau') z(\tau')$$

$$p(\tau) = CLP_{D(\tau)}(r(\tau))$$

$$z(\tau) = p(\tau) + r(\tau)$$

where $CLP_{D(\tau)}(r(\tau))$ denotes some (usually suboptimal) solution to the CLP problem of equation 1. A block diagram for the update step is shown in FIG. 71.

Computing Perturbations with $W_{THP}$

In this subsection we disclose how to compute good perturbations using a MIMO single carrier THP filter. Like the SISO case, the application of $I - U^{-1}$ can be well approximated by the application of a filter (outside of edge effects):

$$\sum_{\tau'=\tau+1}^{N_\tau-1} U^{-1}(\tau, \tau') z(\tau') \approx \sum_{n=1}^{N_{chan}} W_{THP}(n) z(\tau + n),$$

for $\tau = 0, 1, \ldots, N_\tau - N_{chan} - 1$, where $N_{chan}$ denotes the width of the channel. We call the filter $W_{THP}$ the MIMO single carrier THP filter with:

$W_{THP}(n) \in \mathbb{C}^{L_u \times L_u}$ and $W_{THP}(n) = U^{-1}(N_{chan} - n, N_{chan})$ for $n = 1, \ldots, N_{chan}$. Also, outside of edge effects the positive definite matrix $D(\tau)$ is nearly constant:

$D(\tau) \approx D(N_{chan})$, for $\tau = N_{chan}, \ldots, N_\tau - N_{chan} - 1$. To avoid edge effects we enforce the QAM signal, x, to be zero for an initialization region. Putting everything together gives an efficient method to compute coarse perturbations:

1. Setup compute the filter coefficients $W_{THP}(n)$ for $n = 1, \ldots, N_{chan}$. Compute the positive definite matrix D $(N_{chan})$.

2. Initialization set the function values on the top delay bins equal to zero:

$p(\tau)=0$, $x(\tau)=0$, and $z(\tau)=0$, for $\tau=N_\tau-N_{chan}, \ldots, N_\tau-1$.

3. Update Suppose we have selected $p(\tau')$ and $z(\tau')$ for $\tau'=(\tau+1), \ldots, N_\tau-1$, then:

$$r(\tau) = x(\tau) - \sum_{n=1}^{N_{chan}} W_{THP}(n)z(\tau+n)$$

$$p(\tau) = CLP_{D(N_{chan})}(r(\tau))$$

$$z(\tau) = p(\tau) + r(\tau)$$

4. Update suppose we have selected $p(\tau')$ and $z(\tau')$ for $\tau'=1, \ldots, N_\tau-1$. Then we take:

$$x(\tau) = z(\tau) + \sum_{n=1}^{N_{chan}} W_{THP}(n)z(\tau+n),$$

for $\tau=N_T-N_{chan}, \ldots, N_\tau-1$.

Figure 72:
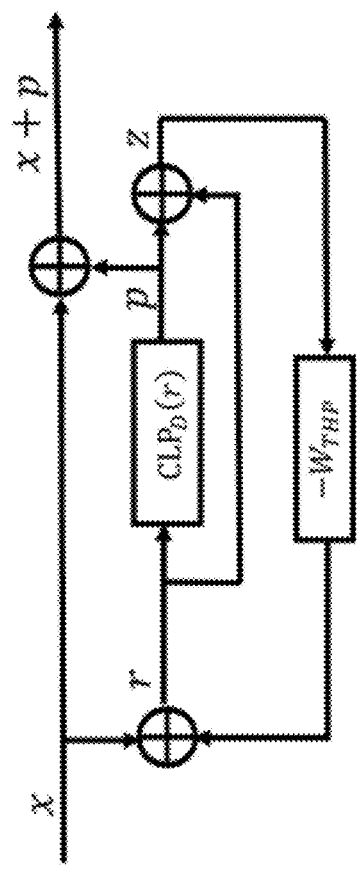
FIG. 72 is a block diagram illustrating an example of the update step of the algorithm for the computation of perturbation using $W_{THP}$ for the MIMO single carrier case.

Because there is no QAM information transmitted in the initialization region the finalize step does not overwrite user data. We note that by using unique word single carrier, the initialization region can also do the work of the cyclic prefix thus limiting overhead. A block diagram for the update step is shown in FIG. 72.

Simulation Results

Application of the MIMO single carrier THP filter was simulated with the parameters given in Table 11.

TABLE 11

| Subcarrier spacing | 15 kHz |
| --- | --- |
| $N_f$, $N_\tau$ | 600 |
| Delay span | 2 us |
| Doppler span | 0 kHz |
| Data noise variance | −35 dB |
| Channel noise variance | −35 dB |
| $L_u$ | 8 |
| $L_h$ | 8 |
| QAM order | Infinity (uniform in unit box) |

Figure 73:
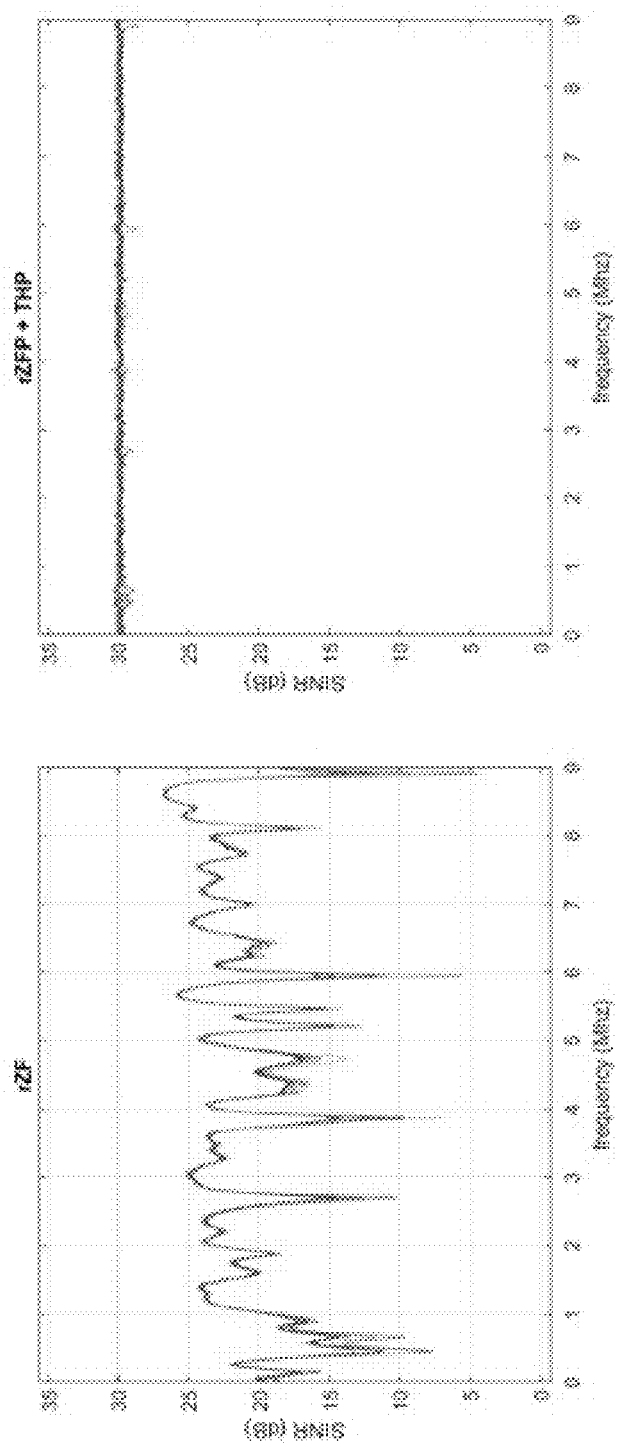
FIG. 73 shows plots comparing the SINR experienced by the 8 UEs for two precoding schemes in the MIMO single carrier case.

FIG. 73 compares the SINR experienced by the 8 UEs for the two precoding schemes. We note that the THP perturbed signal has both a high average SINR and an extremely stable SINR. In contrast, just using the linear precoder results in large SINR fluctuations (20+ dBs).

MIMO OTFS

In this section, we disclose MIMO OTFS THP filters. The filters will be like the SISO OTFS THP filters, however, with the filter taps now being matrix valued instead of scaler valued. Towards this end we express the expected error energy in the hybrid delay-time domain:

expected error energy =

$$\sum_{f=0}^{N_f-1}\sum_{t=0}^{N_t-1}(X(f,t)+P(f,t))^*M_{error}(f,t)(X(f,t)+P(f,t))$$

$$=\sum_{t=0}^{N_t-1}\sum_{\tau=0}^{N_\tau-1}(\tilde{X}(\tau,t)+\tilde{P}(\tau,t))^*\sum_{\tau'=0}^{N_\tau-1}\tilde{M}_{error}(\tau-\tau',t)(\tilde{X}(\tau',t)+\tilde{P}(\tau',t)),$$

Where the function $\tilde{X}(\tau,t)$ is defined as:

$$\tilde{X}(\tau,t)=(\mathcal{F}_F^{-1}X)(\tau,t)=\sum_{f=0}^{N_f-1}e^{\frac{2\pi j f \tau}{N_f}}X(f,t)$$

The functions $\tilde{P}(\tau,t)$ and $\tilde{M}_{error}(\tau,t)$ are defined in the same way. Next, we vectorize the functions $\tilde{P}(\bullet,t)$ and $\tilde{X}(\bullet,t)$ to express the expected error energy using linear algebra:

$$\text{expected error energy} = \sum_{t=0}^{N_t-1}(\tilde{X}_t+\tilde{P}_t)^*\tilde{M}_{error,t}(\tilde{X}_t+\tilde{P}_t)$$

where $\tilde{X}_t, \tilde{P}_t \in \mathbb{C}^{L_u N_\tau}$ and the matrices $\tilde{M}_{error,t} \in \mathbb{C}^{L_u N_\tau \times L_u N_\tau}$ are positive definite and block circulant (with blocks of size $L_u \times L_u$).

Computing Perturbations with Block Cholesky Factors

In this subsection, we disclose how to compute good perturbations using the block Cholesky decompositions:

$$\tilde{M}_{error,t}=\tilde{U}_t^*\tilde{D}_t\tilde{U}_t,$$

for $t=0, 1, \ldots, N_t-1$, where the $\tilde{D}_t$ are positive definite block diagonal and the $\tilde{U}_t$ are block unit upper triangular (i.e. upper triangular with block diagonal matrices equal to the identity matrix). Expressing the expected error energy in terms of these Cholesky factors gives:

$$\text{expected error energy} = \sum_{t=0}^{N_t-1}(\tilde{X}_t+\tilde{P}_t)^*\tilde{U}_t^*\tilde{D}_t\tilde{U}_t(\tilde{X}_t+\tilde{P}_t)$$

$$=\sum_{t=0}^{N_t-1}\tilde{Z}_t^*\tilde{D}_t\tilde{Z}_t$$

$$=\sum_{\tau=0}^{N_\tau-1}\sum_{t=0}^{N_t-1}\tilde{Z}(\tau,t)^*\tilde{D}(\tau,t)\tilde{Z}(\tau,t),$$

with:

$\tilde{Z}_t=\tilde{U}_t(\tilde{X}_t+\tilde{P}_t)$ $\tilde{Z}(\tau,t)\in\mathbb{C}^{L_u}$ equal to the spatial values of $\tilde{Z}_t$ at delay bin $\tau$:

$\tilde{Z}(\tau,t)=\tilde{Z}_t(\tau L_u:(\tau+1)L_u-1)$ $\tilde{D}(\tau,t)\in\mathbb{C}^{L_u\times L_u}$ equal to the $\tau$'th block diagonal entry of $\tilde{D}_t$:

$\tilde{D}(\tau,t)=\tilde{D}_t(\tau L_u:(\tau+1)L_u-1,\tau L_u:(\tau+1)L_u-1)$

Next, we express the expected error energy in the delay-Doppler domain (the domain where QAMs and perturbations are defined):

$$\text{expected error energy}=\sum_{\tau=0}^{N_\tau-1}\sum_{v=0}^{N_v-1}z(\tau,v)^*\sum_{v'=0}^{N_v-1}d(\tau,v-v')z(\tau,v')$$

where the function $z(\tau,v)$ is defined as:

$$z(\tau,v)=(\mathcal{F}_T^{-1}\tilde{Z})(\tau,v)=\sum_{t=0}^{N_t-1}e^{\frac{2\pi j t v}{N_t}}\tilde{Z}(\tau,t)$$

The function $d(\tau,v)$ is defined in the same way. For Doppler shifts encountered in typical wireless channels ($\leq 500$ Hz) the term $\tilde{D}(\tau,t)$ is nearly constant with respect to time, therefore, the energy of its inverse Fourier transform, $d(\tau,v)$, is concentrated in the DC term, $d(\tau,0)$. Using this fact, the expected error energy can be well approximated as:

$$\text{expected error energy} \approx \sum_{\tau=0}^{N_\tau-1} \sum_{v=0}^{N_v-1} z(\tau,v)^* d(\tau,0) z(\tau,v)$$

In conclusion, minimizing the expected error energy is equivalent to minimizing the quadratic forms $z(\tau,v)^* d(\tau,0) z(\tau,v)$, where the value of $z(\tau,v)$ can be expressed recursively:

$$z(\tau,v) = x(\tau,v) + p(\tau,v) - \mathcal{F}_T^{-1}\left(\sum_{\tau'=\tau+1}^{N_\tau-1} \tilde{U}_t^{-1}(\tau,\tau')\tilde{Z}(\tau',t)\right)(\tau,v)$$

with:
- $x(\tau,v) \in \mathbb{C}^{L_u}$ equal to the spatial values of x at delay-Doppler bin $(\tau,v)$
- $p(\tau,v) \in \mathbb{C}^{L_u}$ equal to the spatial values of p at delay-Doppler bin $(\tau,v)$
- $\tilde{U}_t^{-1}(\tau,\tau') \in \mathbb{C}^{L_u \times L_u}$ equal to the $(\tau,\tau')$ block entry of $\tilde{U}_t^{-1}$:

$$\tilde{U}_t^{-1}(\tau,\tau') = \tilde{U}_t^{-1}(\tau L_u:(\tau+1)L_u-1, \tau' L_u:(\tau'+1)L_u-1)$$

Suppose the value of $\tilde{Z}(\tau',t)$ has been selected for $\tau' = (\tau+1), \ldots, N_\tau-1$ and $t=0, 1, \ldots, N_t-1$, then the problem of minimizing the quadradic forms $z(\tau,v)^* d(\tau,0) z(\tau,v)$ can be cast as a closest lattice point problem (CLP) by noting that:

$$z(\tau,v)^* d(\tau,0) z(\tau) = (r(\tau,v) + p(\tau,v))^* d(\tau,0)(r(\tau,v) + p(\tau,v))$$

$$r(\tau,v) = x(\tau,v) - \mathcal{F}_T^{-1}\left(\sum_{\tau'=\tau+1}^{N_\tau-1} \tilde{U}_t^{-1}(\tau,\tau')\tilde{Z}(\tau',t)\right)(\tau,v)$$

Therefore, minimizing the quadratic form is equivalent to solving the CLP:

$$\operatorname*{argmin}_{p \in (2\mathbb{Z}+2j\mathbb{Z})^{L_u}} (r(\tau,v) + p)^* d(\tau,0)(r(\tau,v) + p) \qquad (2)$$

Figure 74:
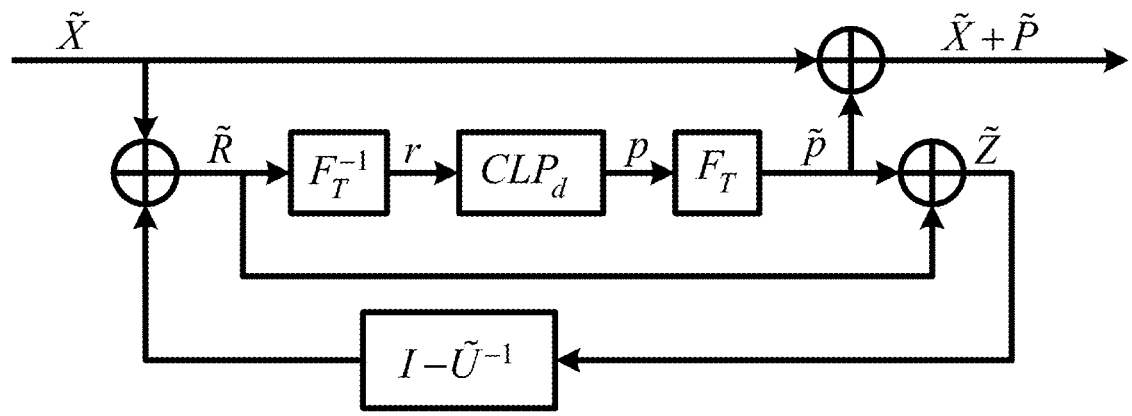
FIG. 74 is a block diagram illustrating an example of the update step of the algorithm for the computation of perturbation using $U^{-1}$ for the MIMO OTFS case.

In general, the CLP problem is NP hard. A quick but suboptimal solution can be computed by projecting each coordinate of $-r(\tau,v)$ onto the lattice $2\mathbb{Z}+2j\mathbb{Z}$:

$$p(i) - \mathcal{P}\ (2\mathbb{Z}+2j\mathbb{Z})_{(r(\tau,v))}(i)$$

for $i=0, 1, \ldots, L_u-1$. To compute a better solution, a form of spatial THP should be used; this includes the methods of V-Blast, sphere-encoding, k-best, lattice reduction, and their variants. Putting everything together gives a method to iteratively compute a good perturbation signal:

1. Initialization set $\tilde{P}(N_\tau,t)=0$ and $\tilde{X}(N_\tau,t)=\hat{X}(N_\tau,t)$ for $t=0, 1, \ldots, N_t-1$
2. Update Suppose we have selected $\tilde{P}(\tau',t)$ and $\tilde{Z}(\tau',t)$ for $\tau'=(\tau+1) \ldots N_\tau-1$, then:

$$\tilde{R}(\tau,t) = \tilde{X}(\tau,t) - \sum_{\tau'=\tau+1}^{N_\tau-1} \tilde{U}_t^{-1}(\tau,\tau')\tilde{Z}(\tau',t)$$

$$r(\tau,v) = (\mathcal{F}_T^{-1}\tilde{R})(\tau,v)$$

$$p(\tau,v) = CLP_{d(\tau,0)}(r(\tau,v))$$

$$\tilde{P}(\tau,t) = (\mathcal{F}_T p)(\tau,t)$$

$$\tilde{Z}(\tau,t) = \tilde{P}(\tau,t) + \tilde{R}(\tau,t)$$

here $CLP_{d(\tau,0)}(r(\tau,v))$ denotes some (usually suboptimal) solution to the CLP problem of equation 2. FIG. 74 shows a block diagram for the update step.

Computing Perturbations with $W_{THP}$

In this subsection we disclose how to compute good perturbations using MIMO OTFS THP filters. Like the SISO case, the application of $I-\tilde{U}^{-1}$ can be well approximated by the application of filters (outside of edge effects):

$$\sum_{\tau'=\tau+1}^{N_\tau-1} \tilde{U}_t^{-1}(\tau,\tau')z(\tau') \approx \sum_{n=1}^{N_{chan}} W_{THP}(n,t)z(\tau+n,t),$$

for $\tau=0, 1, \ldots, N_\tau-N_{chan}-1$ and $t=0, 1, \ldots, N_t-1$, where $N_{chan}$ denotes the width of the channel. We call the filters $W_{THP}(\bullet, t)$ the MIMO OTFS THP filters with:

$$W_{THP}(n,t) \in \mathbb{C}^{L_u \times L_u} \text{ and } W_{THP}(n,t) = \tilde{U}_t^{-1}(N_{chan}-n, N_{chan}),$$

for $n=1, \ldots, N_{chan}$ and $t=0, 1, \ldots, N_t$. Also, outside of edge effects the positive definite matrix $d(\tau,0)$ is nearly constant:

$$d(\tau,0) \approx d(N_{chan},0),$$

for $\tau = N_{chan}, \ldots, N_\tau - N_{chan}-1$. To avoid edge effects we enforce the QAM signal, x, to be zero for an initialization region. Putting everything together gives an efficient method to compute good perturbations:

1. Setup compute the filter coefficients: $W_{THP}(n,t)$ for $t=0, 1, \ldots, N_t-1$ and $n=1, \ldots, N_{chan}$. Compute the positive definite matrix $d(N_{chan}, 0)$.
2. Initialization set function values on the top delay bins equal to zero:

$$\tilde{P}(\tau,t)=0, \tilde{X}(\tau,t)=0, \text{ and } \tilde{Z}(\tau,t)=0,$$

for $\tau = N_\tau - N_{chan}, \ldots, N_\tau-1$ and $t=0, 1, \ldots, N_t-1$.

3. Update suppose we have selected $\tilde{P}(\tau',t)$ and $\tilde{Z}(\tau',t)$ for $\tau'=(\tau+1), \ldots, N_\tau-1$ and $t=0, 1, \ldots, N_t-1$ then:

$$\tilde{R}(\tau,t) = \tilde{X}(\tau,t) - \sum_{n=1}^{N_{chan}} W_{THP,t}(n)\tilde{Z}(\tau+n,t)$$

$$r(\tau,v) = (\mathcal{F}_T^{-1}\tilde{R})(\tau,v)$$

$$p(\tau,v) = CLP_{d(N_{chan},0)}(r(\tau,v))$$

$$\tilde{P}(\tau,t) = (\mathcal{F}_T p)(\tau,t)$$

$$\tilde{Z}(\tau,t) = \tilde{X}(\tau,t) + \tilde{R}(\tau,t)$$

for $t=0, 1, \ldots, N_t-1$ and $v=0, 1, \ldots, N_v-1$.

4. Finalize suppose we have selected $\tilde{Z}(\tau', t)$ and $\tilde{P}(\tau', t)$ for $\tau'=0, 1, \ldots, N_\tau-1$ and $t=0, 1, \ldots, N_t-1$. Then we take:

$$\tilde{X}(\tau, t) = \tilde{Z}(\tau, t) + \sum_{n=1}^{N_{chan}} W_{THP}(n, t)\tilde{Z}(\tau, t)$$

for $\tau=N_\tau-N_{chan}, \ldots, N_\tau-1$ and $t=0, 1, \ldots, N_t-1$.

Figure 75:
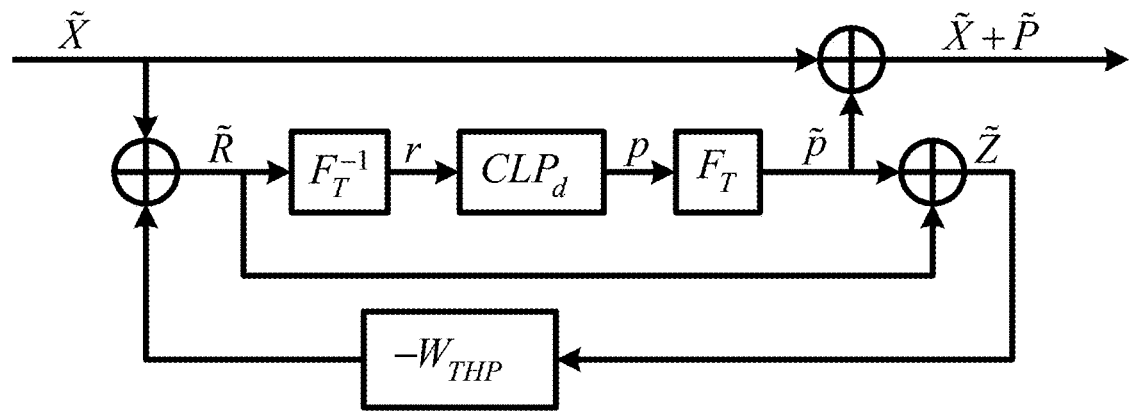
FIG. 75 is a block diagram illustrating an example of the update step of the algorithm for the computation of perturbation using $W_{THP}$ for the MIMO OTFS case.

Because there is no QAM information transmitted in the initialization region the finalize step does not overwrite user data. We note that by using unique word OTFS, the initialization region can also do the work of the cyclic prefix thus limiting overhead. A block diagram for the update step is shown in FIG. 75.

Simulation Results

Application of the OTFS MIMO THP filter was simulated with the parameters given in Table 12.

TABLE 12

| | |
|---|---|
| Subcarrier spacing | 15 kHz |
| $N_f$, $N_\tau$ | 128 |
| $N_t$, $N_v$ | 256 |
| Delay span | 1 us |
| Doppler span | 1 kHz |
| Data noise variance | −35 dB |
| Channel noise variance | −35 dB |
| $L_u$ | 8 |
| $L_h$ | 8 |
| QAM order | Infinity (uniform in unit box) |

FIG. 76 shows the SINR experienced by UE 1 for the two precoding schemes. We note that the THP perturbed signal has both a high average SINR and an extremely stable SINR. In contrast, just using the linear precoder results in large SINR fluctuations (15+ dBs).

Section 5: Transmitter and Receiver Implementations for OTFS

In some embodiments, the following design features are consideration in the implementation of a transmitter and receiver of an OTFS modulated communication system.

UPLINK: UE multiplexes users in delay-Doppler using
  DFT-s-OTFS and BS equalizes using turbo receiver
  Diversity gain
  Low PAPR
  Low complexity UE transmitter
  Compared to OFDM, OTFS systems may be able to offer Higher link budget (>7 dB gain) and simpler UE transmitter (<½ complexity)

DOWNLINK: BS multiplexes users in delay-Doppler and pre-equalizes using delay-Doppler THP precoding
  Delay-Doppler Tomlinson-Harashima precoding gain
  Low complexity UE receiver
  Compared to pre-coded OFDM: Higher MU-MIMO efficiency (<¼ #BS antennas) and simpler UE receiver (<½ complexity)

Figure 77:
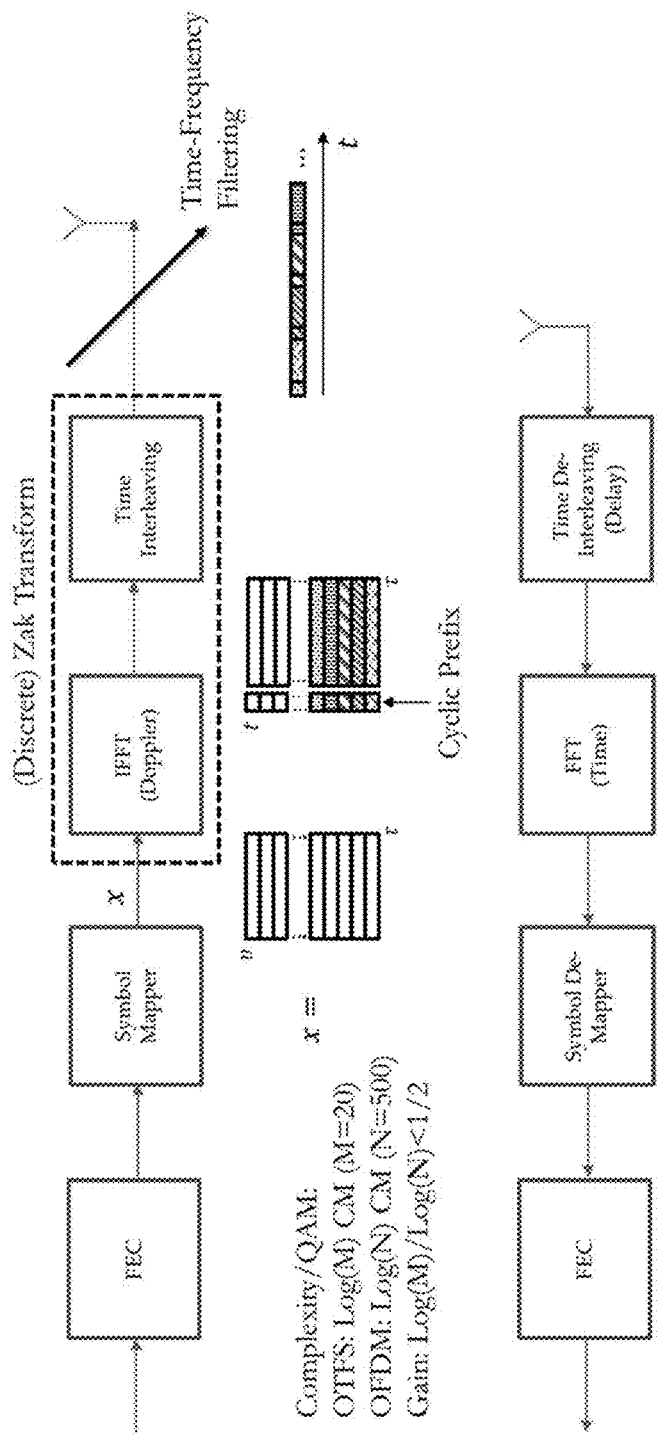
FIG. 77 shows an exemplary modulation and demodulation architecture for an OTFS modulated communication system.
Figure 78:
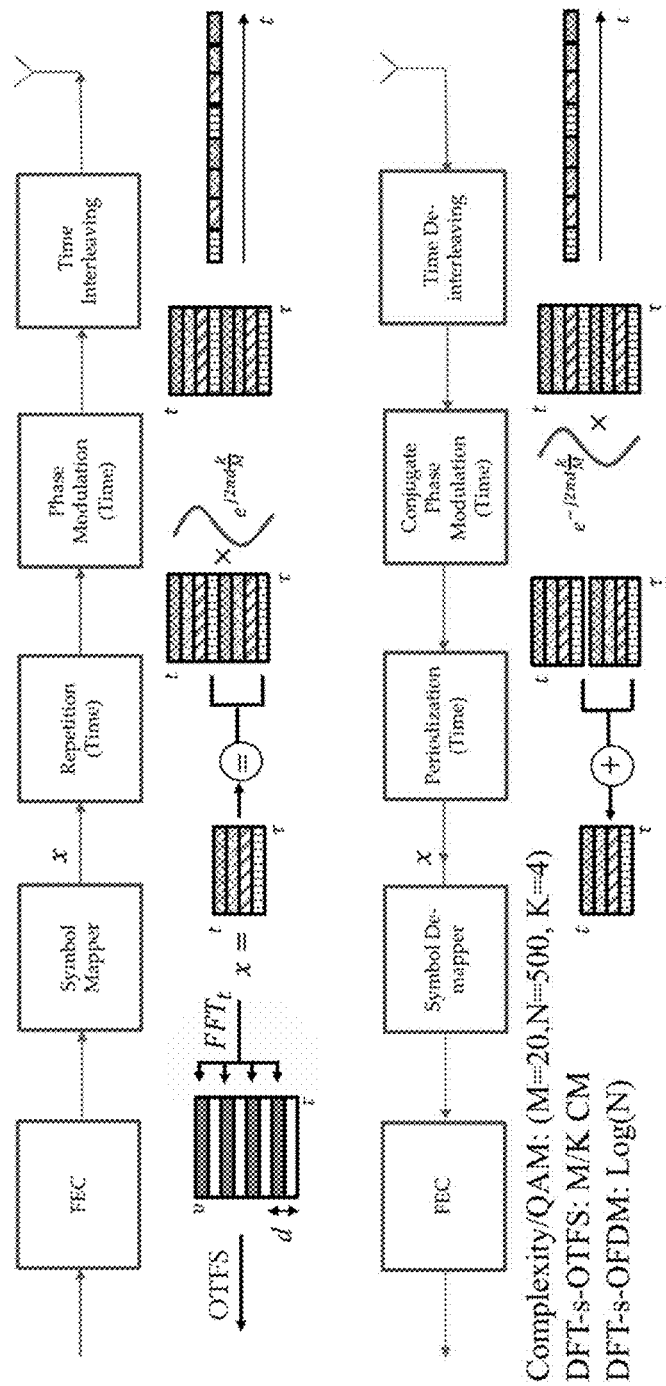
FIG. 78 shows an exemplary modulation and demodulation architecture for a DFT-S OTFS modulated communication system.
Figure 79:
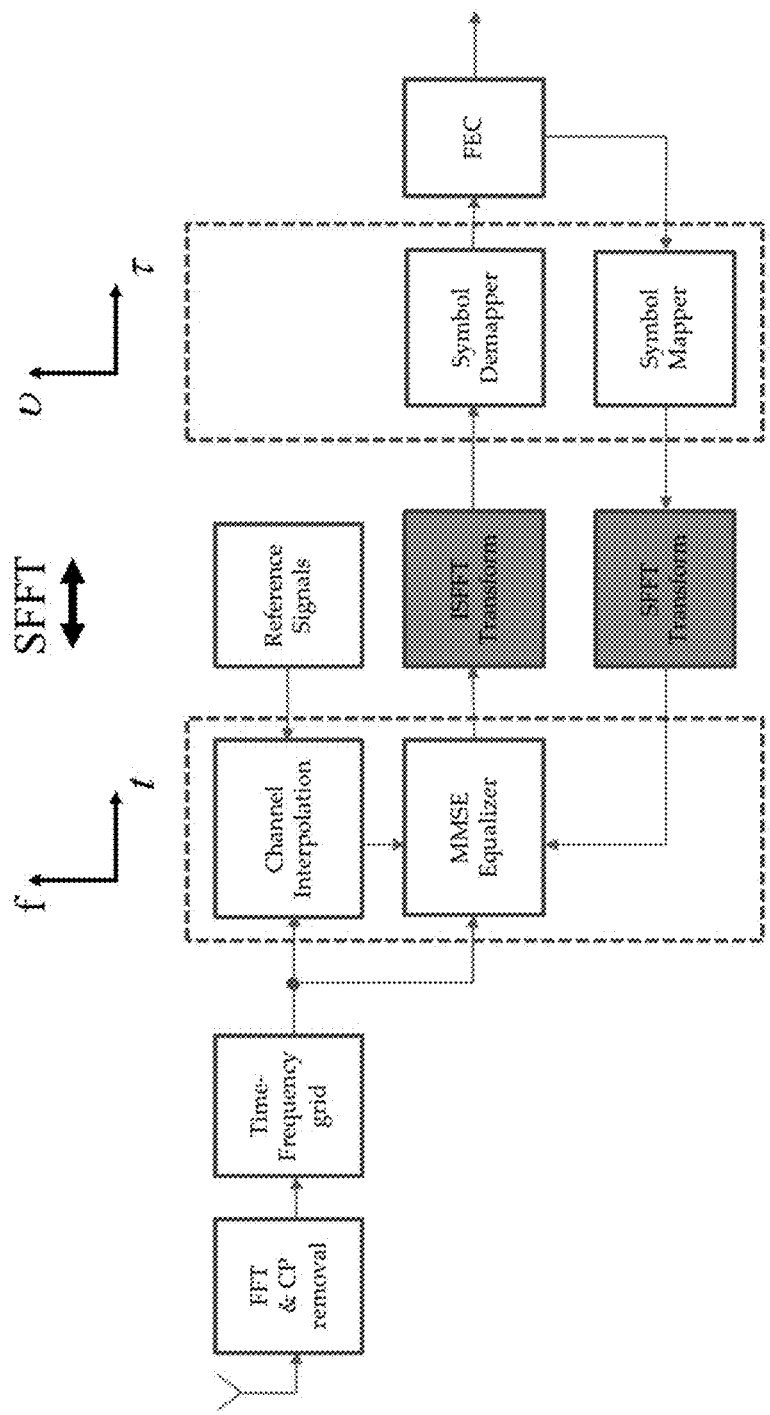
FIG. 79 shows an exemplary uplink base station turbo receiver architecture.
Figure 80:
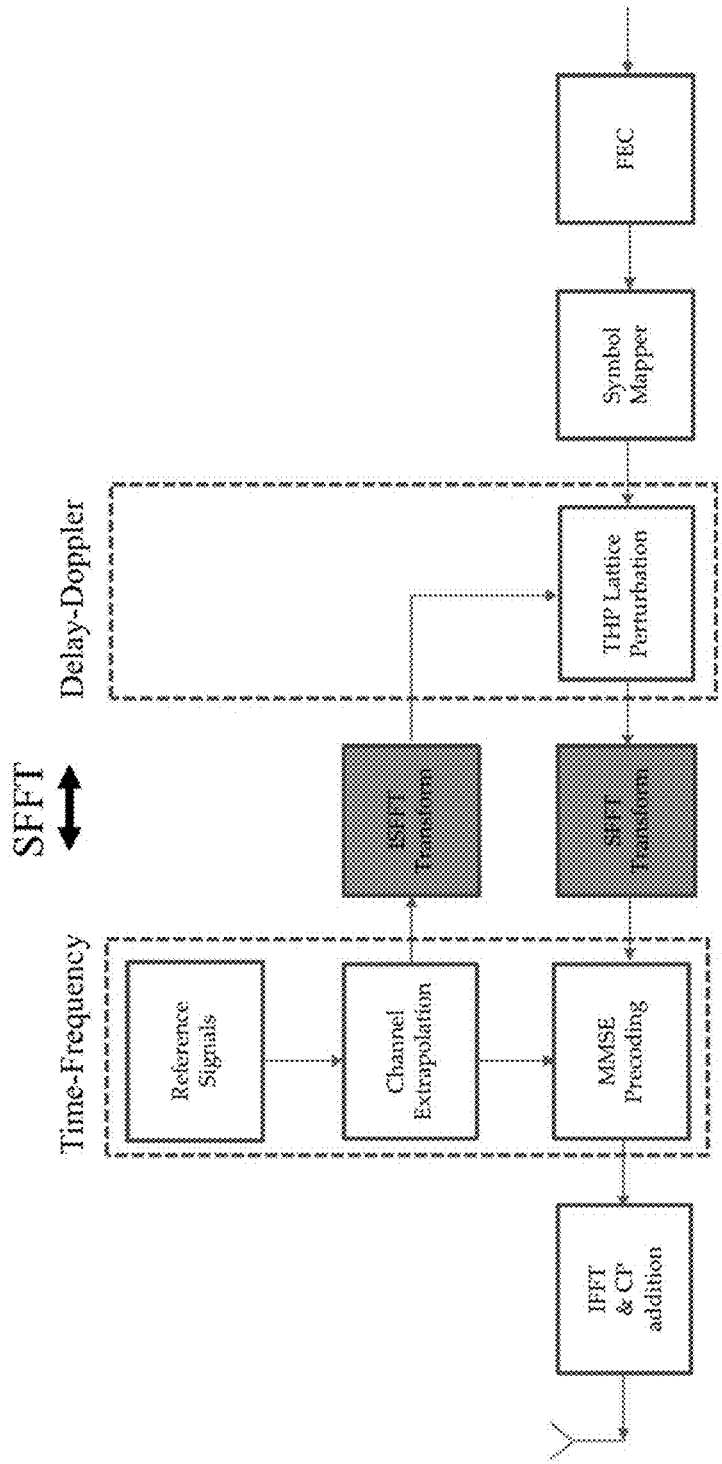
FIG. 80 shows an exemplary downlink base station transmitter architecture.
Figure 81:
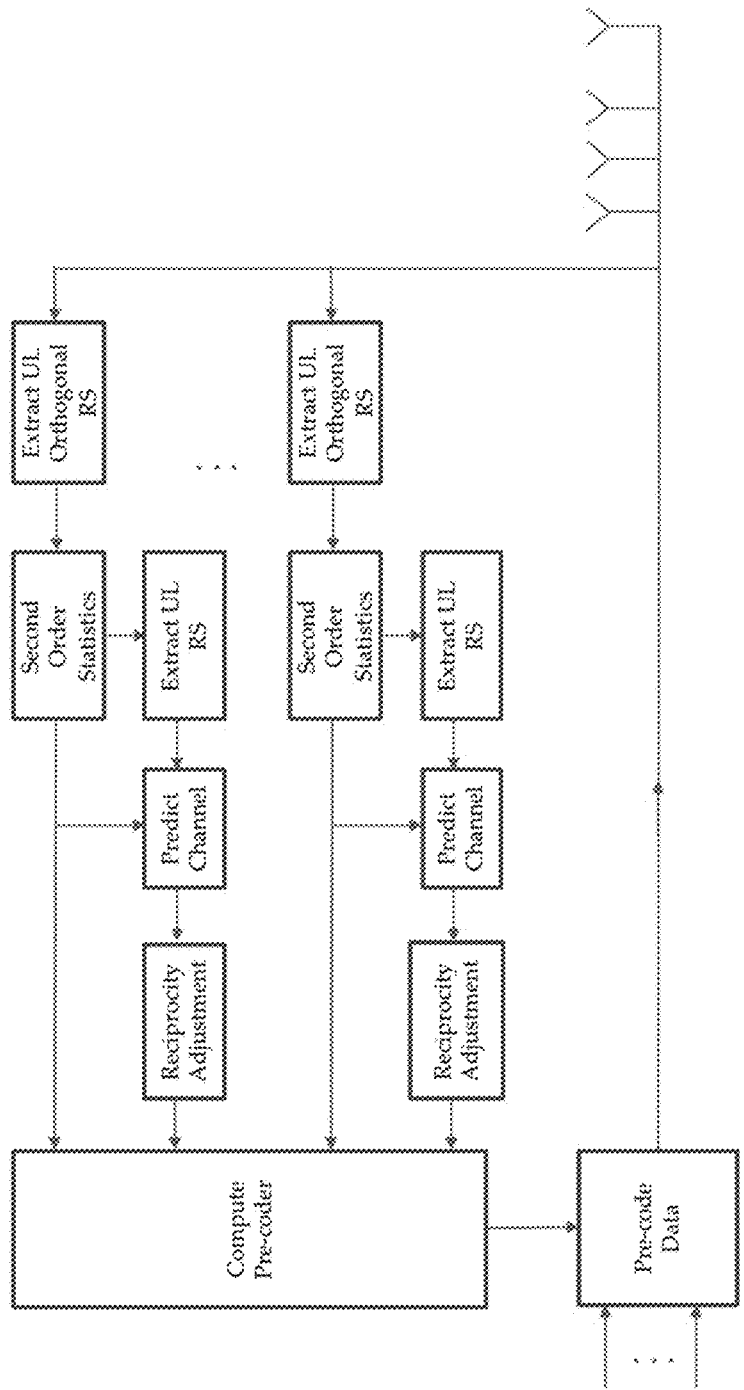
FIG. 81 shows an block diagram for exemplary downlink channel processing at the base station.

FIGS. 77-81 show various embodiments of transmitter and receiver architectures that may be used, in conjunction with the techniques described in Section 1-4. FIG. 77 shows an example of modulation and demodulation architecture for an OTFS modulated communication system. FIG. 78 shows an example modulation and demodulation architecture for a DFT-S OTFS modulated communication system. FIGS. 79 and 80 show examples of an uplink base station turbo receiver architecture and a downlink base station transmitter architecture, respectively. FIG. 81 shows an example block diagram for downlink channel processing at the base station.

In some embodiments, the transmitter shown in FIGS. 77-79 may include:

SVD precoding, which can typically be applied for SU-MIMO in static/slow varying channels, and has the same performance as OTFS.

MU-MIMO that requires linear precoding schemes or their non-linear enhancements. For example, linear precoding schemes include zero-forcing/matched pre-coders that are not capacity-achieving, and non-linear precoders include the THP enhancement which approaches capacity.

The THP enhancement which can be implemented for both OFDM and OTFS. However, OFDM THP complexity is exponential and is not capacity-achieving in the presence of time-frequency selectivity. In contrast, OTFS optimal THP complexity is quadratic and is always capacity-achieving.

UE transmitter is lower complexity for standalone OTFS.

In some embodiments, features of the receiver complexity include:

For capacity-achieving equalizers, OFDM ML (maximum likelihood) complexity grows exponentially with MIMO order/constellation size in the presence of spatial correlations, and OTFS DFE/Turbo complexity grows quadratically.

For more than 2×2 MIMO, OTFS equalizer typically has lower complexity than OFDM.

With precoding: standalone OTFS has lower transmitter & receiver complexity at the UE.

Figure 82:
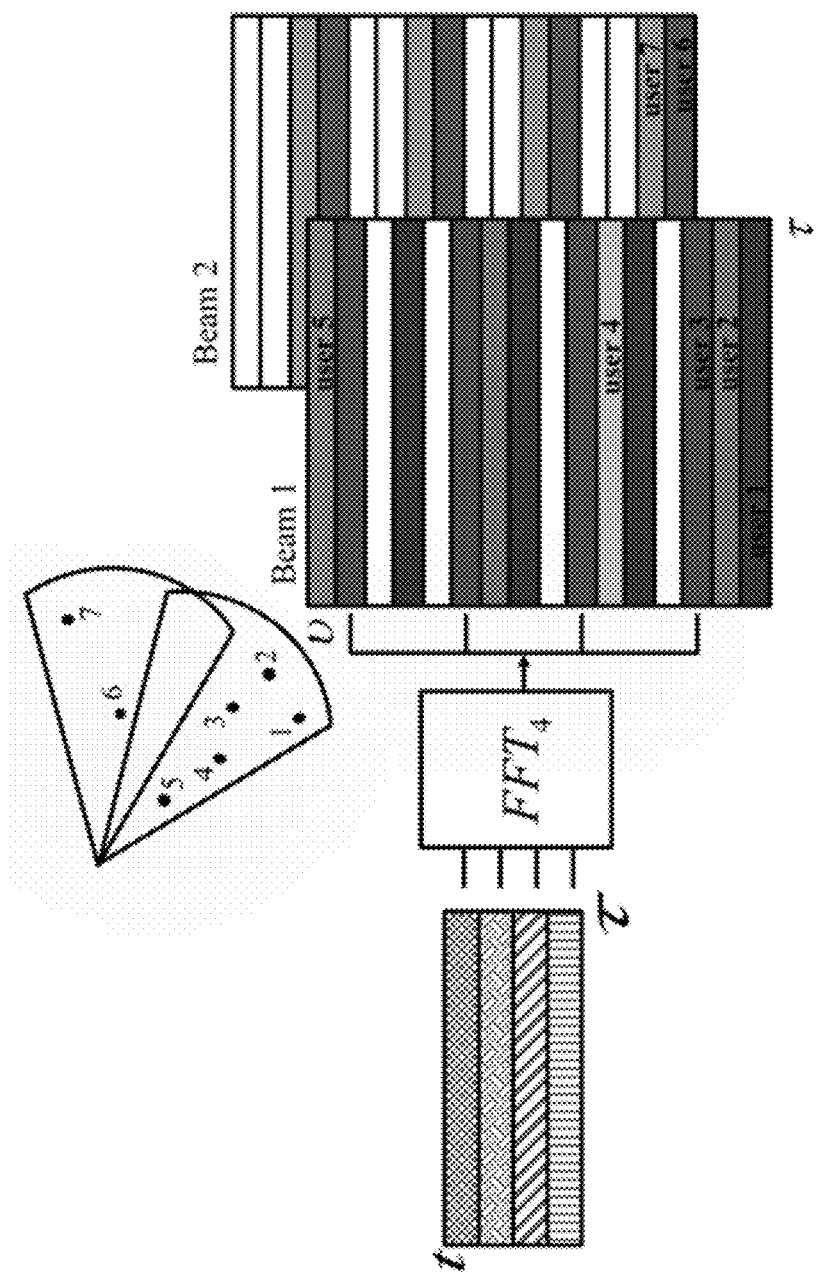
FIG. 82 shows an example of uplink DFT-S OTFS user multiplexing.

FIG. 82 shows an example of uplink DFT-S OTFS user multiplexing. In this example, there are 250 QAM symbols in a physical resource block (PRB), with 2 beams, and 16 PRBs per beam. As shown in FIG. 82, there are 5 users (2 user with 4 PRB, 1 users with 2 PRB, 2 users with 1 PRB) in the first beam and 2 users (2 users with 4 PRB each) in the second beam.

Section 6: Hardware and Antenna Implementations for OTFS

This section covers hardware and antenna implementations that may be used in conjunction with the described transmitter and receiver implementations (Section 5), and include an antenna system comprising a hemispherical dome (Section 6.1), a variable beamwidth multiband antenna (Section 6.2), SWAP (size, weight and power) optimized devices (Section 6.3), and light bulbs with integrated antennas (Section 6.4).

6.1 Antenna System with a Hemispherical Dome

Figure 83:
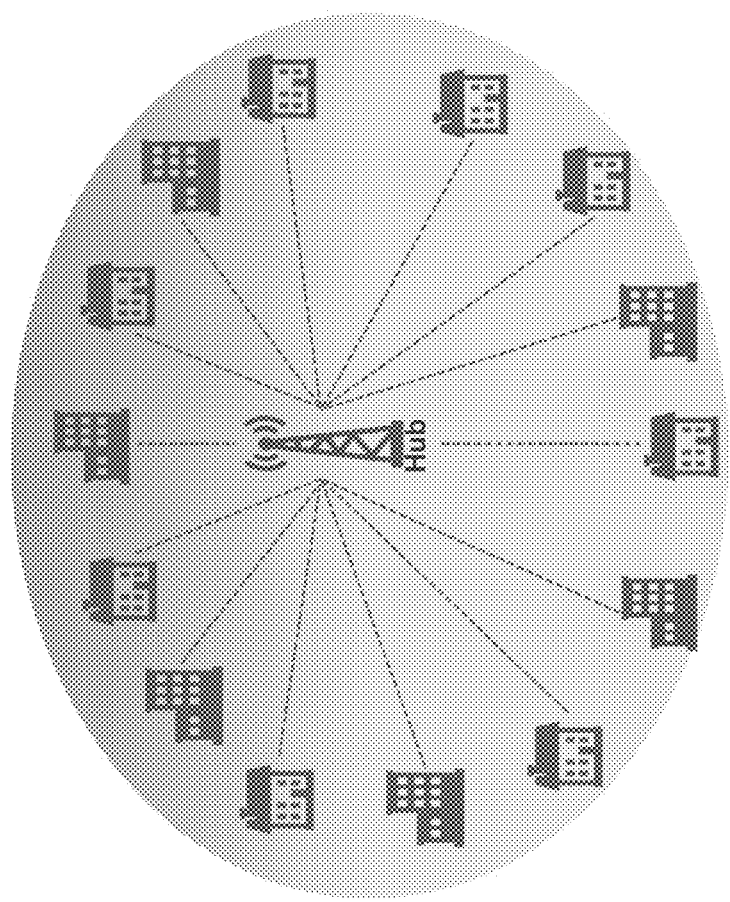
FIG. 83 shows an example of a fixed wireless access system.

FIG. 83 shows an example of a fixed wireless access system. A hub, that includes a transmission facility such as a cell tower, is configured to send and receive transmissions to/from multiple locations. For example, the locations could be user premises or business buildings. As described throughout this document, the disclosed techniques can achieve very high cell capacity fixed wireless access, when compared to traditional fixed access technology. In one advantageous aspect, the transmissions may be performed on a relatively low frequency band that can be used to reduce the cost of deployment. For example, some competing systems have been proposed in the 60 GHz band, while the presently disclosed technologies could be deployed in the 3.5 to 5 GHz frequency band. In another advantageous aspect described in the present document, a pencil beam can be achieved for data transmission and used to multiplex transmissions to/from a large number of users that overlap in other transmission resources, such as time-frequency dimensions.

Figure 84:
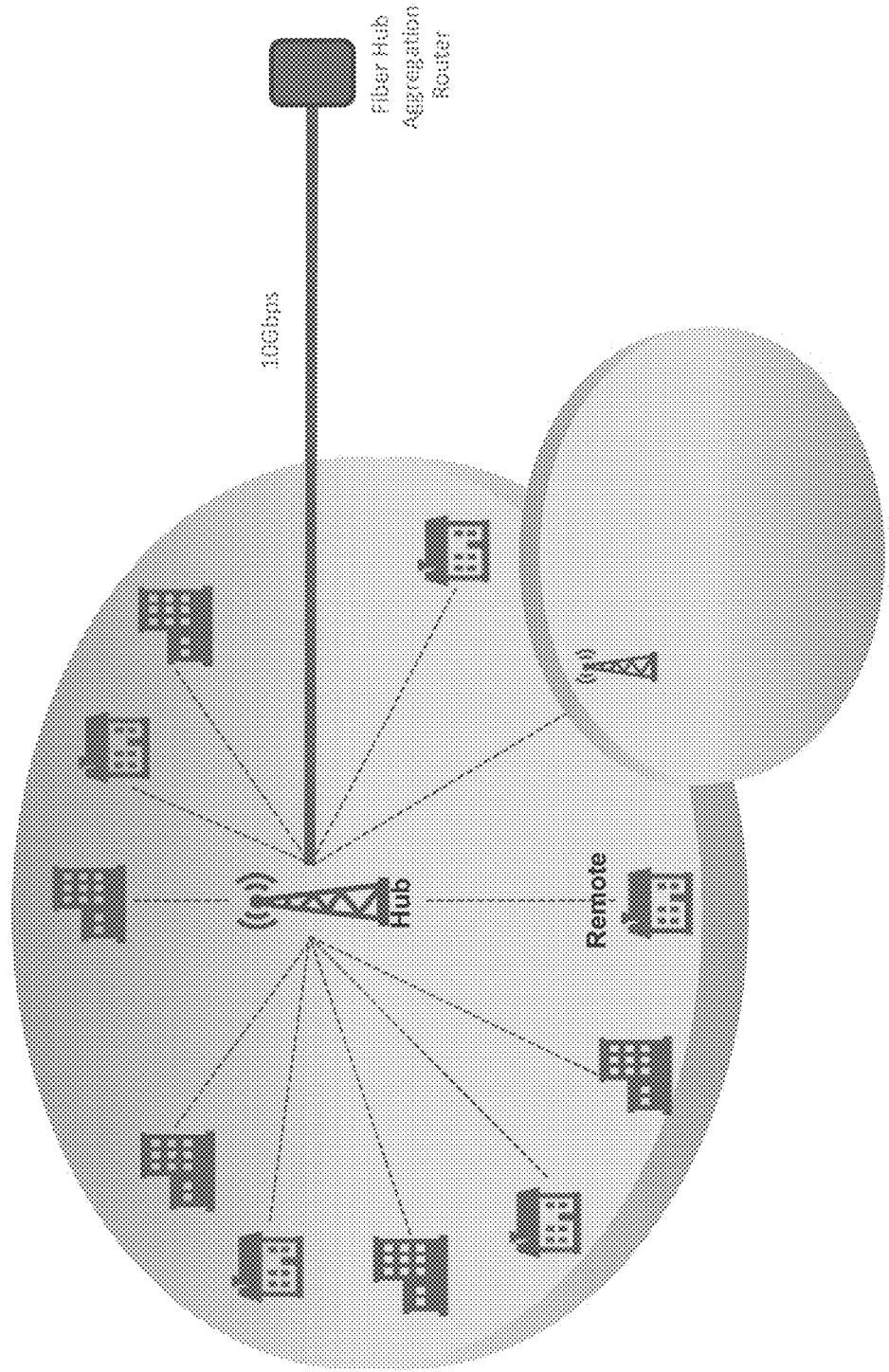
FIG. 84 shows yet another configuration of a fixed wireless access system.

FIG. 84 shows yet another configuration of a fixed access wireless communication system in which hops are used to reach users. For example, one cell tower may transmit/ receive from another cell tower, which would then relay the transmissions between the principle cell tower and the users, thus extending range of the fixed wireless access system. A backhaul may connect the transmission tower with an aggregation router. For example, in one configuration, a 10 Gbps fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point.

As further described in this document, access multiplexing efficiency can be used by combining one or more of the following techniques—delay Doppler multiplexing, time-frequency multiplexing, multiplexing at stream and/or layer level, and angular multiplexing.

Time-frequency multiplexing may be achieved using an approach that divides the time-frequency resource grid for transmission into multiple subgrids. The subgrids may be of equal or different sizes. Each subgrid that is used for signal transmission will be used to carry a two dimensional delay-Doppler array. In some embodiments, the subgrid structure may occupy the entire time-frequency two-dimensional plane. Spacing between subgrids may account for maximum transmission delay and Doppler spread. This document provides additional details of the various multiplexing embodiments.

Figure 85:
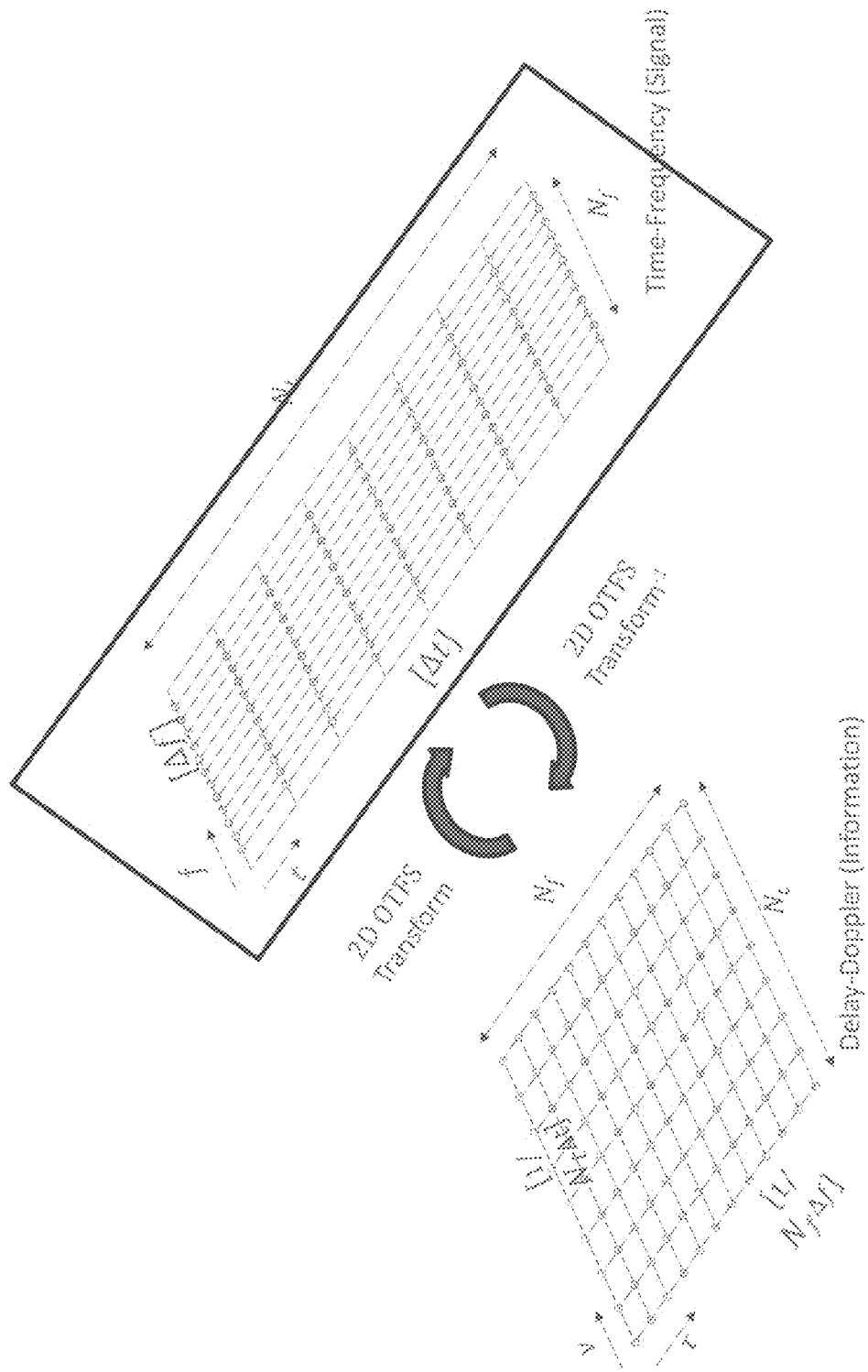
FIG. 85 shows an example of conversion of a signal between the delay-Doppler domain and the time-frequency domain.

FIG. 85 shows a pictorial representation of an example of conversion of a signal between the delay-Doppler domain and the time-frequency domain. The conversion from delay-Doppler domain to time-frequency domain may be achieved using a two-dimensional (2D) OTFS transform. The conversion of signals from time-frequency domain to the delay-Doppler domain may be achieved using an inverse 2D OTFS transform. In this figure, the OTFS QAM symbols reside on a grid or lattice of size N×M (N and M positive integers). The OTFS transform translates these QAM symbols to a lattice in the Time-Frequency plane of size M×N (note the swapping of axes—a result of the OTFS transform, as will be explained below). The OTFS Delay-Doppler lattice and the Time-Frequency multi-carrier lattice are related through a mathematical reciprocity relation intimately linked with the symplectic Fourier transform. In this Time-Frequency domain, one can think of the points along the frequency axis as the equivalent of an OFDM symbol, made up of M subcarriers. In the time dimension, we have the equivalent of N OFDM symbols, where N is a design parameter related to the Doppler spread of the channel.

Another observation worth noting in FIG. 85 is the fine resolution of the Delay-Doppler lattice. In the Delay-Doppler coordinate system, the delay or multipath resolution is given by the inverse of the bandwidth and the Doppler resolution is given by the inverse of the OTFS symbol time or observation time.

To summarize, in OTFS information symbols are indexed by points on a lattice or grid in the Delay-Doppler domain. Through the OTFS Transform each QAM symbol weights a 2D basis function defined in the Time-Frequency domain. The frequency domain samples at each time are transformed into time domain waveforms using filter banks.

Examples of Time Frequency Multiplexing

Figure 86:
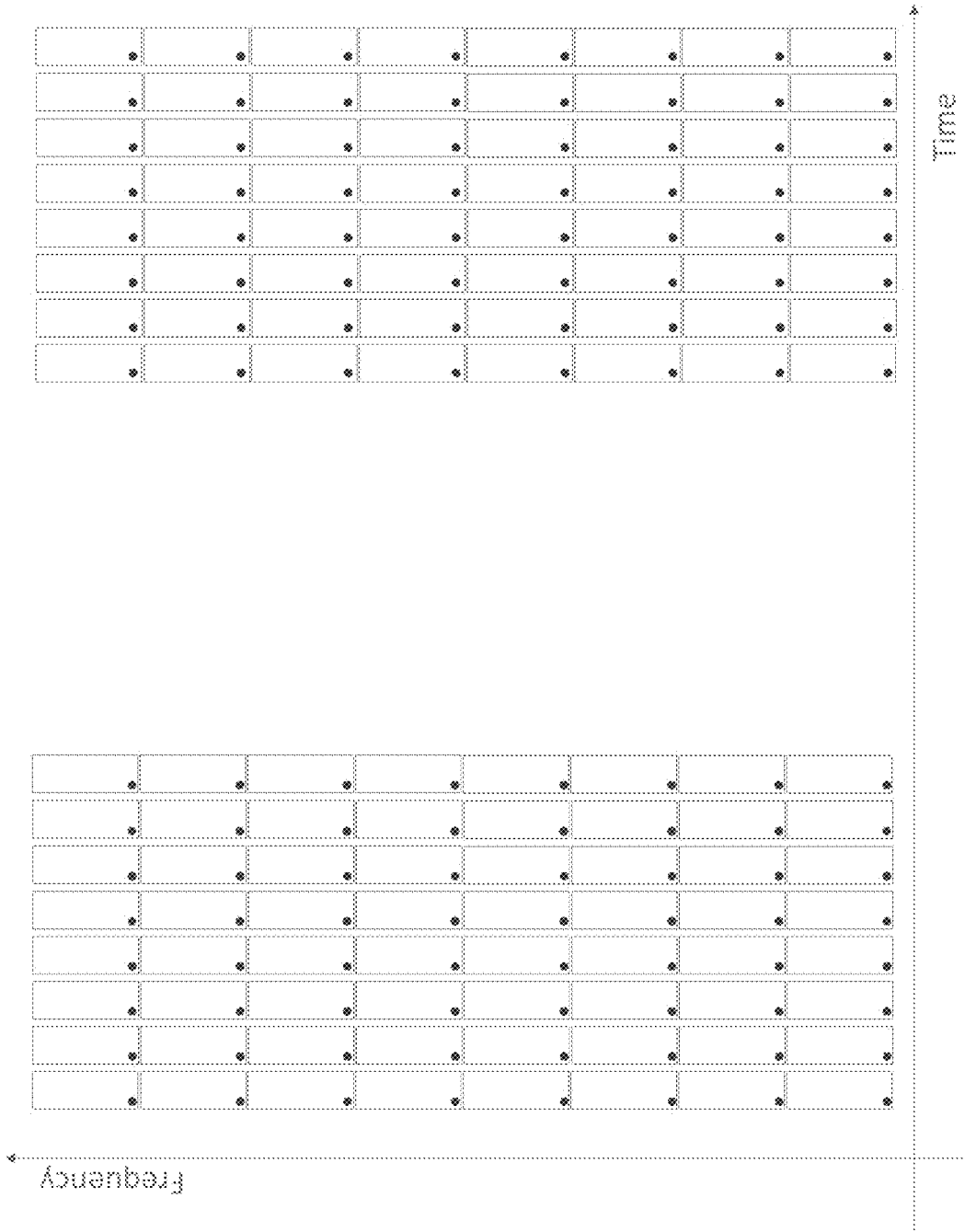
FIG. 86 shows an example of a time frequency grid on which user data is assigned subgrids of resources.

FIG. 86 shows an example of a time frequency grid on which user data is assigned subgrids of resources. In the depicted embodiments, subgrids are equal-sized and a 64×8 array spans the entire frequency at 1 msec time granularity per subgrid. In some embodiments, each subgrid may be used to carry transmission bursts of 64 to 512 bytes.

Figure 87:
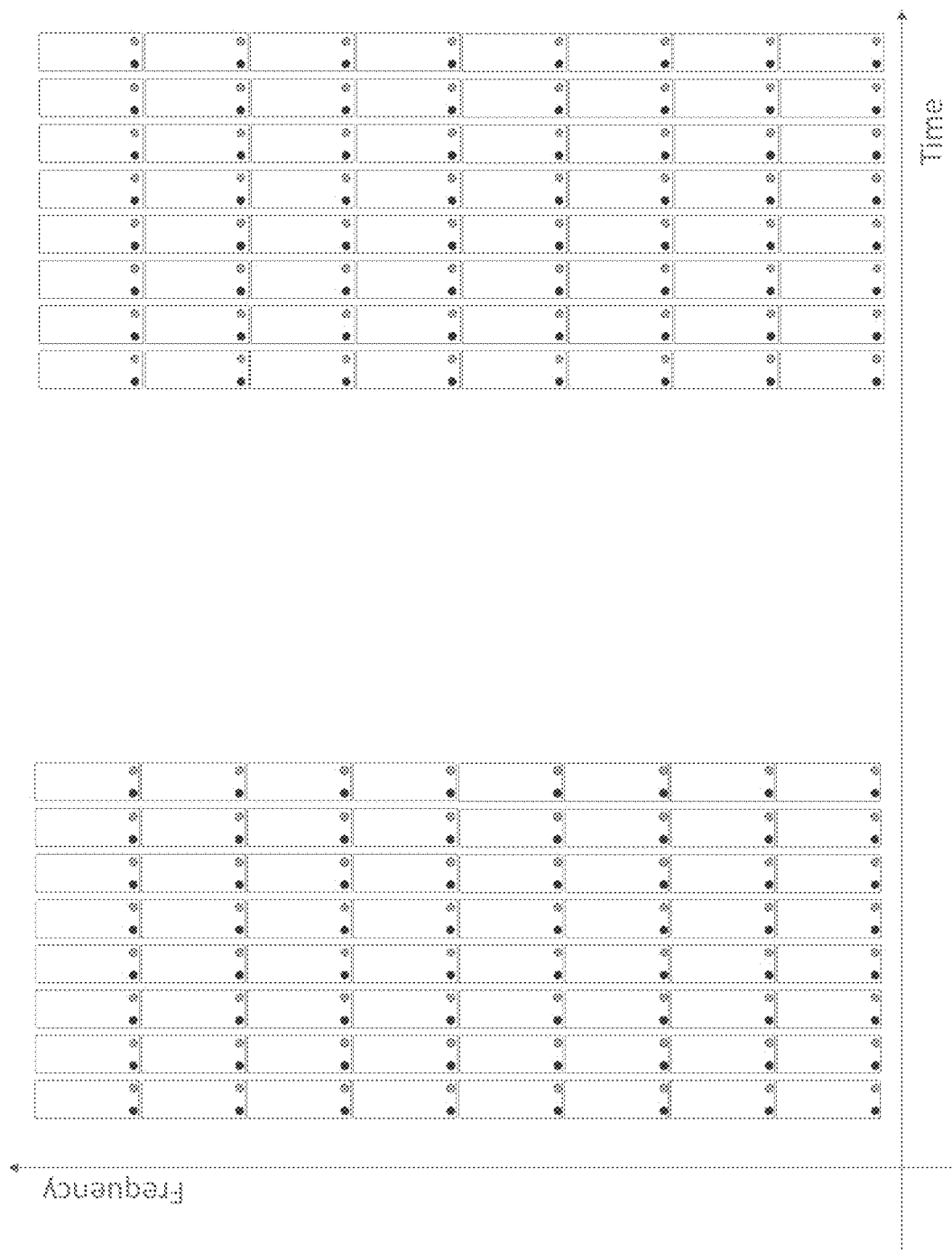
FIG. 87 shows an example of a time frequency grid on which user data is assigned to two subgrids of resources.

FIG. 87 shows an example of a time frequency grid on which user data is assigned to two subgrids of resources. As a result of using different time-frequency resources for the two users, data capacity can be doubled, while the use of subgrid is still sparse. The assignments to two users are illustrated via two different solid circles in each subgrid, representing the transmission resources for the users.

Figure 88:
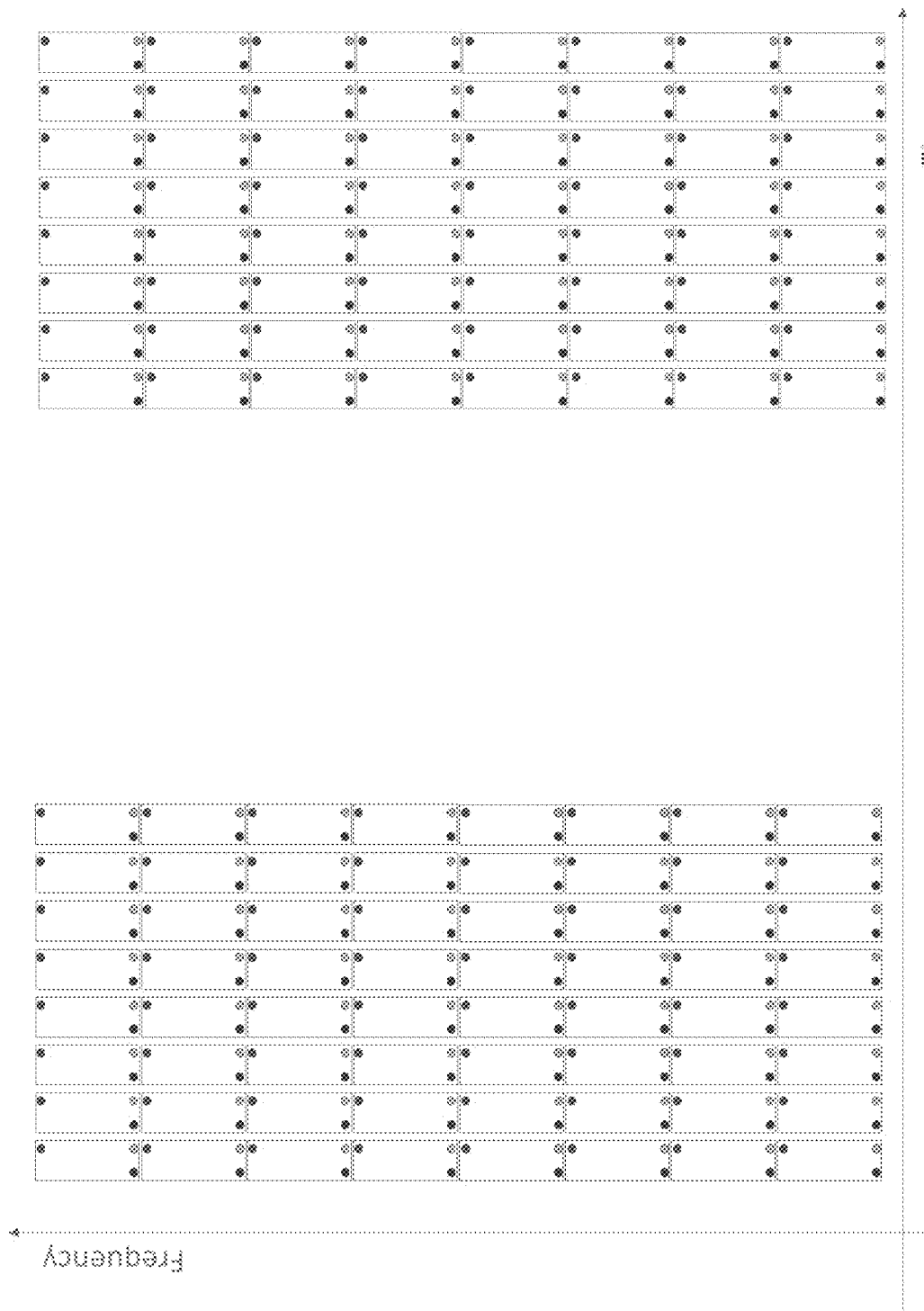
FIG. 88 shows an example of a time frequency grid on which user data is assigned to three subgrids of resources.

FIG. 88 shows an example of a time frequency grid on which user data is assigned in three subgrids of resources.

Figure 89:
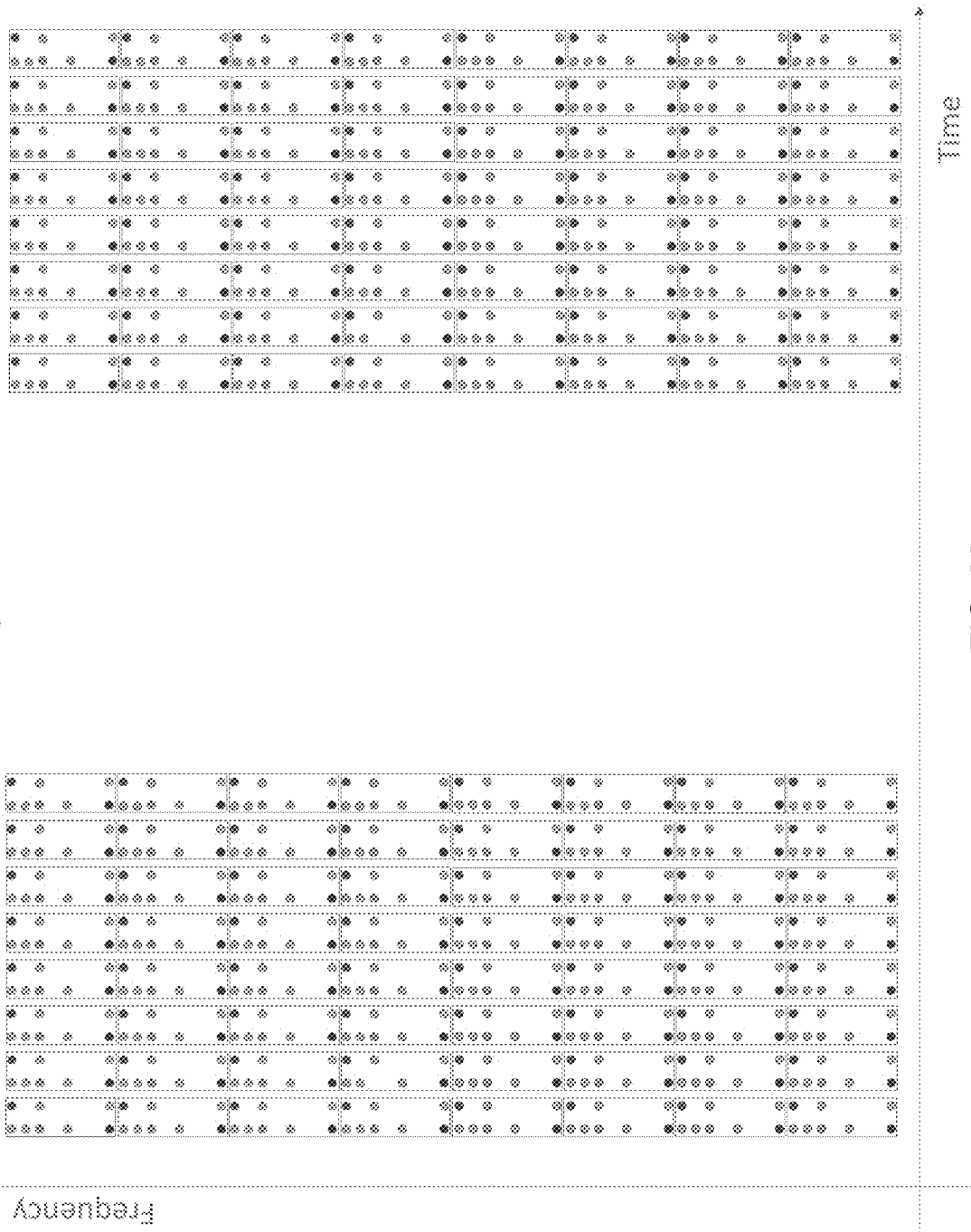
FIG. 89 shows an example of a time frequency grid on which user data is assigned to eight subgrids of resources.

FIG. 89 shows an example of a time frequency grid on which user data is assigned to eight subgrids of resources.

Figure 90:
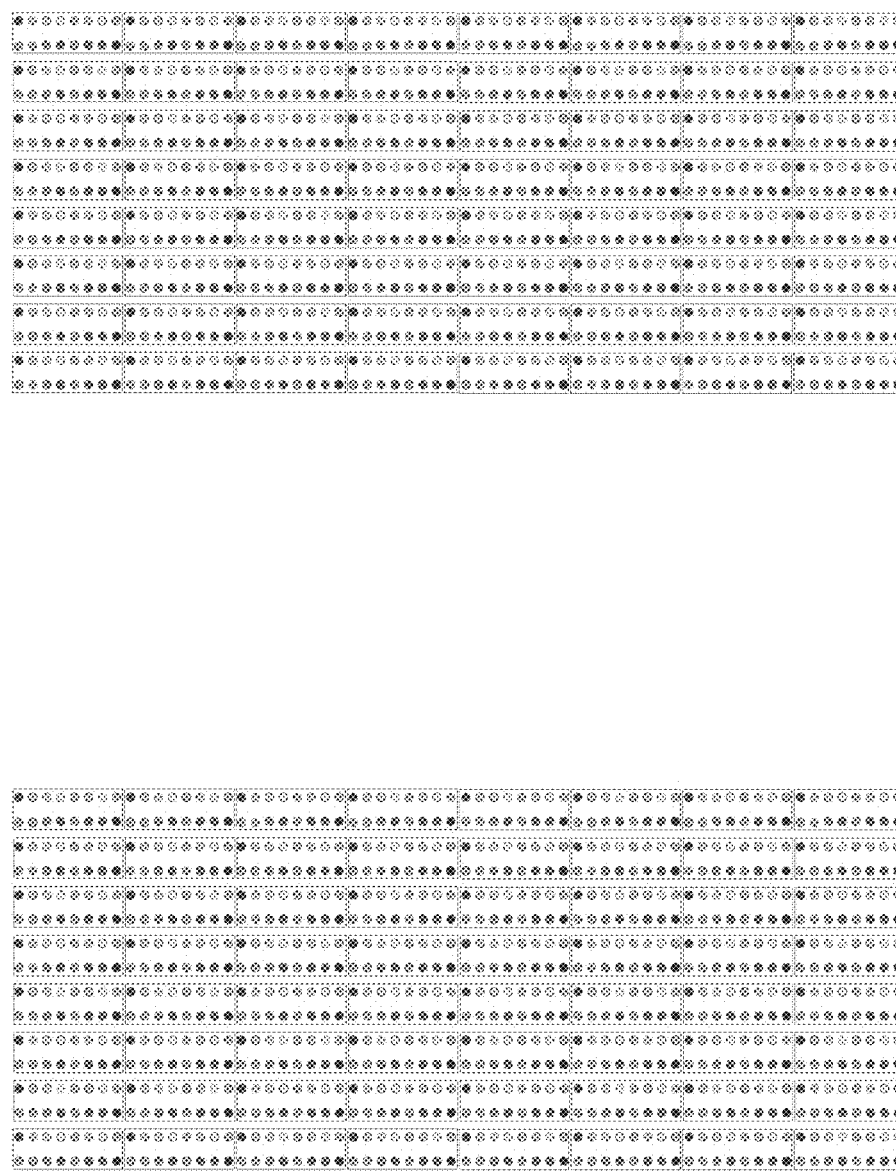
FIG. 90 shows an example of a time frequency grid on which user data is assigned to sixteen subgrids of resources.

FIG. 90 shows an example of a time frequency grid on which user data is assigned to sixteen subgrids of resources. In this embodiment, the time frequency grid comprises 512×16 array, with 16 subgrids corresponding to data transmissions (64×8).

Figure 91:
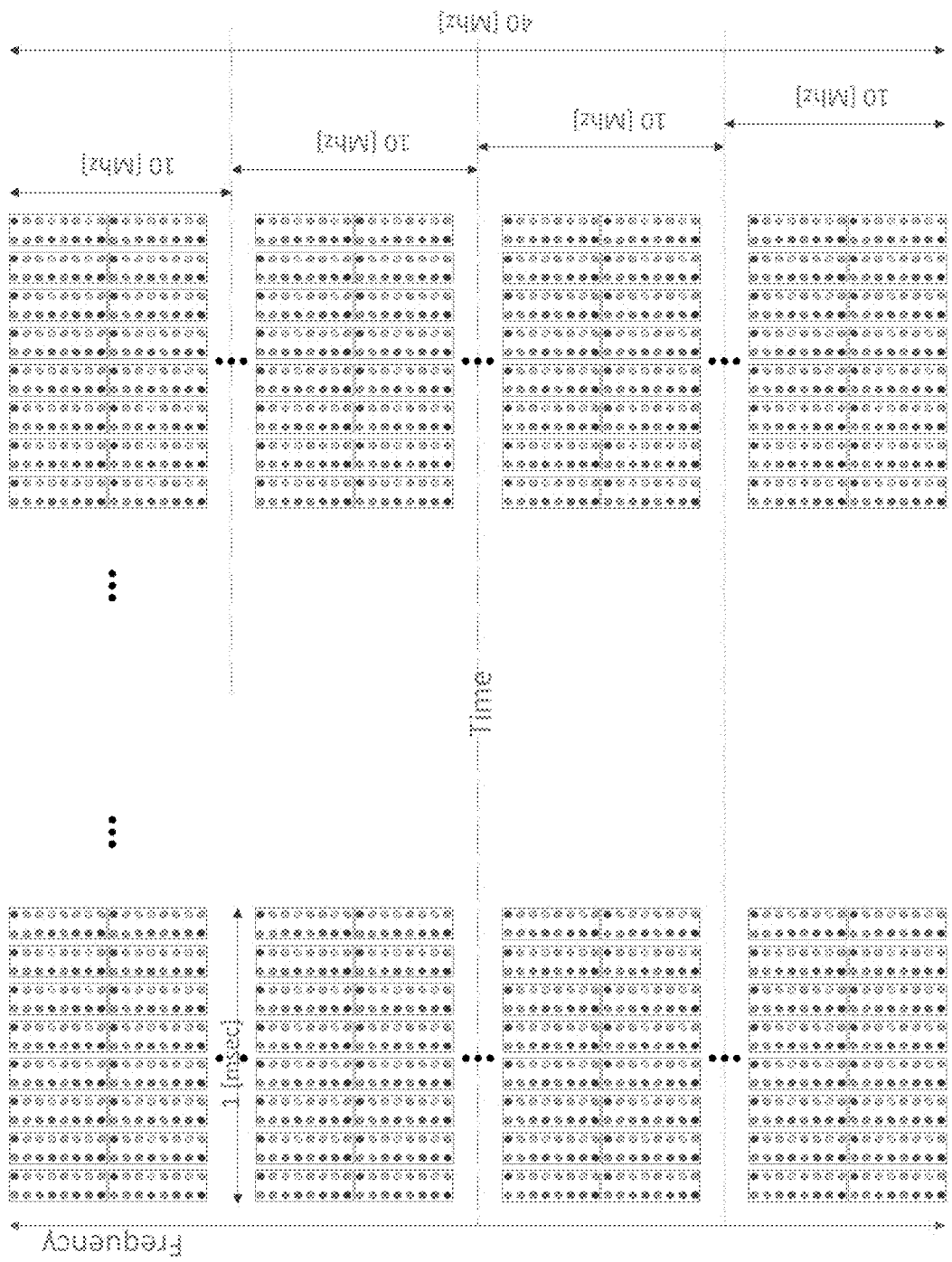
FIG. 91 shows an example of time-frequency resource assignment to four streams with 32 subsectors of transmission.

FIG. 91 shows an example of time-frequency resource assignment to four streams with 32 subsectors of transmission. In this embodiment, signal transmissions could be organized using 32 subsectors and 4 streams, divided into 4 subbands that are 10 MHz wide each, and corresponding to 1 msec transmission time interval (TTI) in a time division duplexing (TDD) transmission scheme.

Figure 92:
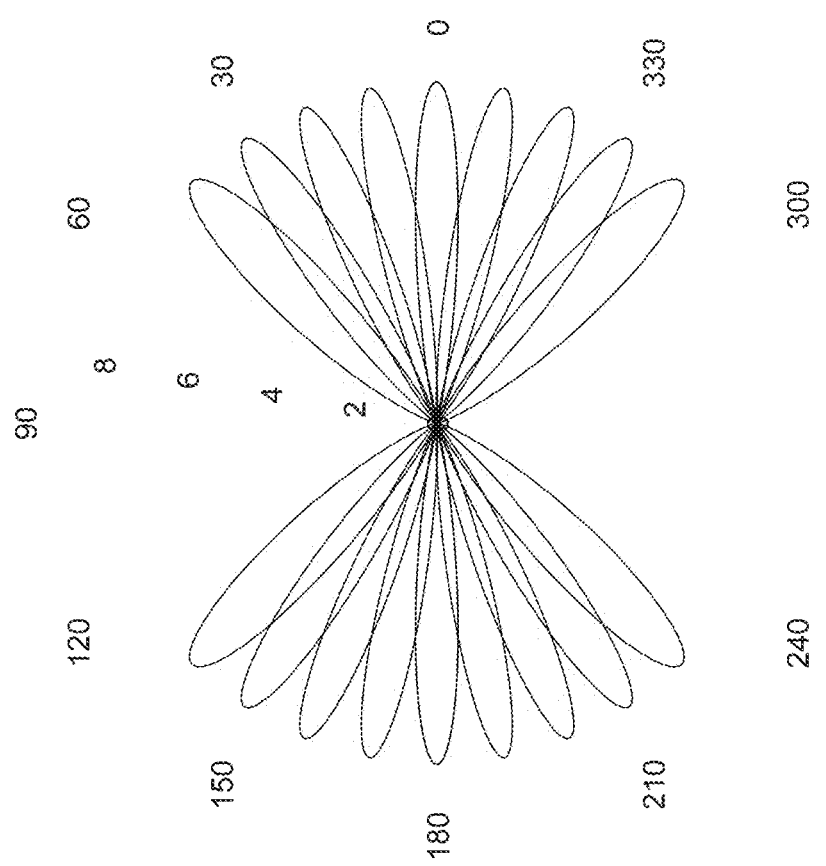
FIG. 92 shows an example of a beam pattern.

Examples of Spatial Multiplexing, Including Steam/Layer and Angular Multiplexing FIG. 92 shows an example of a beam pattern. One of the advantageous aspects of the disclosed technology is that inter-beam interference can be managed such that only two neighboring beams may potentially cause interference to each other. In this regard, the angular spread of transmission of a base station is controlled to be small. As a result of such planning, during signal processing stage to recover signals, the MIMO matrix of the received signal may be represented using a true tri-diagonal or a block-diagonal matrix. In other words, the off-diagonal elements may be represented by zeroes without having to suffer a quality loss due to rounding assumption. FIG. 92 shows an example of a beam pattern that can be used in such configurations.

Figure 93:
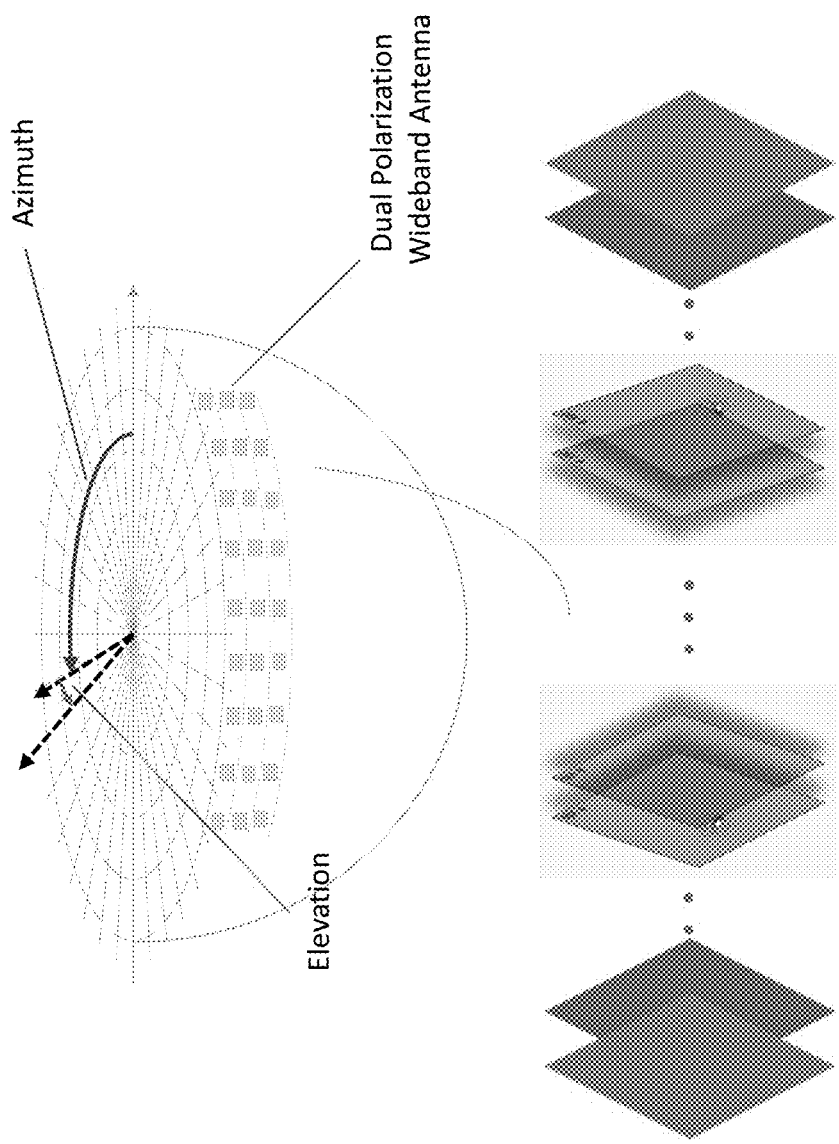
FIG. 93 shows an example of a dual polarization wideband antenna beam pattern.

FIG. 93 shows an example of a dual polarization wideband antenna beam pattern. As depicted, the antenna beam pattern could be controlled along three dimensions—elevation, azimuth and polarization plane, to achieve denser transmission of data (due to three dimensional multiplexing). In the depicted embodiment, a number of antenna elements are used in an array, with one dimension of the array controlling the azimuth of the transmission beam, another dimension controlling the elevation and each wideband antenna achieving dual MIMO for each sector (quadrant of coverage). Each antenna may be a dual polarization wideband antenna. Each antenna may be conformal to the hemispherical shape of the dome to avoid signal distortions and for mechanically snug fitting. The polarization aspect is pictorially depicted in the bottom part of the picture.

Figure 94:
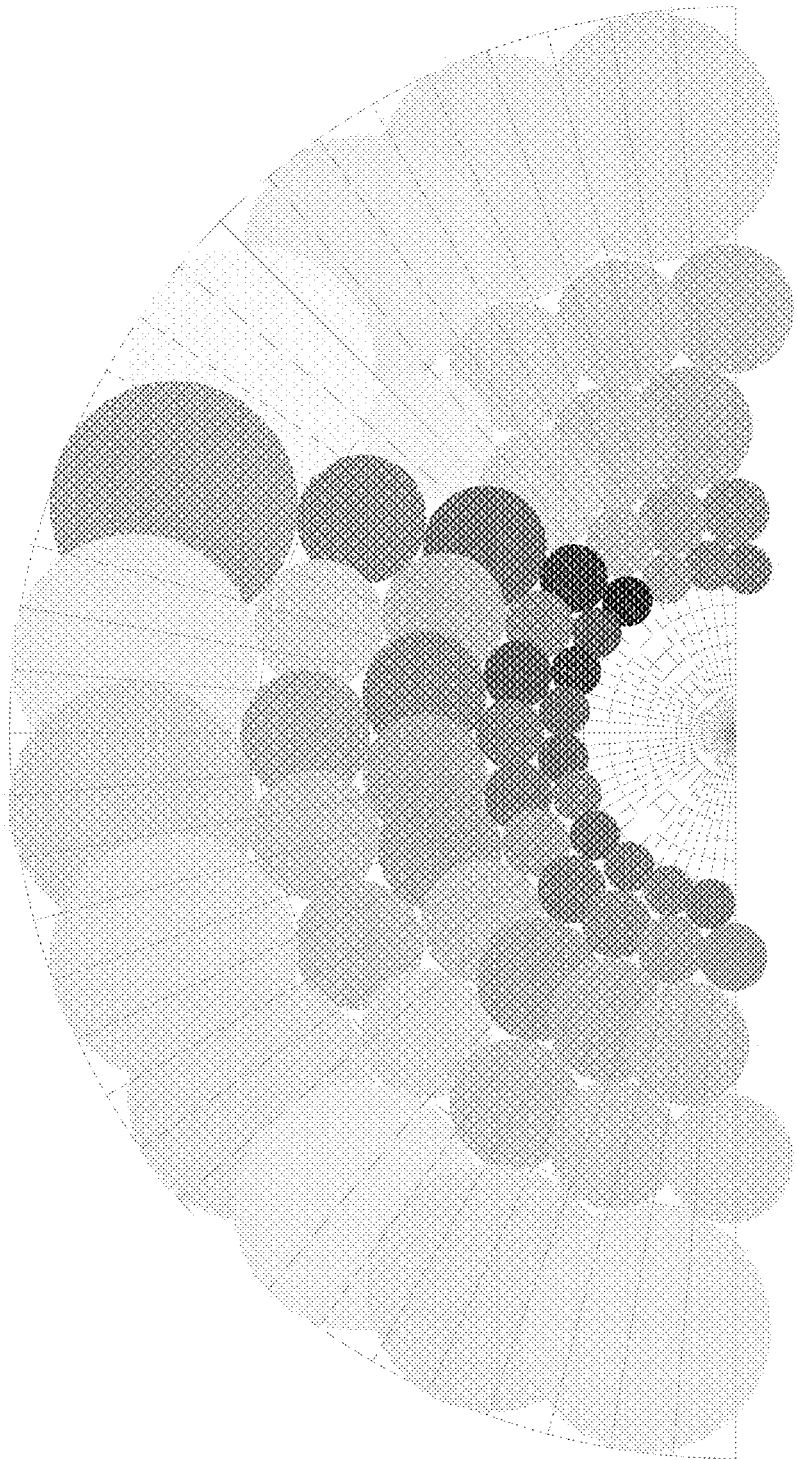
FIG. 94 shows the beam pattern footprint of an example of a 24 azimuth×5 elevation antenna beam.

FIG. 94 shows the beam pattern footprint of an example of a 24 azimuth×5 elevation antenna beam. As can be seen the coverage is uniform throughout the cell, with the antenna beam patterns arranged generally to be circular with radii growing outward from the access point or transmitter.

Figure 95:
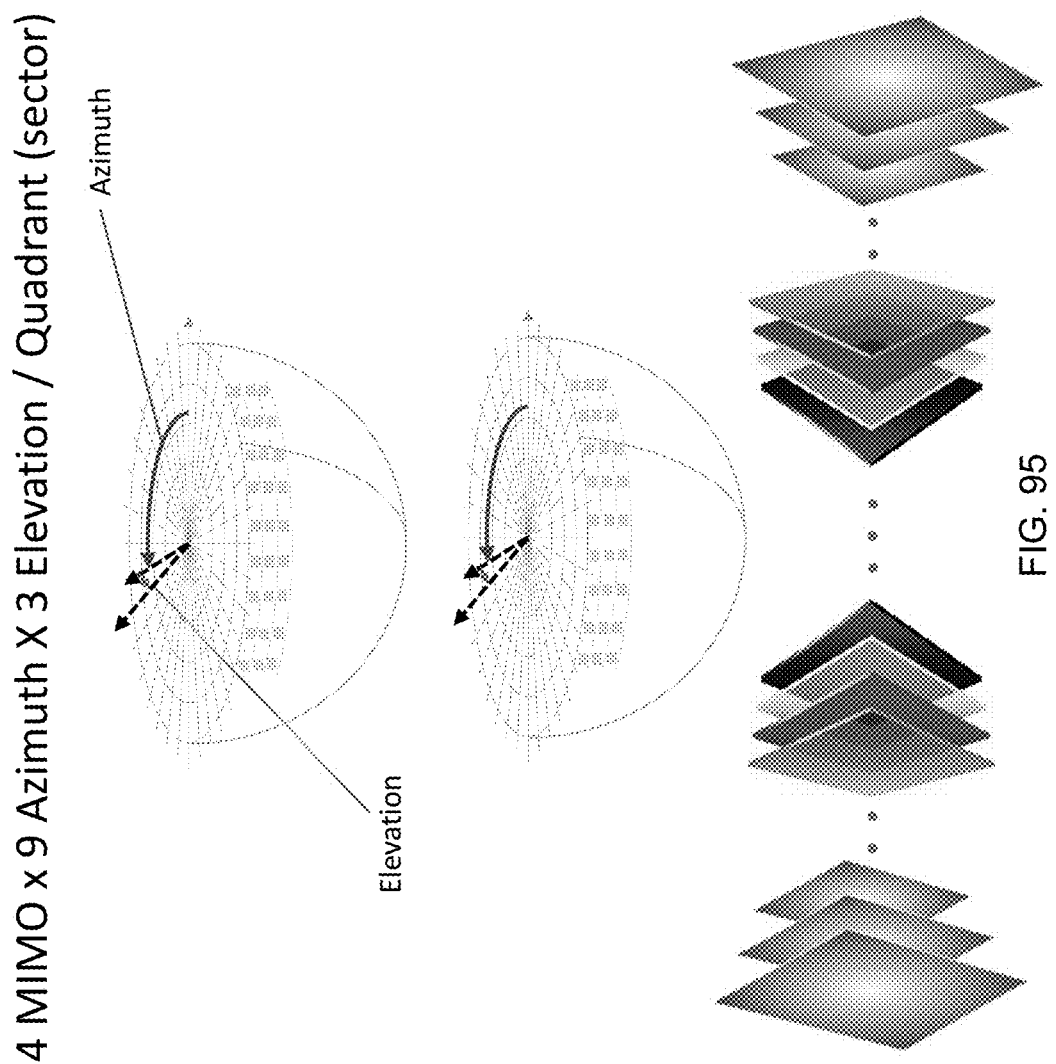
FIG. 95 shows an example of a 4 MIMO antenna beam pattern.

FIG. 95 shows an example similar to that depicted in FIG. 93, except that a 4 MIMO antenna configuration is used. As depicted in the bottom portion of the drawing, four layers of transmission may be used due to the antenna diversity. As shown, a two dimensional array of antenna elements (9 azimuth×3 elevation) provides a control over antenna beam pattern ubiquitously in the space.

Figure 96:
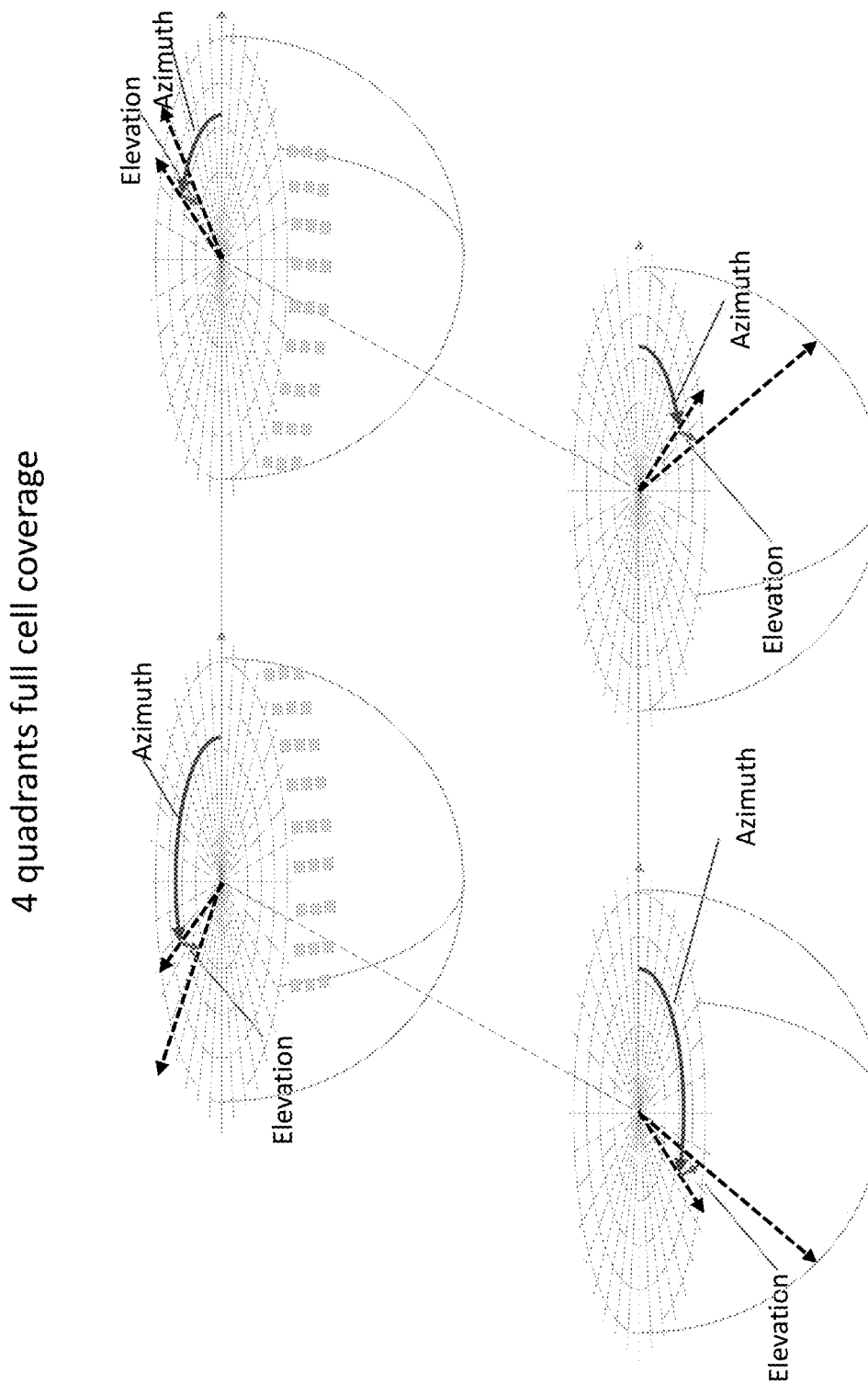
FIG. 96 shows an example of an antenna deployment to achieve full cell coverage using four quadrant transmissions.

FIG. 96 shows an example of an antenna deployment to achieve full cell coverage using four quadrant transmissions. Each antenna may provide coverage to one quadrant of a full 360 degree area, with collectively, all antennas together may provide uniform coverage throughout an entire 360 degree area.

Figure 97:
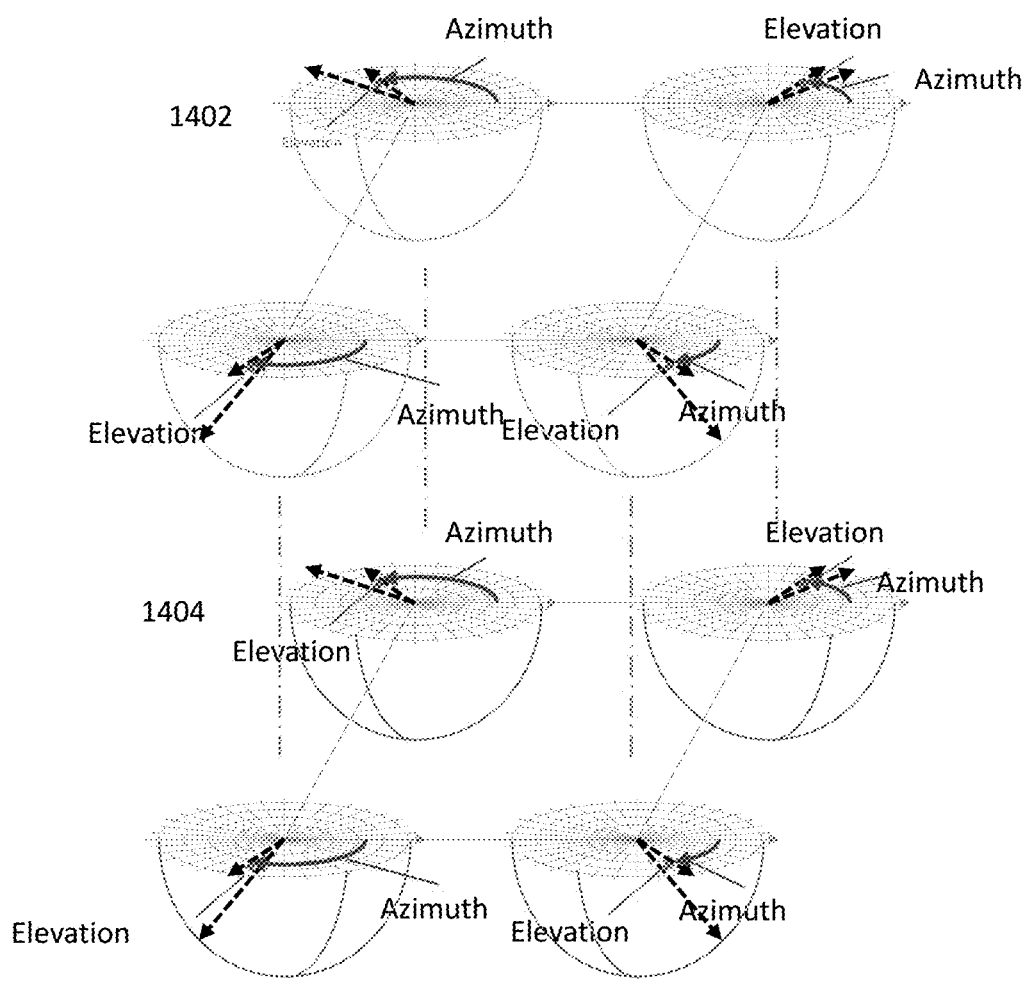
FIG. 97 shows an example of an antenna deployment to achieve full cell coverage using four quadrant transmissions in a 4 MIMO system.

FIG. 97 shows an example of an antenna deployment to achieve full cell coverage using four quadrant transmissions in a 4 MIMO antenna configuration system. As depicted, two pairs of four hemispherical antennas may be used, with each group of four antennas having a corresponding similar coverage orientation (e.g., patterns 1402 and 1404).

Figure 98A:
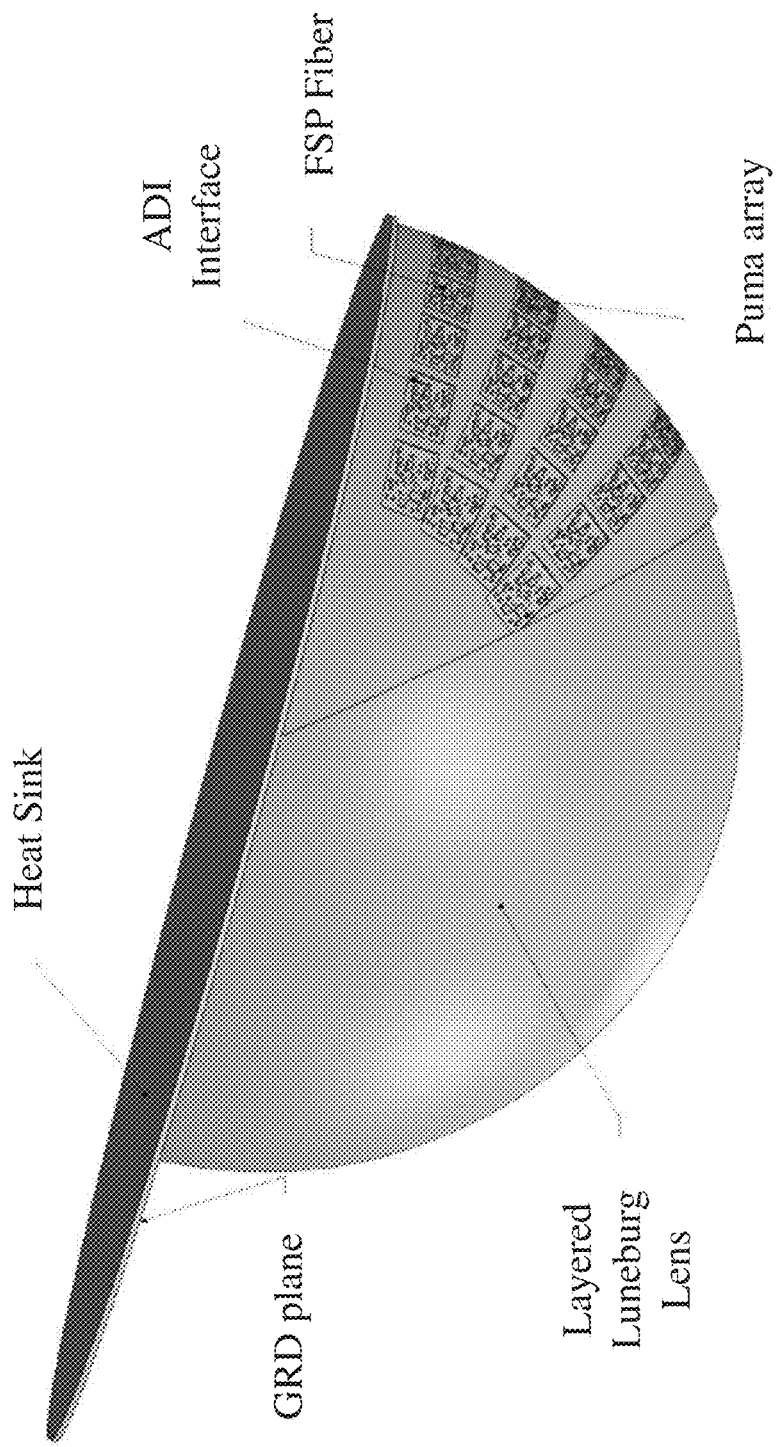
FIG. 98A illustrates an example embodiment of an antenna.

FIG. 98A illustrates an example embodiment of an antenna system. In the depicted embodiment, a Luneburg antenna configuration is used. Is shaped to be half-spherical with a generally planar base and a dome attached to the base. The antenna includes a hemispherical layered Luneburg lens, with a planar ultrawideband phased array (PUMA) antenna array arranged spherically near the spherical surface of the antenna. The planar portion is the ground plane and may include a heat sink for thermal regulation. The puma array is shown to have ADI interface and an interface with a high bandwidth network connection such as a fiber. The layered Luneburg lens may have dielectric layers of varying dielectric constants, arranged to provide focal point accuracy of transmission/reception.

Figure 98B:
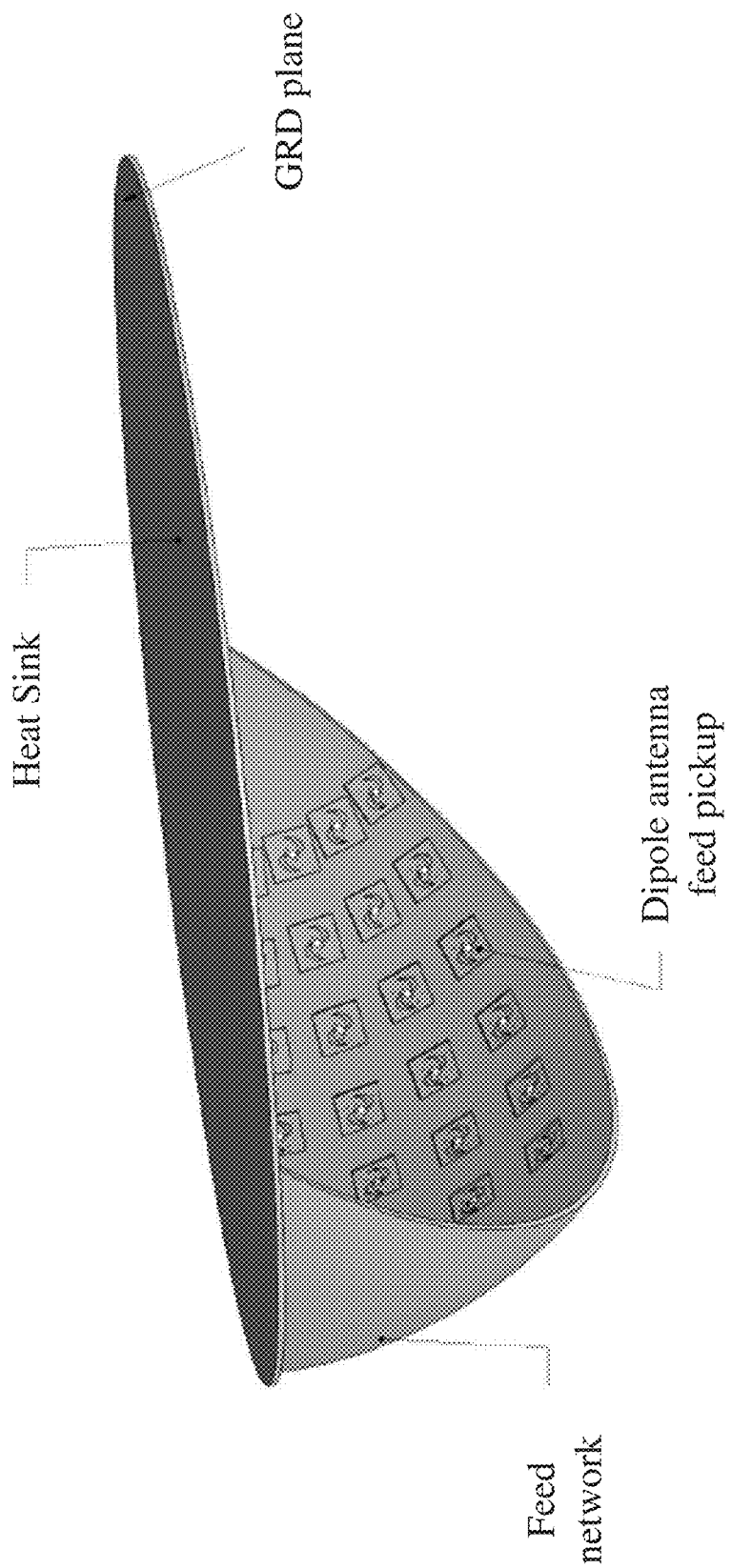
FIG. 98B illustrates an example embodiment of an antenna.

FIG. 98B illustrates another example embodiments of an antenna in which dipole antenna are used along the spherical surface of the hemispherical antenna. A feed network may be ohmically coupled to the dipole antenna feed to carry signals of transmission/reception.

Figure 98C:
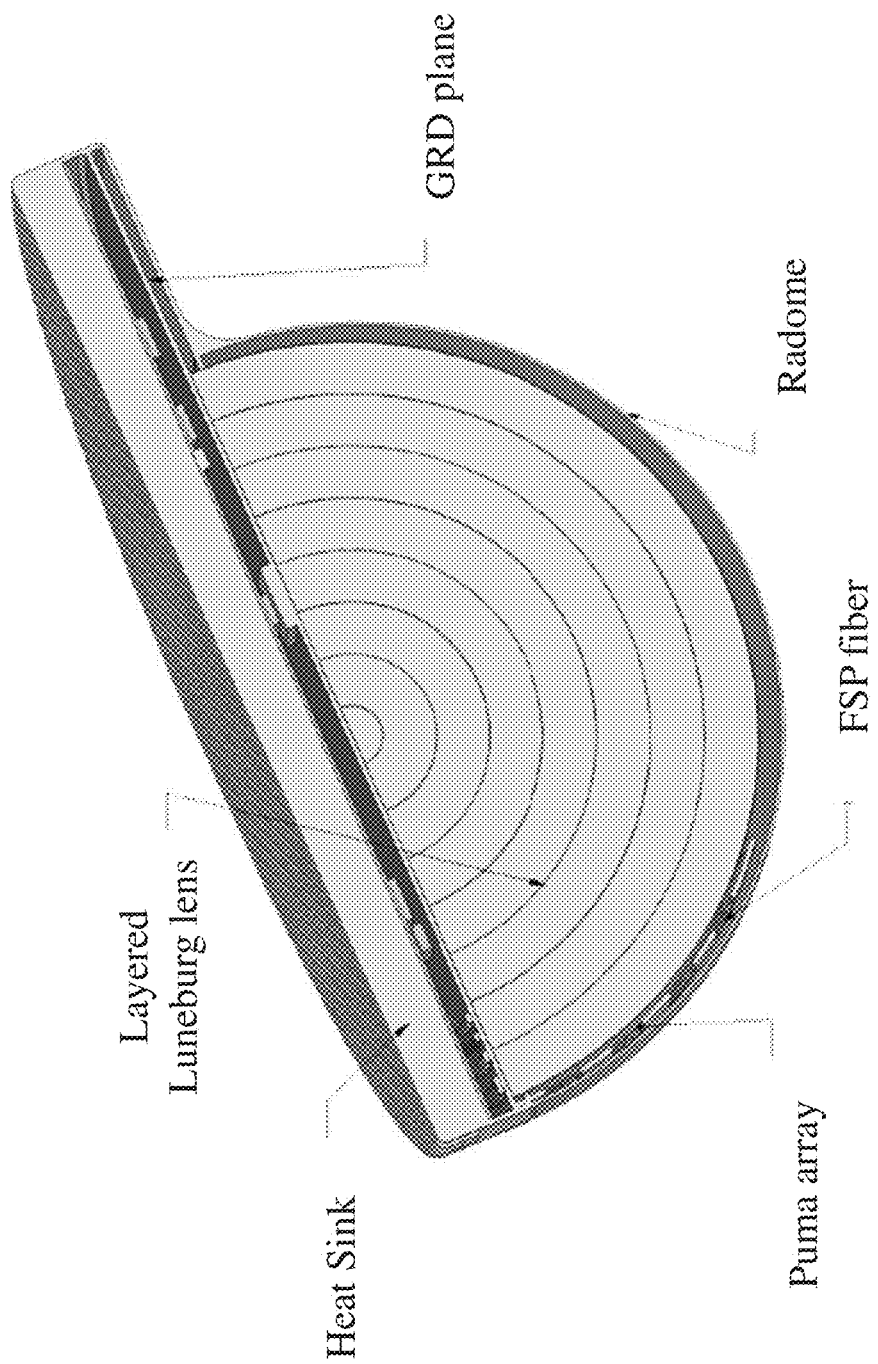
FIG. 98C illustrates an example embodiment of an antenna.

FIG. 98C illustrates an example embodiments of an antenna which shows a cut-out of the antenna element, showing a heat sink at the base of the antenna, with the hemispherical dome comprising layered Luneburg lens above the ground plane, a puma antenna array coupled to a fiber connection, and enclosed within a radome. The layered nature of antenna radome (e.g., layered Luneburg lens) is visible in this cut-out.

Figure 98D:
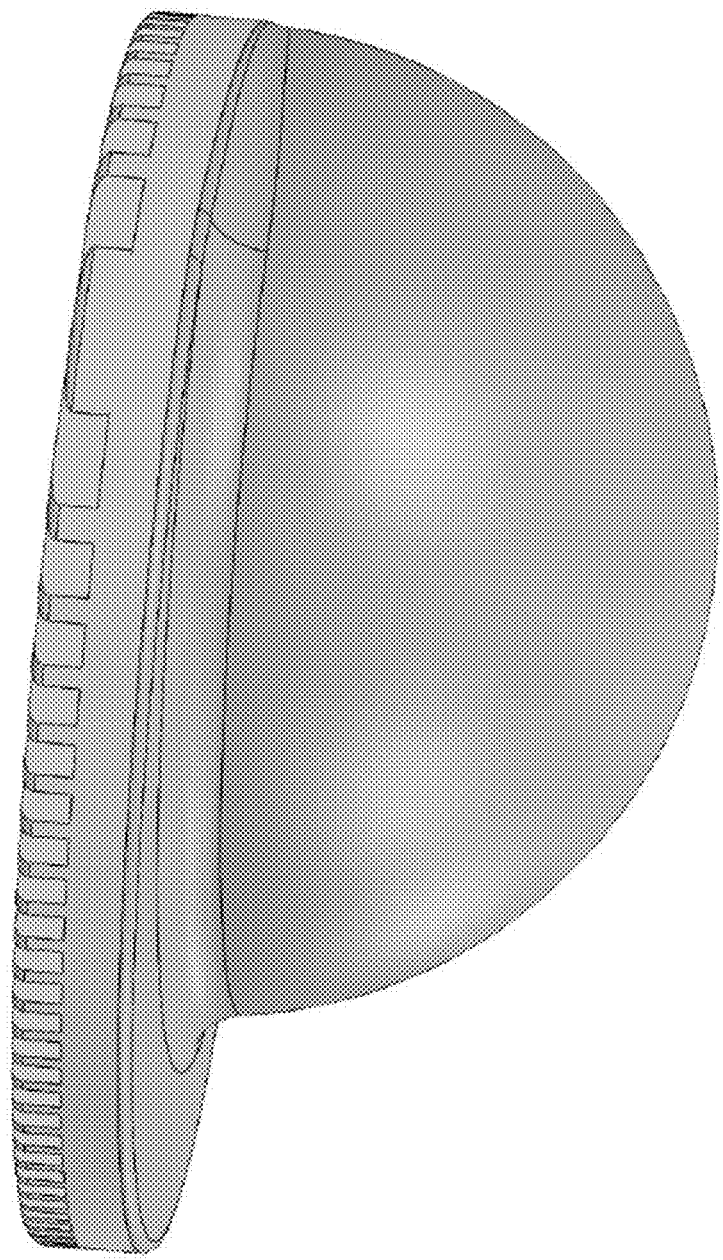
FIG. 98D illustrates an example embodiment of an antenna.

FIG. 98D illustrates an example embodiment of an antenna with the radome enclosure hiding the electronics and other parts of the antenna from view and from external environment.

Figure 99A:
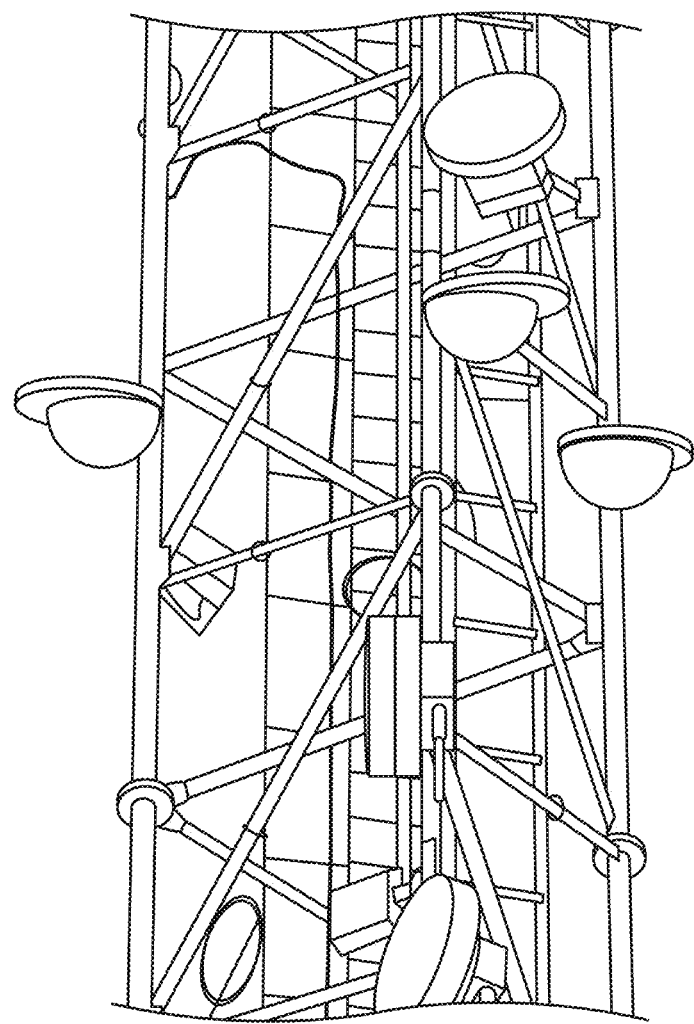
FIG. 99A shows an example of a cell tower configuration.

FIG. 99A shows an example of a cell tower configuration. A cell tower with existing antenna element deployments can be fitted with the disclosed antenna elements as depicted in the figure. In the depicted example, four antenna systems may be fitted to provide four quadrant coverage, thereby the cell tower providing a complete 360 degree coverage area.

Figure 99B:
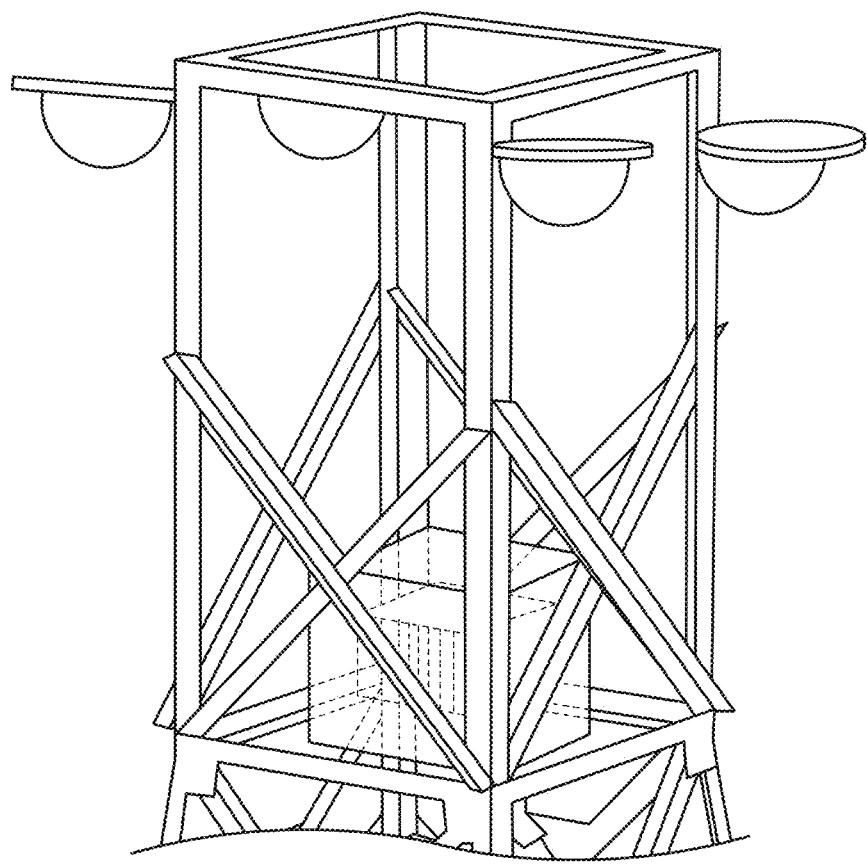
FIG. 99B shows an example of a cell tower configuration.

FIG. 99B shows an example of a cell tower configuration. Antenna deployment is shown along with the placement of electronics that implements the base station function functionality (central rectangular solid box) in a fixed wireless system. In the depicted embodiment, four antenna systems are used and could be configured to provide four quadrant coverage.

Figure 99C:
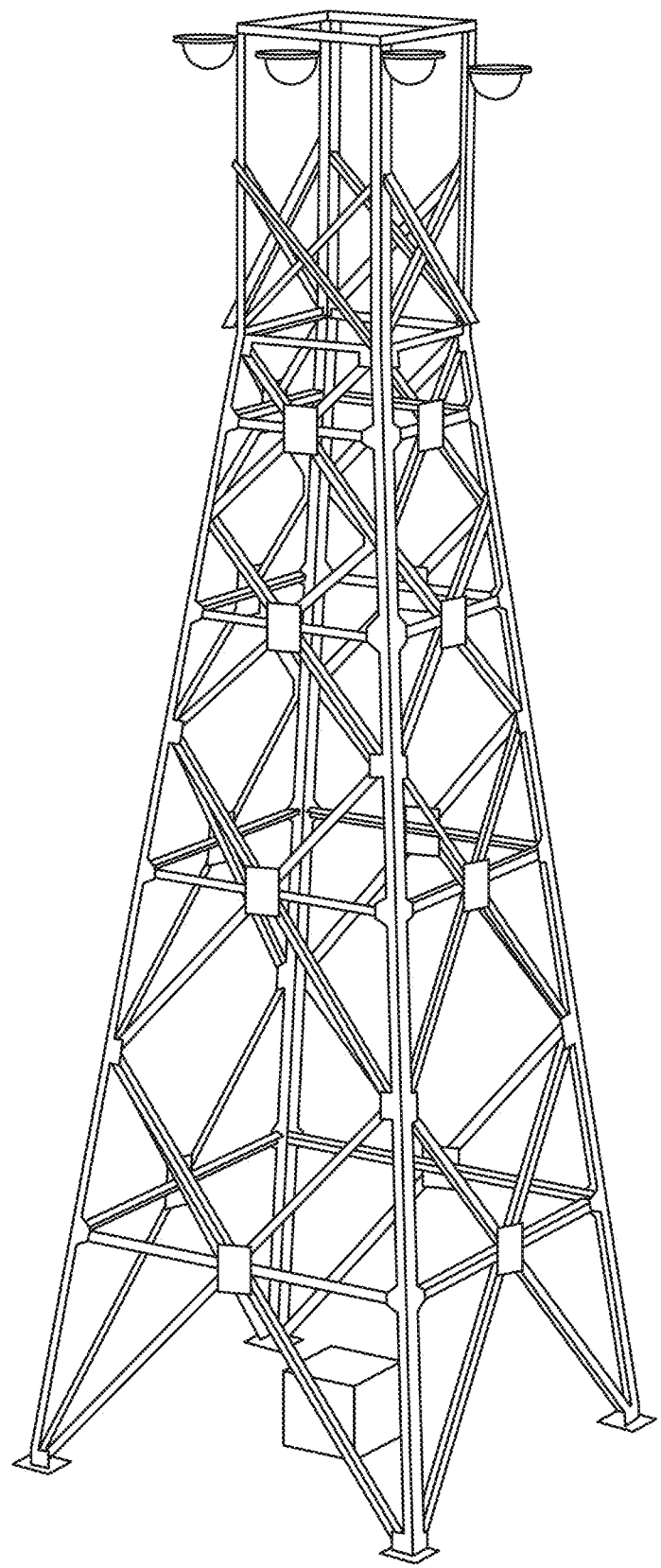
FIG. 99C shows an example of a cell tower configuration.

FIG. 99C shows yet another cell tower configuration in which base station electronics is located at a ground level for easy access by personnel, while antenna elements are positioned towards or at very top of the antenna tower.

The disclosed techniques may support up to 1000/b/sec/Hz peak PHY rate using TDD, a 1 msec TTI, a 4 MIMO antenna configuration with 32 beams (subsectors), and 40 MHz divided into four 10 MHz subbands. Data transmissions may be organized into 16 subgrids of a 64×8 array, with each subband supporting 64 to 512 bytes of data burst every millisecond per subband, depending on the constellation used for modulation. Put differently, 8K logically distinct data payloads could be simultaneously transmitted (or received), providing a 46 Gbps peak raw throughput rate per cell (32×4×40×10×0.9 Mbps).

Figure 100:
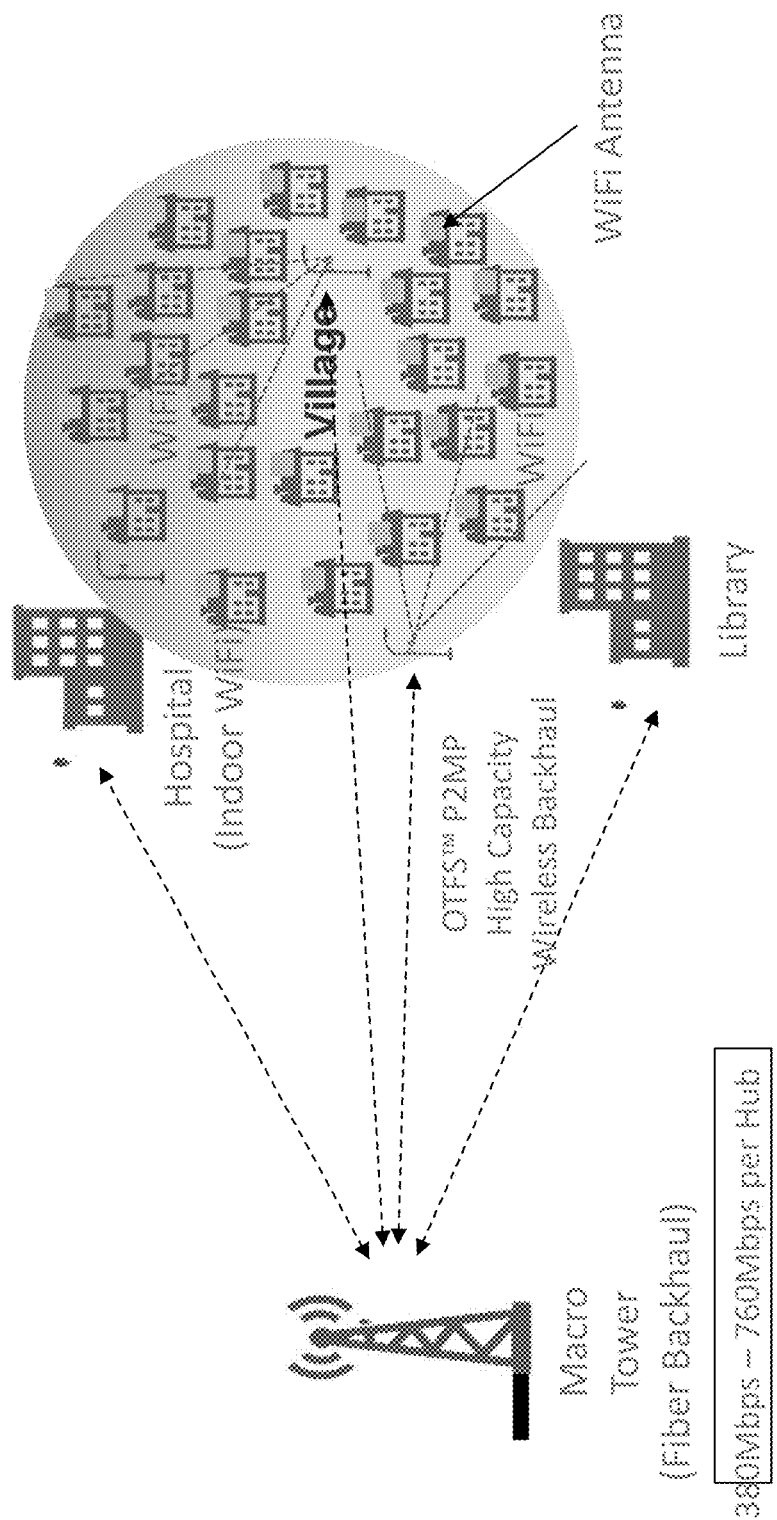
FIG. 100 shows an example of a system deployment in which OTFS is used for wireless backhaul.

FIG. 100 shows an example of a system deployment in which OTFS is used for wireless backhaul. A macro cell tower that is couple to a fiber backhaul may be equipped to carry 380 to 760 Mbps per hub to provide fixed wireless access to localities. The transmission distance may be organized in 500-meter range zones. The hub may be equipped with multiple 1 to N multipoint systems. In some embodiments, coarse angular separation may be achieved among different target zones. In some embodiments, multipoint coordination may be used to further improve transmission efficiency. In some embodiments, frequency and space division multiple access may be used.

Figure 101:
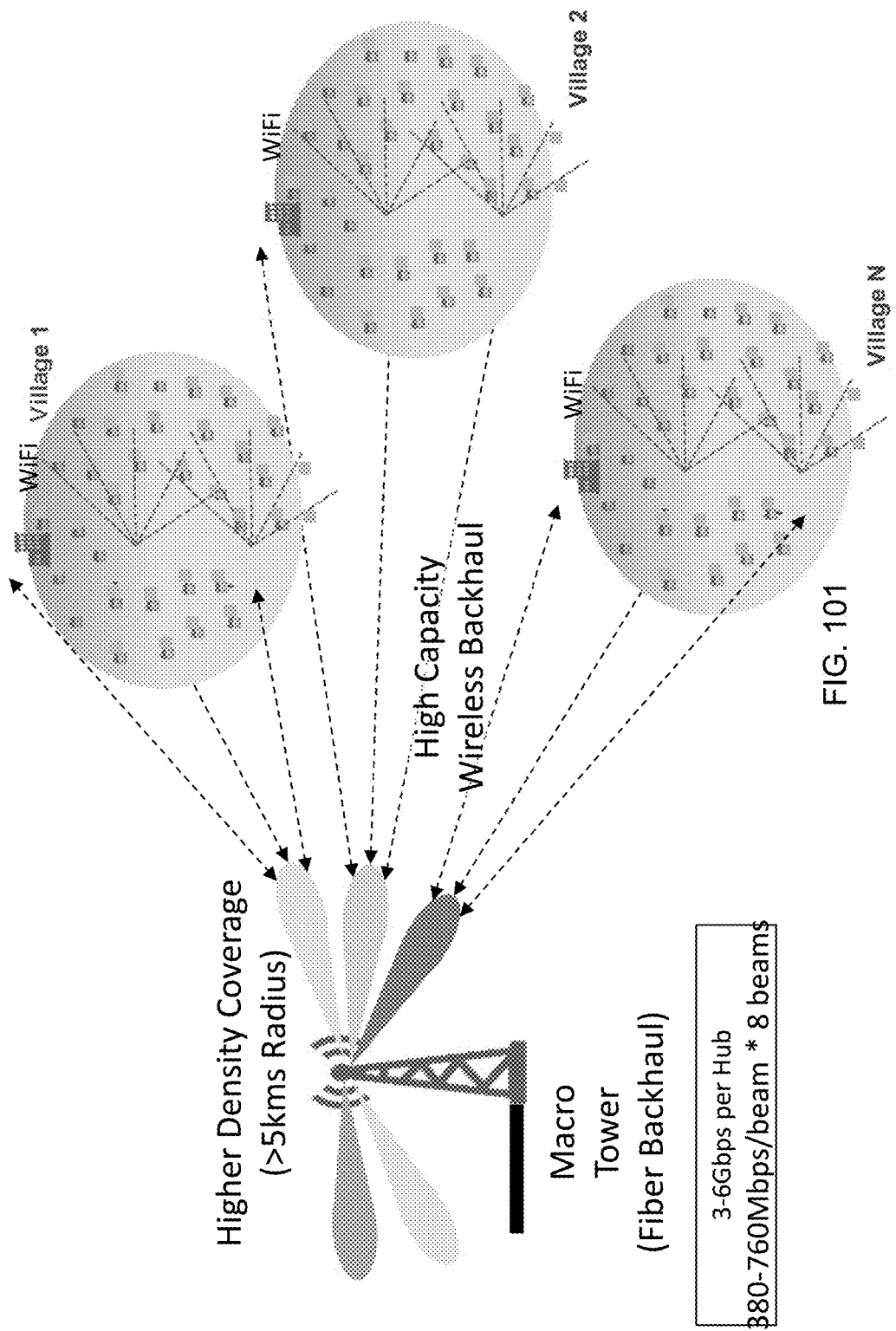
FIG. 101 shows another example of a system deployment in which OTFS is used for wireless backhaul.

FIG. 101 shows another example of a system deployment in which OTFS is used for wireless backhaul. Compared to the depiction in FIG. 100, the angular separation in the embodiment of FIG. 101 may be medium. The hub may be equipped with a Luneburg lens pencil beam antenna configuration to minimize transmission interference. In some embodiments, time, frequency and/or space division multiple access may be used to further improve efficiency. Such coverage may be used for longer-range fixed wireless access. For example, the distance between the macro tower and areas of coverage may be 5 Km. In the depicted embodiment, due to the availability of 8 beams, a total 3 to 6 Gbps bandwidth may be achieved per hub.

Figure 102:
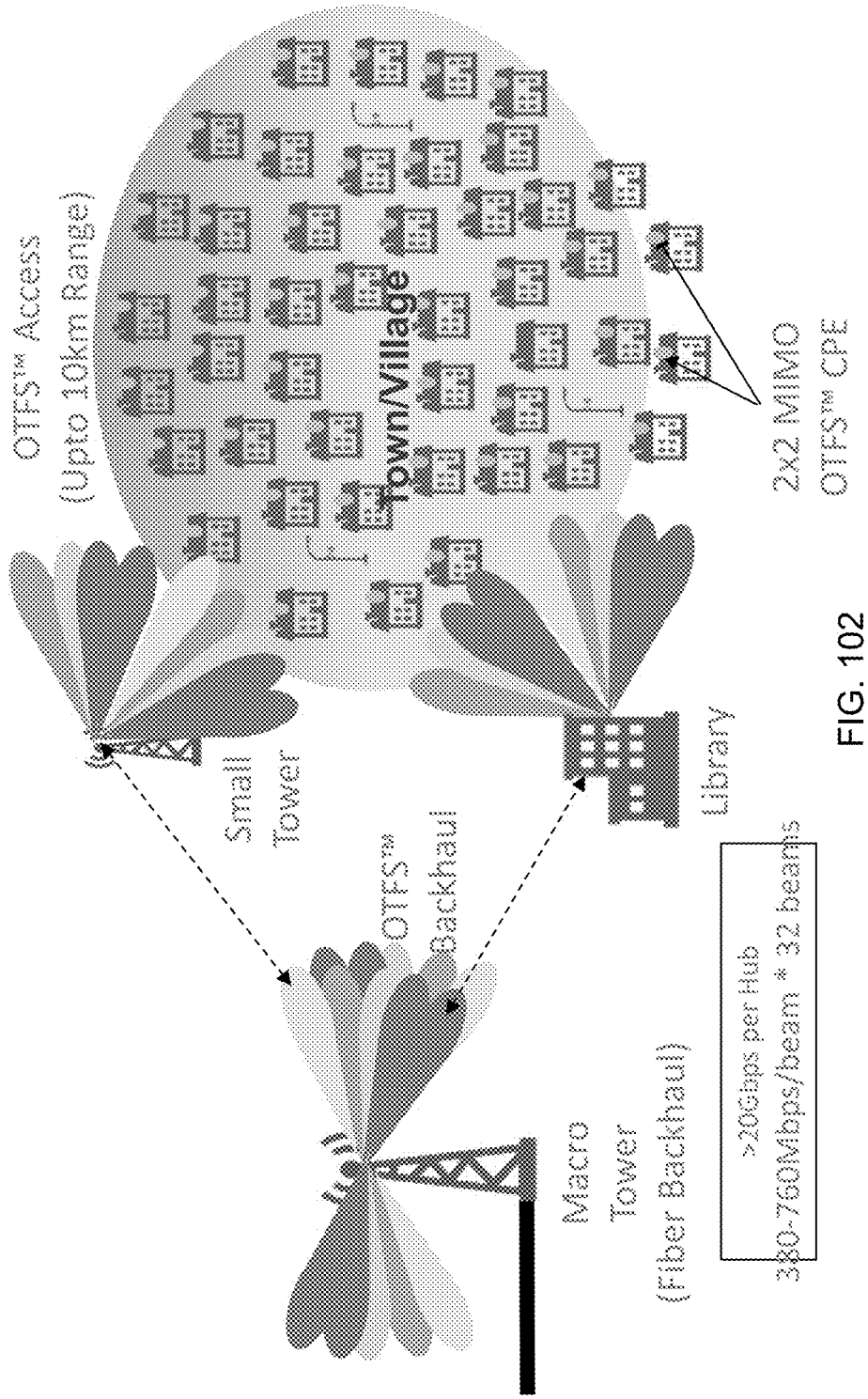
FIG. 102 shows an example deployment of an OTFS based fixed wireless access system.

FIG. 102 shows an example deployment of an OTFS based fixed wireless access system in which UE have MIMO antenna capability. The range of such a deployment may be extendible to up to 10 KM, with 32 beams being used for transmission (due to MIMO), thus providing greater than 20 Gbps bandwidth handling capability per hub. The angular separation among antenna beam may be finer than the embodiments depicted in FIG. 100 and FIG. 101, and MU-MIMO processing may be performed. In some embodiments, azimuthal interference cancellation may be employed to negate the overlap in pencil beams. In some embodiments, elevation beamforming may be used. In some embodiments, up to 4×4 MIMO antenna configuration may be used.

The use of OTFS modulation in the described deployments thus offers a way to achieve, or be close to, theoretical capacity at any MIMO or feedback mode. In some embodiments, a 3D channel representation may be used during acquisition processing. The OTFS modulation allows for timely, accurate and low overhead capturing of mutual coupling between all antenna pairs among all participants in the network.

6.2 Variable Beamwidth Multiband Antenna

Figure 103:
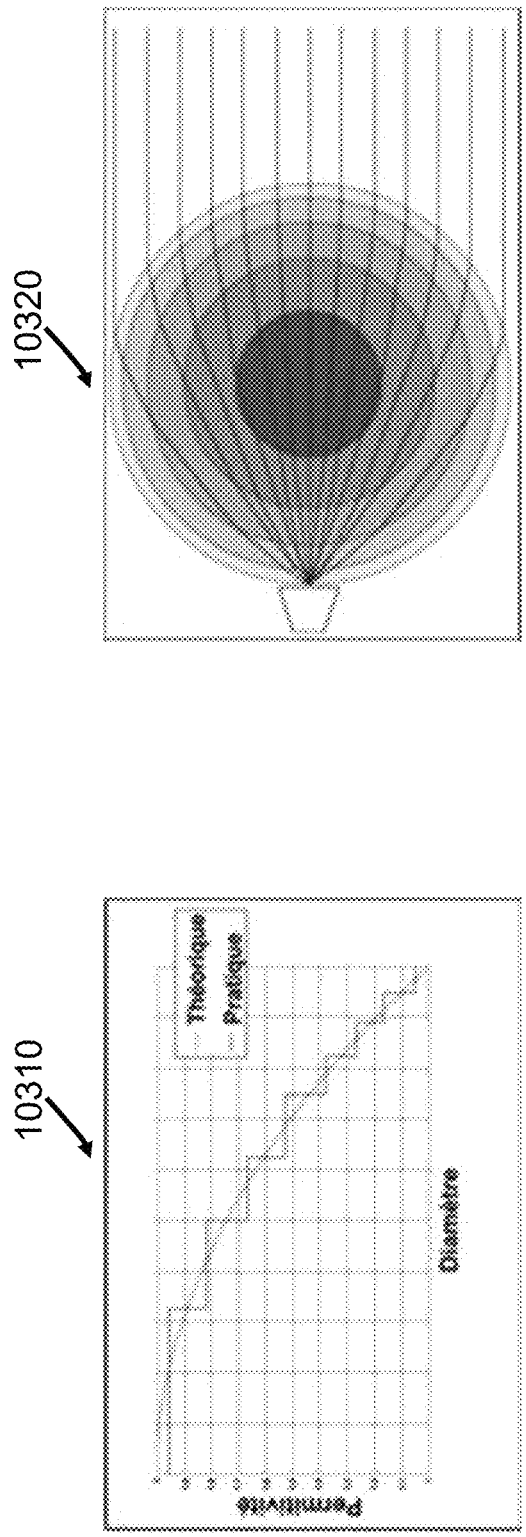
FIG. 103 shows an example of a lens antenna configuration.

FIG. 103 shows an example of a lens antenna. As depicted in the ray drawing on the right (10320), in a traditional lens antenna, an antenna feed is placed at the focal point of the lens antenna such that signals transmitted from the antenna feed are sent into the direction of the associated beam. The graph 10310 shows an example of permittivity of the antenna material as a function of distance from the center of the sphere to achieve the focal concentration effect. Two curves are shown—the smooth curve is the theoretical permittivity, which varies continuously and smoothly throughout the breadth of the lens, while the step-wise curve represents a practical implementation in which permittivity is a step function. Such a practical implementation may be achieved by layering together several concentric spherical pieces with variable dielectric properties. The block diagram 10320 shows convergence of signal beams as they travel through the antenna lens from air (right hand side) to the focal point, where an antenna feed is shown to be located.

The relative dielectric constant at distance r from the center of the lens to an interior point is given by the equation: $\varepsilon_r=2-(r/a)^2$, where a is the outer radius of the lens.

Figure 104:
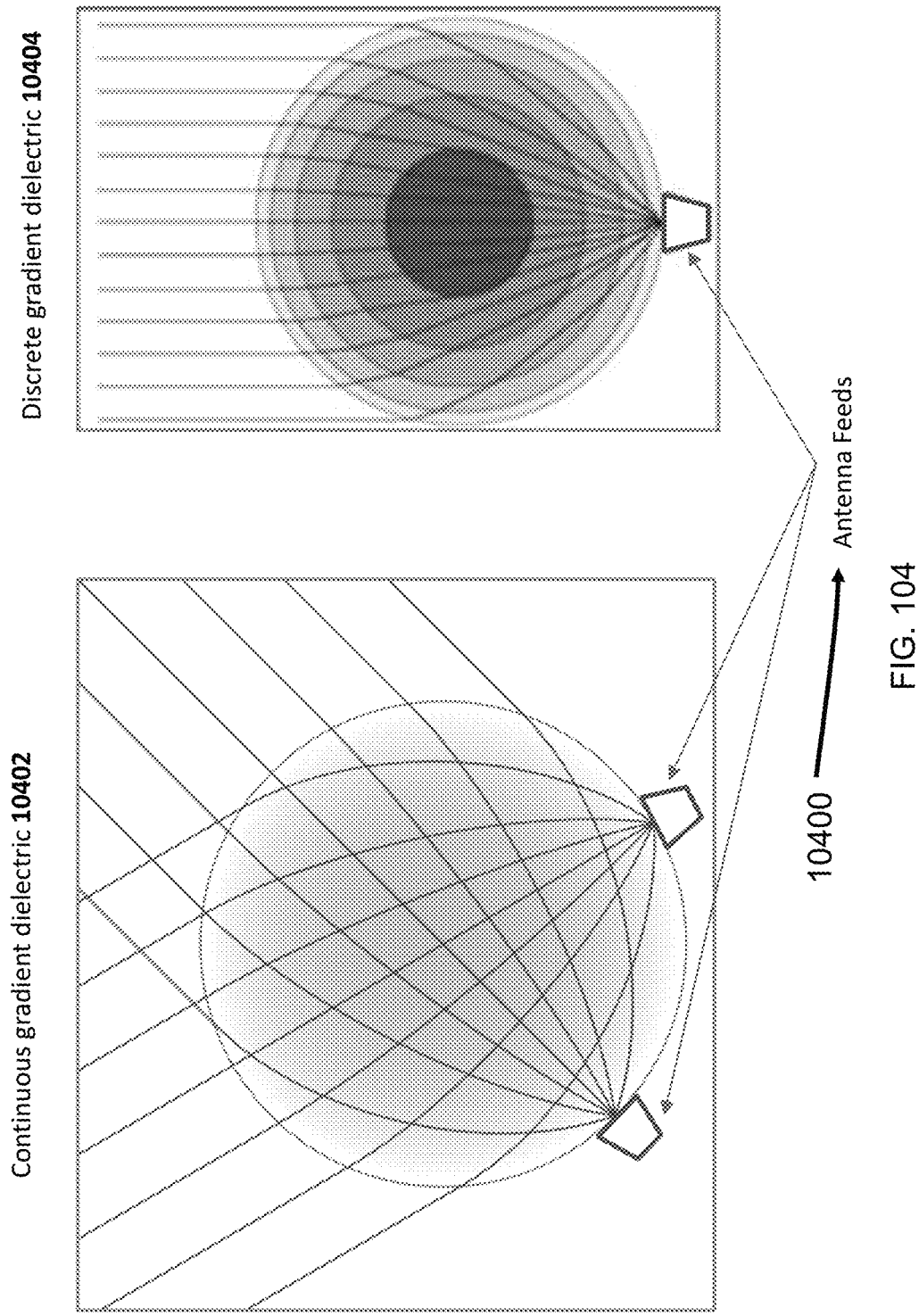
FIG. 104 shows example antenna configurations for beamforming.

FIG. 104 shows additional examples of antenna designs to achieve the beamforming. In embodiment 10402, dielectric constant of the lens material is continuously varied to achieve the desired focal point of convergence (e.g., similar to the smooth curve in graph 10310). As depicted, multiple antenna feeds 10400 may be placed at multiple locations around the spherical lens, thereby resulting in the antenna being able to transmit multiple signal beams in different spatial directions.

In embodiment 10404, discrete material layers may be used, each layer having a different dielectric constant, to achieve focus of radiated or received wireless signals in a particular direction. While only one antenna feed is shown in embodiment 10404, in general, multiple antenna feeds may be used to enable transmission of multiple beams.

Figure 105:
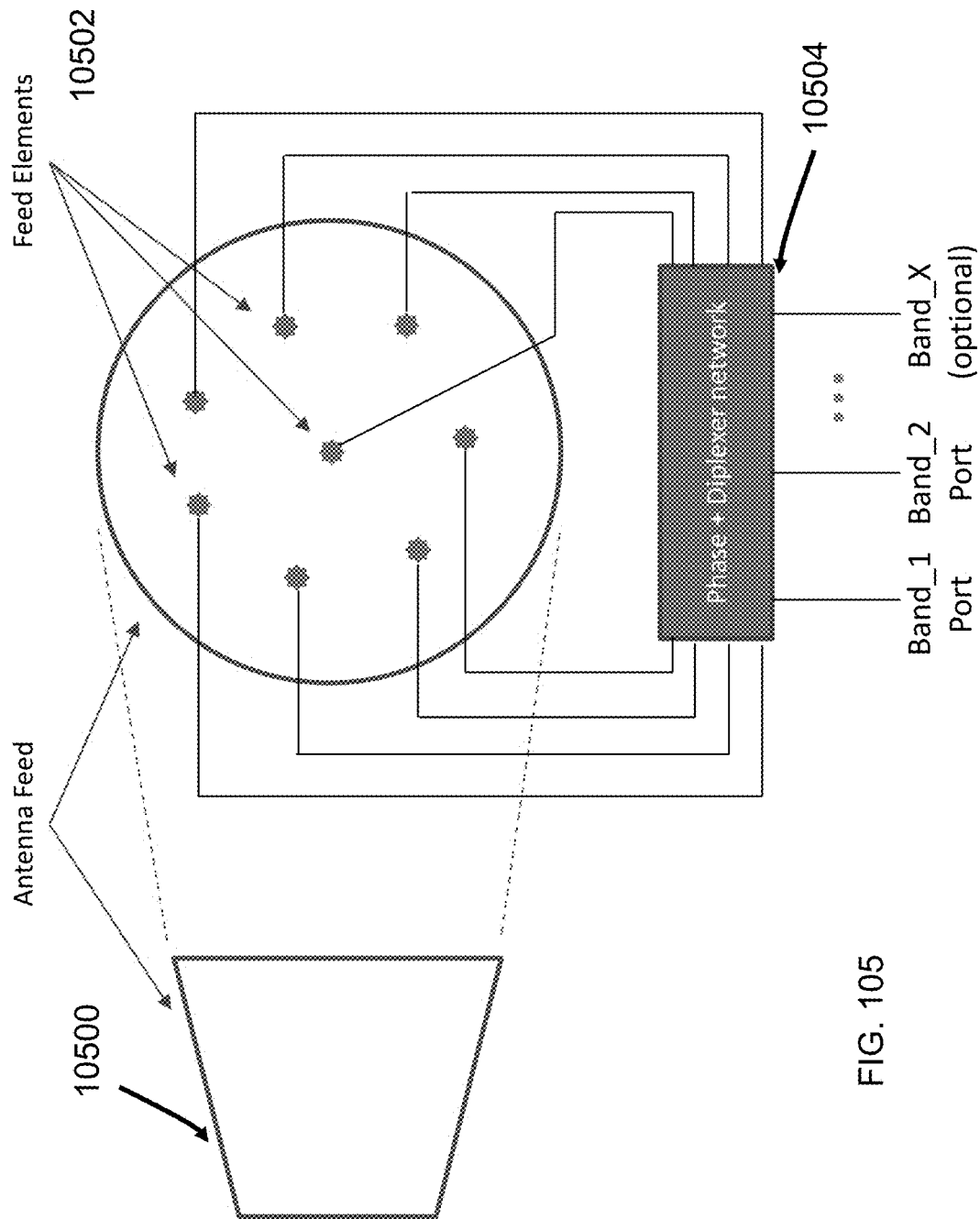
FIG. 105 shows an example of an antenna configuration in which multiple antenna elements are used for multiple frequency bands.

FIG. 105 shows an example configuration of an antenna feed 10500 in which multiple antenna feed elements 10502 are used for transmitting/receiving signals. The antenna feed elements 10502 may be used in various configurations, as described herein.

The multiple antenna feed elements 10502 may be driven by a phased network that provides (or receives) the corresponding signals to the antenna feed elements 10502. For example, in some embodiments, an antenna feed 10500 may operate to transmit or receive wireless signals in multiple frequency bands. Without loss of generality and only for illustrative purpose, the multi-band embodiments are described with reference to two frequency bands—a 3.5 GHz frequency band (e.g., between 2.5 and 3.5 GHz or between 3.55 and 3.7 GHz) and a 5.8 GHz frequency band (e.g., frequencies between 5.1 and 5.9 GHz) for multiple frequency bands. However, it is understood that the disclosed techniques can be used for multiple (greater than two) frequency bands at different operational frequencies.

The antenna feed 10500 is made up of separate antenna feed elements 10502, each of which may have its own electrical connection with a feeder network 10504 that may include a phase adjustment circuit and/or a diplexer. In one example use case, each antenna element may be used for transmission/reception of a single frequency band, with the feeder network 10504 performing the selectivity of which antenna element to map to which frequency band. In the depicted example, signals for transmission/reception within bands 1 to X (where X is an integer) may be fed into the phase+diplexer network, separated and fed into the antenna feed elements 10502.

Figure 106:
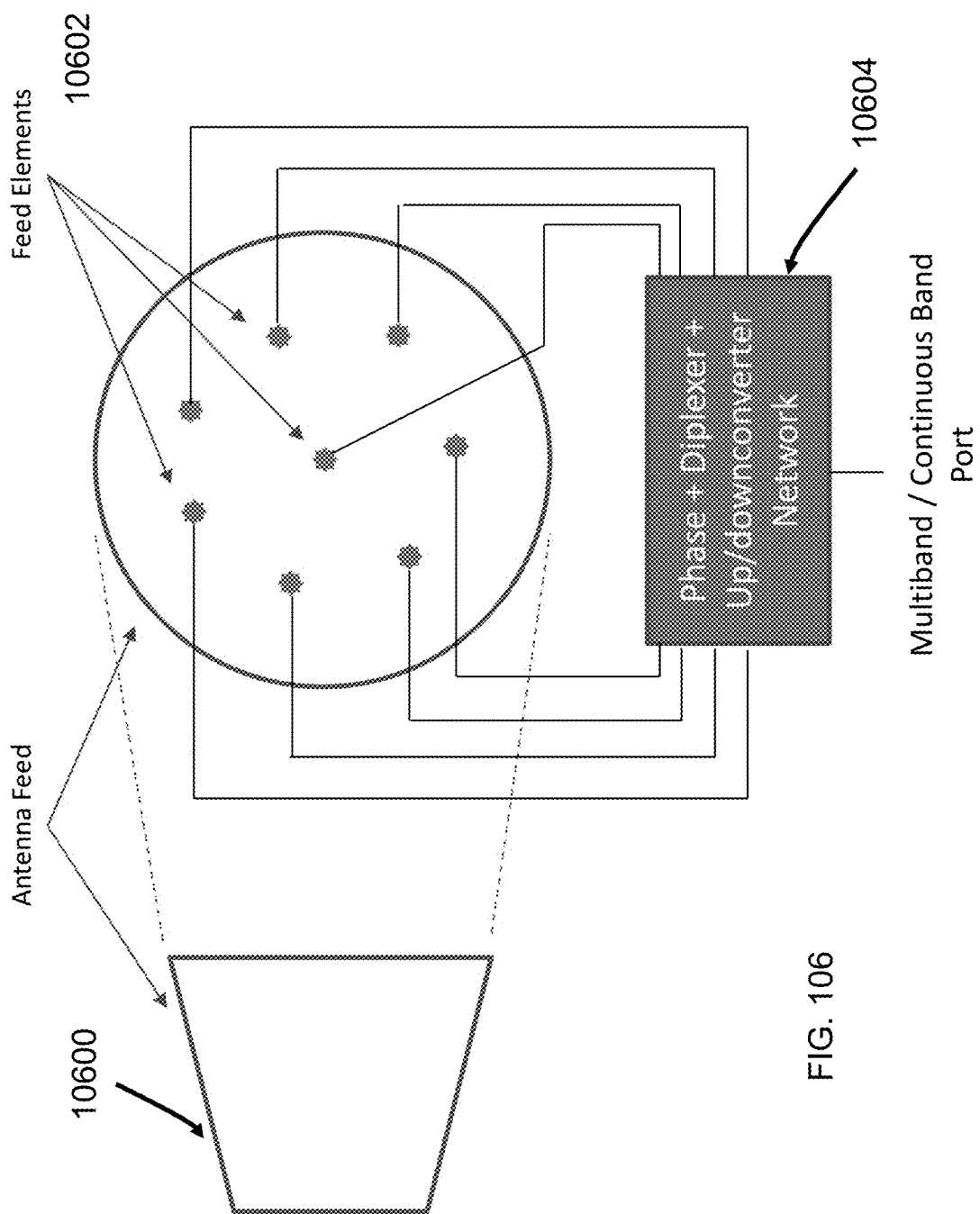
FIG. 106 shows an example of an antenna configuration in which multiple antenna elements are used for transmission using frequency stacking.

FIG. 106 shows an example of an antenna feed 10600 in which multiple antenna elements 10602 are used for transmission using frequency stacking. For example, frequency stacking may be achieved by generating a single wideband signal that includes signals in two or more separate frequency bands. Thus, a frequency stacking technique may use a same antenna port or antenna element, for transmitting signals in two different frequency bands. To support frequency stacking, e.g., allowing at least some antenna feed elements to transmit or receive signals in multiple frequency bands, the feeder network 10604 may include a phase adjustment circuit, one or more diplexers and one or more up/down converters. The antenna configuration in FIG. 106 may be used to provide multi-band signals by simultaneously driving signals to (or from) the antenna elements.

Figure 107:
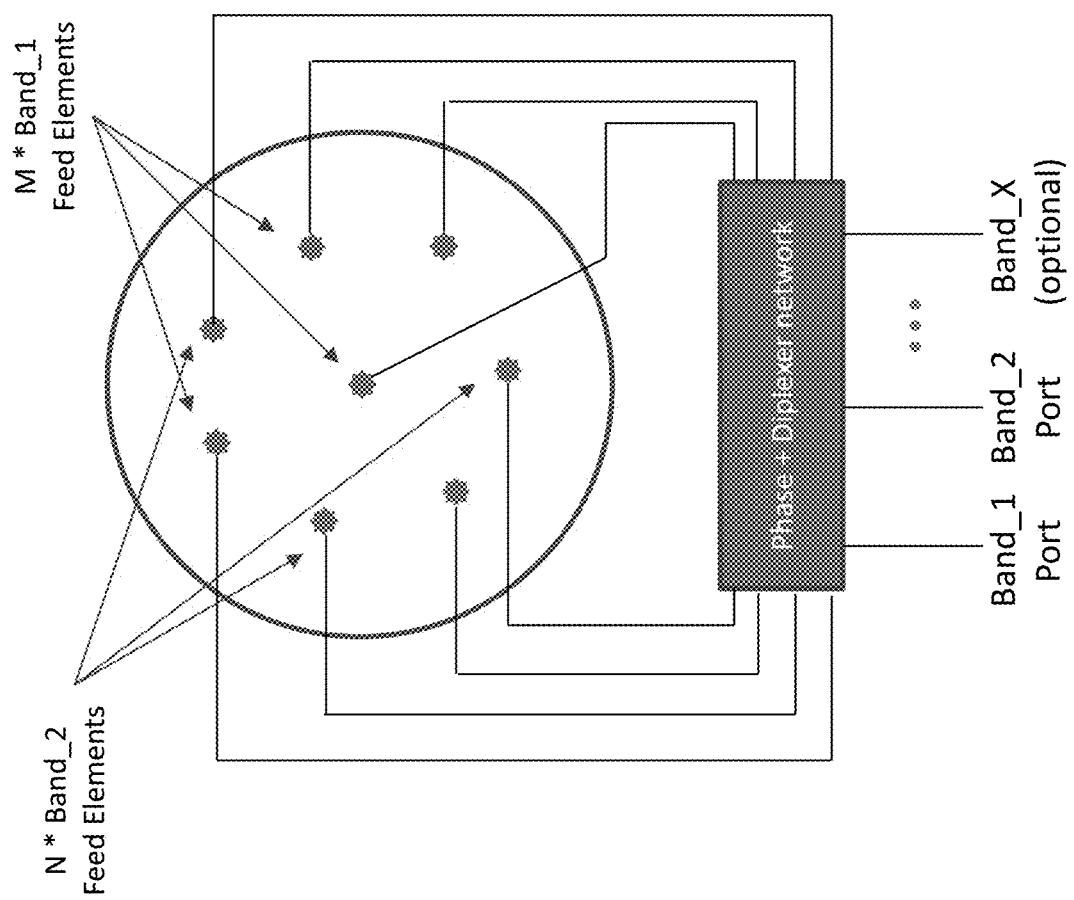
FIG. 107 shows an example of feed element configuration in an antenna configuration.

FIG. 107 shows an example of an antenna feed element configuration in an antenna feed. In general, the layout and number of antenna feed elements may depend on frequency band of operation and on the desired impact on the resulting beamwidths and beamshapes. Diplexers may be used when antenna feed elements have wider bandwidth sensitivity than individual antenna port frequency bands. In some embodiments, in place of the diplexer, a frequency selective combined phase network may be used.

In some embodiments, each antenna feed element may be dedicated to one frequency band, and in general, there may be more than one antenna feed element for any given band. For example, FIG. 107 depicts that N antenna elements are used for Band_2 communication and M antenna feed elements are used for Band_1 communication. Multiple antenna elements for a given frequency band may be driven to perform beam-combining as described in the present document.

Figure 108:
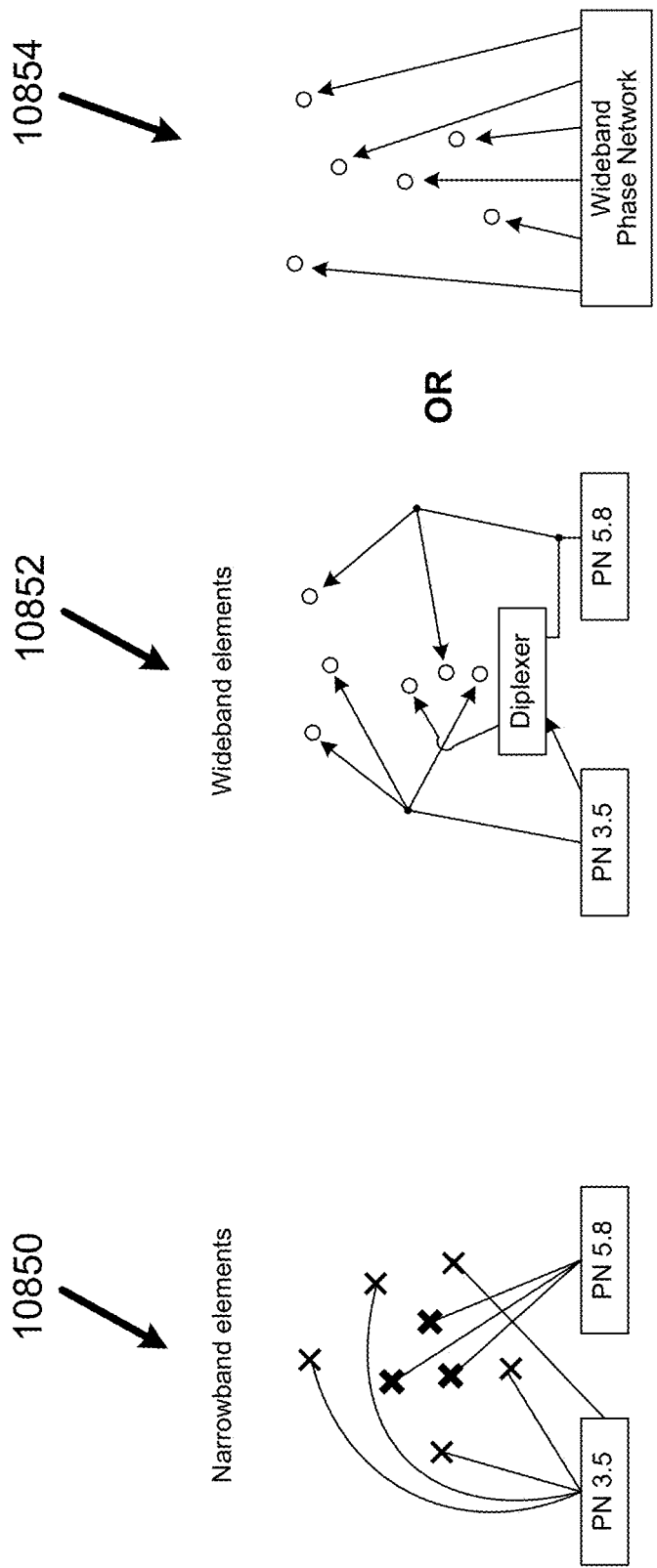
FIG. 108 shows example feed element configurations in a wideband antenna.

FIG. 108 shows additional examples of possible embodiments of antenna feeds. As shown in example 10850, an antenna feed may be operable in two frequency bands—a 3.5 GHz band being coupled with a phase network (PN) that operates at the 3.5 GHz band, and a second PN operating at the 5.8 GHz band. Each of these PNs may be independently connected with corresponding antenna elements via electrical connections, each connection carrying a band-specific signal, which is referred to as a narrowband signal (because it represents less than the entirety of bandwidth handled by the antenna feed).

In embodiment 10852, some of the antenna feed elements are shown to be exclusively coupled with either the 3.5 GHz band PN or the 5.8 GHz band PN, thus operating in one frequency band only, while other antenna feed elements are shown to operate in a wideband configuration in which signals from multiple frequency bands are frequency stacked to provide (or receive) a wideband connection through a diplexer. Therefore, in general, an antenna feed may include antenna feed elements that may include a first group of dedicated, or narrowband, antenna elements, and a second, non-overlapping, group of antenna feed elements that operates as a wideband element that transmits/receives more than one bands of signals, and possibly all bands in which the antenna feed operates.

In embodiment 10854, each antenna feed element is depicted to be operating as a wideband antenna feed element. Thus, in embodiment 10854, duplexing for separation/combination of multiple frequency band signals is performed in the wideband phase network connected to each of the antenna feed elements.

The phase network may perform functions such as adjusting phases of the signals to be transmitted, or fed to each antenna element, to have the appropriate transmission phase so as to achieve a target area of coverage. The phase adjustment may take into account length of the signal path travelled by the signal from the PN circuit to the antenna element before being radiated from the antenna element. The phase adjustment may depend on the desired specific complex linear combination of signals radiated from the antenna elements (resulting possibly in an additive or subtractive effect on the magnitude of the signal), as is known in the art.

Figure 109:
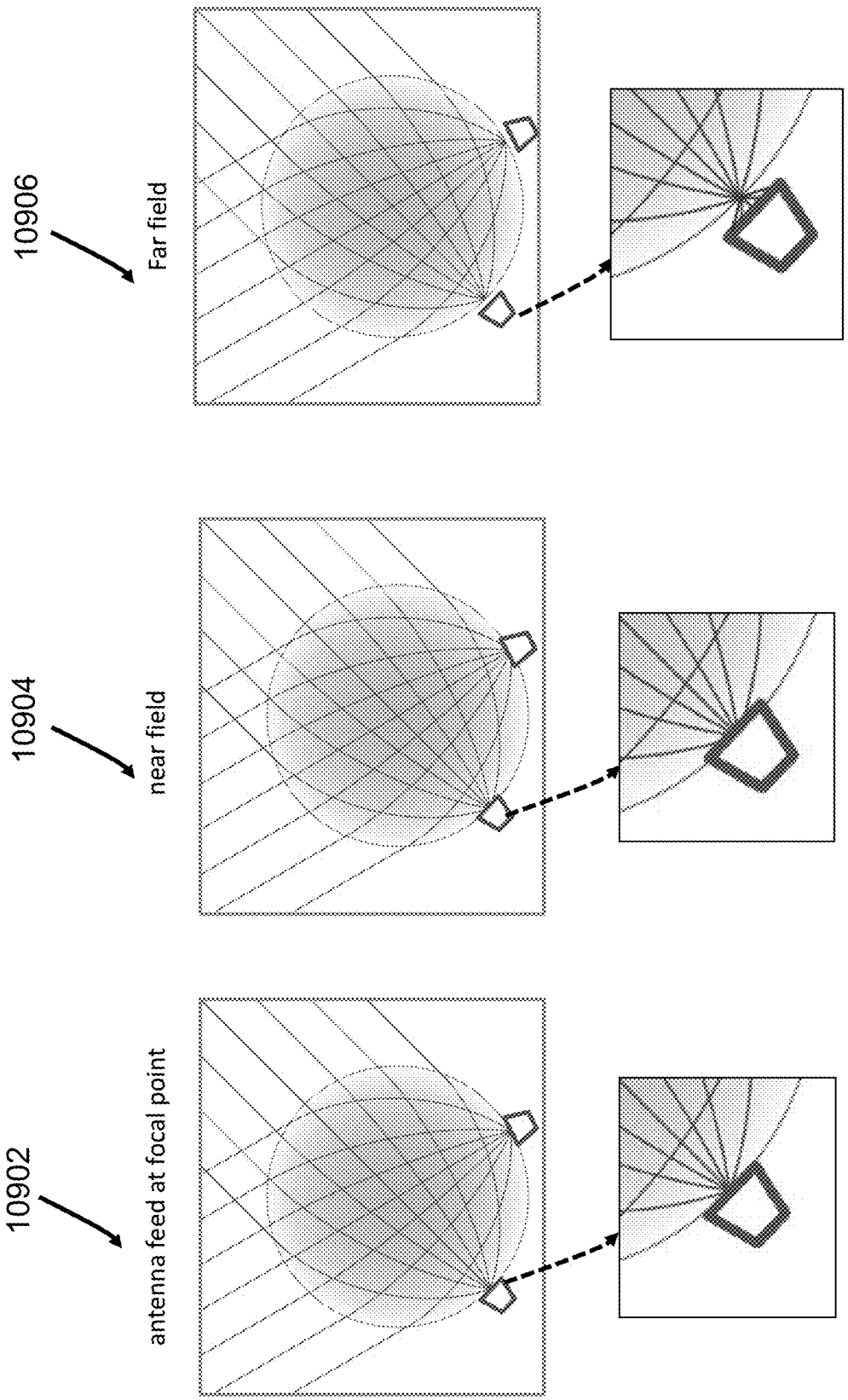
FIG. 109 illustrates different possible radial positioning of antenna elements.

FIG. 109 illustrates different possible radial positioning of antenna elements. In antenna 10902, both the antenna feeds are positioned at the focal point of a lens antenna. In antenna 10904, referred to as a "near field" arrangement, the antenna feed is positioned at an off-focal point, moved off the focal point in the direction of the signal lobe. In other words, the focal point of the lens may lie within the body of the antenna feed or behind it. Explaining in the following for the receive case, in this arrangement, the electromagnetic signal may impinging upon the antenna feed before the signal has converged to a focal point through the lens. In one advantageous aspect, when the antenna feed includes multiple antenna feed elements, e.g., as shown in FIG. 105, FIG. 106, FIG. 107 or FIG. 108, each antenna feed element may receive (or transmit) a signal whose characteristics are similar to a signal received (or transmitted) by the other antenna feed elements.

In antenna 10906, the antenna feed is off-focal point in a direction away from the lens or the direction of the signal beam. As a result, received signals may first converge at a focal point and then begin to diverge beyond the focal point prior to impinging on the surface of the antenna feed. Similar to the antenna 10904, when multiple antenna feed elements are located on the surface of the antenna feed, in antenna 10906, the multiple antenna feed elements may receive/transmit signals similar to each other in strength.

Figure 110:
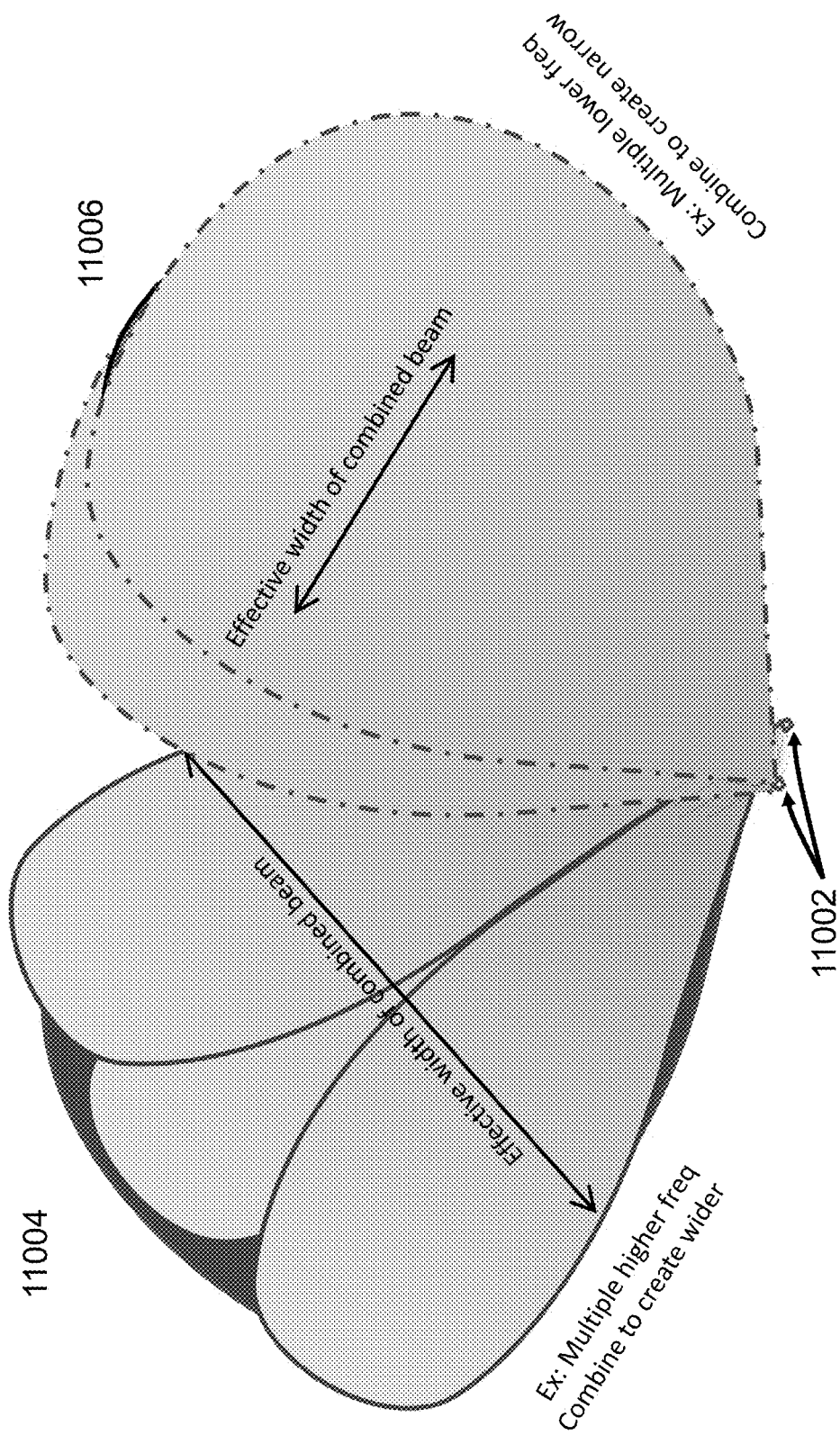
FIG. 110 depicts examples of beamforming to achieve a wider and a narrower beamwidth pattern.

FIG. 110 depicts examples of beamforming to achieve a wider and a narrower beamwidth pattern. A Luneberg lens is used for illustration, but other similar lenses could also be used (e.g., a Rotman lens). The variable beamwidth Luneburg lens antenna illustrates how various antenna feed configurations may be used to increase or reduce the effective bandwidth of a combined beam emanating from/received by the antenna feed with multiple antenna feed elements, as descried with respect to FIGS. 105 to 109. In the beam pattern 11004, the effective width of the combined beam is wider than each individual beam to or from an antenna feed. For example, in a multi-band antenna operation, the beam pattern 11004 may represent one of the bands (e.g., the higher frequency band) that is serviced by the antenna. In the beam pattern 11006, antenna elements and signal processing may be arranged to provide an effective beam width that is narrower than the individual beams from antenna elements (e.g., the same antenna elements that are also operating in a different frequency band).

The embodiment also provides a frequency matched beamwidth. One desirable configuration may provide the same effective azimuthal beam width between different frequency bands. The constructive and/or destructive interference patterns from the various antenna elements of the same frequency band shape the effective beam width to match that of the other band(s). In a variation, the antenna may be operated to provide different beam widths for different frequency bands. The beamwidth variations may be achieved by constructive or destructive signal interference, and/or by using off-focal point antenna placement.

Figure 111:
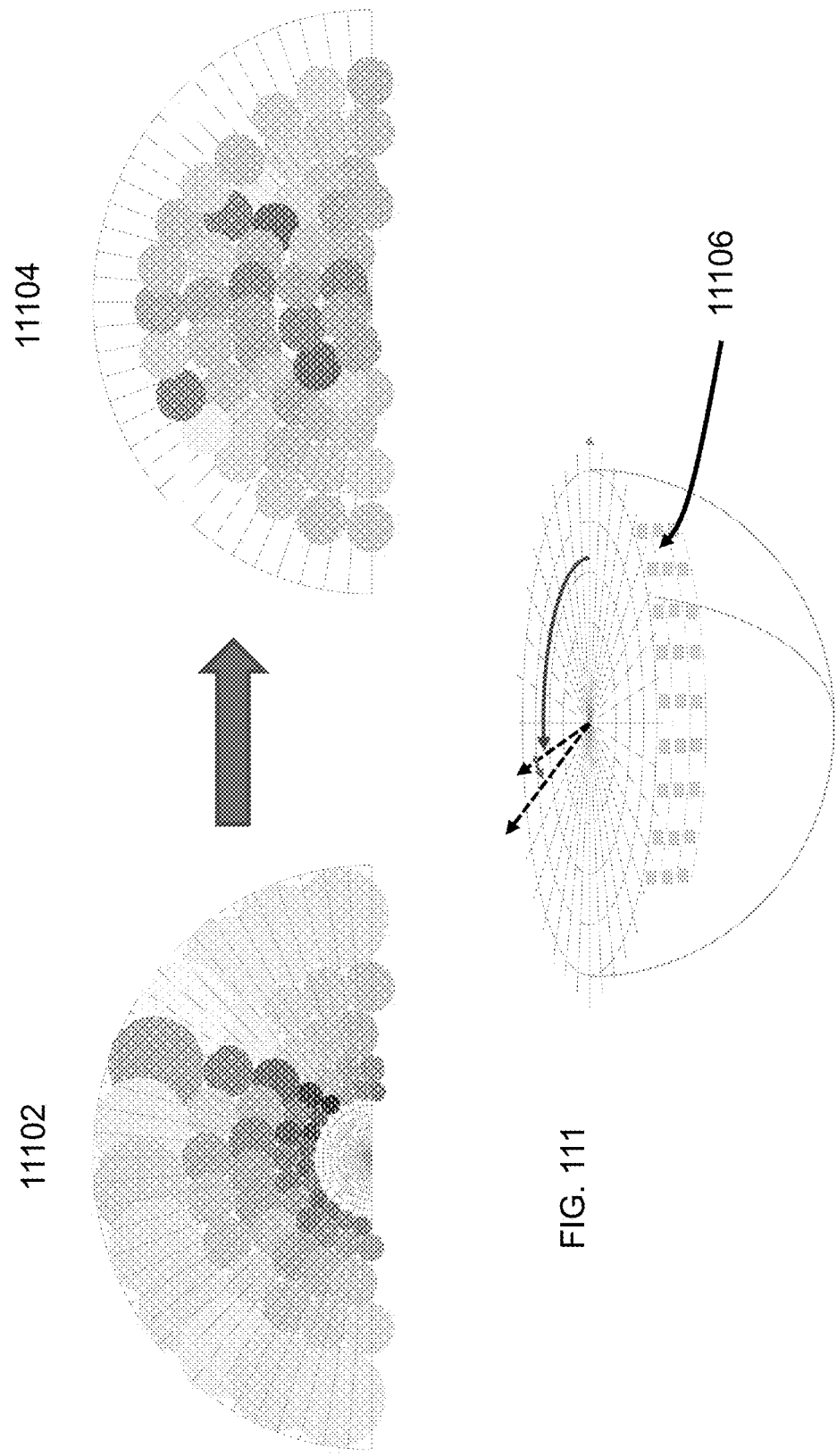
FIG. 111 shows an example of a variable beamwidth antenna and a corresponding example radiation pattern.

FIG. 111 shows an example of a variable beamwidth antenna and a corresponding examples of radiation patterns. One example configuration may provide a same effective area coverage yet different beam elevation angles. The multiple antenna feeds may be tiled in an array along the azimuth and the elevation directions, as shown in the arrayed arrangement 11106. Antenna feeds creating beams pointed towards areas that are close to the base station have multiple elements whose signals are combined to a create wider beam. Conversely, for further points signals at the elements are combined to create a narrower beam, such that the actual coverage is approximately the same as that for the "near" beam described previously. It will be appreciated that the disclosed embodiments can thus be used to provide uniform density coverage (configuration 11104) from each antenna feed to a geographic area, irrespective of the distance of the coverage area from a transmission station at which the antenna is installed for operation. One example advantageous property is that this configuration overcomes operational problems associated with the coverage footprint depicted in configuration 11102, in which the zone or area of the covered area increases at distances farther away from the antenna location. For example, at the transmission station at which such an antenna is installed, network backhaul resources can be uniformly allocated to each antenna element due to its uniform density coverage, instead of having to allocate non-uniform transmission resources based on the size of the covered area.

In some embodiments, an antenna system includes an antenna lens such as a Luneburg lens or a Rotman lens and one or more antenna feeds placed at on or off focal point of the antenna lens (e.g., as depicted in FIG. 109). The position of the antenna feed may thus be far-field (behind focal point) or near-field (in front of the focal point, in the direction of beam). Each of the one or more antenna feeds comprises one or more antenna feed elements that are electrically independently operable. The antenna system also includes an antenna feed network, or a phase network (PN) electrically coupled with the one or more antenna feed elements via signal paths or connections. In some embodiments, each of the antenna feeds is designated to operate in one or more frequency bands and wherein position and/or size of the one or more antenna feed elements for each antenna feed depends on the one or more frequency bands of operation. In some embodiments, at least one antenna feed is capable of simultaneous operation in at least two frequency bands and wherein the at least one antenna feed includes multiple antenna elements that are grouped to operate in different ones of the at least two frequency bands.

In some embodiments, at least one antenna feed is capable of simultaneous operation in at least two frequency bands and wherein at least one antenna feed includes an antenna feed element that is coupled to the antenna feed network using a frequency stacked configuration in which the antenna feed element simultaneously receives or transmits signals in two different frequency bands and wherein the antenna feed network includes a diplexer.

In some embodiments, the antenna system includes a data feed that is positioned conformal to the antenna lens. For example, as depicted in FIG. 111, an array of antennas may be placed around the spherical lens surface.

6.3 SWAP Optimized Devices for OTFS Communication

Techniques using orthogonal time frequency space (OTFS) modulation enable precoding of a transmitted signal on a symbol-by-symbol basis. The rapid adjustment of precoded OTFS modulated signals may improve reception by moving receivers or receivers in environments with moving reflectors or interferers. The rapid adjustment of precoded OTFS modulated signals may support multiple simultaneous users.

A portion of the computational complexity used by a communication link using precoded OTFS modulated signals resides in the transmitter. In some example embodiments, the receiver may be simplified to a matched filter receiver. Because the receivers of precoded OTFS modulated signals may not have much complexity, they may be small in size, use little power, and may be inexpensive. The receivers including antennas may also take any shape. Some receivers may be end nodes where the data received is consumed at the end node. A remotely controlled light switch that includes the receiver is an example of a device where the data is consumed by the device to control the light switch. Some receivers may re-transmit to another device the data received. For example, a receiver may receive a OTFS modulated signal to determine data and re-transmit the data to another device.

Figure 112:
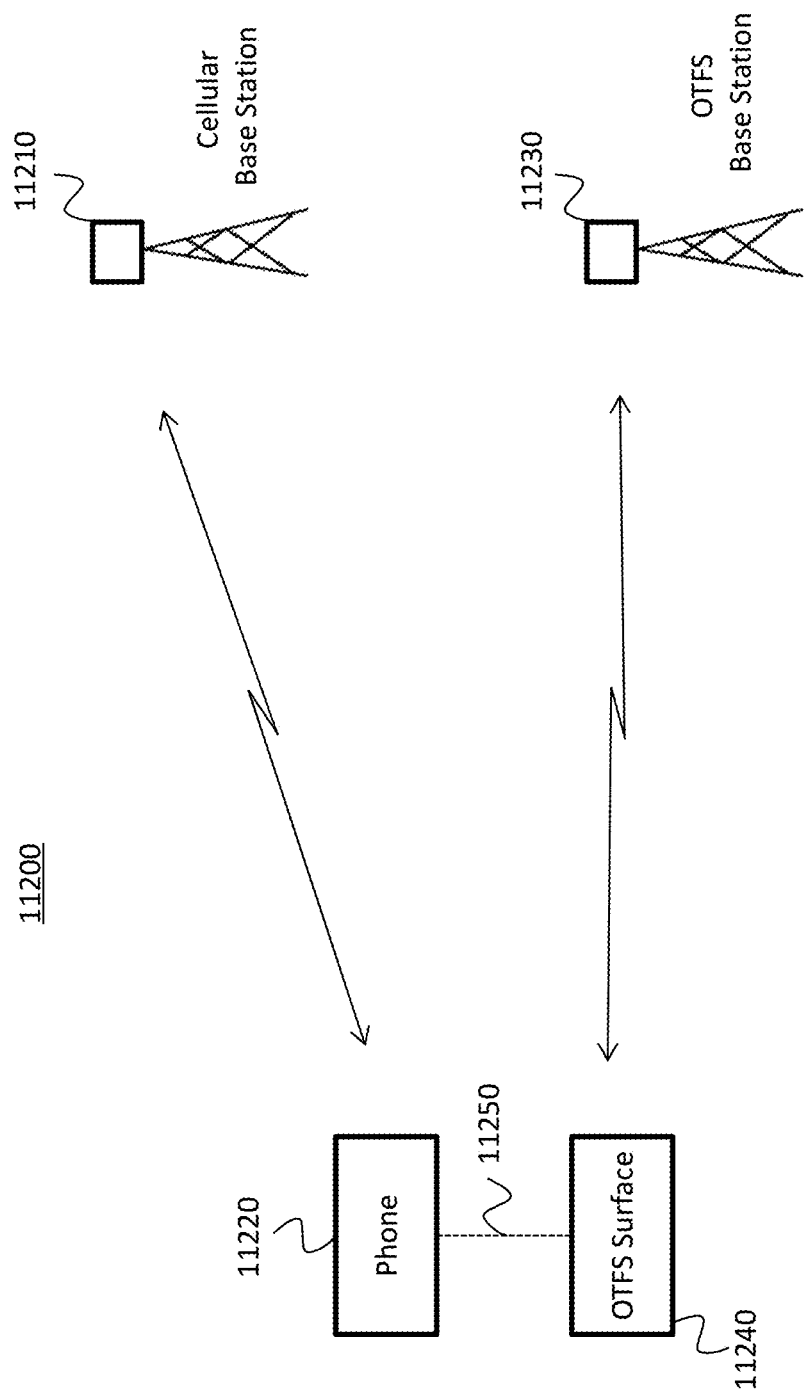
FIG. 112 depicts an example of two communications networks, in accordance with some example embodiments.

FIG. 112 depicts an example of two communications networks, in accordance with some example embodiments. FIG. 112 includes cellular base station 11210, cellular phone 11220, OTFS base station 11230, and OTFS surface 11240.

Cellular base station 11210 may include any type of cellular base station. For example, cellular base station 11210 may be a base station fixed in location that provides communication via a 1G, 2G, 3G, 4G, LTE, 5G or any other cellular system or standard. In some example embodiments, cellular base station 11210 is located on an aircraft and as such may be mobile rather than stationary. Cellular base station 11210 is in communication with phone 11220. Phone 11220 may receive digital data related to voice and/or Internet Protocol (IP) data representative of voice. Phone 11220 may receive IP data from base station 11210 related to web browsing, file transfers, applications, or any other digital data consumer on phone 11220.

OTFS base station 11230 may be in communication with OTFS surface 11240. OTFS base station 11230 may be fixed in location or may be mobile. OTFS base station 11230 may communicate with OTFS surface 11240. By using OTFS, OTFS base station 11230 can adjust modulation and transmission parameters on a symbol by symbol basis thereby creating a more reliable and customized data rate to the OTFS surface 11240. Some OTFS surfaces may require low data rates while others may require higher data rates. The shape, size, and/or power parameters of the OTFS surface can influence the customized data rate. For example, smaller OTFS surfaces and/or lower power OTFS surfaces may be customized for lower data rates than larger and/or higher power surfaces. Such customization allows the design of an OTFS surface to meet the requirements of the end application without being constrained by the material, shape, and size of the surface. For example, a cuff link used as an OTFS surface may maintain its cuff link shape when being used as an OTFS surface and the data rate to the cuff link may be customized according the size, shape, and available power at the cuff link.

OTFS surface 11240 may include a receiving surface such as the surface of an object that is used as an antenna to receive signals from OTFS base station 11230. OTFS surface 11240 may also serve a non-electrical function such as holding cuffs of a shirt together, or as a case to protect a cell/smart phone, or case to protect a laptop/netbook or other portable device. For example, OTFS surface 11240 may include an external case within which a cellular phone, tablet, or portable computer is held. The external case may include an antenna or array of antennas such as a patch array antenna, or other antenna. The external case may include a receiver, transmitter, or transceiver that uses the antenna or array of antennas for reception and/or transmission. For example, a thin form fitting case may be placed on a smartphone that includes the forgoing antenna embedded in the case material. Also embedded in the case may be a receiver, transmitter, or transceiver to communicate with OTFS base station 11230.

In some example embodiments OTFS surface 11240 may receive data from OTFS base station 11230 that is consumed at OTFS surface 11240. The OTFS surface may have another function, a non-electrical function different from being an antenna or receiving surface. For example, OTFS surface 11240 may be formed into a cuff link, button, placed in jewelry, on eyeglasses, door locks, other locks, or other devices where a change to the device may be performed remotely. As illustrative examples, a cuff link used to hold the cuffs of a shirt sleeve together may also receive data to affect a color of the cuff link, or to affect a latching mechanism to release latch the cuff link. The foregoing changes to the cuff link may be based on a signal received from OTFS base station 11230. OTFS surface 11240 formed into a button that may be controlled via OTFS base station 11230 to change the appearance of the button, or to disengage the button to cause an unbuttoning. Eyeglasses may be controlled via an OTFS signal received to cause tinting of the glasses to change. Locks may be controlled via an OTFS signal received to cause the lock to lock or unlock. May other devices may be controlled or caused to change via an OTFS signal received at the device from base station 11230.

Many other applications such as devices in the Internet of Things (IoT) including refrigerators, washers, dishwashers, HVAC systems, irrigation systems, and any other home, commercial, or industrial devices may include OTFS surface 11240. The foregoing applications may be controlled via messages sent from the OTFS base station to each device.

In some example embodiments, phone 11220 may send a signal to cellular base station that is forwarded or otherwise causes OTFS base station 11230 to send a signal message to the cuff link, button, jewelry, or other OTFS surface. For example, an application running on phone 11220 may pass a message or command through cellular base station 11210 to OTFS base station 11230. One or more intervening networks such as a core network may lie between cellular base station 11210 and OTFS base station 11230. The message or command may be passed from OTFS base station 11230 to OTFS surface 11240 and may cause a change the a feature or parameter of the device as described above. OTFS surfaces where the message, command, or other data is used at the device and is not forwarded to another device may be referred to as OTFS end points.

In some example embodiments, OTFS surface 11240 includes a wired or wireless interface 11250 between phone 11220 and OTFS surface 11240. For example, OTFS surface 11240 may communicate with phone 11220 via a short range optical or radio frequency interface such as a Bluetooth interface. Data received at OTFS surface 11240 from base station 11230 may be passed via interface 11250 to phone 11220. For example, the data received via interface 11250 over the OTFS communication link may augment the data throughput capacity to phone 11220. In some example embodiments, when phone 11220 has no connection to base station 11210, OTFS base station 11230 may replace the cellular service and provide data and voice connectivity between phone 11220 and another phone or a core network.

Figure 113:
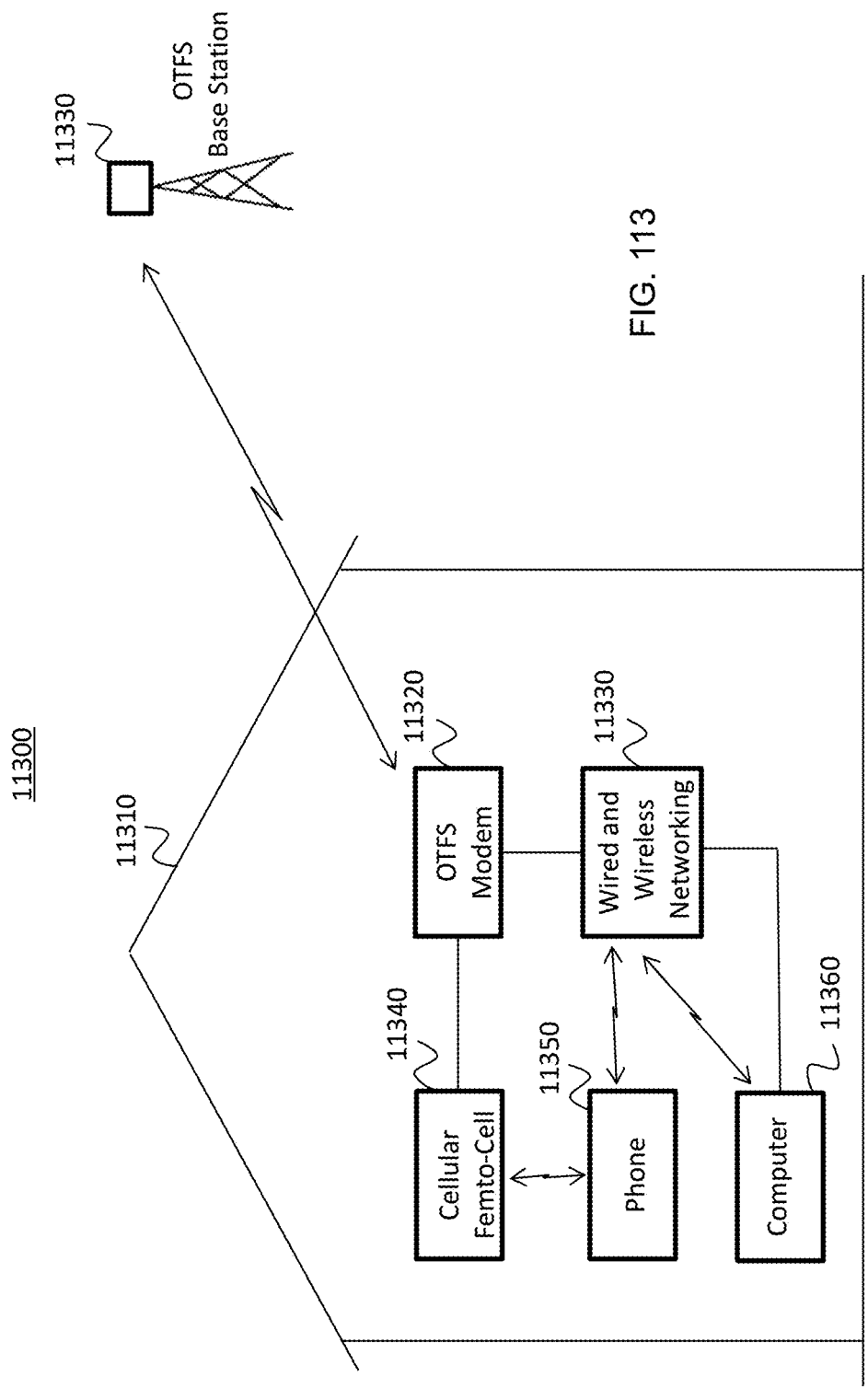
FIG. 113 depicts an example of an OTFS network, in accordance with some example embodiments.

FIG. 113 depicts an example of an OTFS network, in accordance with some example embodiments. In the example of FIG. 113, data services and backbone cellular services are provided to structure 11310 via the communication between OTFS base station 11330 and OTFS modem 11320. OTFS modem 11320 may provide data to wired and wireless networking device 11330 and/or to femto-cell 11340. In some example embodiments, structure 11310 may be a house, office building, or other fixed structure. In other example embodiments, structure 11310 may be mobile such as an automobile, bus, truck, train, airplane, or other vehicle.

OTFS base station 11330 may provide wireless service to structure 11310. OTFS base station 11330 may connect to a core network that may provide digital data such as IP data and/or voice service to structure 11310 via OTFS modem 11320. In some example embodiments, OTFS baste station

11330 may provide backbone service to modem 11320 to support a cellular femto-cell 11340 in or near structure 11310.

OTFS modem 11320 may provide data service to wired and wireless networking device 11330. Wired and wireless networking device 11330 may provide data service via WiFi (e.g., IEEE 802.11 family of standards) or other wireless standard, via Ethernet (e.g., IEEE 802.3 family of standards) or other wired networking standard to computer 11360 and/or phone 11350. Phone 11350 may be provided cellular service via femto-cell 11340 which may include data service for Internet data or other data.

Figure 114:
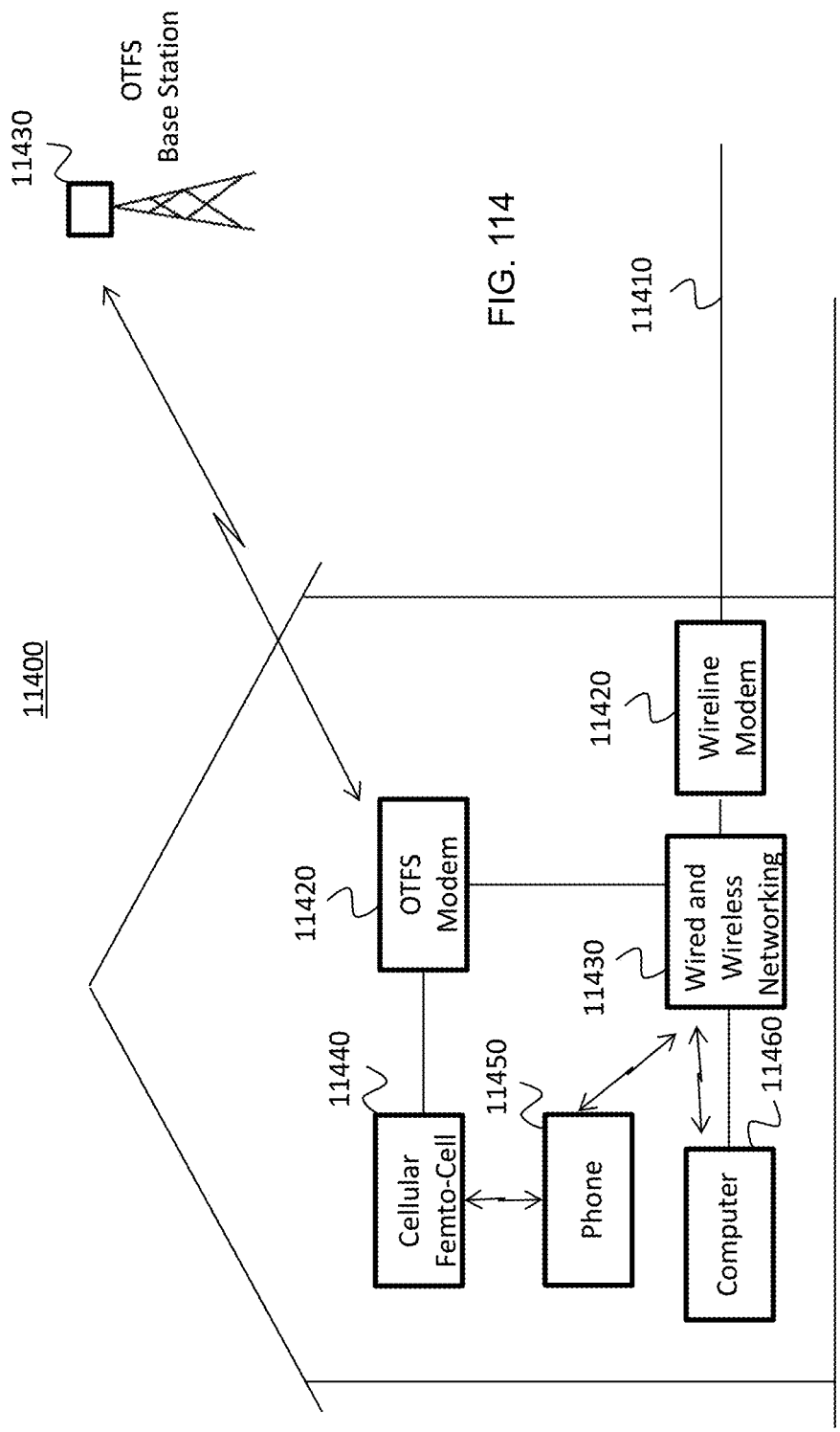

FIG. 114 an example of an OTFS network and a wired network, in accordance with some example embodiments. FIG. 114 is similar to FIG. 113 except that FIG. 114 includes wireline service via cable 11410 and wireline modem 11420 to provide IP and other data to structure 11410. In the example of FIG. 114, the wireline data may provide a baseline data service to structure 11410 including data to wired and wireless networking device 11430. OTFS base station 11430 may provide backbone cellular data service for femto-cell 11440. When service is not available via cable 11410 and wireline modem 11420, OTFS modem 11420 may instead provide service to wired and wireless networking device 11430 and the supported devices such as computer 11460 and/or phone 11450. Service via cable 11410 and wireline modem 11420 may not be available when a wireline system fails or wireline modem 11420 fails so that no data is available (or a reduced throughput) via cable 11410.

Figure 115:
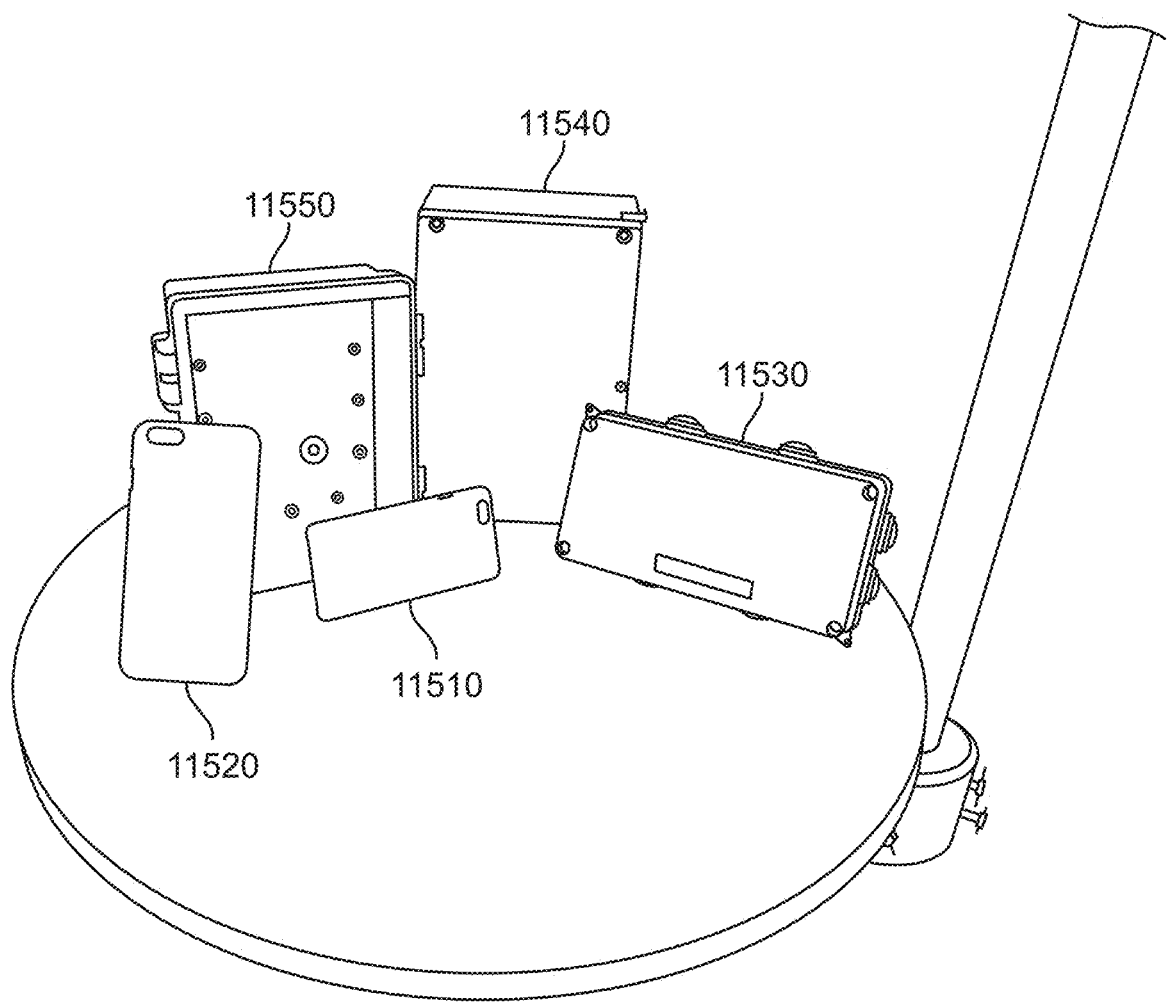

FIG. 115 depicts examples of cases and enclosures that are OTFS surfaces, in accordance with some example embodiments. FIG. 115 depicts examples of cases 11510 and 11520 for smartphones that include OTFS surfaces. At 11530, 11540, and 11550 are enclosures that include OTFS surfaces. The enclosures may protect electronic or electrical equipment form the environment as well as being OTFS surfaces. The enclosures may house electronics or electrical equipment related to, or unrelated to, networking or data communications.

It will be appreciated that the disclosed techniques can be used to implement embodiments in which a surface of an object, which is intended to perform a non-digital communication function such as heat sink, or screen protection, or other examples given in the present document, can also be adapted for OTFS signal reception. The surface may also be adapted to transmit OTFS signals. Using the pre-coding techniques described in Section 4, hundreds and hundreds of receiving devices with their antenna surfaces may be provided with network connectivity using digital communication techniques such as massive MIMO and pre-coding.

With regard to the embodiments described above, the features may be included in any combination. The wireless receiver may include a transmitter to transmit the determined digital data according to a short-range wireless standard. The wireless receiver may include a cellular femto-cell transmitter to transmit the determined digital data according to a cellular radio standard. The cellular radio standard may include one or more of a 3G standard, a 4G standard, a Long Term Evolution standard, or a 5G standard. The digital amplitude modulation constellation may be mapped to a delay-Doppler domain by transforming the digital amplitude modulation signal into a 2D transformed orthogonal time frequency space signal using a 2D Fourier transform from a 2D time-frequency domain to a 2D delay-Doppler domain. The digital amplitude modulation constellation may be a quadrature amplitude modulation (QAM). The surface may be a cellular phone case and the wireless receiver apparatus may be embedded in the cellular phone case. The surface may be configured as a clothing button. The surface may be an eyeglass frame. The surface may be a lock.

6.4 Light Bulbs with Integrated Antennas

This section discloses implementations that include light bulbs for illumination of an area that include wireless antennas for wireless communications. For example, a street light or other exterior light may provide illumination of a road or sidewalk or other area. In the disclosed subject matter, the bulb portion in the street light includes one or more electronically steerable antennas for wireless communications. Each electronically steerable antenna may include a plurality of other antennas where real-time adjustment of phasing and amplitude of electronic feeds to the other antennas antenna causes steering of one or more beams associated with each electronically steerable antenna. The one or more electronically steerable antennas may be used in a multiple input multiple output (MIMO) communication scheme, including, for example, in massive MIMO configurations with 64 or 128 or higher transmit antennas. The one or more steerable antennas may be used to transmit signals, or a combination of signals including orthogonal time frequency space (OTFS) modulation, WiFi (any of the IEEE 802.11 family of standards), or cellular standards including 4G, 5G or other cellular standard. Use of OTFS provides some advantages which are described below.

Techniques using orthogonal time frequency space (OTFS) modulation enable precoding of a transmitted signal on a symbol-by-symbol basis thereby creating a more reliable and customized data rate. Some OTFS devices may use low data rates and others may use high data rates. The rapid adjustment of precoded OTFS modulated signals may improve reception by moving receivers or receivers in environments with moving reflectors or interferers. The rapid adjustment of precoded OTFS modulated signals may support multiple simultaneous users. A portion of the computational complexity used by a communication link using precoded OTFS modulated signals resides in the transmitter. In some example embodiments, the receiver may be simplified to a matched filter receiver. Because the receivers of precoded OTFS modulated signals may not have much complexity, they may be small in size, may be formed into any shape, may use little power, and may be inexpensive. The shape, size, and power of an OTFS device may influence the data rate provided to the device with higher power and/or larger antenna size offering higher data rates. Some receivers may be end nodes where the data received is consumed at the end node. Some receivers may re-transmit to another device the data received. For example, a receiver may receive a OTFS modulated signal to determine data and re-transmit the data to another device.

Figure 116:
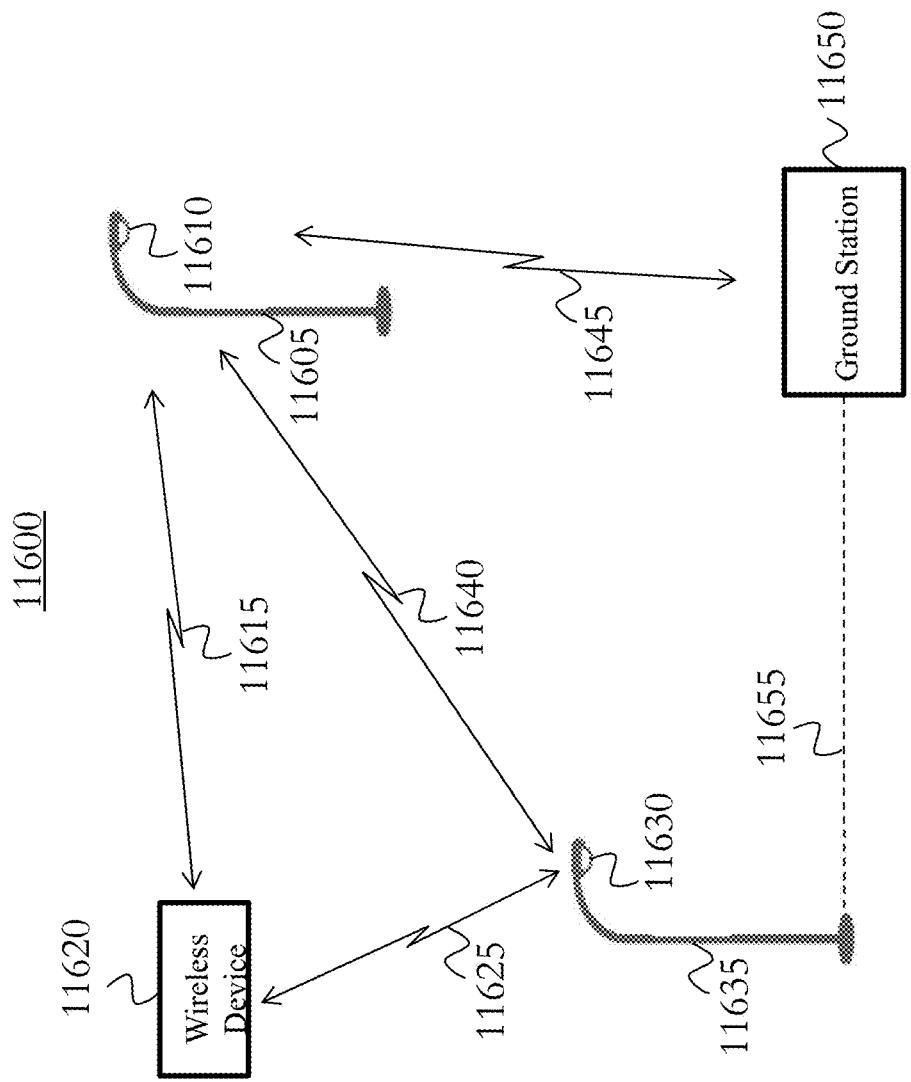

FIG. 116 depicts an example of a wireless system 11600 including a light bulb with integrated antennas, in accordance with some example embodiments. Wireless system 11600 includes ground station 11650 in communication with light pole 11605 and/or 11635 and wireless device 11620 in communication with light pole 11605 and/or 11635.

Light poles 11605 and 11635 include light bulbs 11610 and 11630, respectively. Light bulbs 11610 and 11630 may provide illumination underneath the light poles 11605 and 11635. For example, the light bulbs may illuminate a street or sidewalk or other area underneath the light poles. The light bulbs may include light emitting diode (LED) light sources or other light sources. The light sources may be arranged in a radially symmetrical manner in the light bulb—e.g., on circumference of radome of an antenna, as described in the present document. The number of light sources and their placement may be determined based on the light illumination power of each light source, the total illumination requirement and a desired or target beam of light illumination.

Light bulbs 11610 and 11630 include antennas for wireless communications. The embodiments may also be described as antennas that include illumination function. In one advantageous aspect, the hemispherical antenna appearance may provide the aesthetic look of a conventional street pole light fixture, while at the same time provide wireless connectivity. For example, an antenna in light bulb 11610 may communicate with wireless device 11620. The antenna in 11610 may also communicate wirelessly with ground station 11650. For example, ground station 11650 may be an internet service provider that may provide data service to light bulb 11610 via connection 11645. Light bulb 11610 may perform as an access point to provide data service to wireless device 11620 via connection 11615. Data may be passed from ground station 11650 thru light bulb 11610 to wireless device 11620 via connection 11615. Data may be passed from wireless device 11620 thru light bulb 11610 to ground station 11650 via connection 11615.

Wireless device 11620 may be within range of the antennas at one or more light poles. For example, wireless device may be within range of an antenna in light bulb 11610 at light pole 11605 via connection 11615 and may be within range of light bulb 11630 at light pole 11635 via connection 11625. When the signals from both light poles are sufficiently high, wireless device 11620 may select which light pole to communicate with, or wireless device may commanded to use one of the light poles, or no selection may be made. Wireless device 11620 may include a phone, smartphone, laptop, netbook, or any other wireless device. The data passed between wireless device 11620 and one or more light poles may operate using OTFS or other wireless communication scheme. Wireless device 11620 may be mobile whereas wireless device 120 moves, communication with the wireless device may be handed-off to different light poles according to the movement.

Ground station 11650 may be a central office, hub, or other station providing data communication service to remote access points such as light poles and/or wireless devices. Ground station 11650 may provide wired or wireless service to remote access points such as light poles 11605 and 11635. For example, ground station 11650 may provide wired or fiber optic communication to light pole 11635. In turn, light pole 11635 may provide wireless access to one or more wireless devices such as wireless device 11620. Ground station 11650 may provide wireless communications to light pole 11605. In turn, light pole 11605 may provide wireless access to one or more wireless devices such as wireless device 11620. In some example embodiments, a light pole may perform as a relay from ground station 11650 to another light pole. For example, ground station 11650 may wirelessly provide data service to light pole 11605 via connection 11645, and light pole 11605 may act as a relay to light pole 11635 via connection 11640, and light pole 11635 may provide data service to wireless device 11620 via connection 11625. In another example, ground station 11650 may provide data service to light pole 11635 via wired connection 11655, and light pole 11635 may act as a relay to light pole 11605 via connection 11640, and light pole 11605 may provide data service to wireless device 11620 via connection 11615.

Figure 117:
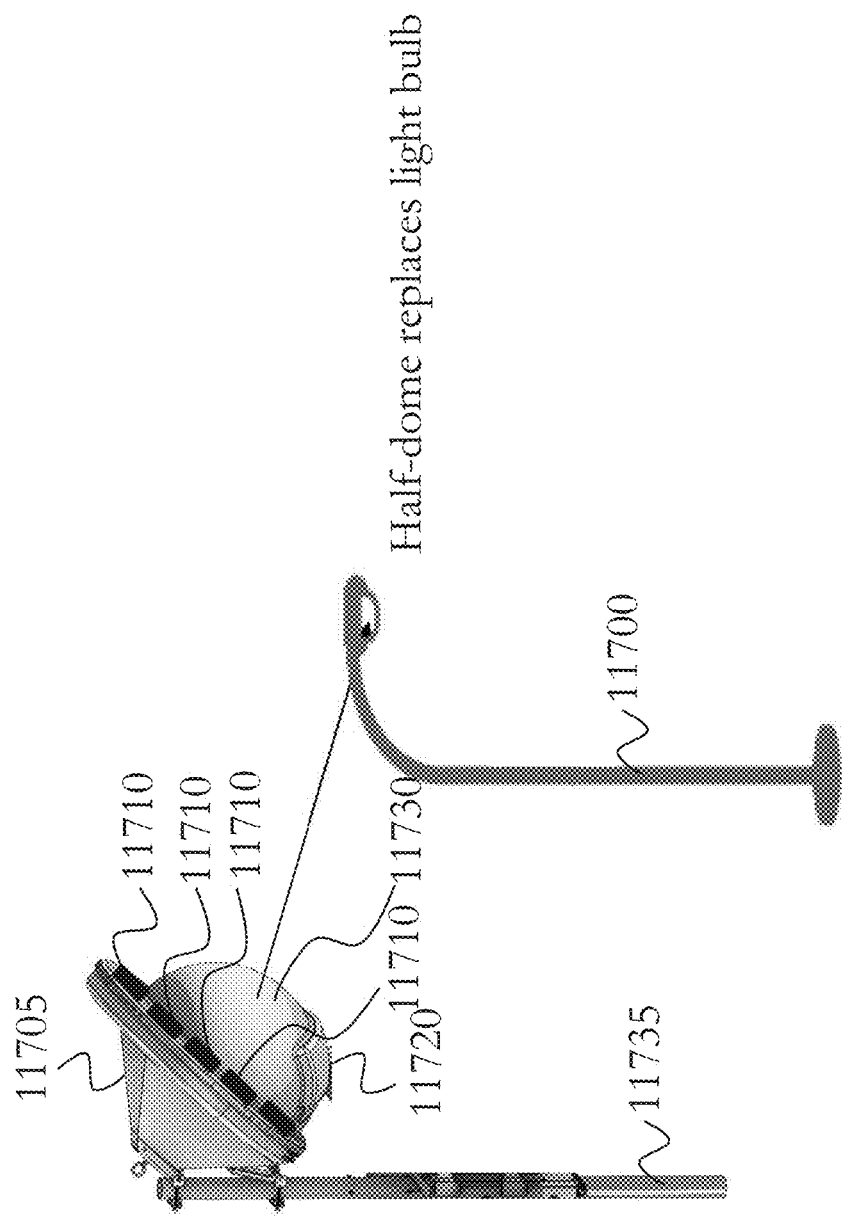

FIG. 117 depicts an example of a light pole 11700 and an exploded view of the top of the light pole including a light bulb, in accordance with some example embodiments. The light bulb 11705 includes light sources 11710 which may be LEDs or other light sources. Five light sources are shown in FIG. 117 but any other number of light sources may be used. In some example embodiments, light bulb 11705 also includes a housing for the light bulb. For example, light bulb 11705 may be mounted or housed in a housing that may be mounted to a light pole. In some example embodiments, light bulb 11705 is a direct replacement for an existing street light such as a sodium street lamp or other street light. As a direct replacement, light bulb 11705 may provide the same or better lighting than the street lamp it replaces in addition to providing wireless services not provided by the original street lamp. Light bulb 11705 includes one or more antennas such as an antenna at 11720. The one or more antennas may be conformal to a curved surface. One or more of the antennas may include a Luneburg lens to focus and direct the electromagnetic waves to/from the antennas in light bulb 11705. Light bulb 11705 may also include a radome 11730.

Figure 118:
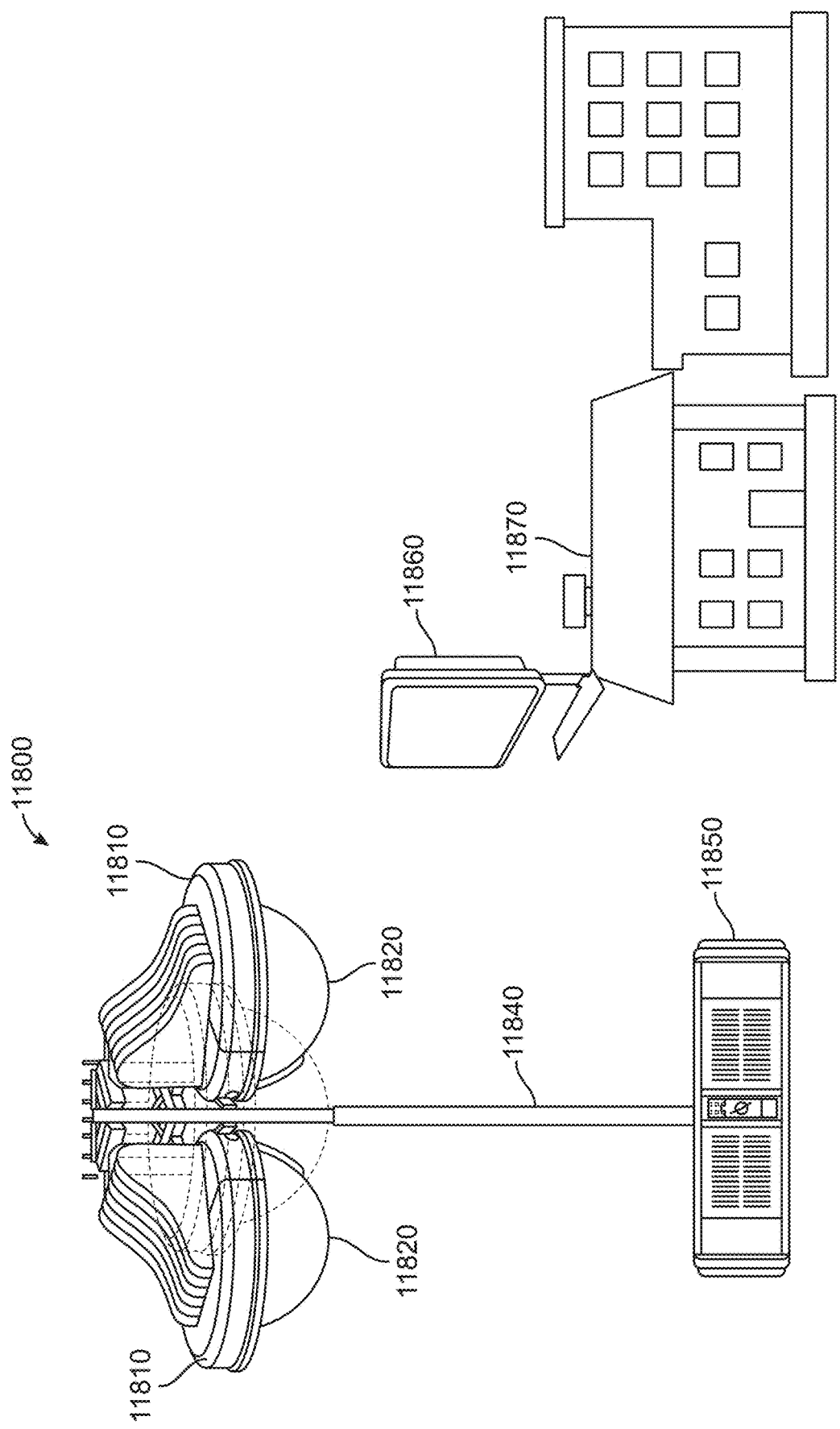

FIG. 118 depicts another example of a light pole 11800 with a light bulb that includes antennas for wireless communications, in accordance with some example embodiments. In the example of FIG. 118, two light bulbs with integrated antennas 11810 are shown attached to pole 11840. The light bulbs and antennas may be similar to those described with respect to FIG. 117. Light bulbs with integrated antennas 11810 may be connected through pole 11840 to base electronics 11840. Base electronics 11850 may include power supply circuits, networking circuits, power amplifiers, modulation/demodulation, and other signal processing and/or networking circuits. In addition to being placed on light poles, the light bulbs and integrated antennas may be mounted to a building 11870.

Figure 119:
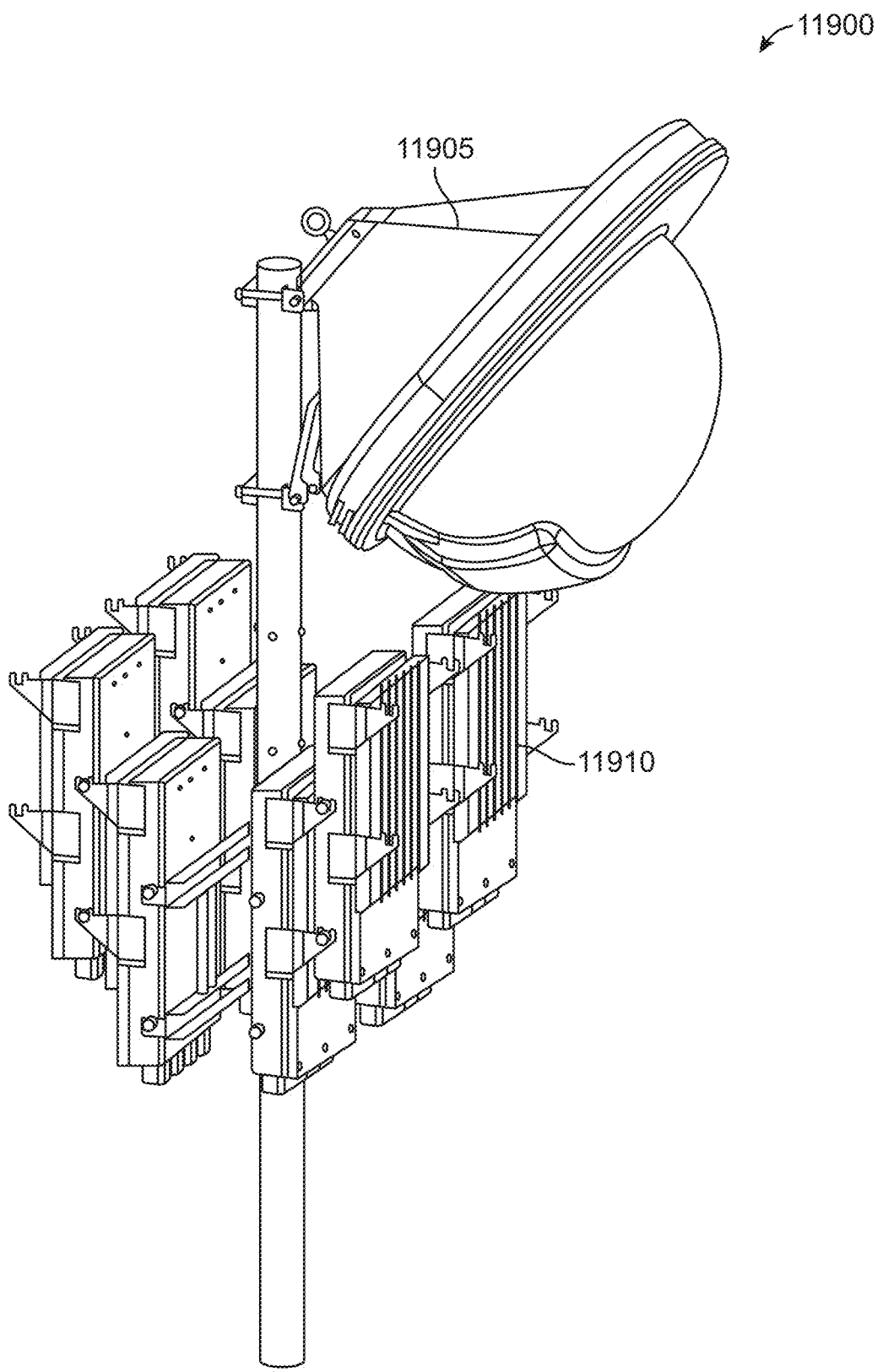

FIG. 119 depicts an example of a light pole 11900 including a light bulb, an antenna, and signal processing electronics, in accordance with some example embodiments. In the example of FIG. 119, some or all of the base electronics such as base electronics 11850 in FIG. 118 may be mounted on the light pole at an above ground location. In the example of FIG. 119, the base electronics 11910 is mounted near the top of the light pole near where light bulb 11905 is located.

Figure 120:
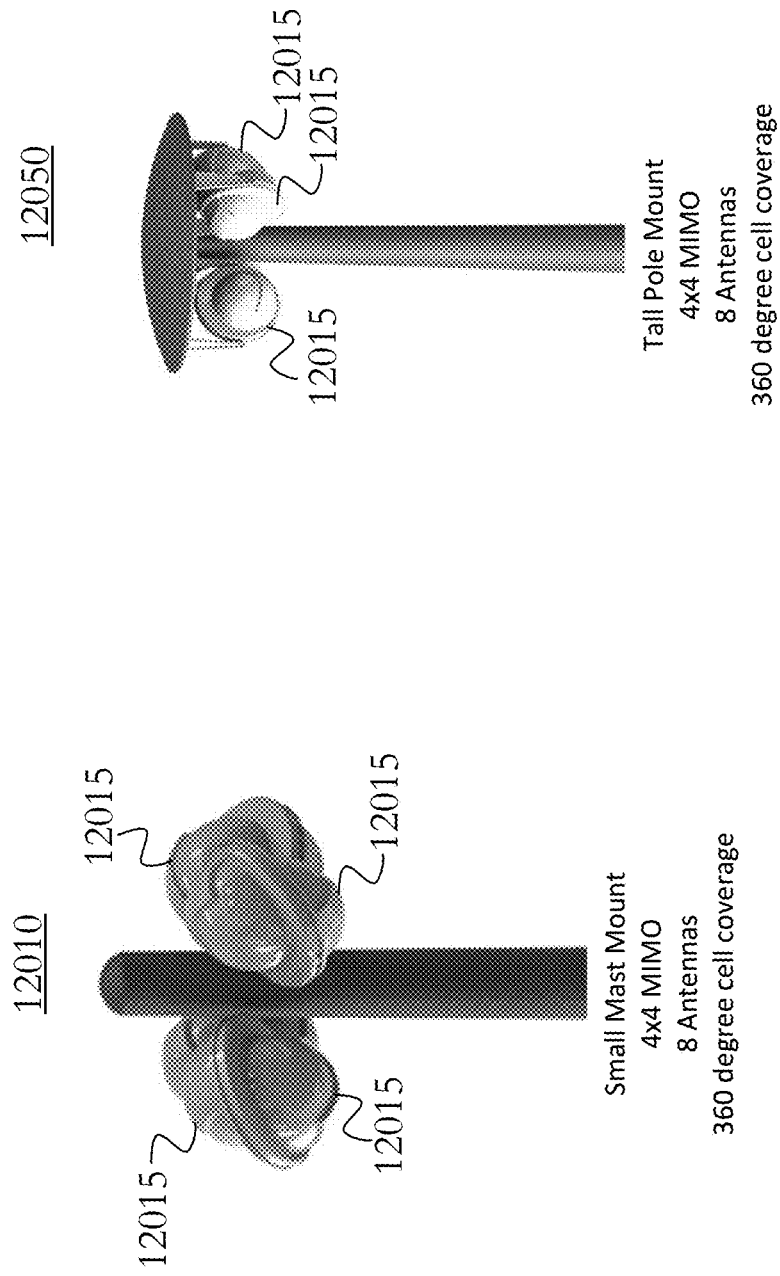

FIG. 120 depicts an example of a mast mounted antenna 12010 and an example of a pole mounted antenna 12050, in accordance with some example embodiments.

Mast mounted antenna 510 and/or pole mounted antenna 12050 may include four or another number of antennas. In the examples shown at 12010 and 12050, each antenna 12015 may provide coverage for a quadrant of hemispherical space. Other numbers of antennas with different corresponding coverages may also be used. In the example at 12010, antennas 12015 may provide 4×4 MIMO, each antenna 12015 may include two internal antennas. Other numbers of internal antennas and other MIMO diversity values may be provided.

Figure 121:
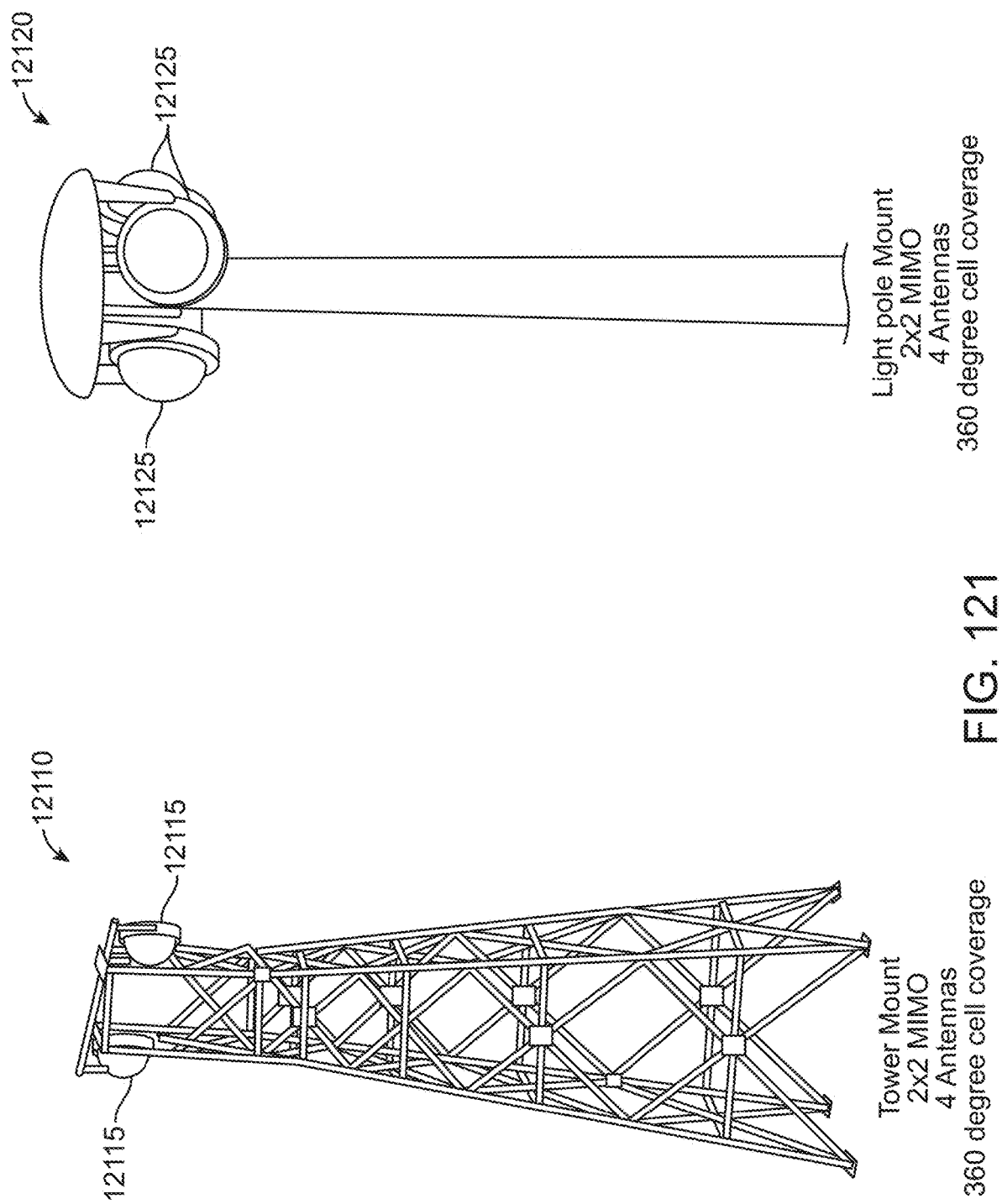

FIG. 121 depicts an example of a tower mounted antenna 12110 and another example of a pole mounted antenna 12120, in accordance with some example embodiments.

The example tower mounted antenna shown at 12110 includes two antennas 12115. Each antenna 12115 may provide coverage for half of hemispherical space. In the example at 12110, antennas 12115 may provide 2×2 MIMO, each antenna 12115 may include two internal antennas. Other numbers of internal antennas and other MIMO diversity values may be provided.

The example light pole mounted antenna shown at 12120 includes four antennas 12125. Each antenna 12125 may provide coverage for quadrant of hemispherical space. In the example at 12120, antennas 12125 may provide 2×2 MIMO, each antenna 12125 may include two internal antennas. Other numbers of internal antennas and other MIMO diversity values may be provided.

It will be appreciated that the present document discloses an apparatus that combines wireless transmissions/reception antenna functionality with light illumination functionality. Due to the antenna design, and placement of light on the outer perimeter of the antenna (e.g., at the ground plane of the hemispherical antenna), the operation of light sources and antenna can occur simultaneously, and without interfering with each other.

Figure 122:
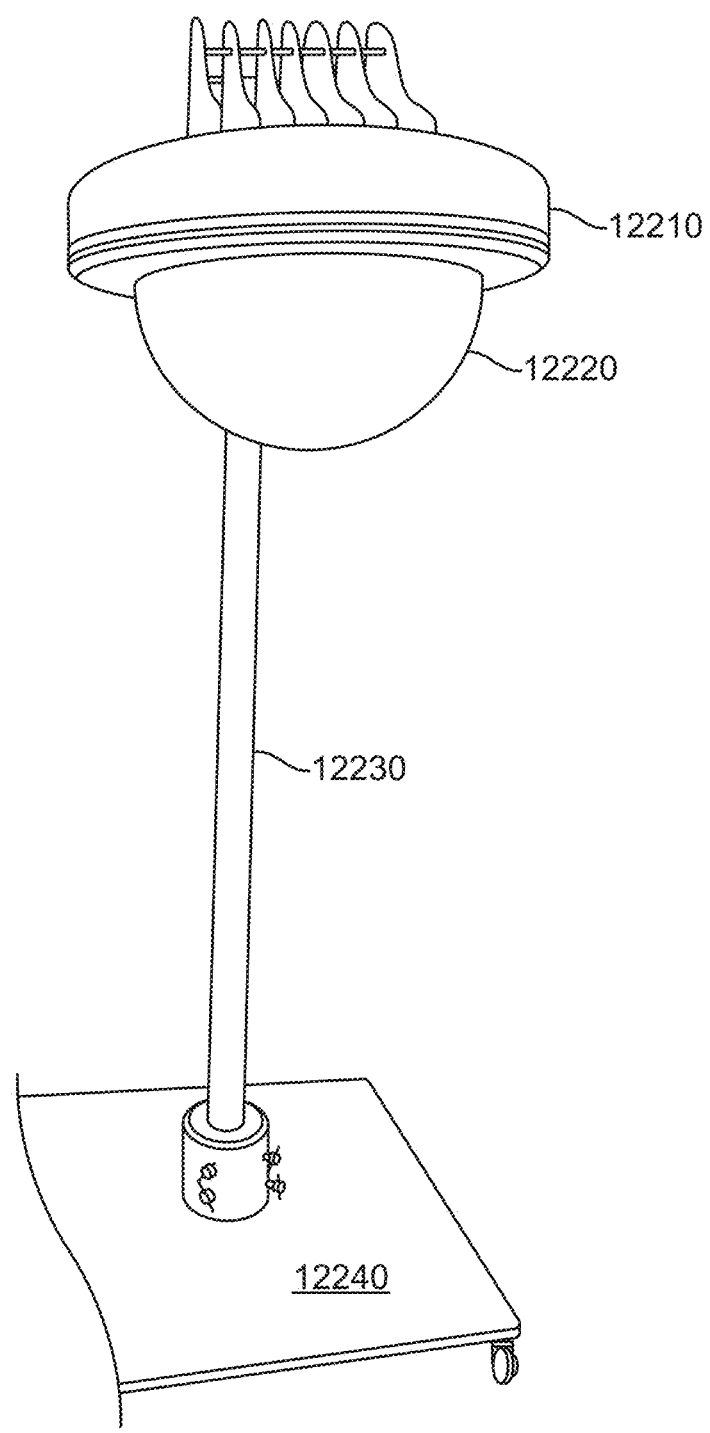

FIG. 122 depicts an example of a light pole, in accordance with some example embodiments. The example of FIG. 122 shows, at 12220, one or more lights and one or more antennas as described above. At 12210 a housing for the light and antenna device is shown. At 12230 is a pole supporting 12210 and 12220. The height of the pole is shown to be approximately 5 feet but the pole may be any other height such as the height of a street light pole. Pole 12230 is held in place by the base 12240. Base 12240 may be a plate of material such as metal or the base may be concrete such as a light pole installed in the ground. The "half coat hanger" shaped structures on top of the light bulb area may be used as heat sinks to dissipate the heat generated during the operation of light and/or communication aspects. In some embodiments, pole 12230 may instead be attached to the side of a building or other object and may provide dual function of illumination and wireless connectivity.

With regard to the embodiments described above, the following features may be included in any combination. The light bulb may be coupled to a light pole. The light pole may be a street light pole. The light bulb may illuminate an area of ground including one or more of a street, sidewalk, walkway, dirt area, or other outside area. The steerable directional antenna may include a luneberg lens. The steerable directional antenna may support a MIMO communications scheme. The light bulb may further include a cellular transceiver, a WiFi transceiver, or other wireless networking transceiver. The cellular transceiver may support one or more of a 3G standard, a 4G standard, a Long Term Evolution standard, or a 5G standard. A digital amplitude modulation constellation may be mapped to a delay-Doppler domain by transforming the digital amplitude modulation signal into a 2D transformed orthogonal time frequency space signal using a 2D Fourier transform from a 2D time-frequency domain to a 2D delay-Doppler domain.

Some embodiments and techniques may be described using the following clause-based description.

1. A light bulb apparatus, comprising:
one or more light sources; and a steerable directional antenna coupled to the one or more light sources, wherein the steerable directional antenna is further coupled to a transmitter, wherein the transmitter maps digital data to a digital amplitude modulation constellation in a time-frequency space, and wherein the digital amplitude modulation constellation is mapped to a delay-Doppler domain and transmitted to the steerable directional antenna according to an orthogonal time frequency space (OTFS) modulation signal scheme.

2. The apparatus of clause 1, wherein the light bulb is coupled to a light pole.

3. The apparatus of clause 2, wherein the light pole is a street light pole.

4. The apparatus of clause 1, wherein the light bulb illuminates an area of ground including one or more of a street, sidewalk, walkway, dirt area, or other outside area.

5. The apparatus of clause 1, wherein the steerable directional antenna includes a Luneburg lens.

6. The apparatus of clause 5, wherein the steerable directional antenna supports a MIMO communications scheme.

7. The apparatus of clause 1, wherein the light bulb apparatus further comprises:
a cellular transceiver, a WiFi transceiver, or other wireless networking transceiver.

8. The apparatus of clause 7, wherein the cellular transceiver supports one or more of a 3G standard, a 4G standard, a Long Term Evolution standard, or a 5G standard.

9. The apparatus of clause 1, wherein the digital amplitude modulation constellation is mapped to a delay-Doppler domain by transforming the digital amplitude modulation signal into a 2D transformed orthogonal time frequency space signal using a 2D Fourier transform from a 2D time-frequency domain to a 2D delay-Doppler domain.

10. A method of illumination and wireless networking, the method comprising:
illuminating, by one or more light sources, an area of street, sidewalk, or ground; and
wirelessly communicating to a user node via a steerable directional antenna coupled to the one or more light sources, wherein the steerable directional antenna is further coupled to a transmitter, wherein the transmitter maps digital data to a digital amplitude modulation constellation in a time-frequency space, and wherein the digital amplitude modulation constellation is mapped to a delay-Doppler domain and transmitted to the steerable directional antenna according to an orthogonal time frequency space (OTFS) modulation signal scheme.

11. The method of clause 10, wherein the light bulb is coupled to a light pole.

12. The method of clause 11, wherein the light pole is a street light pole.

13. The method of clause 10, wherein the steerable directional antenna includes a luneberg lens.

14. The method of clause 10, wherein the steerable directional antenna supports a MIMO communications scheme.

Section 7: Exemplary Methods for Implementation Aspects for OTFS

FIG. 123 is a flowchart showing operations performed in an example method 12300 for wireless communication. The method 12300 includes, at step 12310, allocating resources for wireless transmissions, wherein the resources correspond to resource elements in one or more two-dimensional transmission frames, wherein each transmission frame comprises a first number of units along a delay dimension and a second number of units along a Doppler dimension, and wherein an aspect ratio of the transmission frame is variable over a time period. The method 12300 includes, at step 12320, generating a waveform based on the allocated resources.

FIG. 124 is a flowchart showing operations performed in an example method 12400 for wireless communication. The method 12400 includes, at step 12410, receiving, at a user device, information associated with resources allocated for wireless transmissions, wherein the resources correspond to resource elements in one or more two-dimensional transmission frames, wherein each transmission frame comprises a first number of units along a delay dimension and a second number of units along a Doppler dimension, and wherein an aspect ratio of the transmission frame is variable over a time period.

The method 12400 includes, at step 12420, transmitting or receiving a waveform using the information pertaining to the user device.

FIG. 125 is a flowchart showing operations performed in an example method 12500 for wireless communication. The method 12500 includes, at step 12510, precoding by applying a Doppler dimension transform to the data bits, thereby producing precoded data.

The method 12500 includes, at step 12520, mapping the precoded data to transmission resources in one or more Doppler dimensions, along a delay dimension.

The method 12500 includes, at step 12530, generating transformed data by transforming the precoded data using an orthogonal time frequency space transform.

The method 12500 includes, at step 12540, converting the transformed data into a time domain waveform corresponding to the signal.

FIG. 126 is a flowchart showing operations performed in an example method 12600 for wireless communication. The method 12600 includes, at step 12610, converting a received time domain waveform into an orthogonal time frequency space (OTFS) signal by performing an inverse OTFS transform. The method 12600 includes, at step 12620, extracting, from the OTFS signal, modulated symbols along one or more Doppler dimensions. The method 12600 includes, at step 12630, applying an inverse precoding transform to the extracted modulated symbols. The method 12600 includes, at step 12640, recovering data bits from an output of the inverse precoding transform.

In methods 12300, 12400, 12500 and 12600, the aspect ratio of the transmission frame (e.g., the ratio of number of delay units and number of dimension units) may be changed over a period of time. This change may be performed to accommodate user data packet size changes. For example, the aspect ratio may be changed such that one user device packet maps to one PRB in the delay-Doppler grid. Various methods may be used for signaling the change from a transmitting device (or a device that controls resource scheduling) to a receiving device. The signaling may be performed sufficiently in advance (e.g., 1 millisecond, or one transmit time interval TTI) so that the receiving device may adapt its PHY and MAC for the change in the aspect ratio.

In some embodiments, the methods 12300, 12400, 12500 and 12600 may operate using transmission frames that are made up of physical resource blocks that comprise a fixed number of resource elements along the Doppler domain. Each assigned Doppler domain resource may include one or more PRBs, as may be selected based on user data packet size.

Some embodiments and techniques related to methods 12300, 12400, 12500 and 12600 may be described using the following clause-based description.

1. A method of allocating transmission resources, comprising:
   allocating resources for wireless transmissions, wherein the resources correspond to resource elements in one or more two-dimensional transmission frames, wherein each transmission frame comprises a first number of units along a delay dimension and a second number of units along a Doppler dimension, and wherein an aspect ratio of the transmission frame is variable over a time period; and generating a waveform based on the allocated resources.

2. The method of clause 1, further including: changing an aspect ratio of the transmission frame in response to a size of user data packets.

3. The method of clauses 1 or 2, wherein the transmission resources correspond to uplink transmissions by multiple user devices, and wherein the method further comprises: signaling the aspect ratio or a change in the aspect ratio using a scheme from one or more of: (a) downlink control channel signaling, (b) upper layer signaling, (c) implicit indication, or (d) signal detection.

4. The method of clauses 1 or 2, wherein the transmission resources correspond to downlink transmissions to one or more user devices, and wherein the method further comprises:
   signaling the aspect ratio or a change in the aspect ratio using a scheme from one or more of: (a) common downlink control channel signaling, (b) upper layer signaling, (c) implicit indication, or (d) signal detection.

5. The method of any of clauses 1 to 4, further comprising: signaling one or more of subcarrier spacing, a number of sub-carriers in the transmission frames, a number of symbols in the transmission frames, symbol duration and cyclic prefix duration.

6. The method of any of clauses 1 to 5, wherein the transmission frames comprise physical resource blocks that comprise a fixed number of resource elements along the delay domain in one Doppler dimension.

7. The method of clause 6, wherein each Doppler domain value comprises one or more physical resource blocks.

8. The method of clause 2, wherein the changing the aspect ratio includes selecting a number of delay dimension units to be equal to number of resource elements in one physical resource block or an integer number of physical resource blocks, and wherein a number of Doppler dimension units is adjusted such that the number of resource elements in a rectangular matrix is a constant.

9. A method of wireless communication, comprising:
   receiving, at a user device, information associated with resources allocated for wireless transmissions, wherein the resources correspond to resource elements in one or more two-dimensional transmission frames, wherein each transmission frame comprises a first number of units along a delay dimension and a second number of units along a Doppler dimension, and wherein an aspect ratio of the transmission frame is variable over a time period; and transmitting or receiving a waveform using the information pertaining to the user device.

10. The method of clause 9, wherein the transmitting the waveform includes transmitting the waveform that is a mathematical equivalent of a target waveform generated by assigning data symbols to resource elements and converting a resulting signal into time-domain by an operation comprising a first step is a 2-dimensional Fourier transform to convert the resulting signal to the time-frequency domains, and a second step of converting an output signal of the first step to the time-domain by performing an inverse Fourier transform, and prepending a cyclic prefix to every orthogonal frequency division multiplexing symbol.

11. The method of clause 9, wherein the transmitting the waveform includes transmitting the waveform that is a mathematical equivalent of a target waveform generated by assigning data symbols to resource elements and converting a resulting signal into time-domain by an operation comprising a single step of applying a Fourier transform to convert from Doppler to time dimension.

12. A method of wireless communication, comprising: generating, from data bits, a signal for transmission wherein the signal corresponds to an output of operations of: precoding by applying a Doppler dimension transform to the data bits, thereby producing precoded data; mapping the precoded data to transmission resources in one or more Doppler dimensions, along a delay dimension; generating transformed data by transforming the precoded data using an orthogonal time frequency space transform; and converting the transformed data into a time-domain waveform corresponding to the signal.

13. The method of clause 12, wherein the Doppler dimension transform has a size that is a function of size of data bits.

14. A method of wireless communication, comprising:
generating, from a received signal, data bits wherein the signal corresponds to an output of transmitter-side operations of: precoding by applying a Doppler dimension transform to the data bits, thereby producing precoded data; mapping the precoded data to transmission resources in one or more Doppler dimensions, along a delay dimension; generating transformed data by transforming the precoded data using an orthogonal time frequency space transform; and converting the transformed data into a time-domain waveform.

15. The method of clause 14, wherein the Doppler dimension transform has a size that is a function of size of data bits.

16. A method of wireless communication, comprising: converting a received time-domain waveform into an orthogonal time frequency space (OTFS) signal by performing an inverse OTFS transform; extracting, from the OTFS signal, modulated symbols along one or more Doppler dimensions; applying an inverse precoding transform to the extracted modulated symbols; and recovering data bits from an output of the inverse precoding transform.

17. The method of any of clauses 12 to 16, wherein the precoding transform is a discrete Fourier transform (DFT).

18. The method of clause 16, wherein performing the inverse OTFS transform comprises: converting the received time-domain waveform to a waveform in a frequency-time plane based on a conventional OFDM demodulation process; and converting the waveform in the frequency-time plane to the OTFS signal in a delay-Doppler plane using an inverse symplectic transform.

19. The method of clause 16, wherein performing the inverse OTFS transform comprises: converting the received time-domain waveform to the OTFS signal in a delay-Doppler plane based on an Fourier transform in a Doppler domain.

FIG. 127 is a flowchart showing operations performed in an example method 12700 for wireless communication using an orthogonal time frequency space (OTFS) signal comprising one or more OTFS frames in a two-dimensional delay-Doppler domain grid. The method 12700 includes, at step 12710, generating a signal by concatenating orthogonal time frequency space (OTFS) symbols in a CP-less (cyclic-prefix-less) manner, wherein in each OTFS frame in a two-dimensional delay-Doppler domain grid, for at least some Doppler domain values, a split allocation scheme is used for assigning transmission resources along delay dimension, wherein the split allocation scheme includes allocating a first portion to user data symbols and a second portion to non-user data symbols.

In some embodiments, each Doppler domain value includes the split allocation. In other embodiments, each Doppler domain value comprises a same size of the second portion.

The method 12700 includes, at step 12720, transmitting the signal over a wireless channel.

FIG. 128 is a flowchart showing operations performed in an example method 12800 for wireless communication using an orthogonal time frequency space (OTFS) signal comprising one or more OTFS frames in a two-dimensional delay-Doppler domain grid. The method 12800 includes, at step 12810, partitioning resource elements of an OTFS frame into a first set and a second set that include resource elements along a delay dimension of the two-dimensional delay-Doppler domain grid. The method 12800 includes, at step 12820, using the first set of resource elements for non-user data symbols. The method 12800 includes, at step 12830, using the second set of resource elements to user data symbols, wherein the second set of resource elements comprises lower-numbered delay domain values. For example, the delay domain values with lower indices are assigned to user data. Consequently, the higher-numbered (or indexed) delay domain values are used for the non-user data (or Guard Grid symbols). The method 12800 includes, at step 12840, converting the OTFS frame to time-domain samples in a non-cyclic-prefix manner. The method 12800 includes, at step 12850, generating a transmission waveform for the OTFS signal comprising the time-domain samples.

FIG. 129 is a flowchart showing operations performed in an example method 12900 for wireless communication using an orthogonal time frequency space (OTFS) signal comprising one or more OTFS frames in a two-dimensional delay-Doppler domain grid. The method 12900 includes, at step 12910, receiving the OTFS signal comprising time-domain samples.

The method 12900 includes, at step 12920, converting the time-domain samples to an OTFS frame in a non-cyclic-prefix manner, wherein resource elements of the OTFS frame are partitioned into a first set and a second set that include resource elements along a delay dimension of the two-dimensional delay-Doppler domain grid, wherein the first set of resource elements are used for non-user data symbols, and wherein the second set of resource elements are used for user data symbols. The method 12900 includes, at step 12930, performing channel estimation or equalization based on the first set of resource elements. In methods 12700, 12800 and 12900, the delay dimension of the two-dimensional delay-Doppler domain grid is used to allocate the corresponding resource elements of the OTFS frame to a user. Some embodiments and techniques related to methods 12700, 12800 and 12900 may be described using the following clause-based description.

1. A wireless transmission method, comprising:
generating a signal by concatenating orthogonal time frequency space (OTFS) symbols in a CP-less (cyclic-prefix-less) manner, wherein in each OTFS frame in a two-dimensional delay-Doppler domain grid, for at least some Doppler domain values, a split allocation scheme is used for assigning transmission resources along delay dimension, wherein the split allocation scheme includes allocating a first portion to user data symbols and a second portion to non-user data symbols; and transmitting the signal over a wireless channel.

2. The method of clause 1, wherein each Doppler domain value includes the split allocation.

3. The method of clauses 1 or 2, wherein each Doppler domain value comprises a same size of the second portion.

4. The method of any of clauses 1 to 3, wherein the non-user data symbols comprise zero valued symbols.

5. The method of any of clauses 1 to 3, wherein the second portion of the lowest numbered Doppler domain value comprises known symbols, and wherein the second portion of the other Doppler domain values comprise zero-valued symbols.

6. The method of any of clauses 1 to 5, further comprising:
transmitting information associated with the split allocation.

7. The method of any of clauses 1 to 5, wherein information associated with the split allocation is communicated as part of control channel signaling.

8. The method of any of clauses 1 to 5, wherein information associated with the split allocation is communicated using physical characteristics of the OTFS signal.

9. The method of clause 1, wherein the second portion comprises zero non-user data symbols.

10. A method for wireless communication using an orthogonal time frequency space (OTFS) signal comprising one or more OTFS frames in a two-dimensional delay-Doppler domain grid, the method comprising: partitioning resource elements of an OTFS frame into a first set and a second set that include resource elements along a delay dimension of the two-dimensional delay-Doppler domain grid; using the first set of resource elements for non-user data symbols; using the second set of resource elements to user data symbols, wherein the second set of resource elements comprises lower-numbered delay domain values; converting the OTFS frame to time-domain samples in a non-cyclic-prefix manner; and generating a waveform for transmission the OTFS signal comprising the time-domain samples.

11. The method of clause 10, wherein the delay dimension of the two-dimensional delay-Doppler domain grid is used to allocate the corresponding resource elements of the OTFS frame to a user.

12. The method of clauses 10 or 11, further comprising: transmitting information associated with the partitioning of the resource elements of the OTFS frame.

13. The method of clauses 10 or 11, wherein information associated with the partitioning of the resource elements of the OTFS frame is communicated as part of control channel signaling.

14. The method of clauses 10 or 11, wherein information associated with the partitioning of the resource elements of the OTFS frame is communicated using physical characteristics of the OTFS signal.

15. The method of any of clauses 10 to 14, wherein a zero-valued symbol is assigned to each of the first set of resource elements.

16. The method of any of clauses 10 to 14, wherein known symbols are assigned to the first set of resource elements.

17. The method of any of clauses 10 to 14, wherein known symbols are assigned to resource elements of the first set that correspond to a lowest numbered Doppler domain value, and wherein zero-valued symbols are assigned to other resource elements of the first set.

18. The method of clause 16, wherein the known symbols comprise pre-defined cyclic prefix or data-dependent symbols.

19. The method of any of clauses 10 to 18, wherein each of the one or more OTFS frames is preceded by a plurality of initial guard samples.

20. A method for wireless communication using an orthogonal time frequency space (OTFS) signal comprising one or more OTFS frames in a two-dimensional delay-Doppler domain grid, the method comprising: receiving the OTFS signal comprising time-domain samples; converting the time-domain samples to an OTFS frame in a non-cyclic-prefix manner, wherein resource elements of the OTFS frame are partitioned into a first set and a second set that include resource elements along a delay dimension of the two-dimensional delay-Doppler domain grid, wherein the first set of resource elements are used for non-user data symbols, wherein the second set of resource elements are used for user data symbols, and wherein the second set of resource elements comprises lower-numbered delay domain values; and performing channel estimation or equalization based on the first set of resource elements.

21. The method of clause 20, wherein the delay dimension of the two-dimensional delay-Doppler domain grid is used to allocate the corresponding resource elements of the OTFS frame to a user.

22. The method of clauses 20 or 21, further comprising: receiving information associated with the partitioning of the resource elements of the OTFS frame.

23. The method of clauses 20 or 21, wherein information associated with the partitioning of the resource elements of the OTFS frame is inferred from control channel signaling.

24. The method of clauses 20 or 21, wherein information associated with the partitioning of the resource elements of the OTFS frame is inferred from physical characteristics of the OTFS signal.

25. The method of any of clauses 20 to 24, wherein a zero-valued symbol is assigned to each of the first set of resource elements.

26. The method of any of clauses 20 to 24, wherein known symbols are assigned to the first set of resource elements.

27. The method of any of clauses 20 to 24, wherein known symbols are assigned to resource elements of the first set that correspond to a lowest numbered Doppler domain value, and wherein zero-valued symbols are assigned to other resource elements of the first set.

28. The method of clause 27, wherein the known symbols comprise pre-defined cyclic prefix or data-dependent symbols.

FIG. 130 is a flowchart illustrating an example method 13000 for wireless communication using OTFS. The method 13000 includes, at step 13010, generating a plurality of coded bits from a plurality of data bits using a forward error correction (FEC) coder.

The method 13000 includes, at step 13020, generating a plurality of symbols from the plurality of coded bits using a symbol mapper.

The method 13000 includes, at step 13030, generating a time-domain signal based on an inverse Fast Fourier Transform (IFFT) of the plurality of symbols, wherein the IFFT is computed in a Doppler domain.

The method 13000 includes, at step 13040, generating the OTFS signal based on time-interleaving the time-domain signal.

The method 13000 includes, at step 13050, generating a transmission waveform of the OTFS signal.

Some embodiments and techniques related to method 13000 may be described using the following clause-based description.

1. A method for wireless communication using an orthogonal time frequency space (OTFS) signal, comprising: generating a plurality of coded bits from a plurality of data bits using a forward error correction (FEC) coder; generating a plurality of symbols from the plurality of coded bits using a symbol mapper; generating a time-domain signal based on an inverse Fast Fourier Transform (IFFT) of the plurality of symbols, wherein the IFFT is computed in a Doppler domain; generating the OTFS signal based on time-interleaving the time-domain signal; and generating a transmission waveform of the OTFS signal.

2. A method for wireless communication using an orthogonal time frequency space (OTFS) signal, comprising: receiving the OTFS signal; generating a time-domain signal based on time-deinterleaving the OTFS signal; generating a plurality of symbols based on an Fast Fourier Transform (FFT) of the time-domain signal, wherein the FFT is computed in a delay domain; generating a plurality of coded bits from the plurality of symbols using a symbol demapper; and generating a plurality of data bits from the plurality of coded bits using a forward error correction (FEC) decoder.

3. A method for wireless communication using an orthogonal time frequency space (OTFS) signal, comprising: generating a plurality of coded bits from a plurality of data bits using a forward error correction (FEC) coder; generating a plurality of symbols from the plurality of coded bits using a symbol mapper; generating a symbol stream based on repeating the plurality of symbols in a time-domain; generating a time-domain signal based on phase modulating the symbol stream; generating the OTFS signal based on time-interleaving the time-domain signal; and generating a transmission waveform of the OTFS signal.

4. A method for wireless communication using an orthogonal time frequency space (OTFS) signal, comprising: receiving the OTFS signal; generating a time-domain signal based on time-deinterleaving the OTFS signal; generating a symbol stream based on conjugate phase modulating the time-domain signal; generating a plurality of symbols based periodization of the symbol stream in a time-domain; generating a plurality of coded bits from the plurality of symbols using a symbol demapper; and generating a plurality of data bits from the plurality of coded bits using a forward error correction (FEC) decoder.

5. A method for wireless communication using an orthogonal time frequency space (OTFS) signal, implemented at a base station, the method comprising: receiving the OTFS signal; generating a first signal in a time-frequency domain based on a Fast Fourier Transform (FFT) of the OTFS signal; generating a second signal based on removing at least one cyclic prefix from the first signal; generating a channel estimate in the time-frequency domain based on the second signal and a reference signal; generating a first equalized signal in the time-frequency domain based on the channel estimate and the second signal; generating a first symbol stream in a delay-Doppler domain based on an inverse symplectic Fast Fourier Transform (ISFFT) of the first equalized signal; generating a plurality of coded bits from the third signal using a symbol demapper; and generating a plurality of data bits from the plurality of coded bits using a forward error correction (FEC) decoder.

6. The method of clause 5, further comprising: generating a second symbol stream in the delay-Doppler domain from the plurality of coded bits using a symbol mapper; generating a third signal in the time-frequency domain based on a symplectic Fast Fourier Transform (SFFT) of the second symbol stream; and generating a second equalized signal in the time-frequency domain based on the channel estimate and the third signal.

7. A method for wireless communication using an orthogonal time frequency space (OTFS) signal, implemented at a base station, the method comprising: generating a plurality of coded bits from a plurality of data bits using a forward error correction (FEC) coder; generating a plurality of symbols from the plurality of coded bits using a symbol mapper; generating a first symbol stream based on a Tomlinson-Harashima Precoding (THP) lattice perturbation of the plurality of symbols; generating a second symbol stream based on a symplectic Fast Fourier Transform (SFFT) of the first symbol stream; generating a third symbol stream based on MMSE precoding the second symbol stream; generating a time-domain signal based on an inverse Fast Fourier Transform (IFFT) of the third symbol stream; generating the OTFS signal based on adding at least one cyclic prefix to the time-domain signal; and generating a transmission waveform of the OTFS signal.

8. The method of clause 7, wherein generating the third symbol stream is further based on an extrapolated channel estimate, and wherein the extrapolated channel estimate is based on at least one reference signal.

9. The method of clause 8, further comprising:
generating a fourth symbol stream based on an inverse symplectic Fast Fourier Transform (ISFFT) of the extrapolated channel estimate, and wherein generating the first symbol stream is further based on the fourth symbol stream.

10. A method for wireless communication using an orthogonal time frequency space (OTFS) signal, implemented at a base station, the method comprising: receiving a plurality of uplink reference signals via a plurality of antennas; compute precoding information based on processing the plurality of uplink reference signals; and precoding information bits based on the precoding information. Here, the processing of the plurality of uplink reference signals comprises: extracting an uplink orthogonal reference signal from the plurality of uplink reference signals; computing second order statistics associated with the uplink orthogonal reference signal; generating a channel estimate based on the uplink orthogonal reference signal and the computed second order statistics; and computing a reciprocity adjustment based on the channel adjustment. The precoding information is computed further based on the second order statistics and the reciprocity adjustment.

FIG. 131 is a block diagram illustration of an example of a wireless communication system 13100. The system 13100 may include one or more transmitters/receivers. For example, a transmitter located at a base station 13104 may transmit signals s(t) to a receiver device 13102, where the received signal r(t) may be affected by the wireless channel that includes air medium and may also include moving or stationary interferers or scatterers such as buildings, vegetation and vehicle. The receiver device 13102 may also transmit signals to the base station 13104, which are not explicitly shown in the drawing. The receiver device 13102 may be a user equipment such as a smartphone, a tablet computer, a laptop, or a non-mobile equipment such as a small cell base station or a wireless access receiver, and so on. The various transmitter-side techniques described in the present document may be implemented using the transmission circuitry of a base station 13104 and/or the receiver apparatus 13102. The various receiver-side techniques described in the present document may be implemented using receiver circuitry of the base station 13104 and/or the receiver apparatus 13102.

FIG. 132 is a block diagram representation of a communication apparatus 13200. The apparatus may include a processor 13202. The apparatus 13200 may include a memory 13204. The apparatus 13200 may include transmission and/or reception circuitry 13206. The processor 13202 may be configured to implement a method described in the present document. The memory 13204 may be configured to store data during the implementation of a method, or may store processor-executable code that, when executed by the processor 13202, causes the processor 13202 to implement a technique described in the present document. The transceiver circuitry 13206 may be configured to perform signal reception or signal transmission processing.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless networking receiver apparatus, comprising:
a surface of a light bulb configured to receive an electromagnetic signal from a transmitter, wherein the surface is structured to perform a non-electrical function of providing illumination, wherein the transmitter mapped a digital data to a digital amplitude modulation constellation in a time-frequency space, and wherein the digital amplitude modulation constellation was mapped to a delay-Doppler domain and transmitted to the surface of the light bulb according to an orthogonal time frequency space modulation (OTFS) signal scheme; and
a demodulator configured to:
demodulate an electrical signal generated from the electromagnetic signal; and
determine the digital data based on the demodulated electrical signal.

2. The wireless networking receiver apparatus of claim 1, wherein the light bulb comprises an electronically steerable antenna.

3. The wireless networking receiver apparatus of claim 2, wherein the electronically steerable antenna is configured to support a multiple-input multiple-output (MIMO) communication scheme with multiple transmit antennas, and wherein each of the multiple transmit antennas is configured to be steered by a real-time adjustment of a phase and an amplitude of a respective electronic feed.

4. The wireless networking receiver apparatus of claim 2, wherein the electronically steerable antenna comprises a Luneburg lens.

5. The wireless networking receiver apparatus of claim 1, further comprising:
- a cellular femto-cell transmitter configured to transmit the digital data according to a cellular radio standard.

6. The wireless networking receiver apparatus of claim 5, wherein the cellular radio standard comprises one or more of a Third Generation (3G) standard, a Fourth Generation (4G) standard, a Long-Term Evolution (LTE) standard, or a Fifth Generation (5G) standard.

7. The wireless networking receiver apparatus of claim 1, wherein the OTFS signal scheme comprises a guard grid (GG)-based OTFS (GG-OTFS) signal scheme that excludes a use of a cyclic prefix between OTFS symbols.

8. The wireless networking receiver apparatus of claim 7, wherein special symbols are allocated to a last $N_G$ delay dimensions on each Doppler dimension in the delay-Doppler domain, and wherein $N_G$ is a positive integer.

9. The wireless networking receiver apparatus of claim 8, wherein each of the special symbols is a zero value or a blank symbol.

10. The wireless networking receiver apparatus of claim 8, wherein each of the special symbols in a first Doppler dimension is a non-zero value symbol, and wherein each of the special symbols in other Doppler dimensions is a zero value or a blank symbol.

11. A method of wireless communication, comprising:
- generating, at a surface of a light bulb, an electrical signal from an electromagnetic signal received from a transmitter, wherein the surface is structured to perform a non-electrical function of providing illumination, wherein the transmitter mapped a digital data to a digital amplitude modulation constellation in a time-frequency space, and wherein the digital amplitude modulation constellation was mapped to a delay-Doppler domain and transmitted to the surface of the light bulb according to an orthogonal time frequency space modulation (OTFS) signal scheme; and
- demodulating the electrical signal; and
- determining the digital data based on the demodulated electrical signal.

12. The method of claim 11, wherein the light bulb comprises an electronically steerable antenna.

13. The method of claim 12, wherein the electronically steerable antenna is configured to support a multiple-input multiple-output (MIMO) communication scheme with multiple transmit antennas, and wherein each of the multiple transmit antennas is configured to be steered by a real-time adjustment of a phase and an amplitude of a respective electronic feed.

14. The method of claim 12, wherein the electronically steerable antenna comprises a Luneburg lens.

15. The method of claim 11, further comprising:
- transmitting, by a cellular femto-cell transmitter, the digital data according to a cellular radio standard.

16. The method of claim 15, wherein the cellular radio standard comprises one or more of a Third Generation (3G) standard, a Fourth Generation (4G) standard, a Long-Term Evolution (LTE) standard, or a Fifth Generation (5G) standard.

17. The method of claim 11, wherein the OTFS signal scheme comprises a guard grid (GG)-based OTFS (GG-OTFS) signal scheme that excludes a use of a cyclic prefix between OTFS symbols.

18. The method of claim 17, wherein special symbols are allocated to a last $N_G$ delay dimensions on each Doppler dimension in the delay-Doppler domain, and wherein $N_G$ is a positive integer.

19. The method of claim 18, wherein each of the special symbols is a zero value or a blank symbol.

20. The method of claim 18, wherein each of the special symbols in a first Doppler dimension is a non-zero value symbol, and wherein each of the special symbols in other Doppler dimensions is a zero value or a blank symbol.

* * * * *